(12) United States Patent
Oba

(10) Patent No.: US 12,497,082 B2
(45) Date of Patent: Dec. 16, 2025

(54) INFORMATION PROCESSING DEVICE, INFORMATION PROCESSING METHOD, AND INFORMATION PROCESSING PROGRAM

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 194 days.

(21) Appl. No.: 18/043,456

(22) PCT Filed: Aug. 27, 2021

(86) PCT No.: PCT/JP2021/031603
§ 371 (c)(1),
(2) Date: Feb. 28, 2023

(87) PCT Pub. No.: WO2022/050199
PCT Pub. Date: Mar. 10, 2022

(65) Prior Publication Data
US 2024/0034362 A1 Feb. 1, 2024

(30) Foreign Application Priority Data
Sep. 7, 2020 (JP) ................................ 2020-150181

(51) Int. Cl.
*B60W 60/00* (2020.01)
*B60W 50/08* (2020.01)

(52) U.S. Cl.
CPC ...... *B60W 60/0051* (2020.02); *B60W 50/082* (2013.01); *B60W 2540/215* (2020.02)

(58) Field of Classification Search
None
See application file for complete search history.

(56) References Cited

U.S. PATENT DOCUMENTS 8,618,922 B2 * 12/2013 Debouk .............. B60W 50/038
340/576
11,567,514 B2 * 1/2023 Musk ....................... G06N 3/08
(Continued)

FOREIGN PATENT DOCUMENTS

CN 107207013 A 9/2017
CN 107835932 A 3/2018
(Continued)

OTHER PUBLICATIONS

International Search Report (PCT/ISA/210), International Application No. PCT/JP2021/031603, dated Nov. 16, 2021.
(Continued)

*Primary Examiner* — Donald J Wallace
*Assistant Examiner* — Henry R Hinton
(74) *Attorney, Agent, or Firm* — Michael Best & Friedrich LLP

(57) ABSTRACT

Information processing is disclosed. In one example, an information processing device includes automated driving control notifies a vehicle driver of a condition enabling automated driving of the vehicle based on an operation design domain that is set for the vehicle. In another example, an information processing method notifies a vehicle driver of a condition enabling automated driving of the vehicle based on the set operation design domain for the vehicle. In another example, an information processing program is configured to cause a computer to execute an automated driving control step of making a notification to a driver of a vehicle regarding a condition enabling automated driving of the vehicle based on an operation design domain that is set for the vehicle.

17 Claims, 30 Drawing Sheets

(56) References Cited

U.S. PATENT DOCUMENTS

| | | | |
|---|---|---|---|
| 2015/0006028 A1 | 1/2015 | Strauss | |
| 2017/0313319 A1* | 11/2017 | Kishi | B60W 10/04 |
| 2019/0184998 A1* | 6/2019 | Zheng | B60W 30/182 |
| 2020/0079248 A1* | 3/2020 | Yamamoto | B60N 2/0025 |
| 2020/0150861 A1* | 5/2020 | Jiang | H04N 13/368 |
| 2020/0216095 A1* | 7/2020 | Isozaki | A61M 21/00 |
| 2021/0370983 A1 | 12/2021 | Oba | |
| 2022/0153282 A1* | 5/2022 | Matthias | G06T 7/20 |
| 2024/0227833 A1* | 7/2024 | Fields | G05D 1/0061 |

FOREIGN PATENT DOCUMENTS

| | | |
|---|---|---|
| JP | 2018180594 A | 11/2018 |
| JP | 2018189549 A | 11/2018 |
| JP | 2019079217 A | 5/2019 |
| WO | 2018189549 A1 | 1/2017 |
| WO | WO-2019202881 A1 | 10/2019 |
| WO | 2020100539 A1 | 5/2020 |

OTHER PUBLICATIONS

Chinese Office Action date Sep. 24, 2025 for corresponding Chinese Application No. 202180056331.5.

* cited by examiner

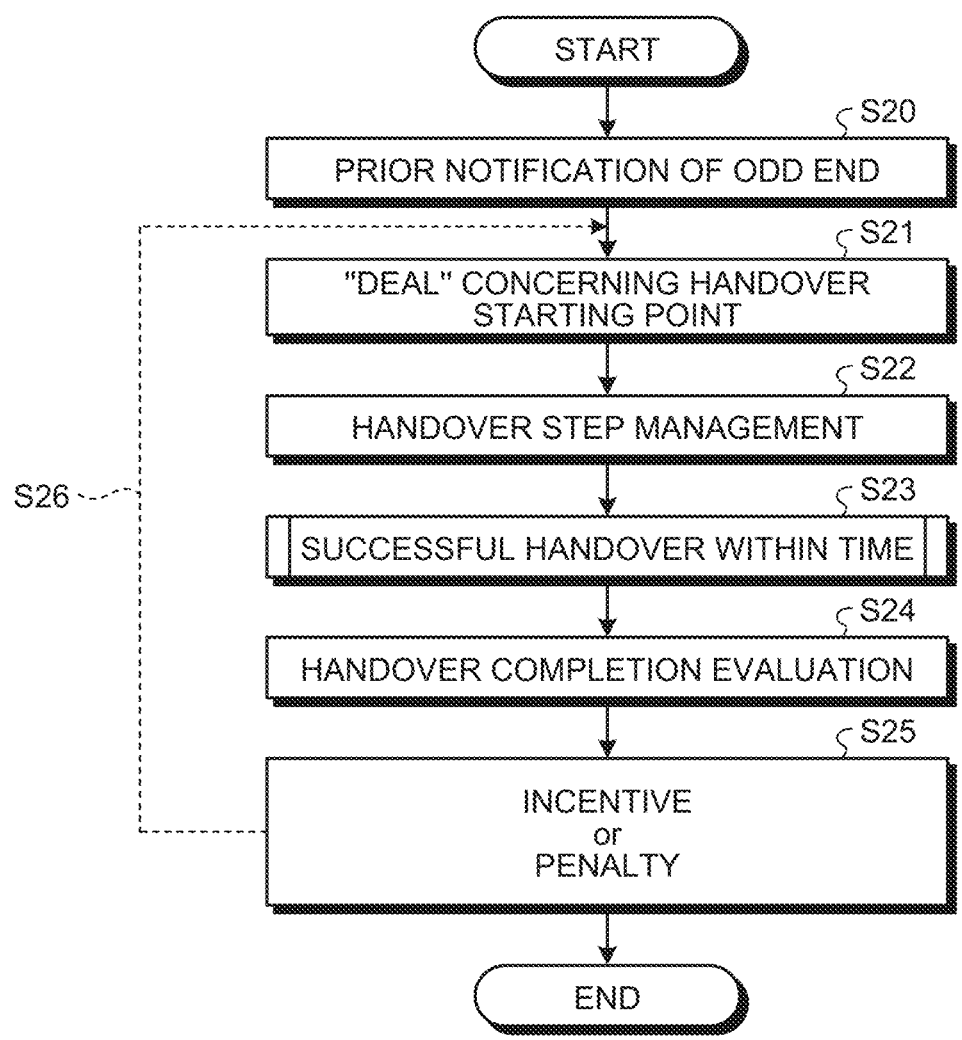

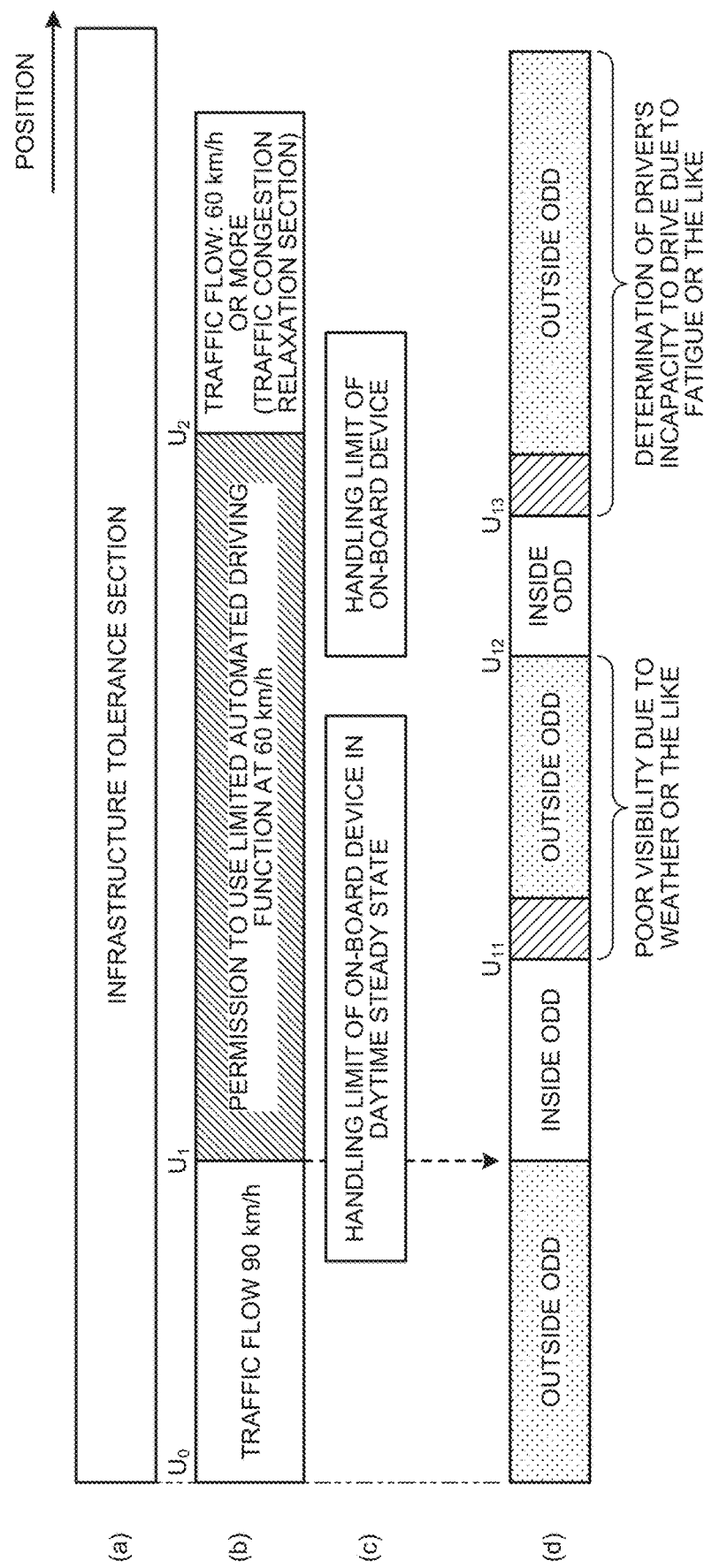

FIG.23A
(a)
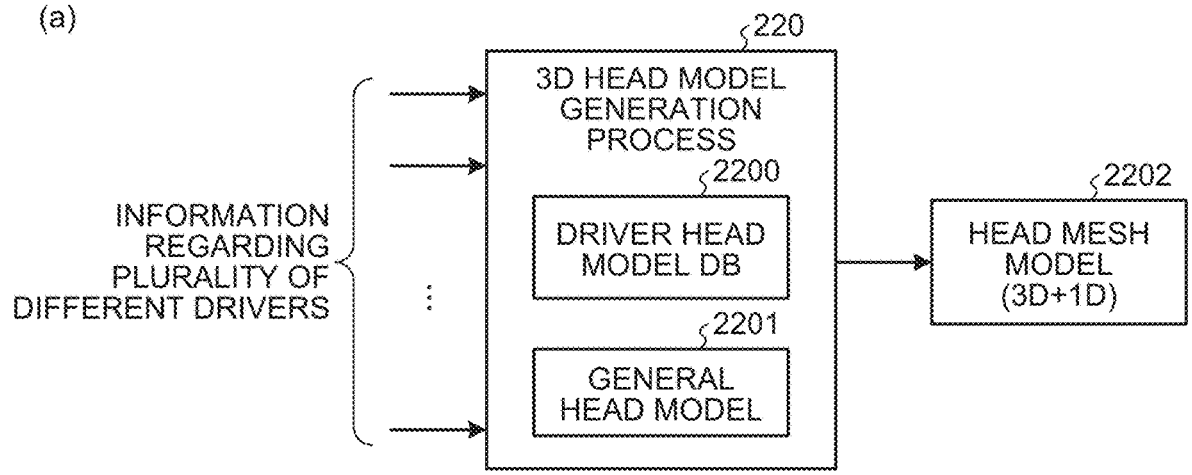
(b)
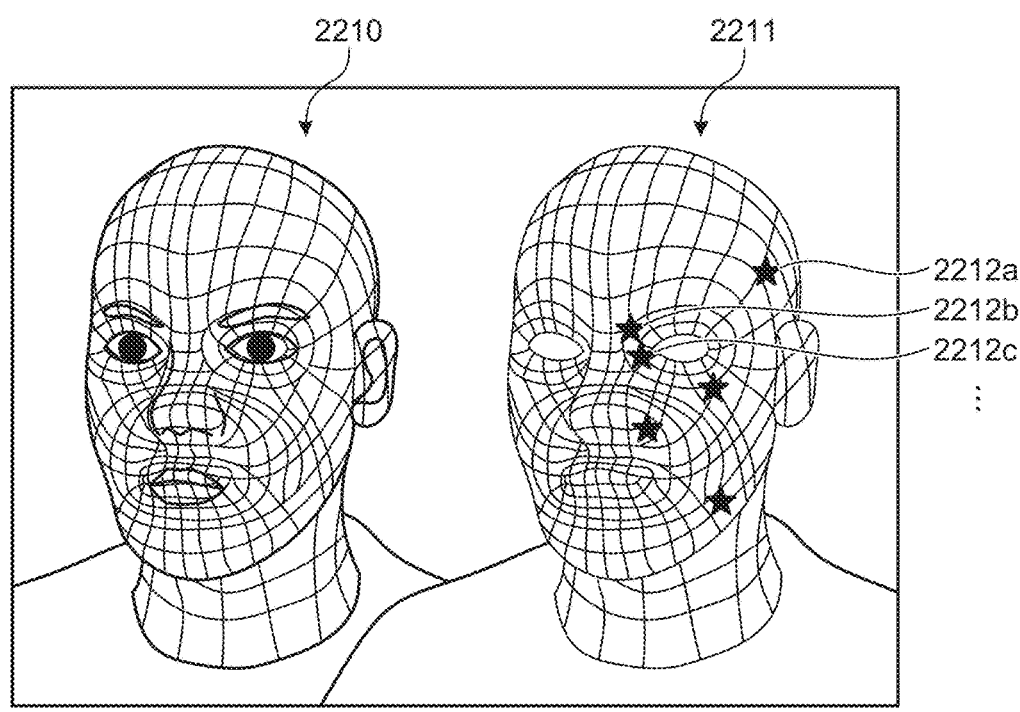

FIG.23B
(a)
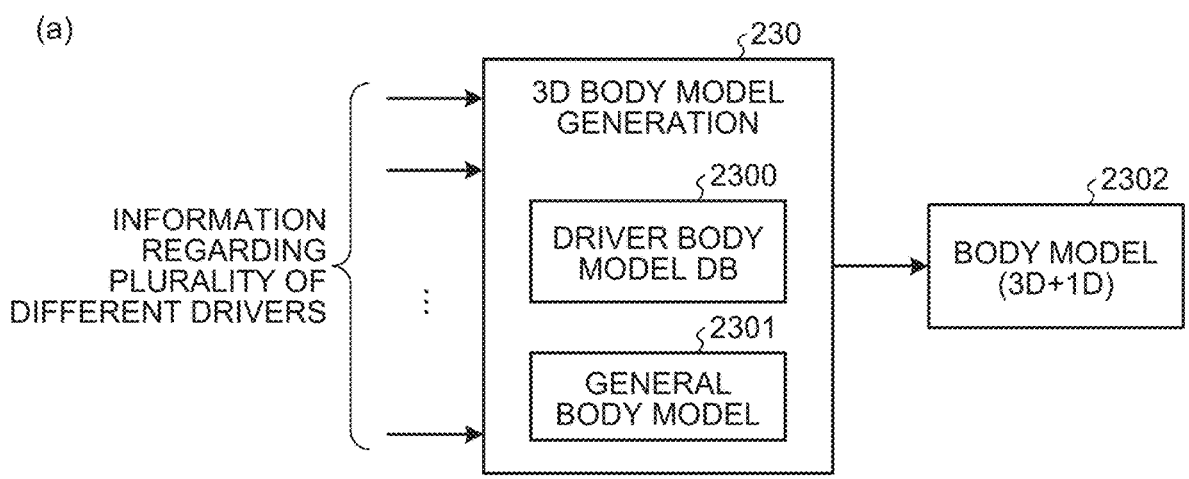
(b)
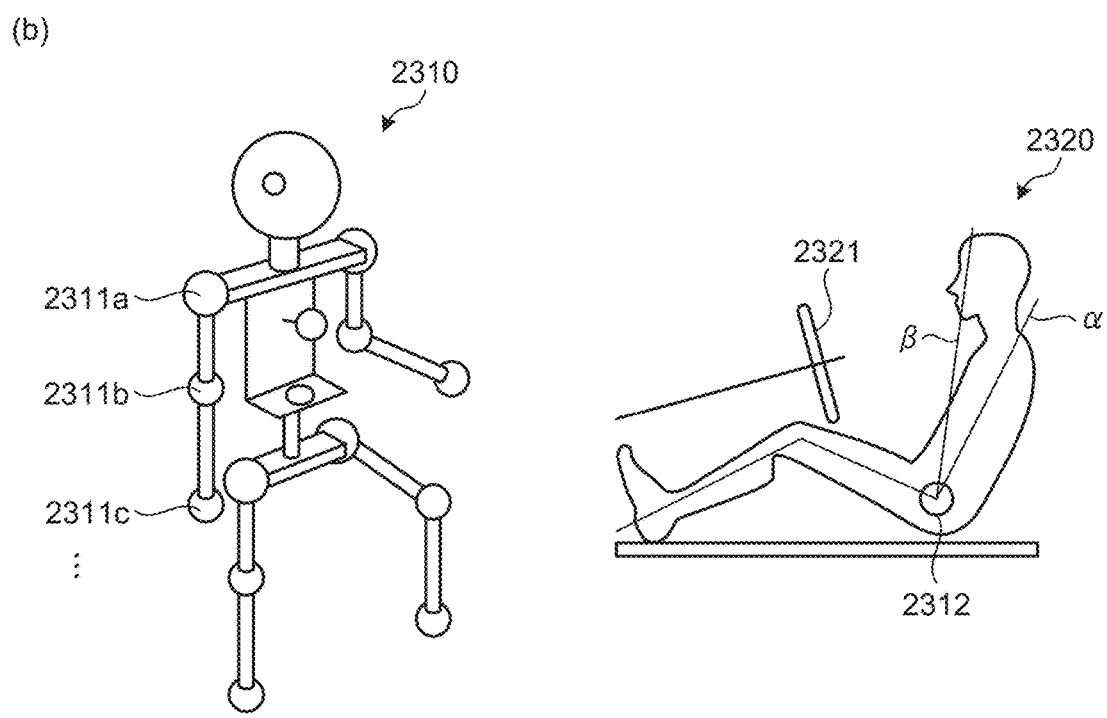

INFORMATION PROCESSING DEVICE, INFORMATION PROCESSING METHOD, AND INFORMATION PROCESSING PROGRAM

FIELD

The present disclosure relates to an information processing device, an information processing method, and an information processing program.

BACKGROUND

In recent years, an automated driving technology in which a vehicle control system (information processing system) controls a vehicle has been actively developed. However, even in a case where such an automated driving technology becomes widespread, it is presumed that many technical problems still remain until a vehicle that travels with automated driving under autonomous independent control alone can travel at a traveling speed equivalent to the speed of existing manual-controlled driving. Therefore, it has been examined to limit automated driving to a travel section capable of achieving good maintenance of a road environment and acquisition of preliminary monitoring information of a constant road environment, for example, and to attempt, in this limited section, cooperative automated driving using the preliminary monitoring information.

In this case, it is expected to have a situation having a mixed section, specifically, a section in which an automated driving permissible section, which is a road section permitting autonomous control of automated driving by the vehicle control system, and a manual-controlled driving section, which is a road section not permitting automated driving, are mixed depending on conditions such as actual road infrastructure maintenance conditions. That is, there might be not only a situation in which the vehicle control system completely autonomously and continuously performs automated driving travel, but also a situation requiring handover of the driving control from the automated driving as described above to manual-controlled driving in which the driver performs driving control such as steering.

Patent Literature 1 describes a technique related to handover of control from automated driving to manual-controlled driving.

CITATION LIST

Patent Literature

Patent Literature 1: JP 2018-180594 A

SUMMARY

Technical Problem

Handover of the control from automated driving to manual-controlled driving, when executed with insufficient preparation for manual-controlled driving on the driver side, has involved a concern of occurrence of social harm such as induction of an accident on the following vehicle.

The present disclosure aims to provide an information processing device, an information processing method, and an information processing program capable of appropriately executing handover from automated driving to manual-controlled driving.

Solution to Problem

For solving the problem described above, an information processing device according to one aspect of the present disclosure has an automated driving control unit that makes a notification to a driver of a vehicle regarding a condition enabling automated driving of the vehicle based on an operation design domain that is set for the vehicle.

BRIEF DESCRIPTION OF DRAWINGS

FIG. 6 is a flowchart schematically illustrating an example of handover processing from automated driving to manual-controlled driving according to the embodiment.

FIG. 20 is a schematic diagram for more specifically describing a setting example of an ODD section applicable to the embodiment.

FIG. 23A is a schematic diagram for schematically illustrating generation of a 3D head model applicable to the embodiment.

FIG. 23B is a schematic diagram for schematically illustrating generation of a body model applicable to the embodiment.

DESCRIPTION OF EMBODIMENTS

Figure 1:
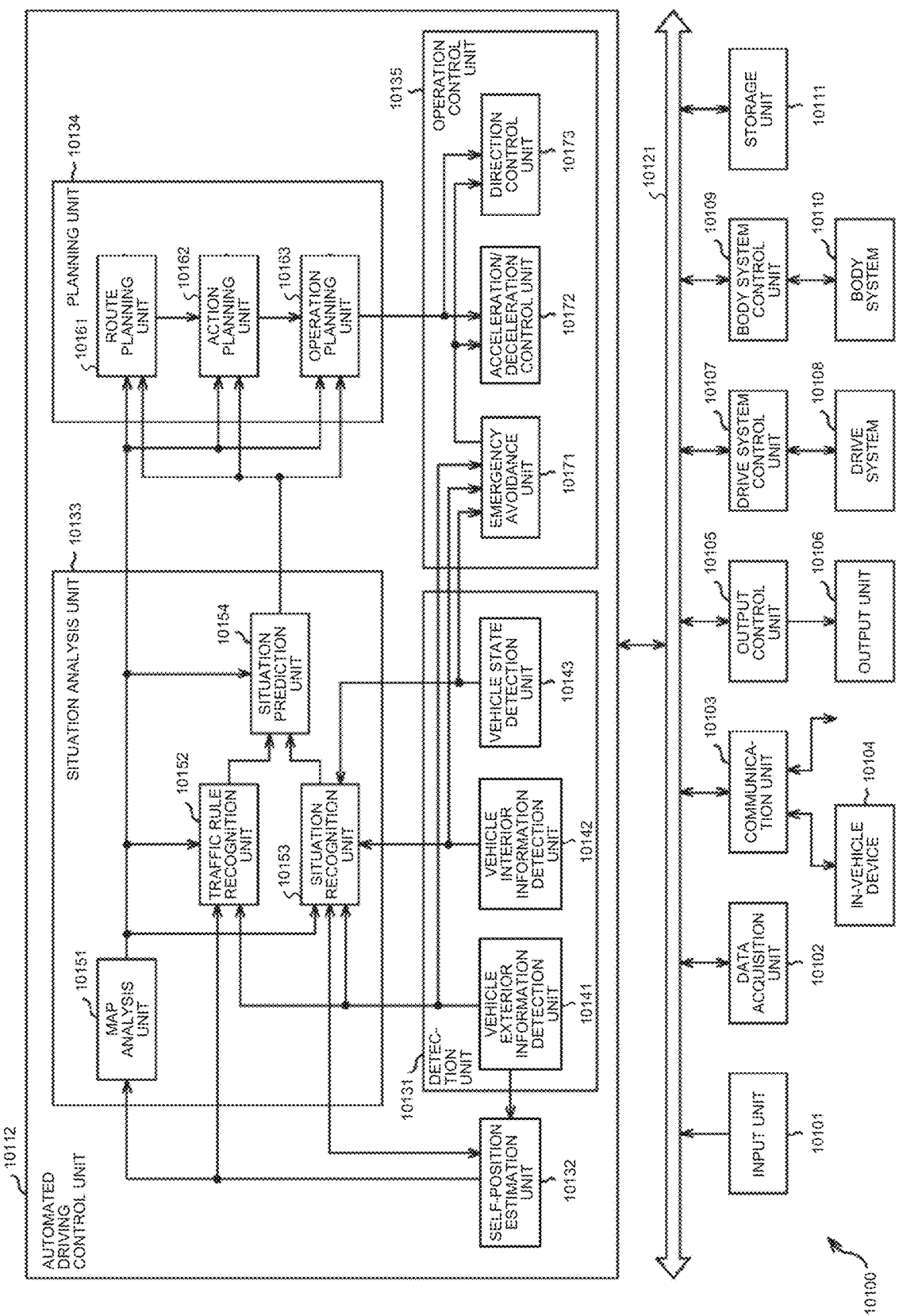
FIG. 1 is a block diagram illustrating a configuration example of a schematic function of a vehicle control system applicable to an embodiment of the present disclosure.

Embodiments of the present disclosure will be described below in detail with reference to the drawings. In each of the following embodiments, the same parts are denoted by the same reference symbols, and a repetitive description thereof will be omitted.

Hereinafter, embodiments of the present disclosure will be described in the following order.

0. Overview of present disclosure
1. Configuration applicable to embodiment of present disclosure
2. Outline of driving automation levels based on SAE
3. Embodiments according to present disclosure
 3-1. Outline of embodiment
 3-2. Human Centered Design (HCD) according to embodiment
  3-2-1. Outline of HCD according to embodiment
  3-2-2. Superiority of HCD in automated driving
   3-2-2-1. Excessive dependence
   3-2-2-2. HCD
   3-2-2-3. Benefits for driver
   3-2-2-4. Driver's working memory and mind during driving
   3-2-2-5. "Deal" between system and driver
   3-2-2-6. Application of driving automation level 4
   3-2-2-7. Effect of adoption of HCD
  3-2-3. Specific example of HCD according to embodiment
   3-2-3-1. Example of automated driving applied with HCD according to embodiment
   3-2-3-2. Evaluation of driver's recovery action
   3-2-3-3. Bird's-eye view display of traveling path applicable to embodiment
  3-2-4. HCD control configuration example according to embodiment
 3-3. Driving automation level 4 applicable to embodiment
  3-3-1. Basic structure
  3-3-2. ODD at driving automation level 4
  3-3-3. Application example of driving automation level 4 according to embodiment
 3-4. Example of application of HCD to driving automation level 3
 3-5. ODD decision element
 3-6. Driver Monitoring System (DMS) according to embodiment
  3-6-1. Outline of DMS according to embodiment
  3-6-2. More specific description of DMS according to embodiment
  3-6-3. Quantification of Quality of Action (QoA) according to embodiment
  3-6-4. Configuration applicable to DMS according to embodiment
  3-6-5. Specific example of evaluation of action quality according to embodiment
  3-6-6. Summary of DMS according to embodiment <<0. Overview of Present Disclosure>>

The present disclosure relates to processing performed in a handover from a vehicle's automated driving system, which is a system allowing autonomous traveling of a vehicle, to driver's manual-controlled driving in which the driver performs operations such as steering of the vehicle in a case where traveling control of the vehicle is handed over from automated driving to manual-controlled driving. More specifically, the present disclosure provides a mechanism of assisting the self-learning on the driver to proceed naturally through repeated use of automated driving by the driver so as to achieve smooth handover of driving from the vehicle to the driver.

That is, the automated driving function is merely knowledge or information obtained by theoretical descriptions or materials at the beginning of the use, and thus is a physically unknown function, and thus, it is considered to make the driver feel anxious and even skeptical about the system they have no practical experience. Meanwhile, in normal cases of action determination, when a person takes an action with some risk in order to obtain something, the person makes a selective determination so as to balance it out with the risk.

Therefore, while the driver who has started to use automated driving still has a sense of uneasiness toward the time of traveling by the automated driving, a certain attentive awareness remains even during the use of the automated driving function in order to alleviate the sense of risk. This would leave some awareness required at the time of using the automated driving function, on the driver, rather than completely disappearing.

Here, when the event handling performance of automated driving system is gradually improved and the uneasiness felt as a risk is reduced by repeated use of automated driving, the user of automated driving releases their uneasiness about the excessive dependence on the automated driving. In particular, an advanced automated driving function that is about to be introduced in recent years is required to include functions, such as a function of taking measures while avoiding an accident even in a situation where a driver is required, under a satisfactory condition, to perform manual-controlled driving from automated driving and where it is difficult for the driver to perform recovery to manual-controlled driving, and a function of minimizing an impact of the accident even in a situation where the accident is unavoidable.

In a case where automated driving having such advanced functions is realized, the driver's anxiety as a risk for excessive dependence on the automated driving gradually disappears, leading to a possibility of occurrence of a situation in which the driver's preparation for the handover is insufficient for the request for the manual-controlled driving. Therefore, in a case where it is difficult for the driver to take necessary measures within a time limit, introduction of measures such as an emergency stop by automated driving as a safe measure has been studied as an impact risk minimization process.

However, such a measure in which the vehicle frequently performs deceleration or emergency stops in every road environment would lead to a situation that hinders traveling of other vehicles, such as sudden deceleration of the following vehicle, a stop in a road environment with poor visibility, and blockage of a narrow road such as a bridge with a narrow traveling zone, occurring in a form having an impact which is not directly visible to the driver themselves. The impact of these situations might cause a decrease in efficiency of an environment of artery roads of social activity. That is, the existing automated driving control mechanism does not include a means of reflecting these social influences as a sense of risk in the action determination when the driver uses the automated driving function.

An object of the present disclosure is to provide a mechanism that enables a driver to reflect the above-described social influence as a sense of risk in an action determination when using the automated driving function.

<<1. Configuration Applicable to Embodiment of Present Disclosure>>

First, a configuration applicable to each embodiment of the present disclosure will be described.

FIG. 1 is a block diagram illustrating a configuration example of a schematic function of a vehicle control system 10100 which is an example of a moving body control system applicable to an embodiment of the present disclosure.

Hereinafter, when a vehicle having the vehicle control system 10100 is distinguished from other vehicles, the vehicle is referred to as an own vehicle.

The vehicle control system 10100 includes an input unit 10101, a data acquisition unit 10102, a communication unit 10103, an in-vehicle device 10104, an output control unit 10105, an output unit 10106, a drive system control unit 10107, a drive system 10108, a body system control unit 10109, a body system 10110, a storage unit 10111, and an automated driving control unit 10112.

Among these, the input unit 10101, the data acquisition unit 10102, the communication unit 10103, the output control unit 10105, the drive system control unit 10107, the body system control unit 10109, the storage unit 10111, and the automated driving control unit 10112 are interconnected via a communication network 10121. The communication network 10121 includes, for example, an in-vehicle communication network conforming to an arbitrary standard such as a controller area network (CAN), a local interconnect network (LIN), a local area network (LAN), or FlexRay (registered trademark), and a bus. Note that each unit of the vehicle control system 10100 may be directly connected without the communication network 10121.

Note that, hereinafter, in a case where each unit of the vehicle control system 10100 performs communication via the communication network 10121, description of the communication network 10121 will be omitted. For example, when the input unit 10101 and automated driving control unit 10112 communicate with each other via communication network 10121, it is simply described that the input unit 10101 and automated driving control unit 10112 communicate with each other.

The input unit 10101 includes a device used by a passenger for inputting various data, instructions, and the like. For example, the input unit 10101 includes an operation device such as a touch panel, a button, a switch, and a lever and an operation device such as a microphone and a camera that can be input by a method other than manual operation by voice, gesture, and the like. Furthermore, the input unit 10101 may be, for example, a remote control device using infrared rays or other radio waves, or an external connection device such as a mobile device or a wearable device compatible with the operation of the vehicle control system 10100. The input unit 10101 generates an input signal based on data, an instruction, or the like input by a passenger (for example, a driver), and supplies the generated input signal to each unit of the vehicle control system 10100.

The data acquisition unit 10102 includes devices such as various sensors that acquire data used for processing of the vehicle control system 10100, and supplies the acquired data to individual units of the vehicle control system 10100.

For example, the data acquisition unit 10102 includes various sensors for detecting a state or the like of the own vehicle. Specifically, for example, the data acquisition unit 10102 includes a gyro sensor, an acceleration sensor, an inertial measurement unit (IMU), and a sensor for detecting an operation amount of an accelerator pedal, an operation amount of a brake pedal, a steering angle of a steering wheel, an engine speed, a motor speed, a wheel rotation speed, or the like.

Furthermore, for example, the data acquisition unit 10102 includes various sensors for detecting information outside the own vehicle. Specifically, for example, the data acquisition unit 10102 includes an imaging device such as a time of flight (ToF) camera, a stereo camera, a monocular camera, an infrared camera, and other cameras. Furthermore, for example, the data acquisition unit 10102 includes an environment sensor for detecting weather, or the like, and a surrounding information detection sensor for detecting an object around the own vehicle. The environment sensor includes, for example, a raindrop sensor, a fog sensor, a sunshine sensor, a snow sensor, and the like. Examples of the surrounding information detection sensor include an ultrasonic sensor, a radar, a light detection and ranging or laser imaging detection and ranging (LiDAR), and a sonar.

Furthermore, for example, the data acquisition unit 10102 includes various sensors for detecting the current position of the own vehicle. Specifically, for example, the data acquisition unit 10102 includes a device such as a global navigation satellite system (GNSS) receiver that receives a GNSS signal from a GNSS satellite.

Furthermore, the data acquisition unit 10102 includes various sensors for detecting vehicle internal information, for example. Specifically, for example, the data acquisition unit 10102 includes devices such as an imaging device that images the driver, a biometric sensor that detects biometric information of the driver, and a microphone that collects sound of the vehicle interior. In this case, the imaging device is preferably capable of imaging the front of the head, the upper body, the waist, the lower body, and the feet of the driver. A plurality of imaging devices can also be provided so as to image each body part. The biometric sensor is provided, for example, on a seat surface, a steering wheel, or the like, and detects biometric information of an occupant sitting on a seat or a driver gripping the steering wheel.

The communication unit 10103 communicates with the in-vehicle device 10104, various devices outside the vehicle, a server, a base station, and the like, transmits data supplied from each unit of the vehicle control system 10100, and supplies received data to each unit of the vehicle control system 10100. The communication protocol supported by the communication unit 10103 is not particularly limited, and the communication unit 10103 can support a plurality of types of communication protocols.

For example, the communication unit 10103 performs wireless communication with the in-vehicle device 10104 by wireless LAN, Bluetooth (registered trademark), near field communication (NFC), wireless USB (WUSB), or the like. Furthermore, for example, the communication unit 10103 performs wired communication with the in-vehicle device 10104 by universal serial bus (USB), high-definition multimedia interface (HDMI) (registered trademark), mobile high-definition link (MHL), or the like via a connection terminal (together with a cable, when necessary) not illustrated.

Furthermore, for example, the communication unit 10103 communicates with a device (for example, an application server or a control server) existing on an external network (for example, the Internet, a cloud network, or an operator-specific network) via a base station or an access point. Furthermore, for example, using a peer to peer (P2P) technology, the communication unit 10103 communicates with a terminal (for example, a terminal of a pedestrian or a store, or a machine type communication (MTC) terminal) existing in the vicinity of the own vehicle. Furthermore, for example, the communication unit 10103 performs V2X communication such as vehicle to vehicle communication, vehicle to infrastructure communication, own vehicle to home (Vehicle to Home) communication, and vehicle to pedestrian communication. Furthermore, for example, the communication unit 10103 includes a beacon receiver, and receives radio waves or electromagnetic waves transmitted from a wireless station or the like installed on a road to acquire information such as a current position, congestion, traffic restrictions, and required time.

The in-vehicle device 10104 includes devices such as a mobile device or a wearable device possessed by a passenger, an information device carried in or installed on the own vehicle, and a navigation device for searching for a route to a certain destination.

The output control unit 10105 controls output of various types of information to a passenger of the own vehicle or the outside of the vehicle. For example, by generating an output signal including at least one of visual information (for example, image data) or auditory information (for example, audio data) and supplying the output signal to the output unit 10106, the output control unit 10105 controls the output of the visual information and the auditory information from the output unit 10106. Specifically, for example, the output control unit 10105 combines image data imaged by different imaging devices of the data acquisition unit 10102 to generate an image such as a bird's eye view image or a panoramic image, and supplies an output signal including the generated image to the output unit 10106. Furthermore, for example, the output control unit 10105 generates sound data including a warning sound, a warning message, or the like for danger such as collision, contact, or entry into a danger zone, and supplies an output signal including the generated sound data to the output unit 10106.

The output unit 10106 includes a device capable of outputting visual information or auditory information to a passenger of the own vehicle or the outside of the vehicle. For example, the output unit 10106 includes devices such as a display device, an instrument panel, a head up display (HUD), an audio speaker, a headphone, a wearable device such as an eye-glass display worn by a passenger, a projector, and a lamp. The display device included in the output unit 10106 may be a device that displays visual information in the field of view of the driver, such as a head-up display, a transmissive display, or a device having an augmented reality (AR) display function, in addition to a device having a normal display.

The drive system control unit 10107 controls the drive system 10108 by generating various control signals and supplying the control signals to the drive system 10108. In addition, on an as-needed basis, the drive system control unit 10107 supplies a control signal to each unit other than the drive system 10108 and performs notification of a control state of the drive system 10108 and the like.

The drive system 10108 includes various devices related to the drive system of the own vehicle. For example, the drive system 10108 includes devices such as a driving force generation device for generating a driving force such as an internal combustion engine or a driving motor, a driving force transmission mechanism for transmitting the driving force to wheels, a steering mechanism for adjusting a steering angle, a braking device for generating a braking force, an antilock brake system (ABS), an electronic stability control (ESC), and an electric power steering device.

The body system control unit 10109 controls the body system 10110 by generating various control signals and supplying the control signals to the body system 10110. In addition, on an as-needed basis, the body system control unit 10109 supplies a control signal to each unit other than the body system 10110 and performs notification of a control state of the body system 10110 and the like.

The body system 10110 includes various devices of a body system mounted on a vehicle body. For example, the body system 10110 includes devices such as a keyless entry system, a smart key system, a power window device, a power seat, a steering wheel, an air conditioner, and various lamps (for example, a head lamp, a back lamp, a brake lamp, an indicator, and a fog lamp).

The storage unit 10111 includes a storage medium that stores data and a controller that controls reading and writing of data from and to the storage medium. The storage medium included in the storage unit 10111 can be implemented by applying one or more devices out of a magnetic storage device such as read only memory (ROM), random access memory (RAM), and a hard disc drive (HDD), a semiconductor storage device, an optical storage device, and a magneto-optical storage device, for example. The storage unit 10111 stores various programs, data, and the like used by individual units of the vehicle control system 10100. For example, the storage unit 10111 stores map data, examples of which including a three-dimensional high-precision map such as a dynamic map, a global map that is less accurate than the high-precision map and covers a wide area, and a local map including information around the own vehicle.

Incidentally, one of the maps stored in the storage unit 10111 is a local dynamic map (refer to as an LDM). The LDM conceptually includes four hierarchies, specifically, static data (type 1), transient static data (type 2), transient dynamic data (type 3), and dynamic data (type 4) according to the change speed of data.

In FIG. 1, the automated driving control unit 10112 includes a detection unit 10131, a self-position estimation unit 10132, a situation analysis unit 10133, a planning unit 10134, and an operation control unit 10135. The detection unit 10131, the self-position estimation unit 10132, the situation analysis unit 10133, the planning unit 10134, and the operation control unit 10135 are implemented by a predetermined program operating on a central processing unit (CPU). Implementation is not limited to this, and some or all of the detection unit 10131, the self-position estimation unit 10132, the situation analysis unit 10133, the planning unit 10134, and the operation control unit 10135 can be implemented by hardware circuits operating in cooperation with each other.

The automated driving control unit 10112 performs control related to automated driving such as autonomous traveling or driving assistance. Specifically, the automated driving control unit 10112 performs cooperative control for the purpose of implementing a function of an advanced driver assistance system (ADAS) including collision avoidance or impact mitigation of the own vehicle, follow-up traveling based on an inter-vehicle distance, vehicle speed maintaining traveling, a collision warning of the own vehicle, and a lane deviation warning of the own vehicle, for example. Furthermore, for example, the automated driving control unit 10112 performs cooperative control for the purpose of automated driving or the like in which the vehicle autonomously travels without depending on the operation of the driver.

The detection unit 10131 detects various types of information necessary for controlling the automated driving. The detection unit 10131 includes a vehicle exterior information detection unit 10141, a vehicle interior information detection unit 10142, and a vehicle state detection unit 10143.

The vehicle exterior information detection unit 10141 performs processing of detecting information outside the own vehicle based on data or signals from each unit of the vehicle control system 10100. For example, the vehicle exterior information detection unit 10141 performs detection processing, recognition processing, and tracking processing regarding an object around the own vehicle, and processing of detecting a distance to the object. Examples of the object to be detected include a vehicle, a person, an obstacle, a structure, a road, a traffic light, a traffic sign, a road sign, and the like. Furthermore, for example, the vehicle exterior information detection unit 10141 performs processing of detecting a surrounding environment of the own vehicle. The surrounding environment to be detected includes weather, temperature, humidity, brightness, and a road surface condition.

The vehicle exterior information detection unit 10141 supplies data indicating a result of the detection processing to the units such as: the self-position estimation unit 10132; units in the situation analysis unit 10133, such as a map analysis unit 10151, a traffic rule recognition unit 10152, and a situation recognition unit 10153; and an emergency avoidance unit 10171 in the operation control unit 10135.

The vehicle interior information detection unit 10142 performs vehicle interior information detection processing based on data or signals from each unit of the vehicle control system 10100. For example, the vehicle interior information detection unit 10142 performs processing such as driver authentication processing and recognition processing, driver state detection processing, passenger detection processing, and vehicle interior environment detection processing. Examples of the driver state to be detected include a physical condition, a wakefulness level, a concentration level, a fatigue level, and a line-of-sight direction. Examples of the vehicle interior environment to be detected include temperature, humidity, brightness, and odor. The vehicle interior information detection unit 10142 supplies data indicating a result of the detection processing to the situation recognition unit 10153 of the situation analysis unit 10133, the emergency avoidance unit 10171 of the operation control unit 10135, and the like.

The vehicle state detection unit 10143 performs processing of detecting the state of the own vehicle based on data or signals from each unit of the vehicle control system 10100. Examples of the state of the own vehicle to be detected include a speed, an acceleration, a steering angle, presence or absence of abnormality and details of the abnormality, a driving operation state, a position and inclination of a power seat, a door lock state, and states of other on-board devices. The vehicle state detection unit 10143 supplies data indicating a result of the detection processing to the situation recognition unit 10153 of the situation analysis unit 10133, the emergency avoidance unit 10171 of the operation control unit 10135, and the like.

The self-position estimation unit 10132 performs estimation processing of the position, attitude, and the like of the own vehicle based on data or signals from each unit of the vehicle control system 10100, such as the vehicle exterior information detection unit 10141, and the situation recognition unit 10153 of the situation analysis unit 10133. Furthermore, the self-position estimation unit 10132 generates a local map (hereinafter, referred to as a self-position estimation map) used for estimating the self position as necessary. The self-position estimation map is, for example, a highly accurate map using a technique such as simultaneous localization and mapping (SLAM). The self-position estimation unit 10132 supplies data indicating a result of the estimation processing to units in the situation analysis unit 10133, such as the map analysis unit 10151, the traffic rule recognition unit 10152, and the situation recognition unit 10153. Furthermore, the self-position estimation unit 10132 stores the self-position estimation map in the storage unit 10111.

The situation analysis unit 10133 performs processing of analyzing the own vehicle and the surrounding situation. The situation analysis unit 10133 includes the map analysis unit 10151, the traffic rule recognition unit 10152, the situation recognition unit 10153, and a situation prediction unit 10154.

Using data or signals from each unit of the vehicle control system 10100, such as the self-position estimation unit 10132 and the vehicle exterior information detection unit 10141 as necessary, the map analysis unit 10151 performs processing of analyzing various maps stored in the storage unit 10111 and constructs a map including information necessary for automated driving processing. The map analysis unit 10151 supplies the constructed map to the traffic rule recognition unit 10152, the situation recognition unit 10153, the situation prediction unit 10154, and to the units in the planning unit 10134, such as a route planning unit 10161, an action planning unit 10162, and an operation planning unit 10163.

The traffic rule recognition unit 10152 performs processing of recognizing traffic rules around the own vehicle based on data or signals from each unit of the vehicle control system 10100, such as the self-position estimation unit 10132, the vehicle exterior information detection unit 10141, and the map analysis unit 10151. This recognition processing leads to recognition of information such as a position and a state of a signal around the own vehicle, details of traffic regulations around the own vehicle, and a lane on which the own vehicle can travel. The traffic rule recognition unit 10152 supplies data indicating a result of the recognition processing to the situation prediction unit 10154 and the like.

The situation recognition unit 10153 performs recognition processing on a situation related to the own vehicle based on data or signals from each unit of the vehicle control system 10100, such as the self-position estimation unit 10132, the vehicle exterior information detection unit 10141, the vehicle interior information detection unit 10142, the vehicle state detection unit 10143, and the map analysis unit 10151. For example, the situation recognition unit 10153 performs recognition processing on situations such as own vehicle situations, own vehicle surrounding situations, and own vehicle driver situations. In addition, the situation recognition unit 10153 generates a local map (hereinafter, it is referred to as a situation recognition map) used to recognize the situation around the own vehicle as necessary. The situation recognition map is an occupancy grid map, for example.

Examples of the own vehicle situations to be recognized include the position, attitude, and movement (for example, speed, acceleration, and moving direction) of the own vehicle, and the presence or absence of abnormality as well as details of the abnormality if any. Examples of the own vehicle surrounding situations to be recognized include a type and a position of a surrounding stationary object, a type, a position, and a movement (for example, speed, acceleration, moving direction, and the like) of a surrounding moving object, a configuration of a surrounding road and a state of a road surface, as well as conditions such as surrounding weather, temperature, humidity, and brightness. Examples of the driver situations to be recognized include a driver's physical condition, a wakefulness level, a concentration level, a fatigue level, movement of a line of sight, and driving operation.

The situation recognition unit 10153 supplies data (including a situation recognition map as necessary) indicating a result of the recognition processing to the self-position estimation unit 10132, the situation prediction unit 10154, and the like. In addition, the situation recognition unit 10153 stores the situation recognition map in the storage unit 10111.

The situation prediction unit 10154 performs prediction processing on a situation related to the own vehicle based on data or signals from each unit of the vehicle control system 10100, such as the map analysis unit 10151, the traffic rule recognition unit 10152, and the situation recognition unit 10153. For example, the situation prediction unit 10154 performs prediction processing on situations such as the own vehicle situations, the own vehicle surrounding situations, and the driver situations.

Examples of the own vehicle situations to be predicted include behavior of the own vehicle, occurrence of abnormality, and a travelable distance. Examples of the own vehicle surrounding situations to be predicted include behavior of a mobile body around the own vehicle, a change in a signal state, and a change in environment such as weather. Examples of the driver situations to be predicted include the behavior and physical condition of the driver.

The situation prediction unit 10154 supplies data indicating a result of the prediction processing, together with the data from the traffic rule recognition unit 10152 and the situation recognition unit 10153, to the units of the planning unit 10134, such as the route planning unit 10161, the action planning unit 10162, and the operation planning unit 10163, and the like.

The planning unit 10134 includes a route planning unit 10161, an action planning unit 10162, and an operation planning unit 10163.

The route planning unit 10161 plans a route (traveling path) to a destination based on data or signals from each unit of the vehicle control system 10100, such as the map analysis unit 10151 and the situation prediction unit 10154. For example, the route planning unit 10161 sets a route from the current position to a designated destination based on the global map. In addition, the route planning unit 10161 appropriately changes the route based on a situation such as a traffic congestion, a traffic accident, a traffic restriction, and construction, and based on conditions such as a physical condition of the driver, for example. The route planning unit 10161 supplies data indicating the planned route to the action planning unit 10162 and the like.

The action planning unit 10162 plans an action of the own vehicle for achieving safe traveling on the route planned by the route planning unit 10161 within a planned time based on data or signals from each unit of the vehicle control system 10100, such as the map analysis unit 10151 and the situation prediction unit 10154. For example, the action planning unit 10162 performs planning including start, stop, traveling direction (for example, forward movement, backward movement, left turn, right turn, direction change, and the like), traveling lane, traveling speed, and overtaking. The action planning unit 10162 supplies data indicating the planned action of the own vehicle to the operation planning unit 10163 and the like.

The operation planning unit 10163 plans the operation of the own vehicle for implementing the action planned by the action planning unit 10162 based on data or signals from each unit of the vehicle control system 10100, such as the map analysis unit 10151 and the situation prediction unit 10154. For example, the operation planning unit 10163 plans acceleration, deceleration, a travel trajectory, and the like. The operation planning unit 10163 supplies data indicating the planned operation of the own vehicle to units of the operation control unit 10135, such as an acceleration/deceleration control unit 10172, and a direction control unit 10173.

The operation control unit 10135 controls operations of the own vehicle. The operation control unit 10135 includes the emergency avoidance unit 10171, the acceleration/deceleration control unit 10172, and the direction control unit 10173.

Based on detection results of the vehicle exterior information detection unit 10141, the vehicle interior information detection unit 10142, and the vehicle state detection unit 10143, the emergency avoidance unit 10171 performs processing of detecting an emergency such as collision, contact, entry into a danger zone, abnormality of the driver, or abnormality of the vehicle. When having detected the occurrence of an emergency, the emergency avoidance unit 10171 plans an operation of the own vehicle for avoiding the emergency, such as a sudden stop or a sudden turn. The emergency avoidance unit 10171 supplies data indicating the planned operation of the own vehicle to the acceleration/deceleration control unit 10172, the direction control unit 10173, and the like.

The acceleration/deceleration control unit 10172 performs acceleration/deceleration control for implementation of the operation of the own vehicle planned by the operation planning unit 10163 or the emergency avoidance unit 10171. For example, the acceleration/deceleration control unit 10172 calculates a control target value to be used by the driving force generation device or the braking device for implementation of the planned acceleration, deceleration, or sudden stop, and supplies a control command indicating the calculated control target value to the drive system control unit 10107.

The direction control unit 10173 performs direction control for implementation of the operation of the own vehicle planned by the operation planning unit 10163 or the emergency avoidance unit 10171. For example, the direction control unit 10173 calculates a control target value of the steering mechanism for implementation of the travel trajectory or the sudden turn planned by the operation planning unit 10163 or the emergency avoidance unit 10171, and supplies a control command indicating the calculated control target value to the drive system control unit 10107.

Figure 2:
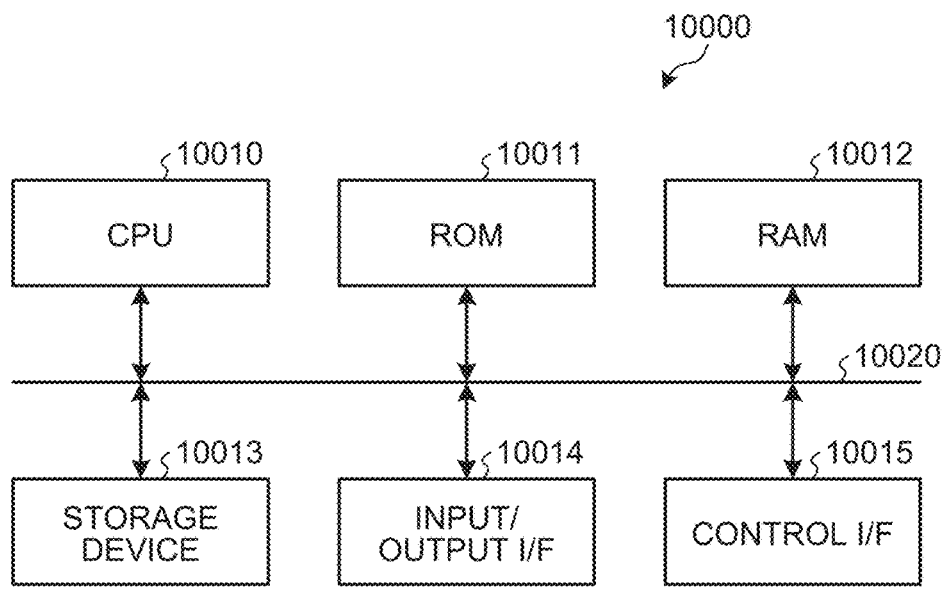
FIG. 2 is a block diagram illustrating a configuration of an example of an information processing device including an automated driving control unit applicable to the embodiment.

FIG. 2 is a block diagram illustrating a configuration of an example of an information processing device including the automated driving control unit 10112 of FIG. 1.

In FIG. 2, an information processing device 10000 includes a CPU 10010, read only memory (ROM) 10011, random access memory (RAM) 10012, a storage device 10013, an input/output I/F 10014, and a control I/F 10015, which are communicably connected to each other via a bus 10020.

The storage device 10013 is a nonvolatile data storage medium and applicable examples of this include a hard disk drive and flash memory. The CPU 10010 controls the operation of the information processing device 10000 by using the RAM 10012 as work memory according to programs stored in the storage device 10013 and the ROM 10011.

The input/output I/F 10014 is an interface that controls input/output of data to/from the information processing device 10000. The control I/F 10015 is an interface for a device to be controlled by the information processing device 10000. For example, the input/output I/F 10014 and the control I/F 10015 are connected to the communication network 10121.

For example, by executing the information processing program according to the embodiment by the CPU 10010, the above-described units, namely, the detection unit 10131, the self-position estimation unit 10132, the situation analysis unit 10133, the planning unit 10134, and the operation control unit 10135, are each formed a module on a main storage region in the RAM 10012, for example.

The information processing program is pre-installed in the information processing device 10000 when the information processing device 10000 is incorporated in a vehicle and shipped, for example. The installation timing is not limited to this, and the information processing program may be installed in the information processing device 10000 after the information processing device 10000 is incorporated in a vehicle and shipped. Furthermore, the information processing program can also be supplied from the input/output I/F 10014 via communication with an external device (server or the like) by the communication unit 10103 so as to be installed in the information processing device 10000.

<<2. Outline of Driving Automation Levels Based on SAE>>

Next, the automated driving of a vehicle applied to the embodiment will be described. For automated driving of a vehicle, driving automation levels are defined by Society of Automotive Engineers (SAE). Table 1 illustrates the driving automation levels defined by SAE.

TABLE 1

| Driving automation level | Name | | Driving task execution subject | Safe driving monitoring subject |
|---|---|---|---|---|
| 0 | Manual-controlled driving (direct driving/steering) | No use of driving assistance | Driver | Driver |
| 1 | Manual-controlled driving (direct driving/steering) | Use of driving assistance (Automatic Braking, ACC, LKAS, etc.) | Driver | Driver |
| 2 | Automated driving function under specific condition | | Driver (partially system) | Driver |
| 3 | Conditional automated driving | | System | System (partially driver) |
| 4 | Full automated driving under specific condition | | System | System |

Hereinafter, descriptions will be given with basically reference to the driving automation levels defined by the SAE illustrated in Table 1. However, the examination of the driving automation levels illustrated in Table 1 has not thoroughly studied problems and validity in a case where the automated driving technology has widely spread. Therefore, in the following description, there are some points that are not necessarily described by interpretation as defined by SAE in consideration of these problems and the like.

As illustrated in Table 1, according to the SAE, the driving automation levels needing human intervention in steering are classified into five levels, namely, Level 0 to Level 4, for example. Incidentally, while the SAE also defines the driving automation level 5 (Level 5), which assumes unmanned full automation, the present disclosure handles this driving automation Level 5 as out of scope because of no driver involvement in steering.

The driving automation level 0 (Level 0) is manual-controlled driving without driving assistance by the vehicle control system (direct driving with steering by the driver), in which the driver executes all driving tasks and constantly executes monitoring regarding safe driving (for example, an action of avoiding danger).

The driving automation level 1 (Level 1) is manual-controlled driving (direct driving with steering) that can include driving assistance (automated brake, adaptive cruise control (ACC), lane keeping assistant system (LKAS), and the like) by a vehicle control system, in which the driver executes all driving tasks other than the single function provided as assistance and also executes monitoring regarding safe driving.

The driving automation level 2 (Level 2) is also referred to as an "partial driving automation, or automated driving function under a specific condition", in which the vehicle control system executes a sub-task of a driving task related to vehicle control in both the longitudinal (front-rear) direction and the lateral (left-right) direction of the vehicle under specific conditions. For example, at the driving automation level 2, the vehicle control system controls both the steering operation and acceleration/deceleration in cooperation (for example, cooperation between ACC and LKAS). Still, even at the driving automation level 2, the execution subject of the driving task is basically the driver, and the safe driving monitoring subject is also the driver.

The driving automation level 3 (Level 3) is also referred to as "conditional driving automation", and the vehicle control system can execute all driving tasks within a limited region. In the driving automation level 3, the execution subject of the driving task is the vehicle control system, and the safe driving monitoring subject is also basically the vehicle control system.

The driving automation level 3 defined by the SAE has no specific definition as to what types of secondary task the driver can actually execute. Note that the "secondary task" refers to an operation other than the operation related to driving performed by the driver during traveling, and is also referred to as non-driving related activity (NDRA).

More specifically, it is considered that, during traveling at the driving automation level 3, the driver can perform a secondary task such as a work and an action other than steering, for example, operation of a mobile terminal, a telephone conference, video viewing, a game, thinking, and conversation with other passengers. On the other hand, in the range of the definition of the driving automation level 3 of the SAE, the driver is expected to appropriately perform responsive operations such as a driving operation in response to a request or the like from the vehicle control system side due to a system failure, deterioration of a traveling environment, or the like. Therefore, at the driving automation level 3, even in a situation where the secondary task as described above is currently executed in order to ensure safe traveling, the driver is expected to be constantly in a ready state in which the driver can immediately perform recovery to manual-controlled driving.

The driving automation level 4 (Level 4) is also referred to as "fully automated driving under specific conditions", in which the vehicle control system performs all driving tasks within a limited region. In the driving automation level 4, the execution subject of the driving task is the vehicle control system, and the safe driving monitoring subject is also the vehicle control system.

However, unlike the above-described driving automation level 3, the driver is not expected at the driving automation level 4 to perform a responsive operation such as a driving operation (manual-controlled driving) in response to a request or the like from the vehicle control system side due to a system failure or the like. Therefore, at the driving automation level 4, the driver can perform the secondary task as described above, and can take a nap, for example, depending on the situation.

As described above, in a range of the driving automation level 0 to the driving automation level 2, the vehicle travels in the manual-controlled driving mode in which the driver proactively executes all or some of the driving tasks. Therefore, at these three driving automation levels, the driver is not permitted to engage in a secondary task which is a behavior other than manual-controlled driving and an action related thereto, such as a task that would lower the attention or impair focus ahead in the driver during traveling.

On the other hand, at the driving automation level 3, the vehicle travels in the automated driving mode in which the vehicle control system proactively executes all the driving tasks. However, as described above, there may be a situation in which the driver performs the driving operation at the driving automation level 3. Therefore, when the secondary task is permitted to the driver at the driving automation level 3, the driver is required to be in a ready state in which the driver can perform recovery from the secondary task to the manual-controlled driving.

On the other hand, at the driving automation level 4, the vehicle also travels in the automated driving mode in which the vehicle control system executes all the driving tasks. Here, even in a section where the driving automation level 4 is to be applied, there might be a part of the section where the driving automation level 4 is not applicable due to the reasons such as actual road infrastructure maintenance conditions. Such a section is assumed to be set to the level of the driving automation level 2 or lower, for example, and thus, the driver is required to proactively execute the driving task. Therefore, even during the use of the automated driving at the driving automation level 4 in the planning stage of the traveling path or after the start of the traveling path, in a case of occurrence of a situation such as deviating from the condition under which the use is permitted, the request for transition to the driving automation level 2 or lower as described above can occur. Therefore, in a case where these condition changes are found, the driver is required to be in a ready state capable of recovery from the secondary task to the manual-controlled driving according to the situation even when it is not scheduled at the beginning of the traveling path plan.

Here, the actual use range for each driving automation level permitted for each of the different driving automation levels is referred to as Operation Design Domain (ODD). More specifically, ODD is a driving environment condition under which the automated driving system operates in design. When all conditions illustrated in ODD are satisfied, the automated driving system operates normally to allow execution of automated driving of the vehicle. When the condition indicated by ODD ceases to be satisfied during traveling, the driving control of the vehicle needs to be transferred from automated driving to manual-controlled driving. Note that the conditions indicated by the ODD generally vary depending on each automated driving system, deterioration and contamination of devices such as sensors, performance variation at each time due to a self-diagnosis result of a device installed for controlling automated driving, and the like.

Figure 3:
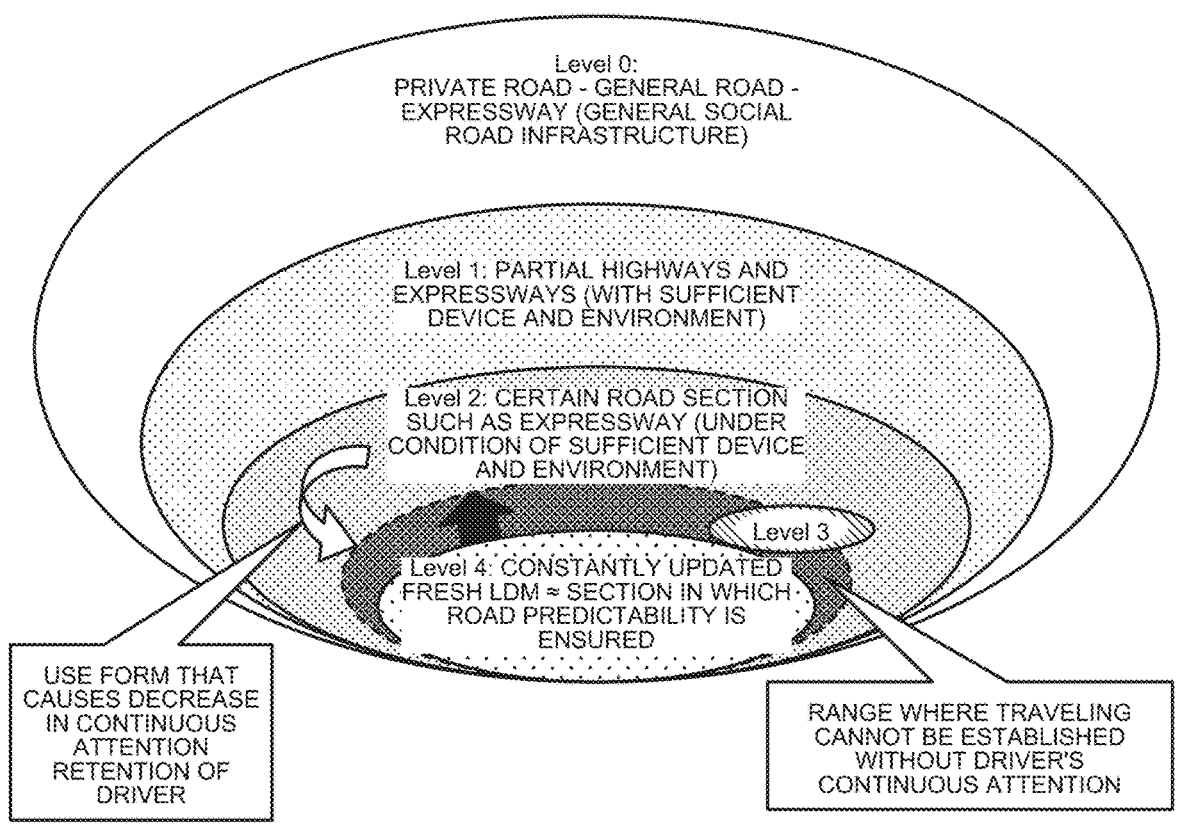
FIG. 3 is a schematic diagram illustrating a case where individual driving automation levels defined in SAE is viewed from a user's viewpoint as a use state.

FIG. 3 is a schematic diagram illustrating a case where individual driving automation levels of SAE is viewed from a user's viewpoint as a use state.

The environment to which the driving automation level 0 (Level 0) is applicable is general social road infrastructure such as private roads, general roads, and expressways. The environment to which the driving automation level 1 (Level 1) is applicable is a road equipped with a device and an environment for driving assistance, for example, a part of highways, and expressways. In this driving automation level 1, driving assistance systems such as ACC and LKAS described above by the vehicle control system need to be applied to the existing manual-controlled driving vehicle. In this case, attention reduction of the driver would lead to an intuitive risk because the driving assistance system does not provide comprehensive support.

In addition, an environment to which the driving automation level 2 (Level 2) is applicable is a fixed road section such as an expressway when there are sufficient devices and environments for driving assistance. In the section to which the driving automation level 2 is applied is classified into a section in which, in addition to acceleration/deceleration in the traveling direction by the traveling control such as ACC, the automated control in the lateral direction with respect to the traveling direction so as to be able to travel along the lane achieved by LKAS, etc. is permitted integrally. Therefore, this section still requires continuous attention of the driver for driving. On the other hand, the section to which the driving automation level 2 is applied allows the travel to continue unless there is an obstructive factor. Therefore, when the driving assistance is excessively advanced, there is a possibility that the driver's sense of risk would be lowered. Consequently, the driving automation level 2 is considered as a driving automation level that requires preventive measures against the reduction of driver's attention.

As described above, in these sections at the driving automation levels 0 to 2, the travel of the vehicle is controlled by the manual-controlled driving of the driver.

On the other hand, the section of the driving automation level 3 (Level 3) and the section of the driving automation level 4 (Level 4) are sections in which the autonomous driving control by the automated driving system of the vehicle is possible as described above. Among these, the environment to which the driving automation level 4 is applicable may be realized, for example, by constantly updating each type of information in the LDM to obtain a section in which road predictability is ensured.

In comparison, the environment to which the driving automation level 3 (Level 3) is applicable may be a section which is a section basically capable of automated driving at the driving automation level 4 but not having satisfied the condition of ODD corresponding to the driving automation level 4 for some reason. For example, the section may be a section in which only transient static data information can be obtained in the LDM, or a section incapable of continuous acquisition of the traveling condition for the driving automation level 4 due to deterioration or insufficiency of the environmental response performance of the system. Examples of the section in which the driving automation level 4 cannot be obtained include a temporary construction section, a flooded section, a complex intersection section, a LDM missing section, a communication band temporary lacking section, and a section having a risk report issued from a preceding vehicle.

Furthermore, the environment to which the driving automation level 3 is applicable can include a section functionally passable under the control of the driving automation level 4 but cancels application of the driving automation level 4 for some reason. Examples of such a section include a section with a risk of causing a flow being stuck, which stops a smooth flow of the traffic infrastructure when a vehicle is stopped by reasons such as Minimum Risk Maneuver (MRM) or deceleration of emergency evacuation, construction sections, and crossing of a railroad crossing. Furthermore, the environment to which the driving automation level 3 is applicable can include a section where the non-driver intervention passage is prohibited in the system (which is penalized for the use that violates the preventive operation in the system), which is set fixedly or actively.

Note that, as indicated by the filled arrow in FIG. 3, even in a section where only automated driving based on the driving automation levels up to the driving automation level 2 is permitted, it would be possible, in examination of future operation, to utilize an automated driving function such as Automatically Commanded Steering Function (ACSF), at the time of high-speed traveling under a condition that the normal road use range from a user's viewpoint has a smooth flow and there is no trouble such as traffic congestion and when an average vehicle speed drops due to congestion or the like, and under a condition that allows automated driving based on the driving automation level 3 or the like is temporarily satisfied. For example, even in a section where automated driving travel is not originally assumed, such as a congestion section in an expressway to which the driving automation level 2 is applied, it would be possible to use automated driving at the driving automation level 3 or the driving automation level 4. In particular, when the automated driving at the driving automation level 4 is permitted, the NDRA can be safely executed. In this case, it is necessary to be able to predict the congestion end point and manage the operation of recovery to the manual-controlled driving.

Here is an assumable case, as a use form of the automated driving, which is a case where the vehicle enters the application section of the driving automation level 4 from the application section of the driving automation level 2, and the travel control of the vehicle is switched from manual-controlled driving by the driver to automated driving by the vehicle control system. In this case, the driver does not need to concentrate on driving the vehicle, leading to reduction of retention of attention. That is, the switching from manual-controlled driving to automated driving can be considered as a use form that causes the reduction in continuous retention of attention on the driver.

In addition, considering the switching from the driving automation level 4 to the driving automation level 2 (recovery to manual-controlled driving), the section in which automated driving at the driving automation level 4 is performed can be defined as a use region in which the retention of attention on the driver decreases and it is required to plan the details of the time budget up to the recovery based on the monitoring information of the driver in the previous steady state. In the existing technology, in the driving automation level 4, the notification of recovery to the driving automation level of the driving automation level 2 or lower, that is, the manual-controlled driving, is uniformly given to the driver.

The role of the function corresponding to the driving automation level 3 can be considered as a role of connection for avoiding division of a section in which the automated driving at the driving automation level 4 is performed and a section in which the manual-controlled driving at the driving automation level 2 or lower is performed. That is, the use form of the automated driving at the driving automation level 3 is a use form in which the driver continues retention of attention to driving and a recovery action in a short time (for example, several seconds) is expected. In the driving automation level 3, detection of a decrease in driver's attention retention by a driver monitoring system (DMS) which monitors the driver, and continuation of the attention retention on the driver are requirements that are essential for using the driving automation level of the driving automation level 3 or below.

Figure 4:
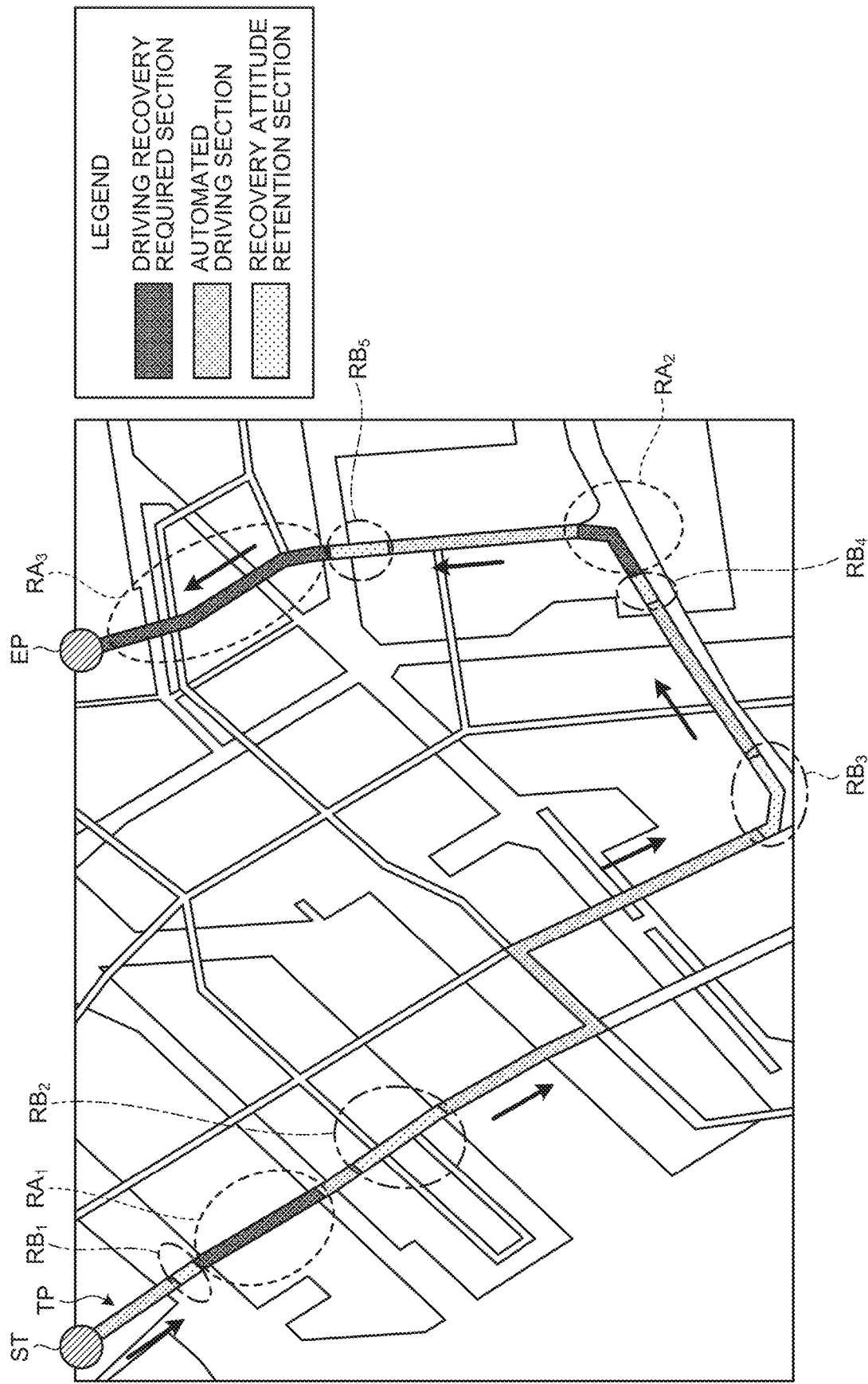
FIG. 4 is a schematic diagram for schematically illustrating application of driving automation level 3.

FIG. 4 is a schematic diagram for schematically illustrating application of driving automation level 3. The map of FIG. 4 illustrates a case where a vehicle travels in a direction (counterclockwise) indicated by an arrow in the drawing according to a traveling path TP (filled portions in the drawing) from a departure point ST to an end point EP.

In FIG. 4, sections $RA_1$, $RA_2$, and $RA_3$ indicate sections corresponding to the driving automation level 0 to 2, for example, and manual-controlled driving is essential in these sections. For example, when the vehicle enters these sections $RA_1$ to $RA_3$ while traveling with automated driving at the driving automation level 4, the automated driving system of the vehicle needs to perform handover of the travel control from automated driving by the automated driving system to manual-controlled driving by the driver's steering or the like. On the other hand, sections $RB_1$ to $RB_5$ indicate sections in which passage with automated driving is permitted under attentive monitoring of the recovery attitude from the automated driving to the manual-controlled driving. The sections $RB_1$ to $RB_5$ are sections corresponding to the driving automation level 3, for example.

In order to enter each of the sections $RA_1$, $RA_2$, and $RA_3$ where manual-controlled driving is essential, the driver needs to be ready in an attitude or the like for recovery from automated driving to manual-controlled driving. Therefore, each of the sections $RB_1$, $RB_4$, and $RB_5$ corresponding to the driving automation level 3 is respectively set on the entry side of each of the sections $RA_1$, $RA_2$, and $RA_3$, for example.

On the other hand, the sections $RB_2$ and $RB_3$ are, for example, functionally passable sections under the control of the driving automation level 4, but are set as sections in which the application of the driving automation level 4 is canceled for some reason. The section $RB_2$ is a temporary construction section or a flooded section, for example, while the section $RB_3$ is a section in which attention needs to be paid to travel of the own vehicle due to a sharp curve, for example.

In this manner, when there is an occurrence of recovery to manual-controlled driving during traveling at the driving automation level 4, and when there is enough time from an issuance of the recovery request from the system to the point where the vehicle reaches the corresponding place where the handover completion is required, the vehicle is supposed to pass through the section of the driving automation level 3 or the state where the driver's driving operability is awakened to be able to pay attention to the surroundings with the driving capability recovered. Since the driving automation level 3 requires the driver to retain their attention to the situation while not being directly involved in driving, and thus, can cause a case where the driver feels uncomfortable in an operation in which the driver is required to just keep waiting for a long time while paying attention without actual driving operation with steering.

<<3. Embodiments According to Present Disclosure>>

Next, an embodiment according to the present disclosure will be described. In the following description, unless otherwise specified, the ODD indicates ODD corresponding to the driving automation level 4 including conditions for the driving automation level 4. The travel section satisfying the condition indicated by ODD is simply referred to as an ODD section.

<3-1. Outline of Embodiment>

Figure 5:
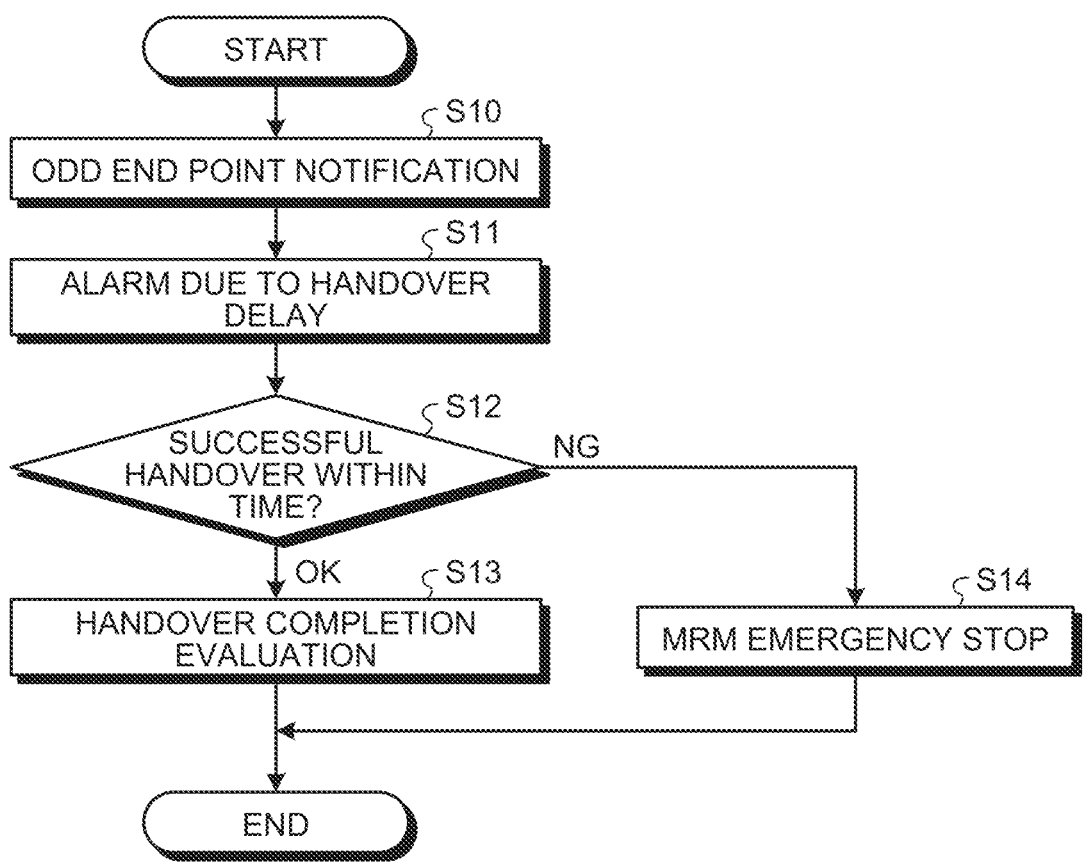
FIG. 5 is a flowchart schematically illustrating an example of handover processing from automated driving to manual-controlled driving according to an existing technology.

First, an outline of the embodiment will be described in comparison with an existing technology. FIG. 5 is a flowchart schematically illustrating an example of handover processing from automated driving to manual-controlled driving according to an existing technology. Before the start of the processing according to the flowchart of FIG. 5, the vehicle including the driver is assumed to be traveling in the ODD section corresponding to the driving automation level 4.

When the traveling comes close to the end point of the ODD section, the automated driving system installed on the vehicle notifies the driver in step S10 that the end point of the ODD is coming. In response to this notification, the driver makes a preparation for transferring driving control from automated driving to manual-controlled driving, for example. When handover of driving control from automated driving to manual-controlled driving is delayed more than a predetermined time, the automated driving system issues an alarm to the driver (step S11).

In step S12, the automated driving system determines whether handover of the driving control from the automated driving to the manual-controlled driving has been performed within a predetermined time after the notification is made as an ODD end pre-notification point in step S10. When having determined that the driver has completed the handover within the predetermined time (step S12, "OK"), the automated driving system proceeds to the processing of step S13 and evaluates the completion of the handover.

In contrast, when having determined that the handover of the driving control from the automated driving to the manual-controlled driving is not completed within the predetermined time in step S12 (step S12, "NG"), the automated driving system proceeds to the processing of step S14. In step S14, the automated driving system applies MRM to the control of the vehicle, and controls the vehicle to perform evacuation travel, for example, an emergency stop on a road shoulder.

Here, in the concept of the automated driving control of the vehicle according to the existing technology, the level allowed for the vehicle to travel among the driving automation level category of the SAE is determined as ODD which is a range of a design concept of on-board devices of the vehicle. The driver is required to handle all the required situations with constant conformity according to the driving automation level at which the vehicle can travel by automated driving.

For example, it is assumed that a specific expressway permits automated driving travel at driving automation level 4, and the automated driving performance of on-board devices of the vehicle permits automated driving travel corresponds to driving automation level 4. In this case, the driver can travel through the section using the driving automation level of the vehicle as level 4. When the vehicle approaches a situation where the vehicle deviates from the ODD section where the vehicle can travel at the driving automation level 4, the automated driving system prompts the driver to perform recovery to manual-controlled driving (FIG. 5, step S10). When the response is delayed, the automated driving system simply issues a warning (FIG. 5, step S11). When the automated driving system does not perform recovery to the manual-controlled driving at an appropriate timing even though the warning is issued in step S11, the automated driving system is supposed to shift to emergency forced evacuation steering, the control referred to as MRM within the ODD section where the vehicle can travel with the automated driving at the driving automation level 4 (FIG. 5, step S14), thereby preventing the vehicle from entering the section where the automated driving cannot be handled by the system.

In such vehicle control according to the existing technology, the driver is supposed to engage in a specific secondary task (NDRA) other than driving within a section permitted by the automated driving system to perform traveling at the driving automation level 4 according to the performance limit of the automated driving system. On the other hand, when the automated driving system reaches its own handling limit, the automated driving system issues a forced recovery request from the automated driving to the manual-controlled driving to the driver. From the viewpoint of the user, this request forces the user to perform a forced recovery from the engagement of the secondary task.

In this manner, when using the automated driving system of the vehicle according to the existing technology, the driver is forced to have a subordinate relationship with the automated driving system. Therefore, for the driver, the engagement of the secondary task using the automated driving function has been a stressful use or control mode.

FIG. 6 is a flowchart schematically illustrating an example of handover processing from automated driving to manual-controlled driving according to the embodiment. Prior to the start of the process according to the flowchart of FIG. 6, there is an assumption that the vehicle with the driver is traveling in the ODD section corresponding to the driving automation level 4.

In step S20, the automated driving system notifies the driver of the end of the ODD section in advance. For example, the automated driving system notifies the driver of the end of the ODD at a time point earlier than the lapse of time predicted to be required for the driver to perform recovery to the manual-controlled driving after receiving the notification.

In the next step S21, a "deal" regarding the handover starting point is exchanged between the automated driving system and the driver. The term "deal" herein refers to a series of flow in which the driver explicitly responds to the notification issued by the automated driving system. At this time, the automated driving system presents, to the driver, information indicating a point where handover completion is essential and a risk to be produced by incompletion of handover. Note that the "deal" herein is to share information regarding handover between the automated driving system and the driver, and does not impose any obligation on the driver, and thus should be actually referred to as a "provisional deal".

In this manner, by exchanging the provisional deal regarding the handover start point between the automated driving system and the driver by driver's explicit response, the handover work can be imprinted in working memory of the driver. Working memory is also referred to as a work storage, and refers to the storage ability of the human brain to temporarily store and process information necessary for work or operation.

In the next step S22, the automated driving system manages a step of handover to manual-controlled driving by the driver. For example, the automated driving system performs monitoring of the state of the driver, and determines, in step S22, the margin from the current time point (current geographical point) to the handover start point, whether to extend the grace time until the handover start, and the like based on the monitoring result, the state of the vehicle at that time point, and the like. The automated driving system performs control such as further notification and transition to MRM according to the determination result.

The "margin" herein is a time that can be ensured longer than the time required to reach the handover completion limit point when the vehicle travels at a cruising speed estimated from the flow of surrounding vehicles on the road on which the vehicle is traveling, as compared with the time estimated to be required by the driver to achieve recovery by the driver status analysis detected through continuous passive monitoring. In addition, the "extension of the grace time until the handover start" described above refers to extending the time before reaching the handover completion limit point by, for example, reducing the traveling speed of the vehicle or moving to a road shoulder, temporary evacuation area, or a low-speed traveling lane without disturbing the flow of surrounding cruise traveling vehicles.

In the next step S23, the automated driving system determines whether the handover of the driving control from the automated driving to the manual-controlled driving has been performed within a predetermined time set in the handover step management in step S22, for example. When having determined that the handover has not been completed within the predetermined time, the automated driving system controls the vehicle to perform evacuation travel and execute an emergency stop or the like by the MRM, similarly to step S14 in FIG. 5.

In the next step S24, the automated driving system evaluates completion of handover to manual-controlled driving by the driver. At this time, the automated driving system calculates an evaluation point according to the response of the driver related to the handover. For example, the automated driving system adds an evaluation point to a preferable operation as handover, such as when the handover processing has been voluntarily performed by the driver or when a provisional deal has been executed. In addition, the case where the driver abandons handover in advance and selects to take a break or the like also corresponds to the selection of a means of preventing traveling obstruction to surrounding vehicles, which is regarded as a handling suitable considering an influence on the social infrastructure, and will obtain an additional evaluation point. On the other hand, in a case where the handover processing is started in response to the repeated warning, or in a case where the handover processing is started after an imminent situation occurs, the vehicle performs control by the MRM, and for the operation that is not preferable as handover, such as an increase in the risk of causing a failure in handover, the automated driving system deducts points from the evaluation points in accordance with the degree of influence.

In next step S25, the automated driving system gives an incentive or a penalty to the driver according to the evaluation point calculated in step S24. As an example, in a case where the automated driving system performs addition/deduction of the evaluation point based on the evaluation point=0, for example, the automated driving system gives an incentive to the driver when the evaluation point calculated in step S24 is a value exceeding 0. In contrast, when the evaluation point calculated in step S24 is a value lower than 0, the automated driving system imposes a penalty on the driver. The lower the evaluation point, the heavier the penalty. Examples of the penalty include a restriction on the use of automated driving of the driver and a restriction on the engagement in the secondary task by the driver.

In this manner, by giving an incentive or a penalty to the driver in accordance with the evaluation for the handover processing, it is possible to perform imprinting including the risk into the working memory of the driver performing the handover work at the time of the provisional deal in step S21 described above (step S26).

In the embodiment of the present disclosure, the automated driving system observes the state of the driver by constant monitoring, and evaluates the degree of possibility for the driver to perform recovery to the manual-controlled driving. The automated driving system constantly presents, to the driver, prior recovery request pre-notification information necessary for recovery to manual-controlled driving to enable the driver to appropriately perform recovery to manual-controlled driving without delay while the vehicle is under travel control with steering by automated driving. Prior to the actual recovery start timing, the automated driving system exchanges, with the driver, a "deal" related to determination of an appropriate recovery start timing, and manages the handover step with respect to the recovery start timing.

By performing human-centered interactive control of the automated driving to achieve a smooth and reliable perform recovery to the manual-controlled driving in this manner, the embodiment of the present disclosure aims to enable a comfortable use of automated driving. That is, the embodiment of the present disclosure aims to achieve handover control in which the system and the driver cooperate to share prior knowledge of handover with each other and work on the memory of the driver, rather than the control in which the automated driving system unilaterally notifies a transition demand, which is a request for recovery to manual-controlled driving, only based on the status of the vehicle to prompt the driver to perform recovery.

That is, the automated driving system according to the embodiment of the present disclosure notifies the driver of each handover start point at a time point earlier than the arrival of the predicted time required for the driver to perform recovery to the manual-controlled driving after receiving the notification regarding the handover start point (step S20 in FIG. 6). Subsequently, the driver makes the "provisional deal" with the automated driving system regarding the actual handover start point (step S21 in FIG. 6). The automated driving system manages the handover step based on the provisional deal, and performs budgeting and risk distribution of the handover sequence (step S22 in FIG. 6). This makes it possible for the driver to execute appropriate preparation for completion of the secondary task and obtain a prior knowledge of a situation necessary for manual-controlled driving in advance (for example, knowledge of the surrounding environment necessary for travel control by manual-controlled driving).

In the embodiment of the present disclosure, the "deal" (step S21 in FIG. 6) exchanged between the system and the driver also has a role of causing the visual field memory of the driver to retain the importance of handover and an approximate sense of time as described below by devising a providing method.

By making a preliminary deal necessary for handover from automated driving to manual-controlled driving between the automated driving system and the driver, the automated driving system can achieve "reliable" transmission of the importance of the handover to the driver. By presenting the transmission of the handover completion required point and the risk to occur when the handover is incomplete to the driver in advance, the automated driving system can put determination information related to the driver's action determination into the working memory as the "pre-notification information". This makes it possible to prevent or at least reduce inadvertent erroneous determination of handover start as a result of putting certain non-negligible pre-notification information into the memory in advance, unlike the situation in which the driver starts grasping the situation after receiving the notification according to the existing technology.

Furthermore, according to the embodiment of the present disclosure, even in a case where there is a risk of overlooking due to an error occurring in the handover start determination due to dementia, neurocognitive disorder, or the like in the driver, it is still possible to perform monitoring of the repeated recovery habit of the driver and detect a sign of the error each time of occurrence. Therefore, according to the automated driving system according to the embodiment, by reduced effects based on the prior "deal" (that is, execution in which recovery work is expected), it is possible to have an effect, as a side benefit, of discovering a sign of dementia, neurocognitive disorder, or the like in the person such as the elderly.

<3-2. Human Centered Design (HCD) According to Embodiment>

The automated driving system according to the embodiment applies Human Centered Design (HCD), which is a design concept centered on a person (driver or the like), instead of Machine Centered Design (MCD), which is a design concept centered on a device or a system which is generally used in existing systems. In other words, the automated driving system according to the embodiment performs cooperative control in which human action characteristics are incorporated in vehicle control.

<3-2-1. Overview of HCD According to Embodiment>

First, an overview of HCD according to the embodiment will be described. In the existing MCD, the automated driving system mechanically determines ODD available for the automated driving according to the performance of the on-board devices of the vehicle, and uniformly permits the use of the automated driving function within the limited range. In this case, even when the user uses the automated driving function with excessive dependence or the like, the control performed by the system to the user is within a range of unilateral control instruction notification and an alarm, or Minimal Risk Maneuver (MRM) only in a case where handling of the problem is impractical.

In contrast, the HCD according to the present disclosure controls the user availability of the automated driving function at the time of use of automated driving so as to promote the use in a socially-acceptable range. That is, the control of the availability is performed in consideration of the characteristic obtained from the behavioral habits of the driver so as to permit the use of the function when the use has appropriate behavioral habits. On the other hand, for an inappropriate behavioral habit (e.g., not responding to the request for recovery to manual-controlled driving, delaying the recovery action to manual-controlled driving, or lowered quality in the recovery action), a Human-Machine Interface (HMI) that prompts the user's behavioral change is adopted. The availability range of the automated driving function is then actively applied individually in accordance with the degree of adaptation.

Implementation of such HCD is difficult simply by introducing a function, and needs multistage hierarchical, multidimensional, and dynamic information feedback that encourages a person to perform behavioral change in use. The present disclosure adopts the concept of "deal" and conducts feedback of information for implementation of HCD by using a deal between a system and the person (driver).

Specifically, the deal and feedback are conducted as follows.

Upon start of use of each permissible section of the automated driving function, the system and the driver exchange a "deal".

Before reaching the use section end point associated with the deal, the system and the driver confirm an "associated deal" of completing the prompt and safe handover to manual-controlled driving without a sudden stop or slowing down.

The driver conducts an incidental obligation related to reconfirmation of a change state over elapsed time of use.

Granting of credit, which serves as an evaluation of individual effectiveness regarding the incidental obligations in the "deal" involved in the repeated use of automated driving, is performed on a driver (driver credit).

The ODD of the automated driving allowable range on the most recently used road is redefined from the past evaluation history of the performance regarding the recovery obligation to the manual-controlled driving, that is, the driver credit, the redefinition performed in consideration of the recovery personal characteristic of the driver.

The system provides these items to the driver as visual information, and also provides a change after the start of each permissive section (as an ancillary deal) as visual information for confirming a change in the situation change. For example, in a case where the condition of the end point of automated driving is different from the condition at the start of use, the system performs visual feedback to the driver using visual information illustrating a factor for ending the use of automated driving and a possible result that would be a risk to occur when the end of the automated driving is not handled properly. With the information presented to the driver through the HMI, the information as a material for risk determination corresponding to the situation in which the recovery action is neglected will remain in the memory. Since the driver feels, as psychology in action determination, the impact caused by the case where the recovery request is ignored, making it possible to enhance the memory.

Meanwhile, the stored memory remaining as working memory fades as time passes. In particular, when non-driving related activity (NDRA) such as viewing television broadcasting continues in a situation where there is no imminent need for handling by manual-controlled driving, handover to manual-controlled driving during the period will not be a major concern. Therefore, information processed in subconscious to the brain activity occurring outside the consciousness will be responsible for the re-recognition of necessity events. This, in this sense, increases the importance of EMI that captures the memory of the risk into the subconscious level of the brain by a subliminal method or the like and restores the interest in the handover of driving.

In addition, the system may request the driver to give a pointing vocalization call of confirming a traveling direction, which prompts the driver to forcibly gaze forward and confirm, and may evaluate the result.

In order to implement the control based on the HCD, it is necessary to perform continuous reconstruction of the memory necessary for the recovery according to the individual difference between persons and the working memory storage capability in the current situation. The problem here is that human memory is different from information that can be directly observed from the outside. Therefore, in the present disclosure, the system implements continuous reconstruction of memory necessary for recovery by using the "deal" exchanged with the driver.

<3-2-2. Superiority of HCD in Automated Driving>

Next, superiority of the HCD according to the present disclosure in automated driving will be described.

Introduction of the automated driving technology into society has a great impact on the long-term users and on the way of association depending on the introduction procedure. In order to successfully introduce the automated driving technology with no adverse side effects on society, the introduction needs to be promoted with appropriate suppression of adverse effects caused by the automated driving. That is, when a function that has been enabled by technology development is unlimitedly provided without considering human behavioral psychology, the user would not necessarily use the technology within a range of social acceptability.

The concept of introduction of the automated driving into society according to the existing technologies is to promote the introduction of an automated driving function stepwise according to the levels of attainment of technology (such as the SAE driving automation levels), that is, to promote the introduction to society by sequentially expanding use from a range of functions that can be automated along with the results of technology development. In other words, the concept of introduction of automated driving into society according to the existing technologies indicates an idea of sequentially promoting introduction of automated driving into society based on the performance stages of automated driving functions defined as driving automation levels 2 to 4 by SAE or the like based on results of technical development, that is, according to the mechanical performance achieved by development.

In comparison, in the technology according to the present disclosure, the function of the automated driving to be provided is dynamically changed and the degree of tolerance of the automated driving control is dynamically controlled according to the adaptability of the driver using the automated driving function to the device, that is, according to whether the driver has receptive capabilities to appropriately use the technology.

That is, in the present disclosure, even with exactly same mechanical and functional configurations of the automated driving, the functions of the automated driving to be given in practice are provided such that the function of the automated driving that can be actually used by the user will be dynamically changed according to whether the driver who is the user has the behavioral compatibility sufficient to be able to safely use the function. The present disclosure relates to a technology of applying such a concept of HCD to a control and operation of the automated driving system.

<3-2-2-1. Excessive Dependence>

In order to use an appropriate automated driving function, it is necessary for the driver to avoid excessive dependence on the automated driving function in use. An example of a simplest case of excessive dependence on the automated driving function is a case where the driver neglects to pay attention to the front or neglects a surrounding monitoring obligation necessary for traveling even though the driver is apparently supposed to be involved in the control by design. In this case, the attention of the driver to the preceding vehicle can be lowered, leading to a possibility that the driver falls into an inattentive state with respect to the inter-vehicle distance. That is, for example, during the use of an automated driving function limited to the function of a lane keeping assistant system or the like, although the function is a limited auxiliary function, there is a possibility to have a situation in which the driver depends on the automated driving function when there is no other approaching vehicle or obstacle that interferes with the own vehicle in front of or behind the own vehicle. When the driver feels a sense of security in the assistance, the driver's attention to driving might be reduced, leading to the possibility of occurrence of a delay in determination or excessive avoidance behavior in coping behavior in emergencies.

When such a situation related to attention reduction occurs, the driver can fall into a situation such as a delay in handling the emergency, an excessive avoidance operation, or an inability to deal with the emergency. In this case, the driver might perform emergency deceleration in a hurry, and the deceleration or the hasty operation can lead to an occurrence of secondary damage such as rear-end collision against the following vehicle or traffic congestion. As the automated driving of the driving automation level 2, when the automated steering control can be performed even in a more complex and complicated situation, the driver would be involved in the steering less frequently. The driver feels a sense of security in these driving assistance functions, and is likely to pay less attention although continuous attention or the like needs to be paid against a case that needs measures.

The introduction of automated driving at a level higher than driving automation level 2 eliminates the need for the driver to constantly pay attention to the front, making this issue further complicated. In a case where the system determines that continuation of traveling in the automated control would exceed the limit of the situation determination handling capability of the on-board device, which is dangerous, it would be necessary, when the vehicle is traveling at the driving automation level 4, for the system to abandon continuing the automated driving and start a procedure to perform appropriate handover of the driving to the driver. Alternatively, when handover to the driver is difficult due to a sudden event needing urgency, it is necessary to perform automated start of a risk minimization procedure. In this case, the driver's reluctance in promptly starting recovery to the manual-controlled driving in accordance with the instruction from the system and reluctance in taking measures such as recovery to the manual-controlled driving will cause a situation in which the system takes accident prevention measures, such as controlling the vehicle to be decelerated against the traveling speed of the surrounding vehicles or start MRM in order to delay the time for the system to reach the limit point. These are good examples of excessive dependence on automated driving.

Similarly, even in the case of the automated driving at the driving automation level 2 or the driving automation level 3, advancement of assistance allows the driver to directly feel appropriate and successful handling of events by the system without driver's frequent steering intervention under many traveling conditions. Since it is possible to drive through the traveling path without directly linking the reduction of continuous attention during the traveling of the vehicle to the sense of risk, the driver would take a situation in which the system handles events for granted. Over time, the driver is accustomed to be dependent on the automated driving, leading to the possibility that the driver will be less skeptical about the imperfection of the system.

In the case of the driving automation level 2 or the driving automation level 3, since the driver is required to immediately handle the abnormal situation, the reduction of attention is not allowed. However, in the driving automation level 4, there is a possibility of occurrence of reduction of attention. Furthermore, while the driving automation level 2 and the driving automation level 3 require continuous attention of the driver, it is not guaranteed in practice that the driver can always perform the attention obligation in terms of ergonomics, for example.

That is, the current situation is a situation where the user is unilaterally forced to correctly understand and use the individual design limit according to the performance that can be achieved by the development of the design function of the machine. In a case where the technology is introduced into the society assuming that the user can completely use the technology as expected in accordance with the design performance, there remains a problem of excessive dependence on the technology. Generally, human mind is skeptical about newly developed unknown technologies, and unconsciously takes preventive measures to deal with them. However, with the progress of the development and spread of automated driving, the advancement and diversification of the functions of the automated driving gradually decrease the sense of uneasiness and skepticism at the time of use, making this problem of excessive dependence more serious and problematic.

The present disclosure relates to a technology needed for introduction of a series of mechanisms necessary for naturally self-learning and adapting the behavioral psychology of the user according to the limited performance of the automated driving, rather than coping with (warning, awakening for recovery, etc.) the essential problem using a system for preventing the reduction of the user's attention and the like by simply regarding the problem as a problem of reduction of consciousness and reduction of attention. That is, the present disclosure provides a mechanism that performs, on the user, a series of control necessary for prompting the user to perform behavioral improvement and behavioral change in which the repeated use action of the user themselves gradually changes and that acts on the driver with a hierarchical mechanism in order to prompt the improvement of the use action.

<3-2-2-2. HCD>

The point of the present disclosure is shifting the relationship between the vehicle and the driver from the existing MCD to HCD and determining the operation region of the system according to the way the person behaves. The determined operation region affects the benefit obtained by the user when using the vehicle depending on the action routine of the person. The system performs, in the situation that the user feels comfortable, weighting on its feedback loop so as to avoid unintentional harm (traffic congestion, rear-end accident, road blockage, etc.) on the social activity. The present disclosure relates to an HMI effective for a system to maintain, in a favorable cycle, system control in which weighting is performed in this manner and development of behavioral habits of a person.

That is, the user is required to perform a behavioral change in which the use mode of the vehicle equipped with the existing automated driving function gets out of the over-dependent use of a provided function, and shifts to the cooperative use. In order to produce this behavioral change in use, there is a need to provide a mechanism for producing the change. The present disclosure proposes a mechanism of individual elements that produce the behavioral change to the cooperative use and a technology related to the entire application of the mechanism.

In order to enable the use form of the HCD, the behavioral change of the user is essential, and the HMI for generating the behavioral change is also required. The HCD is not a mechanism that simply allows the user to use a function to satisfy their own desire, but is an entire mechanism to be developed so as to naturally prompt the user to take a responsive action and the like necessary for the user to comfortably use the function. In consideration of human behavior, the design to be obtained is not a design for allowing the use of the system to satisfy animal-like instinctive desires, but can be redefined as a design incorporating a mechanism including voluntary action and behavioral change necessary for following (or enabling following) rules required to maintain social order in modern society, and functional design can be considered as the design to achieve this mechanism.

This point will be described more specifically. First, when automated driving is introduced into society, availability of this varies depending on conditions, and determination is made on the premise that the system has a function of performing automated vehicle steering control.

The vehicle needs to have at least a function of acquiring information from the outside, grasping the environment while complementing the information with the acquired information, performing the travel planning for the own vehicle and traveling along the generated plan. Based on this, when the system cannot confirm the guarantee that the series of processing can be executed under all conditions, the system permits the vehicle to perform automated driving travel at the driving automation level 3 or the driving automation level 4, exceeding the driving automation level 2, according to whether the driver is required to quickly perform recovery to manual-controlled driving or whether there is no need to request the recovery.

Furthermore, for example, in the automated driving travel at the driving automation level 4, there is a possibility that one or more occurrences to end the automated driving before the vehicle in the automated travel reaches the end point of the traveling path. In this case, the handover sequence to the manual-controlled driving at the end of the automated driving is inevitably included in the traveling path a plurality of times.

Here, driving automation level 5 having a higher function than driving automation level 4 is defined by SAE. The driving automation level 5 is applied after preparing an LDM that performs information update with higher definition and higher refresh rate than surroundings by making a large amount of infrastructure investment for activation in a closed environment or acquisition of environment and environmental information. An example of application of this level is a case such as a robot taxi. Unless the operation is performed like a robot taxi at the driving automation level 5, the user who is a driver in the vehicle that enables use of the driving automation level 4 for general users is diversely required to perform recovery from the automated driving to the manual-controlled driving during the traveling path.

A necessary condition of the function of the automated driving of the vehicle is determined as an achievement limit that can be addressed by the design and development of the vehicle. In this case, it is possible to extend the limit enabling the automated driving travel by equipment construction and infrastructure development at a higher cost, such as the number of information acquisition resources that can be assigned to the optimum processing, the number of resources for autonomous or external acquisition and income, and the power and cost resources that can be assigned to the calculation. On the other hand, it is extremely difficult to completely eliminate the situation in which the recovery from the automated driving to the manual-controlled driving is required although the recovery request frequency and the available range in which the automated driving can be used are different. This leads to the demand for HCD that achieves appropriate intervention of a driver for these handover requests occurring when the vehicle is used, instead of the existing MCD.

In a case where the configuration of the system is changed from the MCD that follows the performance of the device in a dependent manner to the HCD that emphasizes cooperation with people, the user is prompted to appropriately use the system without excessive dependence. For this purpose, it is necessary to provide a mechanism in which the system causes the driver to self-learn a balance between the benefit obtained by using the automated driving for the user and the loss or risk incurred for enjoying the benefit through the use, and in which the user extracts the benefit in the balance while comfortably using the system and taking necessary obligations.

<3-2-2-3. Benefits for Driver>

From the viewpoint of finding candidate benefits for the vehicle user, desirable benefits will be as in the following, expressed as one or more complex items.

First, examples of actions for obtaining benefits will be described below.

(1) Simply achieving the movement from starting point A to target point B.
(2) Achieving the movement between the two points by comfortable movement.
(3) Achieving the movement with lower budget.
(4) Achieving the movement in a shorter time.
(5) Achieving movement at scheduled time.
(6) Achieving movement with lower fatigue.
(7) Accomplishing the intended movement even in a fatigued state or in poor physical condition.
(8) Leaving the site anyway.
(9) Achieving the object of necessary goods transportation.
(10) Conducting outdoor or scenic drive with good weather as pleasure.
(11) Being able to appropriately engage in work other than driving (secondary task, namely, NDRA) during the movement.

Examples of the NDRA executed during the movement in item (11) described above include the following.

(11-1) Eating and drinking
(11-2) Browsing with a device such as a mobile terminal
(11-3) Texting using E-mail
(11-4) Implementation of teleconference
(11-5) Execution of leaving seat, distribution of delivery packages, and the like
(11-6) Makeup and grooming
(11-7) Enjoying Karaoke, watching movie, viewing sports broadcast, and the like
(11-8) Operation of terminal device such as smartphone, mobile phone, tablet computer, laptop computer, . . .
(11-9) Viewing scenery during movement
(11-10) Checking inside bag or the like, and searching for lost article
(11-11) Conversation or interaction with other passengers, or games such as crossword
(11-12) Other e-sports
(11-13) Benefit of automated driving use as burden reduction only during traffic congestion or the like
(11-14) Primary measures against temporary poor physical condition (such as leg cramp)
(11-15) Temporary decreased vision
(11-16) Use of eyedrops and support of temporary decrease in vision associated with use of eyedrops
(11-17) Response to asthma or seizures of epilepsy (11-18) Taking a short nap during traveling in a section ensuring safely travel at driving automation level 4

(11-19) Implementation of undefined processing

Further assumable examples of actions for obtaining benefit are the following:

(12) Maximized continuous use of automated driving function

(13) Avoid occurrence of loss associated with use

(14) Avoid occurrence of trouble on any interested party

When it is necessary to perform recovery from the automated driving to the manual-controlled driving during traveling using the automated driving, unless the driver can appropriately perform recovery to the manual-controlled driving when the recovery request is issued from the system, there will be a need to perform emergency deceleration, evacuation stop, or the like as MRM as described above. This leads to a possibility of emergence of negative aspects of the automated driving, such as blocking and congestion of highways as personal/goods distribution routes, and rear-end accident induction.

When viewed from an individual user, it is considered that the loss secondarily generated with respect to the emergency control only affects the following vehicle except for a case where the own vehicle is hit in a rear-end accident, and would not be a factor of impairing the benefit of prompting the own appropriate recovery coping behavior. That is, if the use of the automated driving is simply entrusted to the common sense in the driver from the viewpoint of the HCD, there is a possibility that social order cannot be maintained.

Therefore, in order to maintain social order and prompt appropriate user action while introducing HCD control, for example, there is a need to provide a mechanism for motivating the driver to perform recovery without delay with respect to the requested recovery while obtaining the benefits listed as items (1) to (14) described above. However, the ethical motivation is only an ideal, and even if education is provided to the driver who uses automated driving with expectation of an action based on morals, which does not ignore the request for recovery or take measures against delay, the appropriate effectiveness of recovery would not always be accompanied.

In order to bring out a behavioral change from the driver to take an appropriate and prompt response to the recovery request from the system, there is need to have mechanism in which the drive takes a risk when the driver neglects the recovery request instead of obtaining benefits and the recovery request directly acts on the driver's behavioral psychology to keep balance. That is, there is a need for a mechanism in which an input of a risk aspect having effectiveness acts on the driver in some manner. This is because an action is determined as a balance of merit, benefit, and risk at that time.

For example, JP 2019-026247 A and JP 2016-153960 A are known as prior examples of prompting, from microscopic perspective, the recovery action in response to the recovery request. JP 2019-026247 A discloses a technique of blowing cold air to a driver to keep the driver awake. JP 2016-153960 A discloses a technique of giving awakening notification to a driver stepwise using an alarm. These prior examples are not mechanisms that encourage the driver to perform behavioral change in macro perspective with respect to the manner of use or utilization of the automated driving function.

For example, an example of utilizing an expressway when usage fee is low and not utilizing when the usage fee is high, in consideration of a balance with obligation of paying a usage fee when using an expressway in order to obtain a benefit of arriving early, is a balance obtained conceptually. In another case where the driver watches sports broadcast as NDRA during automated driving and continues watching without immediately interrupting even after receiving a handover request, a penalty can be imposed on the driver as a demerit for the driver. In this case, conceivable penalty examples would be to issue a prohibition regarding the right of viewing the broadcast for a certain period or the same day, prohibition of repeated use of automated driving for a certain period of time, including forced stop measures on the vehicle in an evacuation space, and the like, that is, various demerits are individually given to the users.

<3-2-2-4. Driver's Working Memory and Mind During Driving>

Here, in order to avoid occurrence of collapse of the social infrastructure by the control of the HCD, whatever the merit and demerit for each user, the ultimate point will be placed in human action. Therefore, the driver is demanded to perform smooth and high-quality handover to the traveling with manual-controlled driving, ranging from the handover request time to the recovery limit point, without lowering the basic cruise speed of traveling.

Here, the quality in the action of recovery (handover) will be described. The driver action has individual differences for each driver. Therefore, the system learns the normal handover action of the target driver, and estimates the time required for the driver to perform recovery based on the driver action learned in the action learning. The quality of the recovery action indicates the entire action evaluation as an index based on quality evaluation on actions such as a driver's action of quickly executing the recovery action in response to the recovery request from the system and completing the recovery operation within the time, or and taking an action that is included in the normal learned recovery actions such as extending the start of recovery or taking a slow action or the like without taking the recovery action expected by learning to perform recovery normally even though a notification to complete the recovery within the time has been issued.

That is, it is necessary to define the control necessary for the user's recovery from the HCD viewpoint as in the following.

It cannot be highly guaranteed that the user takes a responsive action with action determination after understanding the detailed situation of the invisible ODD determined by the automated driving system with advanced and precise design including the performance of the device and the vehicle. Therefore, the automated driving system needs to have a mechanism of presenting to the user as a displayable embodied risk that can allow the user to intuitively grasp benefit and risk as senses or feelings.

The human brain performs risk determination from finite information, finds a coping behavior to lower the risk within a limited time, and then moves to the action. In a human behavioral psychology, whether or not a person can take a necessary coping behavior at a necessary timing depends on experiences and histories, that is, depends on how the necessity or inevitability of taking the remedy action has been learned from past experiences, and this differs for each individual. On the other hand, with advancement of automated driving, it is expected that the steering using automated driving can be continuously handled even in wider variety of situations.

With the automated driving system handling with various situations, the necessity for the driver to intervene in recovery from the automated driving to the manual-controlled driving is reduced at least at an intuitive level. This gradually decreases driver's skepticism toward the system. As a result, the driver gradually stops paying attention to the front of vehicle, checking the side/rear of the vehicle, or observation and confirmation of a preceding vehicle, in preparation for instantaneous steering operation in driving even when a necessary situation occurs.

Therefore, once the driver leaves the proactive steering work loop, their thought shifts to things of attention and interest other than driving even when the driver received, from the system, a sudden recovery request to perform manual-controlled driving. With this state, even when the system notifies the driver of the request for recovery to the manual-controlled driving and the driver catches the notification, it takes a long time before the driver becomes capable of capturing insufficient information and grasping the situation and taking an action for avoiding the actual handover accident, since the driver starts from grasping the temporarily interrupted situation. In addition, when the driver starts an action or behavior as NDRA done by the driver in a state of physically moves away from the driver's seat, more time would be required for movement including recovery to highly consciousness state.

When a person manually drives a vehicle, the person takes measures against various events that occur on the route and many of occurrence events that occur each time without any accident, and performs driving work while avoiding suspension of traffic. However, behind the driving operations that appear to be done without difficulty, the driver preliminarily confirms a large amount of information unconsciously in practice. In order to predict the future impact associated with the operation based on the information, the driver preliminarily searches for information necessary for determination at each occasion to acquire a certain degree of sense of security, and takes measures to prevent delay of action determination necessary to prevent accidents.

For example, even with a single operation of stepping on the brake pedal, the driver preliminarily grasp the following information before stepping on the brake pedal and then using the large amount of information in combination to perform final braking action to prevent ultimate dangerous situation:

How the braking power is applied to the vehicle by the degree of stepping on the brake pedal;
Cargo of the own vehicle;
Information used for determination as to whether the loading with occupants has increased the braking distance;
Information for grasping risk of road surface slip (by wet road, snow covered road, etc.) to determine whether the vehicle will decelerate in advance before reaching the corresponding section;
Prediction from the behavior of the preceding vehicle;
Determination of a risk of sudden deceleration due to the presence and the vehicle type of following vehicle;
Fog status in front of vehicle
Presence or absence of risk of delay in determination due to a visibility hindrance factor such as backlight.

That is, when the driver greatly deviates from the driving steering loop in the automated driving, handover from the automated driving to the manual-controlled driving is started in a state where the related pre-stored information (working memory) necessary for the driving steering control is not acquired, that is, the situation is not grasped. Even with a mechanically and suddenly issued handover request to the driver, it is not always possible for the driver to instantaneously acquire the preliminary determination information.

Therefore, when the driver is required to make a momentary action handling determination with insufficient preparation for grasping the situation, the driver might start to panic. In this case, the driver has a possibility to get in a situation in which action handling is required while being panicking. That is, in order to enable the control of the HCD in consideration of the process of human determination, there is a need to provide a mechanism, as a system, that balances the time required for the perform recovery to the state of the driver, such as the thought and posture, with a system that enables continuous traveling with automated driving and grasping of the situation of the road environment, so as to issue a request for recovery of the driver with options of always ensuring the remaining grace section that enables continuous traveling with automated driving.

At this time, it is extremely difficult in practice to estimate a state of mind of a person. For example, there might be a case, where at a glance by external observation, the driver seems be paying attention with their line of sight directed forward, but the driver's mind is set on another matter unrelated to driving. In such a case, the driver's mind (working memory) might be directed to an event completely different from driving, and the working memory might be in a state of lacking information necessary for driving action determination.

The system needs to estimate a time (grace time) required for the driver to normally perform recovery to manual-controlled driving before the end of the section in which the automated driving function can be safely used. In the case of existing manual-controlled driving, for example, driver's carelessness in looking ahead may lead to overlooking the danger which directly leads to an accident. Accordingly, to avoid a situation where the driver neglects to pay attention to the front, basically the driver inevitably avoids continuous interruption of information collection necessary for driving even when the driver is temporarily involved in work other than driving.

Therefore, the driver incessantly performs intermittent visual attention during existing manual-controlled driving, and thus, distraction in attention expressed as a symptom such as drowsiness in driving is easily indexed based on observation data obtained by observing a decrease in these actions. On the other hand, utilization of the automated driving function of the driving automation level 1 or higher eliminates a part of operations to be performed by the driver for steering. Accordingly, the higher the automated driving function such as the driving automation level 1 or more, the less the need for the driver to intervene in driving. This gradually decreases the actions of information collection and the determination by the safe driving steering determination by the driver. Therefore, in order to grasp the situation and perform the determination action after receiving the notification of recovery to the complete manual-controlled driving, it would be necessary for the driver to acquire lacking additional information, which takes time.

The trigger for a person to take an action includes a trigger based on a conceptual procedure and a trigger as a stimulus, which is instantaneously reflected in the action for avoiding danger even when the conceptual procedure is missing. Here, since the latter action is a reflective avoidance action. This corresponds to a risk avoidance action based on limited information performed with unexpected information, which often is an action with feedback to be useful for the action not working appropriately or effectively.

That is, when the driver continuously performs normal manual-controlled driving control, the control is performed by the driver with constant monitoring and checking the state ahead in traveling. Therefore, the driver usually does not suddenly operate the steering wheel, suddenly depress the brake pedal, or excessively perform operations of the steering wheel or the brake pedal. On the other hand, there might be a case where the own vehicle is about to go off the lane due to distracted driving or carelessness or a case where the driver is distracted only by a risk without grasping the situation such as braking by the preceding vehicle. These cases would lead to unexpected accidents such as overturning of the vehicle, rear-end collision by the following vehicle, and spin of the vehicle by sudden operation like unnecessarily excessive steering, sudden braking, and the like.

Example of conceivable factors of this lack of appropriate action control include the shortage of information that enables secondary damage prediction for the working memory needed for suppressing the action amount and excessive information that requires handling. Excessive information might cause brain panic, making it difficult to appropriately perform reactive feedback action such as control of level of reactiveness, which leads to operations such as excessive steering for avoidance. Furthermore, information collection by human also includes a function of filtering unnecessary information by excluding unnecessary information when having continuously received information unnecessary for action determination or the like.

Therefore, even in the case of information related to handover, continuously and mechanically providing information unnecessary for determination in normal use unilaterally from the system to the driver without change would result in a state where the information occupies the working memory of the driver. This is going to be a factor of hindrance to obtaining other potentially important information. Therefore, such unnecessary information is unconsciously recognized as noise by the brain, becomes less important in weight, and then is filtered out. A good example of filtering in which some of external information physically obtained by a human is filtered out at a stage before entering the mind of the brain is an effect called "cocktail party effect" in the fields such as psychology, which is an ability to tune into a conversation of a specific person even in a noisy situation.

Based on this mechanism in which a human brain selectively utilizes information, there is a need to have a mechanism in which how to provide, to the driver, events occurring in various manners and updated along traveling and appearing on the new route, as continuous information sequentially approaching, and a mechanism to allocate information that decides how to determine related information important for handover by the driver based on the information provided by the system, onto the working memory according to the importance and to link the information to determination.

Here, the brain region of a human referred to as working memory cannot be directly observed or visualized. Therefore, it is extremely difficult to directly act on the working memory in the present technology in terms of realization in explicit forms. In the situation that the driver is in at the moment, the prioritization conditions of the driver's brain activity varies significantly. Besides, the working memory does not allow the system to directly leave information.

In consideration of these characteristics of a human, in order to enable the driver during automated driving to perform the handover with sufficient time margin before the end of the section in which automated driving can be utilized, the system needs to provide unique information that becomes a priority factor of an action to a driver and needs to train the driver to learn a measure of significant impact of each piece of information for the driver. That is, in the case of simply providing information to the driver, the provided information can be regarded as equivalent to noise for the driver. Therefore, when the provided information is determined to be significant in outcome prediction and when it is found that there is a risk that can be a demerit for the driver through learning, the information is defined as information with high importance and high priority on the working memory.

<3-2-2-5. "Deal" Between System and Driver>

Here, the first exchange of notification and confirmation operation between the system and the driver in which the driver receives the information notified by the system and takes responsibility for the reception is regarded as a "deal" between the system and the driver. From an initial deal, the execution of the handover work based on the initial deal and the "degree of achievement of the deal" are analyzed as the quality of the recovery transition (recovery operation) based on the observable information. The quality of the analyzed recovery operation is "credibility information" for the execution of the deal of the driver. The credibility information is used as a threshold for determining whether the non-defective product having a high quality by the deal is used at the time of switching to the automated driving and reuse in the next traveling path or the subsequent traveling path segment. The credibility information is then used in the feedback to the driver each time as a handled event, impact, and a visual sensation, promoting the reinforcement learning in terms of intuitive sensations in the driver.

That is, rather than simply receiving information unilaterally notified from the system to the driver, the series of "deals" is performed by responding to the notification. As a subject of the matter, the driver regards the response to the notification as their obligation to perform recovery to manual-controlled driving for the deal. Through a series of repeated operations corresponding to the recovery obligation, the driver can control the HCD by which the driver has successfully and voluntarily participated in the use of the automated driving system.

The individual information presentation methods described in the embodiments of the present disclosure merely describe some representative means among various means applicable to achieve this HCD, and thus, the method is not limited to these described examples. In particular, there are personal differences in how the driver stores the deal item of the "deal" in memory, how the driver remembers the obligation over the passage of time, and how the driver can perform the obligation with high priority and without delay at necessary time point, and thus, there is no need to limit the methods.

HCD does not indicate a simple control that provides a driver with simple specific information. HCD is a design in a broader perspective incorporating consideration for achieving a function associated with the use of the system as designed, which is taken from the viewpoint of human cognitive determination action. More specifically, HCD involves a need to build a system incorporating the mechanisms necessary for the development and growth of desirable cognitive actions.

In human behavioral psychology, behavioral development does not spontaneously advance unconditionally. That is, according to the norm and rules required for an individual, being a member of a family, a region, or a society, a person has individual development in terms of behavioral psychology with a balance between merits of satisfying desires and the like, and demerit of penalties and the like imposed by the society as a regulation and a norm as well as a risk directly suffered by the person regardless of the social norm or the like, and then the person deals with matters. From this viewpoint, the influence of the level of driving assistance, which is one of the automated driving functions, on the human behavioral psychology, as demerit or risk, would be a reduction in the sense of risk for a decrease in attention due to direct driving steering errors, fatigue, or the like, as well as an unnecessary rise in the sense of security.

However, the ultimate purpose of the use of the driving assistance system is to improve comfort and to enable prevention or avoidance of an accident even when a driver using a vehicle with expected attention falls into reduced attention or overlooking of important information and to reduce the risk that the accident will be severer even in the worst case.

Therefore, in the embodiment of the present disclosure, in order to avoid driver's excessive dependence on the driving assistance system, there are provided mechanisms for not just pursuing comfort in all steering operations receiving system assistance and intervention. Instead, there is provided a mechanism to assign an alternative risk that is to be a penalty for the driver while self-avoidance processing by the automated driving system is executed, such as introduction of uncomfortable control for the driver and forced stop of the assistance function, onto obvious excessive dependence. By adopting the mechanism, provided in this manner, in which it is possible to avoid a case where the driver's excessive dependence on the automated driving system directly leads to an accident but not possible to achieve complete risk avoidance, a driver's cycle of psychologically responsive operations is built.

Here, when the system has additional functions of automated driving beyond driving assistance, the system utilization concept greatly changes. In particular, because of existence of the period according to the driving automation level 4 during which the driver is not required to be involved in the travel control at all, there will be a situation in which the driver is functionally at no risk of driving steering.

In the idea of MCD, it would be sufficient if all the conditions under which the vehicle can travel at the driving automation level 4 are satisfied. However, as described above, since the use of excessive dependence caused by the automated driving can cause various negative impacts such as traffic congestion, disorderly use of the driving automation level 4 is not a desirable situation as a social mechanism. Regarding use of the system, there are rules to follow for responsible use, and a typical rule among these is to use automated driving only in a use range having satisfactory conditions.

Based on the idea of HCD, in order to achieve the use conforming to the orderly social norm, there is a need to have a mechanism in which, while the driver uses the driving automation level 4 capable of involving in NDRA only in a section in which the automated driving system allows the use at the driving automation level 4, the driver can quickly perform self-learning of the action defined by the social norm when the necessity occurs in a situation having the end of the use predicted or in a situation change, and the reinforcement learning of the habit can be developed in daily use.

That is, unless there is a progress in the behavioral change of the driver to the quick and preferable recovery action quality after the recovery request notification, the driver cannot enjoy the merits of using the automated driving at the driving automation level 4 as the "reward (benefit)". Additionally, initial information regarding the "risk" necessary for a person's decision is information that is temporarily stored in the memory unconsciously by the driver's approval for the "deal" presented from the system to the driver. The change that can occur after the start of one section of the use of the driving automation level 4 or the interaction between the system and the driver by the HMI for reconfirmation will be an "ancillary deal" to re-examine conditions for the change that occurs with the lapse of time. In addition, every time the driver resumes the section travel of the driving automation level 4, the driver once checks information regarding the end point, and under the agreement, that is, after checking the necessity of recovery and the recovery timing and the end request information, starts the travel through the traveling path within the ODD section determined to be set as the driving automation level 4 by the system.

The term "deal" in the present disclosure conceptually may be any interaction performed between the system and the driver, not limited to the case with an exchange of physical documents or the like. Through the interaction, the necessity of recovery, the impact risk thereof, and the severity of the result of the violation are transmitted to the memory of the driver, whereby the stored information is hardly forgotten according to the importance of the responsive action.

The driver is allowed to use the automated driving at the driving automation level 4 permitted by the system not unconditionally but under the condition of including the obligation to perform recovery from the automated driving to the manual-controlled driving as ancillary conditions. The quality of the driver's compliance with the ancillary conditions will be a credit evaluation when the driver uses the automated driving later on. For example, in a case where the use of the function of the automated driving by the driver violates the range of permitted use, the merit of the execution permission such as NDRA, which is the merit of the use of the automated driving, would not be obtained at all. In addition, for example, when there is a serious violation, demerits would be imposition of penalties, or use restriction on the automated driving, or even use of vehicles. Due to such demerits, the driver has gradually increased cognitive sensitivity to the pre-notification information about risk prediction in the middle of the traveling path. When the reinforcement learning further progresses, the driver has increased sensitivity to the pre-notification information that contributes to maximization without losing the merits.

That is, the automated driving control by the HCD according to the embodiment of the present disclosure is completely different from the concept of a conventional MCD in which the system incorporates a mechanism of issuing an alarm and forcibly recovering the driver's consciousness when a handover point is imminent, or the system periodically forces a recovery request in order to prevent the driver's consciousness from moving away from a steering loop of driving.

The concept regarding the control by conventional MCD is considered to be intuitively felt just annoying for the driver. Therefore, some drivers can weaken the function of the alarm in order to cancel the annoyance, and there is a possibility that the driver gradually becomes insensitive to the alarm and grows a habit to be immersed in the NDRA without paying much attention to the alarm. This also leads to a situation in which the driver ignores the alarm issued by the system, that is, when the alarm sound is a repetition of a monotonous buzzer sound, the driver would give little importance to the sound due to the driver's auditory filtering effect.

As described in detail above, when presenting recovery request to the driver, the system presents risk information that has an impact on the near future of the driver in a multidimensional and variable manner to the driver, that is, in a non-uniform manner as the change information as appropriate. The driver then actively reconfirms the "ancillary condition" in response to the presentation. With this operation, the risk information is distributed to stimulate different memory fields of the working memory of the driver, such as the auditory language center, the visual language center, and the visual cortex, leading to occurrence of non-monotonous stimulation of the memory toward the driver's recovery.

As a result, even in a case where there is a separation of consciousness away from the steering task of driving, such as a case of mind wandering, the degree of forgetfulness of recovery obligation is suppressed. When the automated driving in the driving automation level 4 section is started, factor information, which is incidental to the "deal" regarding requirement of recovery according to the recovery obligation, is visually presented. In addition, in the intermediate step of automated driving in the driving automation level 4 section, new update information is presented along the update information in accordance with the characteristic of forgetfulness of the driver. The driver can reevaluate the risk by presentation of these pieces of information, making it possible to reactivate the important memory stored as the working memory of the driver.

Another important aspect based on the HCD is that the contribution of the stimulus by the notification or alarm from the system to the driver to the cognition necessary for the driving action determination does not simply act as intensity (loudness of sound or the like) of the notification, but acts according to a difference in sensitivity to the stimulus that leads to a risk specific to the driver.

That is, HCD utilizes a mechanism of the brain, that is, the strength of physical stimulation is not important, and information that is more important for near-future determinations is processed first with higher sensitivity and higher priority while information that is less important has low priority and processed later. In the embodiment, the system performs machine learning, using artificial intelligence or the like, on the way a person presents information for a specific information group, raised and fixed as a characteristic of the person, and designs an HMI that encourages early determination using information having high impact.

For example, instead of narrowing down a method of presenting information by limiting all information to visual information, information is presented to the driver by applying comprehensive stimulation using a plurality of different types of information. Specifically, it is conceivable to give a stimulus to the driver by allowing the driver to hear a specific sound as auditory stimulus and then performing a visual notification following the sound. When the driver quickly and accurately has responded to the stimulus, the system gives credit points to the driver as a superior driver. Furthermore, application of the credit point for the superior driver is not limited to simple addition of points in storage into a mechanical storage medium (memory, hard disk drive, etc.), but is conducted on the spot with intuitive visual feedback to the driver via the HMI. This intuitively form a linkage with the obligation to perform an appropriate early recovery under the scheduled timing and circumstances based on the "deal" of the driver, leading to psychological reinforcement learning on the driver which promotes self-optimization of the responsive action by the driver.

In a neuron as an optic nerve that triggers determination, stimulation of a large number of factor elements is applied to a synapse from microscopic perspective. The memory that temporarily holds information requiring attention corresponds to the warning state of ignition standby. The status of storing related information having a near future risk in the storage referred to as working memory for action determination corresponds to a handling standby state based on the important items of memory in order to increase the sensitivity for related information so as to take a quick action in a case where information necessary for determination as necessary stimulus is received. With a large amount and variety of stimulation paths, it is possible to obtain an anchor effect for holding high priority even with a temporary occurrence of floating of thought due to mind wandering or the like, making it possible to enhance retention of necessity by visual and auditory information indicating risk factors presented simultaneously in parallel.

That is, the driver's action of confirming the "deal" or the "ancillary deal" presented by the system to the driver is reconfirmation of information by the driver. From microscopic perspective, the operation of reconfirming the information can be regarded as being performed by a role of activating the potential of the synapse in a state before the determination is fired. The optic nerve for determination is placed in this ready standby state, thereby increasing the perception sensitivity of the driver to unnoticeable information found in approaching the end of an ODD-permitted section, such as driving automation level 4. This places the driver in a heightened awareness of necessity even when the obtained information is not perfect. Therefore, when the memory is insufficient, the driver voluntarily attempts to supplement information in order to suppress the increase in risk. With this, the driver aims to complete the "ancillary obligation" based on the initial "deal". When the driver feels uneasy, for example, the uneasy feeling is reflected in an action of visually reconfirming a status screen related to the deal.

<3-2-2-6. Application of Driving Automation Level 4>

Next, a concept of the application of the driving automation level 4 according to the embodiment of the present disclosure will be described.

There is an issue what causes the driver to abandon the continuous use of the automated driving at the driving automation level 4 at an early stage and take a quick and appropriate measure (recovery action) while the vehicle approaches the end point of the available section at the driving automation level 4. In order for the driver to interrupt the NDRA that can be regarded as a merit when using the automated driving at the driving automation level 4 and shift to the recovery action to the manual-controlled driving, it is necessary to store related information regarding the shift to the recovery action in the working memory that controls the determination.

The trigger for storing the relevant information in the working memory is an "deal" between the system and the driver at the start of use of the driving automation level 4. At the time of the "deal" at the start of the use, the driver temporarily recognizes the responsibility and obligation. However, when the end point of the actual use section is a little long way off in terms of time, it is necessary to re-clarify the memory in order to perform the recovery obligation before reaching the limit point at which the recovery action to the manual-controlled driving is taken. In this, the presence or absence of information serving as a trigger and the risk importance will have a great impact on the success or failure of the recovery.

From an ergonomic point of view, a stimulus associated with some reason leads to an overwhelmingly more accurate determination than a simple recovery action having no other reason. Therefore, it is useful for successful perform recovery to present thereafter the handover factor with a difference in factors.

Assuming the use of the automated driving up to the driving automation level 4, when the driver starts to use the driving automation level 4 in the road extended section under satisfactory maintenance and management, the immediate recovery action to the manual-controlled driving is basically not required in the road section. In automated driving at a low speed, referred to as low speed automated driving, when a handling limit of the automated driving is exceeded, it is possible to obtain a handling time by deceleration or stopping of the vehicle.

On the other hand, on an ordinary road having a traffic of many ordinary passenger cars, it is necessary to perform automated handling along the flow of the corresponding road section without disturbing the flow. At this time, at a stage where automated handling is predicted to be difficult, the system needs to select whether to perform handover to manual-controlled driving, to enable completion of smooth handover to the driver at a cruising speed that is safe in automated driving. When estimation of successful operation is low, the system needs to perform selection such as whether to take evacuation travel to a road shoulder, a service area, an evacuation parking pool space, or a general road permitting stop or low speed travel while evacuation selection is left as selection candidate.

In a situation where an ordinary vehicle is traveling at the driving automation level 4 on roads such as an ordinary road, an expressway, or a highway, there are various factors that trigger interruption of continuous traveling of automated driving, such as characteristics of the vehicle, a road, an environment, a driver's availability for handling. Here, it is not always possible for the system to perform handover to the manual-controlled driving at a probability of 100% at a time point where the continuous traveling is difficult by the automated driving. Furthermore, as described above, in a case where the emergency stop or deceleration is executed on the spot, there is a high possibility of occurrence of impact on the following vehicle, that is, a large social influence, even when the own vehicle is not so negatively affected.

Therefore, what is necessary is to start the handling control so that the system can determine the confirmation of the success of the handover while the vehicle is in the travel continuable section having an option of evacuation selection capable of minimizing the hindrance to the following vehicle or the like, even when it is difficult for the driver to take a recovery action to the manual-controlled driving.

Hereinafter, an example of an event in which it might be difficult to continuously use the driving automation level 4 will be described.

It is necessary that traveling at driving automation level 4 is compatible with orderly use of roads being social infrastructure by individual vehicles and individual sense of risk handling, capability, and the like. Here, it is extremely difficult currently for the system to determine the use appropriate for the orderly road environment in manner similar to the human's brainpower. In another concept, leaving such heavy functions to the system can be an issue related to a fundamental quality of human, leading to a moral decision that ultimate automated driving is not to be performed. This is also considered as denial of the society in which humans are manipulated by machines.

As an example, in a situation where a vehicle can pass after giving way on a narrow street, a person temporarily interrupts or intervenes in steering with automated driving, breaks the entangled state, and passes through the street. As a simple case, when a vehicle passes through a narrow bridge with a single line, the vehicle communicates with an oncoming vehicle in advance and gives way to each other, thereby preventing complete obstruction of vehicles opposing each other, allowing the passage of each vehicle through the section.

In practice, it would be sufficient to intentionally incorporate a control mechanism for maintaining social order before the section. At this time, for example, in the highway, in order to have no impact on other vehicles even when the vehicle travels at the driving automation level 4, it is preferable to proceed to the selection determination processing such as determination of the situation to abandon the scheduled traveling path travel, handover to manual-controlled driving by the driver, remote driving assistance, and prior evacuation avoiding impact on other vehicles. In this case, appropriate determination is required.

Next, an example of factors for giving up the continuous use of the automated driving at the driving automation level 4 will be described as a list of items. These items, alone or in combination of a plurality of items, may be the factor.

A first factor is a factor for giving up continuous traveling at the driving automation level 4 due to success/failure in preliminary acquisition of road environment information regarding a destination of the currently used road. Examples the first factor include the following items.

(20-1) Lack of highly fresh LDM section information or updated LDM section information due to the reason such as a failure of section travelling vehicle which regularly collects information (20-2) Information acquisition failure due to primary congestion of communication band used for constant update of high-freshness update LDM (20-3) Use restriction due to expiration of deal for local map information based on the subscription deal (20-4) Failure in acquisition of continuous data due to leading vehicle defect or the like during following travel with leading vehicle assisted by pairing leader (20-5) Lack of shadow probing data for the road information from ordinary vehicles due to lowered density of the section travelling vehicles in a specific time zone.

(20-6) Communication device malfunction in own vehicle, or infrastructure communication malfunction (20-7) Lack of update information necessary for continuous travel with automated driving due to communication cyber-attack or information manipulation due to data fabrication As a second factor, there may be a case of giving up continuous traveling of the driving automation level 4 according to information notified from the updated preliminary road environment information of the destination of the currently used road. Examples of factors in this case include the following items.

(21-1) Matters to be handled by remote driving assistance controller go beyond capacity (21-2) Insufficient number of remote driving assistance operators (21-3) Reception of information such as entry of person and large animal into vehicle exclusive road, situation where animal escapes from luggage carrier of vehicle traveling ahead and walks on exclusive roads, and scattering information of emergency falling object from section leading vehicle (21-4) Reception of information difficult to predict abnormality, such as earthquake, cliff collapse, or tsunami
(21-5) Reception of alerting information for following vehicle obtained by voluntary danger report from section leading vehicle
(21-6) Partial and unexpected freezing of a road surface such as a wet bridge or a shade in a mountain area
(21-7) Traffic restrictions due to unexpected road construction or post-accident procedures
(21-8) Passage through section by traffic control through human communication (traffic control such as handling of accidents)
(21-9) Entry into a passage prohibited section in accordance with driver's conditions because of disappearance of evacuation available sections due to a narrow road section, an alternate passage single-direction bridge, a tunnel, or the like encountered in continuous travel with automated driving
(21-10) Traversing of railroad crossing section As a third factor, there may be a case of giving up continuous traveling of the driving automation level 4 due to a performance limit or a performance variation with the lapse of time in the sensing device mounted on the own vehicle Examples of this case include the following items. In this case, the continuous traveling is abandoned according to the departure/start time point of the automated driving at the driving automation level 4 or the situation change during traveling.
(22-1) Lowered detection performance in devices such as millimeter wave radar, LiDAR, and camera due to snow melting agent or dirt rolled up by preceding vehicle in travel
(22-2) Primary degradation or restriction of performance of sensing camera due to collision of windshield by insect, flying object, or the like during high-speed traveling
(22-3) Occurrence of noise and detection performance partial deterioration due to temperature rise during use
(22-4) Local window damage due to pebbles wound up by preceding vehicle, flying object from adjacent lane, or the like
(22-5) Broken headlight or the like and reduction in camera view-field detection limit in a vehicle at night-time traveling
(22-6) Clouding of the windshield due to an erroneous operation or the like of indoor air-conditioning use, and a primary decrease in detection performance of the indoor-installed sensing camera
(22-7) Recovery request with unknown cause based on self-diagnosis result by vehicle system As a fourth factor, there may be a case where continuous traveling of the driving automation level 4 is abandoned due to a situation change in a load affecting traveling of the own vehicle during continuous traveling with automated driving, or other changes in vehicle dynamics. Examples of this case include the following items.
(23-1) Load collapse during normal traveling
(23-2) Air release or burst of tire
(23-3) Riding on a scattered object, travel performance variation due to road abnormality, and generation of abnormal noise in own vehicle
(23-4) Load collapse due to sudden braking for collision prevention, significant movement of passenger in vehicle and lost balance of load associated with the movement
(23-5) Detection of brake abnormality in self-diagnosis of traveling vehicle
(23-6) Engine overheating, malfunction of control device As a fifth factor, there may be a case where continuous traveling of the driving automation level 4 is abandoned due to an abnormality of the driver. Examples of this case include the following items.
(24-1) Disabled prediction of necessary recovery due to driver's unexpected sleep, absence from seat, and state detection failure
(24-2) Sudden seizure of driver (asthma, spasm or numbness in foot, allergic reaction due to sudden vehicle entry of material such as pollen, heart attack, sudden headache, stroke, cerebral infarction, . . . , and the like)
(24-3) Detection of abnormal action due to addition to drug
(24-4) Interference with driver condition monitoring being performed by system
(24-5) Driver's Ignoring or disregarding of necessary response processing requested by the system to the driver in continuous use of automated driving
(24-6) Resting situation of driver, information about activities, rest, and conventional history from the previous day, and the like There is a possibility of having occurrence of some combinations of conditions and contributions of individual items of the first factor to the fifth factor described above. In a case where the travel at the driving automation level 4 is continued by the combinations, there is a need to avoid a situation involving deceleration or emergency stop of the vehicle, a decrease in efficiency of the social traffic infrastructure, or a large disturbance.

Regarding at least the first factor to the fourth factor among the factors described above, in a case where the driver does not execute the recovery action according to different conditions by the risk determination, the driver will receive a preliminary feedback information such as the degree of influence or the application of a penalty at the time of violation by an HMI capable of presenting a sensuous expression, for example, an expression using a stimulus to the visual sense. The visual stimulus to the driver is captured at least once in the working memory by the preliminary feedback by the HMI, the stimulus remains temporarily as a visual sensory stimulus, for example. By giving the driver a stimulus related to this visual sensory stimulus, it is possible to refresh the memory and sustain the memory of the need for a recovery action.

On the other hand, when an abnormality occurs in the driver themselves as the fifth factor, it would be extremely difficult to prompt the driver to take an early recovery action by the HCD. However, even in this case, by presenting, to the driver, a function for abandoning automated driving at an early stage, the system can use the application to send the driver a voluntary abandonment request or a rescue request based on information regarding an evacuation spot by this function or the like. This application makes it possible to perform control with a margin for preliminary handling, as compared with a case where the system leaves the driver with no presentation of any information to the driver and allows the vehicle to continuously travel to the handover limit point, and activates the MRM only after the vehicle reaches the handover limit point.

Note that the examples illustrated in the above items are representative examples of handling required for important highways and the like of social infrastructure which has a possibility of causing problems when the own vehicle stops in a traveling zone of a road. The handling will not be limited to above items when the road has a very low possibility of causing a traffic obstruction even if the vehicle makes a sudden stop or a complete stop due to the MRM, such as a road with an extremely small traffic volume or a road with a wide road width even when it is not a highway.

That is, when the section is a section capable of execution of emergency stop or evacuation without hindering the social activity by the MRM when the driver continues traveling at the driving automation level 4, the system can allow the vehicle to continue the traveling plan as scheduled without considering the executability of handling regarding the recovery of the driver or regardless of the state of the driver. In other words, under this situation, even when the system encounters a situation difficult to handle at the driving automation level 4 and the driver cannot appropriately recovery, an emergency stop or evacuation of the vehicle to a certain place would not cause traffic obstruction of the road as the social infrastructure.

In this manner, the situation in which the use of the automated driving at the driving automation level 4 is appropriate is not uniformly determined or is not a fixed environment. The situation will actively change due to various factors such as the handling ability with respect to the recovery request of the driver, the road condition, the use environment, and the vehicle state.

<3-2-2-7. Effect of Adoption of HCD>

Next, effects in a case where the HCD is adopted instead of the existing MCD as described above will be described.

First, the essence of the control of the HCD according to the present disclosure is that the available section of the automated driving of the driver is variable, and the determination of the available section is also performed depending on the acquired credit information of the driver in addition to the observable evaluation value such as the wakefulness of the driver at the observed time point. Furthermore, in the HCD according to the present disclosure, information detected by the system and a result thereof are presented to the driver as near-future risk information using at least a visual expression in an intermediate process in determining an available section.

Unlike a simple recovery request notification or the like uniformly presented in the system, information is presented as a risk of the driver's own selection action, achieving a thinking selection operation considering the balance between the merits and demerits. With this operation, information regarding the degree of importance of the driver in the working memory is captured and maintained with further freshness depending on the importance of handover. In addition, the action evaluation for the selection work in mind is further reflected in the future use condition, and whether the use merit of the automated driving can be obtained is also determined for the current use permission based on the past evaluation result. Therefore, in the HCD, the driver can acquire the use responsibility and the feeling of enjoyment of merit different from the machine instruction by the MCD through repeated use.

Furthermore, by repeated use, the driver learns an association suitable for themselves. In addition, the system imposes a penalty and use suppression in a case where the driver's action interferes with social activity. This makes it possible to make the driver avoid a disadvantageous action to be an obstructive factor, leading to suppression of a use form having poor social acceptability.

Second, the automated driving can greatly reduce a human intervention load on the driving steering work. Therefore, it is expected that occurrence of a social accident is greatly reduced by the vehicle being driven in the automated driving mode instead of a human, in view of today's social circumstances in which accidents caused by human factors are estimated to be about 94%.

However, in the introduction of automated driving widely considered today, introduction of automated driving into society is examined on the premise that a driver appropriately recovers to manual-controlled driving in response to a request of a system and the driver can quickly respond to the request. However, there is a possibility that this premise is not established in a situation in which driver's excessive dependence on the automated driving system can be caused by improved performance of the automated driving system.

In the present disclosure, availability of the function of the automated driving is basically provided according to whether it is possible to successfully establish appropriate use applicability of the driver. In addition, an HMI that encourages appropriate use is incorporated in the mechanism. This can accomplish a control technique for preventing the driver from being excessively dependent on the system and allowing the driver to subjectively take an appropriate recovery action.

That is, the present disclosure relates to vehicle control in which a method of use control for automated driving of a vehicle has been changed from an MCD that unilaterally issues an instruction from a conventional device to an HCD that performs use control according to human behavioral characteristics, with introduction of an HMI that achieves the change. In particular, when the driver uses the automated driving function of the system, the driver exchanges with the system an "deal" which is "ritualistic" and represented by a "confirmation action" taken by the driver without neglecting the request at the completion of the automated driving, and the validity of the deal is appropriately reconfirmed even during the progress of the use of automated driving.

Such a system based on the HCD cannot be implemented by simply incorporating some function into the system, and it is necessary to perform reinforcement learning by repeating complex use necessary for various drivers to form a use habit. The embodiment describes an HMI that works on the driver in order to promote the reinforcement learning and performs long-term retention of an appropriate early recovery as a sense of use. Note that the combination of the execution means for feedback operation to the driver is not limited to the example described in this specification.

The allowable driving automation level of the conventional automated driving has been mechanically determined by the system according to the situation of the road environment that can be handled by the device, the driver has been supposed to uniformly switches the use selection appropriately by self-determination. In contrast, the present disclosure provides a development support of the habit of the driver to appropriately start the recovery procedure without delay in response to the request of the system by repeated use, and provides the HMI necessary at that time of support. With this, even when the introduction of the automated driving is widely spread in society, the system has an effect of widely suppressing occurrence of emergency deceleration and stop on the road due to an emergency MRM or the like due to delay of the recovery operation of the driver, and further suppressing occurrence of control that leads to significant disturbance of traffic when the vehicle stops so as to prevent inhibition of social activities.

Third, in order to use automated driving involving frequent handover to manual-controlled driving, it is necessary to grasp the characteristics of the working memory of the driver in order to safely continue the driving operation.

Even when a person perceives and recognizes a necessary handling event and temporarily takes information into the working memory, the strayed consciousness such as mind wandering progresses with respect to other events due to the state of being lost in thought, imbalance of the autonomic nerve, or the like, might occur. This causes the importance of a matter, which is important, to be lost from memory, leading to the delay in handling the matter and even a critical result.

The amount of information allocated to a human thought is finite, and complete consideration cannot be allocated to all things at the same time. Therefore, when information is learned by a plurality of different systems, information input is performed with information of the different systems by different means such as visual or linguistic means, and when each result can be depicted, it becomes easier to return the thought to a necessary handling item even at the occurrence of mind wandering. That is, the HMI in which the necessity of handover is presented as information leading to a result prediction of a certain influence specifically as a sense of risk, rather than a boring information presentation form such as a simple symbol, will be effective for clarifying the memory of the recovery request.

In a case where the HCD is adopted for the control, regarding the information that has once entered the working memory of the thought during work, there is a possibility that the thought transition occurs in other matters at the moment, and the information that has been acquired as fundamentally important information will be forgotten with the transition of time. Therefore, it is necessary to perform feedback to restore the memory onto the driver according to the current inherent degree of forgetfulness of the driver. Therefore, the present disclosure evaluates the driver's "forgetfulness" regarding important matters as their daily characteristics and "freshness of memory the driver holds regarding the driving-related cautions at the time point of use of travel", and then presents the memory refresh information suitable for the driver.

In addition, as one of the embodiments of the present disclosure, in a case where remote assistance is used, it is possible to confirm and predict a point where assistance is not available in advance. With this, by providing information such as a sufficient road shoulder zone and service area (SA) together to the driver via the HMI, in a case where assistance is not received, standby selection at a point that does not interfere with traffic to other places becomes easy, and a mechanism that is established even with a small number of remote assistance operators can be realized, making it possible to provide practical and efficient remote assistance. In addition, it is possible to efficiently operate the infrastructure necessary for remote monitoring.

Fourth, in a case where a secondary task other than driving performed by the driver, that is, NDRA mainly involves in visual information of an electronic terminal, attention awareness can be improved by the following measures. Specifically, in the terminal device having the monitor screen, the short-term information related to the automated driving may be presented in a display image area as originally designed for NDRA so as to display the visual information related to the necessity of handover.

For example, the visual information may be displayed in an extremely short period of time aiming at an effect referred to as a subliminal effect, which cannot be consciously noticed by the viewer. In addition to the information presentation that remains completely out of consciousness, it is allowable to perform information presentation that is longer than in the case of aiming at the subliminal effect and that can be clearly recognized by the driver.

In the case of information that does not necessarily pass through linguistic comprehension such as the subliminal effect, it is more effective that a sense of risk acts on the driver as a visual and intuitive sense as a risk to occur in a case where the handover request is ignored. For example, it is effective to use a visual depiction in which, in a case of violation, the user is watched by a police motorcycle on the road side rather than written information including penalty regulations, a depiction in which the user is receiving a tracking stop order as a violation control rather than the static information including a police box image, a situation depiction in which confirmation of the violation is requested, and a depiction of the risk suffered by the user in a case where the MRM cannot be continuously executed.

A person consciously captures visual information and performs linguistic interpretation on the captured visual information. On the other hand, it is academically suggested that a human has an information transmission mechanism capable of working on the brain without language interpretation at all and without going through consciousness.

These short-time stimuli due to the subliminal effect, for example, are expected to have an effect of refreshing and reactivating important information that has almost gone from the working memory. Unlike the effect that the system acts to awaken from a decrease in consciousness due to fatigue or drowsiness, this effect has an effect of restoring stored information onto a working memory necessary for handover determination in consciousness.

In a case where a person remembers important information, there is a case where the person forgets the necessity of a response while understanding the necessity of a response in mind, and cannot recall the important information at a necessary timing, until later time.

This is because the important information that needs to be handled is not preferentially stored in the working memory as an important matter, and cannot be retrieved from storage. In order for the stored information to work effectively for determination, it is necessary to increase the amount of stimulation onto the memory. Similarly to blindsight, the subliminal effect or the like affects action determination even if it is not consciously regarded as visual information. However, since suppression of display is not the main focus, the subliminal effect is an example of the ultimate short-time HMI, and longer display that acts on consciousness may be performed, or furthermore, display may be continued until the driver cancels the display, thereby acting as risk depiction with higher intensity.

That is, when the automated driving is used, once the request of handover to manual-controlled driving has occurred between the system and the driver due to a situation change, the system allows continuous use of the automated driving as long as the "deal" corresponding to a handover request is valid. In order to cause the driver to execute "recovery obligation execution" incidental to the "deal" without fail while the driver is utilizing the automated driving function in response to the "deal" with utilization of benefits of NDRA during automated driving, it is effective to use some type of reminder stimulus. When an electronic terminal is used, it is effective to display this stimulus on the application screen of the electronic terminal. In this case, there is an effect of causing the driver to "notice" the "recovery obligation execution" incidental to the "deal" without excessively hindering the user's browsing operation on the screen related to the NDRA utilizing the benefit.

<3-2-3. Specific Example of HCD According to Embodiment>

Next, the HCD according to the embodiment will be described more specifically. Hereinafter, unless otherwise specified, it is assumed that the automated driving is the automated driving at the driving automation level 4 defined by SAE.

<3-2-3-1. Example of Automated Driving Applied with HCD According to Embodiment>

Figure 7A:
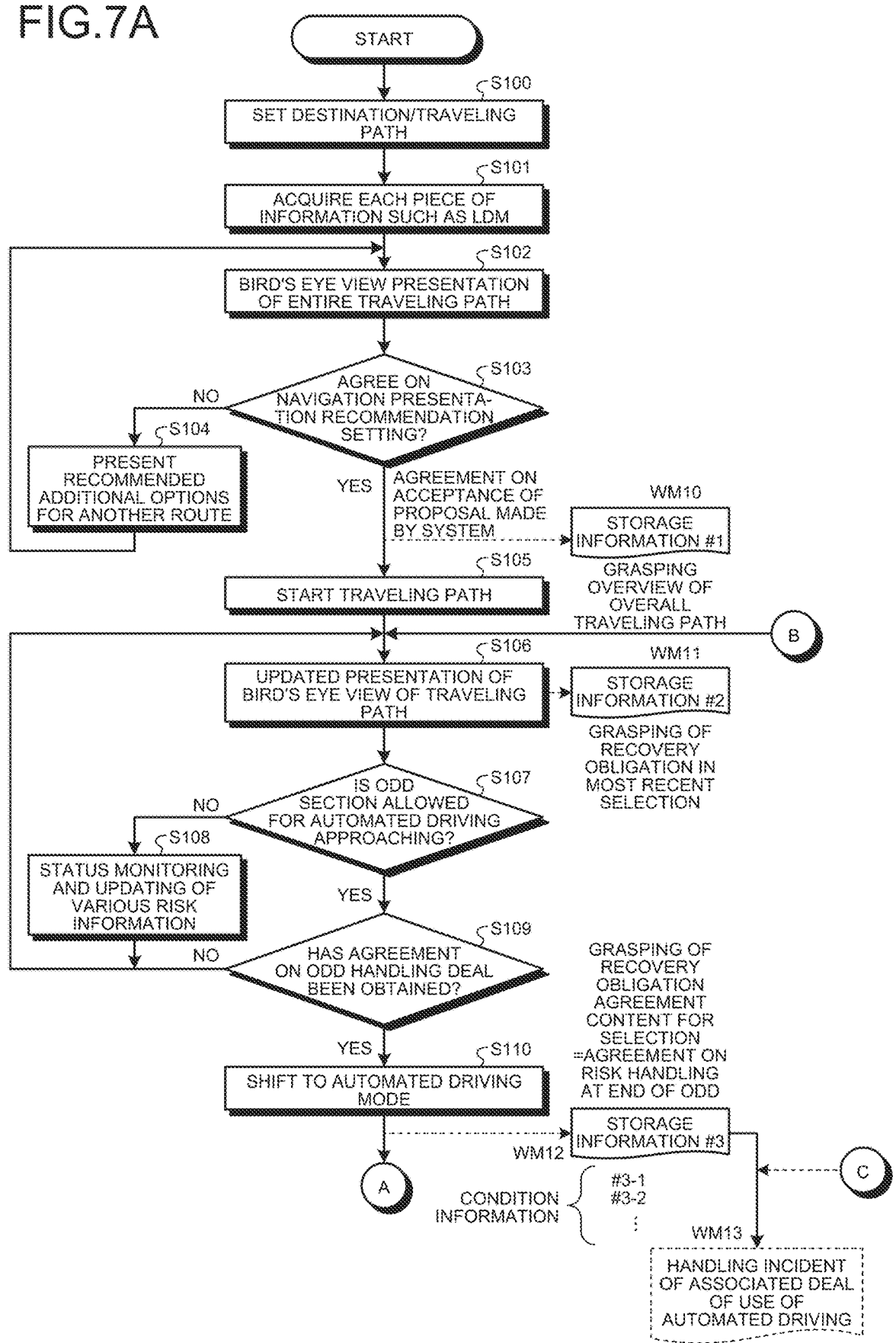
FIG. 7A is a flowchart illustrating an example of a flow from a traveling path setting to transition to an automated driving mode according to the embodiment.
Figure 7B:
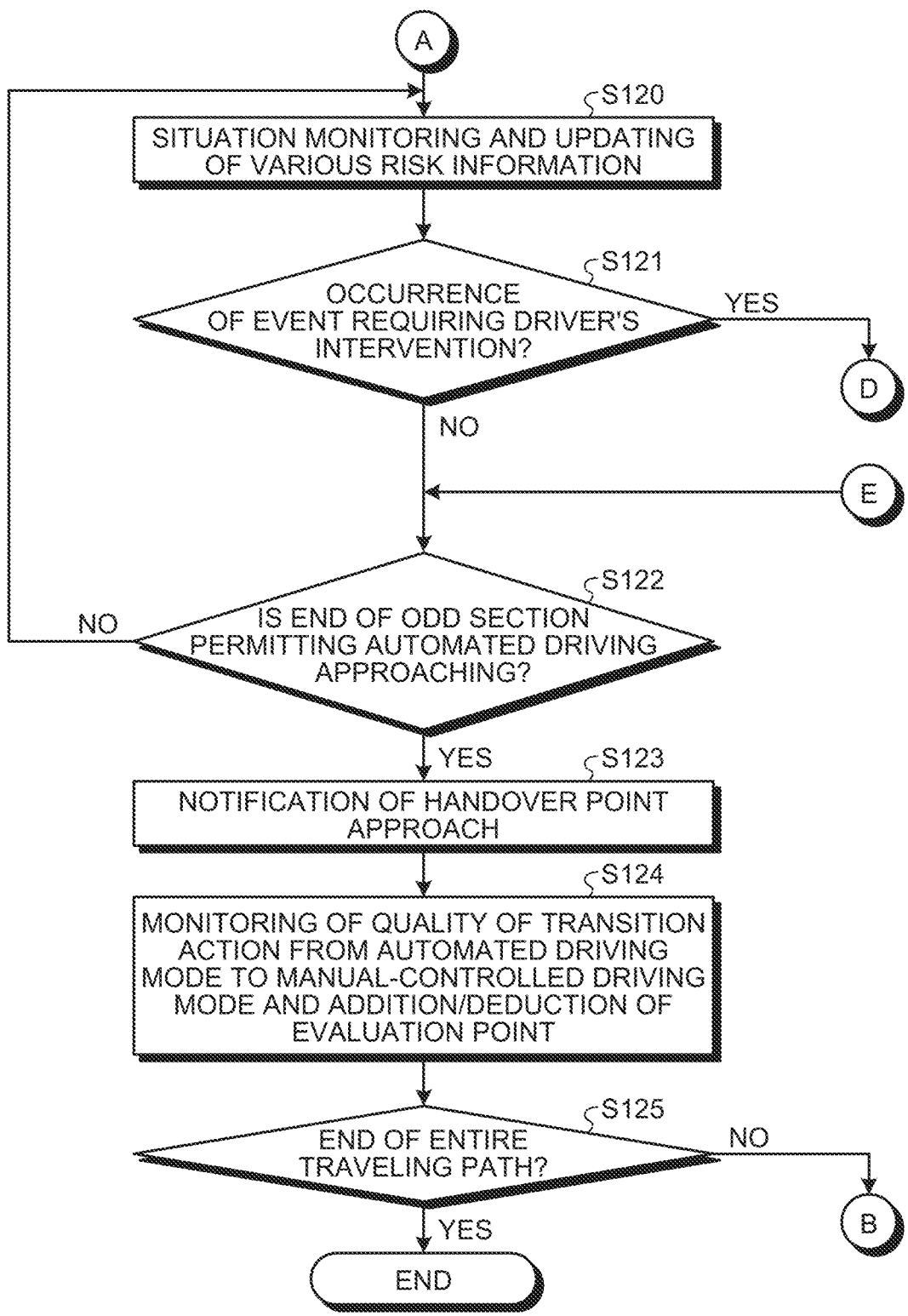
FIG. 7B is a flowchart illustrating an example of a flow of processing in the automated driving mode according to the embodiment.
Figure 7C:
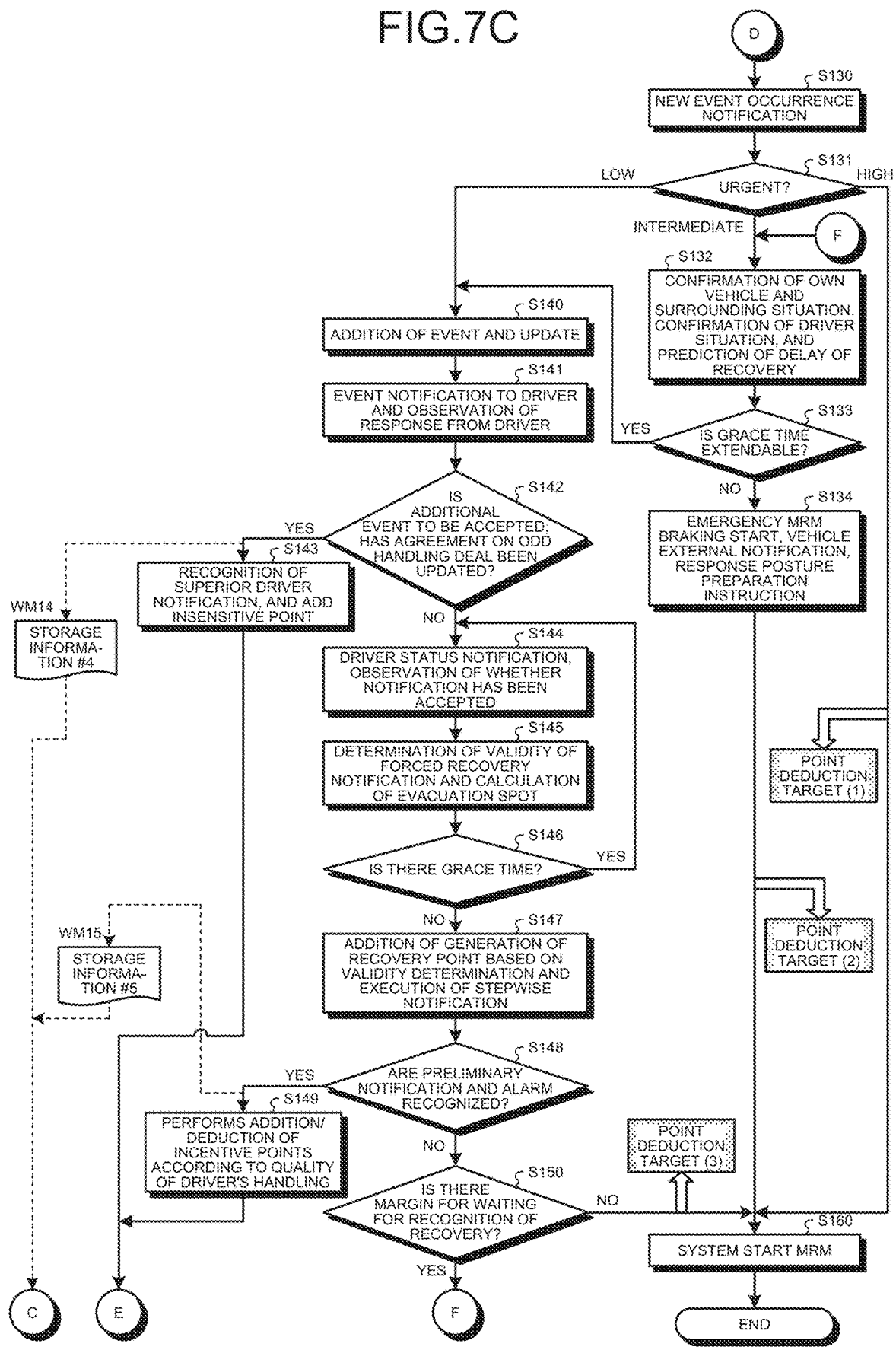
FIG. 7C is a flowchart illustrating an example of a response to an event occurring during automated driving at driving automation level 4 according to the embodiment.

An application example of the automated driving to which the HCD according to the embodiment is applied will be described more specifically with reference to the flowcharts of FIGS. 7A to 7C. In FIGS. 7A to 7C, reference numerals "A" to "F" indicate that the processing shifts to corresponding processing with reference numerals in the flowcharts of the other drawings in FIGS. 7A to 7C. Blocks generally indicating "documents" in the flowcharts of FIGS. 7A to 7C indicate that information is provided to the driver by visual stimulation or the like.

FIG. 7A is a flowchart illustrating an example of a flow from the traveling path setting to the transition to the automated driving mode according to the embodiment. Note that the traveling path described herein indicates a travel plan of the vehicle, and includes information indicating a departure point and a destination of travel together with information indicating a travel route. Furthermore, starting the traveling path means starting traveling according to the traveling path.

Step S100 sets a traveling path including a traveling destination is set by the user (driver) of the vehicle. The set traveling path is input to the automated driving control unit 10112 (refer to FIG. 1). The automated driving control unit 10112 acquires various types of information necessary for traveling according to the traveling path, such as the LDM based on the input traveling path. For example, in step S101, the automated driving control unit 10112 acquires information such as the LDM, the recovery characteristic of the driver to the manual-controlled driving, the weather of the area included in the traveling path, and the cargo loaded on the vehicle. Among these characteristics, for example, the characteristic based on the evaluation performed on the recovery operation to the manual-controlled driving in the past for the driver can be applied as the recovery characteristic to the manual-controlled driving of the driver.

In the next step S102, the automated driving control unit 10112 presents a bird's-eye view of the entire traveling path to the driver. Although a specific example will be described below, the automated driving control unit 10112 generates, based on LDM, for example, display information obtained by visualizing map information indicating the entire travel route of the traveling path, information indicating a section where the vehicle can travel at the driving automation level 4 in the travel route, and the like. The automated driving control unit 10112 supplies the generated display information to the output unit 10106 via the output control unit 10105, and causes a display device connected to the output unit 10106 to display an image according to the display information, for example.

This display is a navigation display that displays the setting of the traveling path recommended by the system, that is, the automated driving control unit 10112. Note that the bird's-eye view display described herein does not need to be a bird's-eye view on a three-dimensional scale having an adjusted scale based on a physical distance, and may be a time-converted display, a stereoscopic display, or another display form as long as the driver can recognize an intervening point.

In the next step S103, the automated driving control unit 10112 inquires of the driver whether to agree to the setting of the traveling path recommended by the navigation display presented in step S102. For example, the automated driving control unit 10112 performs determination of agreement or not in accordance with the driver's operation on the input unit 10101. The determination method is not limited thereto, and the automated driving control unit 10112 may detect the movement of the driver by using a camera for imaging the inside of the vehicle or the like and determine whether the driver agrees with the detected movement, or may perform the determination according to the utterance of the driver.

When having determined in step S103 that the driver does not agree with the recommended setting (step S103, "No"), the automated driving control unit 10112 proceeds to the processing of step S104. In step S104, the automated driving control unit 10112 adds another recommended travel route, and presents the driver with an option of selecting the another travel route. Subsequently, the automated driving control unit 10112 returns to the processing of step S102, and presents a bird's-eye view of the entire traveling path by the another travel route to the driver.

In contrast, when having determined that the driver agrees with the recommended setting in step S103 (step S103, "Yes"), the automated driving control unit 10112 proceeds to the processing of step S105. At this time, when the driver accepts and agrees the traveling path suggested by the system, the concept of the entire traveling path is grasped by the driver, and the fact is stored in the working memory of the driver as storage information #1 (WM10).

Step S105 starts the driving of the vehicle by the driver to start the traveling path. The automated driving control unit 10112 updates the bird's-eye view of the traveling path along the travel of the vehicle by the start of the traveling path, and presents the updated bird's-eye view to the driver (step S106). At this time, the automated driving control unit 10112 controls the automated driving for each section in the traveling path, and calculates the automated driving mode for each ODD corresponding to each section in time series.

At this time, by confirming the updated bird's-eye view presented by the automated driving control unit 10112, the driver can grasp the current state of the traveling path and grasp the recovery obligation to the manual-controlled driving with respect to the latest selection. The grasped information is stored in the working memory of the driver as storage information #2 (WM11).

In next step S107, the automated driving control unit 10112 determines whether the ODD section permitting automated driving is approaching. When having determined that the section is not approaching (step S107, "No"), the automated driving control unit 10112 proceeds to the processing of step S108, performs continuous monitoring of the situation change, updates various risk information based on the monitoring result, and returns to the processing of step S106.

In contrast, when having determined that the section is approaching (step S107, "Yes"), the automated driving control unit 10112 proceeds to the processing of step S109. In step S109, the automated driving control unit 10112 presents a deal related to a response to the ODD section to the driver, and determines whether an agreement on this agreement by the driver has been obtained. This deal includes various conditions for permitting automated driving in the ODD section, for example. The automated driving control unit 10112 makes this determination based on the presence or absence of driver's operation or an action indicating an agreement on the presented deal, for example. When having determined that the agreement has not been obtained (step S109, "No"), the automated driving control unit 10112 returns to the processing of step S106.

When having determined that the agreement on the deal is obtained in step S109 (step S109, "Yes"), the automated driving control unit 10112 permits the use of the automated driving in ODD, and proceeds to the processing of step S110. In step S110, when the own vehicle enters the ODD section where automated driving is permitted, the automated driving control unit 10112 shifts the driving mode from the manual-controlled driving mode to the automated driving mode.

When the driving mode shifts to the automated driving mode in step S110, the driver is obliged to perform recovery to manual-controlled driving in response to the selection in step S109. Grasping the contents of agreement (details of deal) with the system indicates that the driver has agreed with the system regarding risk handling at the end of the ODD section. The violation in execution of the recovery obligation involves a penalty for the driver. Information #3-1, #3-2, . . . indicating each condition included in the agreed deal is stored in the working memory of the driver as storage information #3 (WM12). In addition, the stored information #3 is stored as information regarding a countermeasure in a case where an unscheduled incident newly occurs in the traveling path as an associated deal at the time of using the automated driving (WM13).

When the driving mode is selected and shifted to the automated driving mode in step S110, the processing proceeds to the processing of the flowchart illustrated in FIG. 7B according to the reference sign "A".

FIG. 7B is a flowchart illustrating an example of a flow of processing in the automated driving mode according to the embodiment. The processing proceeds from step S110 in FIG. 7A to step S120 in FIG. 7B. In step S120, the automated driving control unit 10112 performs continuous monitoring of the situation change, updates various types of risk information based on the monitoring result, and proceeds to the processing of step S121.

In step S121, the automated driving control unit 10112 determines whether an event requiring driver's intervention is occurring based on the result of the status monitoring in step S120. When having determined that the event has not occurred in step S121 (step S121, "No"), the automated driving control unit 10112 proceeds to the processing of step S122.

In step S122, the automated driving control unit 10112 determines whether the end point of the ODD section permitting automated driving is approaching. When having determined that the end point of the section is not approaching (step S122, "No"), the automated driving control unit 10112 returns to the processing of step S120. In contrast, when having determined that the end point of the section is approaching (step S122, "Yes"), the automated driving control unit 10112 proceeds to the processing of step S123.

The loop processing in steps S120 to S122 indicates processing in the ODD section in which automated driving at driving automation level 4 is stably applicable.

In step S123, the automated driving control unit 10112 notifies the driver that the handover point for performing handover the driving from automated driving to manual-controlled driving is approaching. In next step S124, the automated driving control unit 10112 monitors the action of the driver related to the transition from the automated driving mode to the manual-controlled driving mode, that is, the quality of the driver's handover operation from automated driving to manual-controlled driving, and performs addition/deduction of evaluation points regarding the driver based on the monitored the quality. The monitoring of the quality of the handover operation and the calculation of the evaluation adjustment point for the quality will be described below.

In the next step S125, the automated driving control unit 10112 determines whether the entire traveling path set in step S100 of FIG. 7A is ended. When having determined that the entire path has ended (step S125, "Yes"), the automated driving control unit 10112 ends a series of processing of the flowcharts in FIGS. 7A to 7C. In contrast, when having determined that the entire traveling path is not ended in step S125 (step S125, "No"), the automated driving control unit 10112 proceeds to the processing of step S106 in the flowchart of FIG. 7A following the symbol "B".

When having determined that an event requiring intervention by the driver has occurred in step S121 described above (step S121, "Yes"), the automated driving control unit 10112 proceeds to the processing of step S130 in the flowchart of FIG. 7C following the reference sign "D" in the drawing.

FIG. 7C is a flowchart illustrating an example of a response to an event occurring during automated driving at driving automation level 4 according to the embodiment. In step S130, the automated driving control unit 10112 notifies the driver of occurrence of a new event. In the next step S131, the automated driving control unit 10112 determines the urgency of the new event. For example, the automated driving control unit 10112 determines the urgency according to the distance between the point where the own vehicle is traveling and the point where the new event has occurred. This is substantially synonymous with determining the urgency according to the temporal margin until the own vehicle reaches the new event occurrence point.

When the distance to the new event occurrence point is a predetermined distance or less and the time margin is small, the automated driving control unit 10112 determines that the urgency of the new event is high (step S131, "high") and proceeds to the processing of step S160. In step S160, MRM is started by the system, and deceleration of the own vehicle, movement to an evacuation place such as a road shoulder, and the like, are forcibly executed. When the MRM is started in step S160, a series of processing according to the flowcharts of FIGS. 7A to 7C is temporarily ended.

In addition, the processing determined to have high urgency in step S131 and that proceeds to step S160 is to be point deduction target (1) to be described below, in which the evaluation of the driver is set to light point deduction.

When it is determined in the above step S131 that the distance to the new event occurrence point is within the predetermined range (the distance is longer than the case of high urgency determination, and shorter than the case of low urgency determination) and there is a certain amount of time margin, the automated driving control unit 10112 determines that the urgency is at intermediate level (step S131, "intermediate"), and proceeds to the processing of step S132.

In step S132, after obtaining a time for deceleration in advance, the automated driving control unit 10112 confirms the own vehicle and the surrounding situation (such as presence or absence of a following vehicle), and predicts the influence on the surroundings when the own vehicle decreases the traveling speed. In addition, the automated driving control unit 10112 checks the situation of the driver and observes whether the driver can urgently perform recovery to the manual-controlled driving. Based on this observation result, the automated driving control unit 10112 predicts a delay in the driver's recovery action from automated driving to manual-controlled driving.

In next step S133, the automated driving control unit 10112 determines whether the grace time from automated driving to the recovery action to manual-controlled driving can be extended based on the prediction result in step S132. When having determined that the grace time is extendable (step S133, "Yes"), the automated driving control unit 10112 proceeds to the processing of step S140. In contrast, when having determined that the extension of the grace time is not possible (step S133, "No"), the automated driving control unit 10112 proceeds to the processing of step S134.

Although details of control will not be described, when a new incident or event requiring manual-controlled driving newly occurs on the traveling path due to a situation change in the middle of traveling, prolonging the arrival time using sudden deceleration or the like by the system in order to forcibly handle the situation within a short time margin would increase the risk of secondary damage such as rear-end collision by the following vehicle or induction of traffic congestion, and is not necessarily safe.

Therefore, it is necessary to determine a strategy for handling, and re-examination of the travel plan is performed, including checking whether deceleration of the vehicle in the road section will have no impact on the road infrastructure. The usefulness of the determination processing of reviewing the travel plan will be described using a specific example.

An example to be examined is a case where the system determines that it is difficult to continue traveling at the driving automation level 4 at a speed within a performance limit that can be handled by the automated driving system in the course of traveling on the travel route indicated by the traveling path at the allowable maximum speed of the road section. In this case, when the road section is a double-lane road in which vehicles cruising at the same speed are not dense around the own vehicle, that is, the traffic is sparse, and when the road is a straight road, slowly decelerating the vehicle is considered to have a little impact on road traffic. In this case, deceleration can be determined as the best selection.

As another example, when the preliminary periodic monitoring has found a state in which it is difficult for the driver to perform recovery to manual-controlled driving due to poor physical condition or the like, and when a road section where there is heavy traffic in a road section where the driver is traveling and there are many curves with poor visibility is approaching the road section where the driver is traveling, it may be safer to decelerate in a straight road section in advance.

In step S134, the automated driving control unit 10112 urgently starts braking of the MRM. For example, when starting the MRM, the automated driving control unit 10112 preliminarily issues an alarm notification for notifying the surroundings of the own vehicle of the start of the MRM. Furthermore, the automated driving control unit 10112 instructs the driver to prepare a posture (attitude) to respond to the MRM. After the process of step S134, the automated driving control unit 10112 proceeds to the processing of step S160 to start the MRM by the system.

In addition, the transition processing from step S134 to step S160 is a point deduction target (2) to be described below for deduction of points in the driver's evaluation.

In step S131 described above, when the distance to the new event occurrence point is a predetermined distance or more and there is sufficient time margin, the automated driving control unit 10112 determines that the urgency is low (step S131, "Low"), and proceeds to the processing of step S140.

In step S140, the automated driving control unit 10112 adds the new event to the bird's-eye view of the ODD section, and updates the bird's-eye view. In the next step S141, the automated driving control unit 10112 notifies the driver of the new event, and observes the response of the driver to the notification.

In the next step S142, based on the response of the driver observed in step S141, the automated driving control unit 10112 determines whether the driver accepts the added new event, that is, whether the agreement on the deal in the ODD section has been updated. When having determined that the driver has updated the agreement (step S142, "Yes"), the automated driving control unit 10112 proceeds to the processing of step S143.

In step S143, the automated driving control unit 10112 adds an insensitive point as evaluation of the driver in accordance with recognition of the superior driver notification. Subsequently, the automated driving control unit 10112 proceeds to the processing of step S122 in the flowchart of FIG. 7B following the reference sign "E".

The transition from step S143 to step S122 is recognized by the driver as addition of the handover event because the driver has made an intentional cognitive response to the notification. This is information acting on the working memory, and appropriate processing by the driver is expected. The similar applies to a case where the processing proceeds from step S149 to step S122 described below.

Note that the transition of the processing from step S142 to step S143 means that the driver has agreed to the deal presented from the system and has consciously permitted the schedule of automated driving. Accordingly, the information regarding the deal is stored in the working memory of the driver as storage information #4 (WM14).

In contrast, when having determined that the driver has not updated the agreement in step S142 (step S142, "No"), the automated driving control unit 10112 proceeds to the processing of step S144. In step S144, based on the state of the driver, the automated driving control unit 10112 observes whether the notification from the system has been accepted by the driver. In the next step S145, based on the observation result in step S144, the automated driving control unit 10112 determines validity of the forced recovery notification that prompts the driver to forcibly perform recovery to the manual-controlled driving. In addition, the automated driving control unit 10112 calculates an evacuation spot having the minimum impact at the time of recovery.

In the next step S146, the automated driving control unit 10112 determines whether there is a grace time from the current time point to the timing at which the driving should perform recovery to the manual-controlled driving. When having determined that there is a grace time (step S146, "Yes"), the automated driving control unit 10112 returns to the processing of step S144. For example, in a case where the driver is performing NDRA with a large deviation from driving such as a nap, there is a possibility that a soft notification such as a display or a warning sound is not recognized by the driver. Therefore, the automated driving control unit 10112 repeats the processing of steps S144 to S146 until the end of the grace time.

When it is determined in step S146 that there is no grace time from the current time point to the timing to perform recovery to the manual-controlled driving (step S146, "No"), the automated driving control unit 10112 proceeds to the processing of step S147. In step S147, based on the determination result of validity regarding the forced recovery notification in step S145, the automated driving control unit 10112 adds the generation of the recovery point and performs stepwise notification of the recovery point to the driver. For example, the automated driving control unit 10112 performs stepwise issuance of preliminary alarms and notifications to the driver.

In case where the driver is in a state such as being asleep at the time of occurrence of the new event at notification of the driver of an unscheduled new event, the driver has no recollection of matters as a premise of a new handover point, necessity of handover, and urgency. Therefore, in order to prevent the driver from falling into a panic, a certain early notification and an alarm are given in order to give the driver a grace time of thinking and grasping the situation, unlike the planned handover.

This is because, as described above, for the recovery operation earlier than originally intended due to the new event, the recovery point information is not stored in the restoration necessity storage of the driver, and the information prompting the perform recovery to the manual-controlled driving is not yet stored in the work storage of the driver. The limit of this determination is a point where a request recovery ratio (RRR) is high, and when the MRM is activated, which is a point capable of ensuring a time margin a or more in which the driver can recovery without disturbing the operation of the highway. For example, when the driver has been taking a nap, this corresponds to the time until the driver recovers from the nap. Here, in a case where the driver's quality of recovery from a nap is poor, the RRR is high, and the vehicle is approaching a section having a risk of causing a traffic obstruction or the like, the automated driving control unit 10112 performs a preliminary measure by the MRM before the section.

RRR indicates a desired probability at which completion of handover at the handover limit point is desired when the driver is requested to perform recovery to the manual-controlled driving.

RRR will be described in more detail. Ideally, it is desirable that the driver at [1/1] completes the handover normally at the handover limit point. In indicating the success rate, RRR is defined as [1/1].

However, on rare occasions, there are cases where handover is not successful in practice. For example, in a certain road section, when it is allowable to have a level at which drivers of five vehicles out of 10000 vehicles are not successful, the RRR required for the road section is a ratio expressed as [1-0.0005/1].

The RRR is an index indicating a handover success target value defined for each road section so that, for each lane of the road section, when a vehicle stops in the road section due to the activation of the MRM, there is no induction of a rear-end collision accident or traffic congestion to the own vehicle by a following vehicle or the like and the own vehicle does not have to make a sudden stop on the road of a single lane in various dynamic information defined as the LDM as physical information. The RRR is desirably used as a determination factor that dynamically changes according to a temporal situation change incidental to the LDM.

As a specific example of RRR in Japan, RRR is desirably set to [1] in sections such as a road section having no evacuation spot such as a road shoulder like a metropolitan expressway or the like, and particularly in a situation where the evacuation spot is already filled with vehicles arriving earlier. On the other hand, when there is a space to evacuate in an evacuation spot or when it is inevitable for the driver to perform recovery before an exit of an expressway where the driver can evacuate to a general road, it is possible to select steering evacuation to these evacuation spots, get off to a general road and stop the vehicle, and the like as a part of the MRM while minimizing the impact on other following vehicles. Therefore, it is conceivable to set the recovery request rate to about 0.95, for example. Furthermore, in a road section where the traffic volume is extremely small, the RRR may be [0] when the impact of the emergency stop involves only the own vehicle in the road section.

Basically, in order to suppress hindrance to traffic by the MRM on the social infrastructure, RRR is desirably information that is constantly updated and provided to a vehicle using automated driving as a part of the LDM.

After completing the processing of step S147, the automated driving control unit 10112 proceeds to the processing of step S148. In step S148, the automated driving control unit 10112 determines whether the preliminary alarm and notification in step S147 are recognized by the driver.

When having detected a predetermined response (operation on the input unit 10101, specific action, and the like) of the driver to the alarm and notification in step S148 and determines that the alarm and notification have been recognized by the driver (step S148, "Yes"), the automated driving control unit 10112 proceeds to the processing of step S149. In this case, since the driver responds to the call notification at early stage, it is possible to shift to the normal handover processing.

In step S149, the automated driving control unit 10112 performs addition or deduction of incentive points as evaluation of the driver according to quality of the driver's handling. Subsequently, the automated driving control unit 10112 proceeds to the processing of step S122 in the flowchart of FIG. 7B following the reference sign "E".

The transition of the process from step S148 to step S149 indicates that the driver responds early to the call notification, so that the driver can transition to the normal handover processing. Therefore, the information indicating that the driver has recognized the preliminary alarm or notification is stored in the working memory of the driver as storage information #5 (WM15).

Here, the storage information #5 stored in the working memory by the WM15 and the storage information #4 stored in the working memory by the WM14 described above are applied to the processing by the WM13 in FIG. 7A as indicated by symbol "C" in the figure.

When having determined that the alarm and notification are not recognized by the driver in step S148 (step S148, "No"), the automated driving control unit 10112 proceeds to the processing of step S150. In step S150, the automated driving control unit 10112 determines whether there is a margin for waiting for recognition of the recovery of the driver. When having determined that there is a margin for the standby (step S150, "Yes"), the automated driving control unit 10112 returns to the processing of step S132 in the drawing according to symbol "F".

In contrast, when having determined that there is no margin in step S150 (step S150, "No"), the automated driving control unit 10112 proceeds to the processing of step S160. The shift from step S150 to step S160 is processing performed because of time-out of recovery of the driver and including execution of the software MRM. This case corresponds to point deduction target (3) to be described below, in which the evaluation of the driver is deducted in accordance with delay and negligence of the driver in recovery.

Here, the details of the processing in steps S144 to S148 described above will be described.

When the use of the automated driving at the driving automation level 4 is available, in the section corresponding to the ODD section, the driver can engage in the NDRA deviated from the driving steering loop, and can take a nap or move to the cargo bed, for example.

In particular, here is an assumable case where a minor incident occurs in a straight section in a section including, for example, a straight road and a plurality of continuous curves after traveling on the straight road for more than ten minutes during the ODD travel section of the driving automation level 4 in a case where the deviation from the loop is large such as a case of a nap. An example of such an incident is an insect strike in which an insect hits a windshield. Occurrence of insect strike might soil the windshield, leading to a problem in confirmation of the front view.

Here, even when the insect strike has soiled the windshield, it is safe to travel in the automated driving at the driving automation level 4 in the section of the straight road. However, in the continuous curve section following the straight section, the road greatly winds. Therefore, with the soiled windshield, the vehicle would be in a state not suitable for automated driving at the driving automation level 4. This might lead to re-examination of ODD based on this situation change, and the automated driving of the driving automation level 4 might become difficult. In this case, in consideration of safety, the system first notifies the driver of handover from automated driving to manual-controlled driving at timing earlier than normal handover timing. Additionally, the system needs to observe the situation of the driver's confirmation response to the notification and take measures as described below.

That is, similarly to the concept of the driving automation level 3, the section that permits passage at the driving automation level 4 can be defined as a section where a vehicle satisfying necessary conditions is permitted to travel at the driving automation level 4, not a section where all vehicles designed to include the function of traveling at the driving automation level 4 can always travel at the driving automation level 4. In order for the driver to appropriately handle the situation based on the condition, it is necessary for the system to provide the driver with information necessary to be able to make a determination with sufficient time span, and necessary to allow the driver to proactively handle the situation.

At that time, in a case where the system has sufficient time before reaching a point requiring a new recovery, which has occurred due to a condition change, the order from the system to the driver to force the interruption of the NDRA and the request from the system to the driver to perform recovery to the manual-controlled driving would be a useless recovery request from the viewpoint of the user as a driver.

In practice, since it is troublesome for the driver to interrupt the NDRA because the driver has moved to the load carrier platform or is taking a nap, and there is no need to perform recovery in a hurry, the confirmation of an early condition change from the system would be merely an unnecessary and troublesome work without a risk for the driver. Therefore, the unnecessary repeated requests only increase the sense of waste for the driver, and promotes the filtering effect for the notification described above, leading to a state where the importance of the procedure is gradually neglected.

In order to prevent an excessive risk while preventing unnecessary early confirmation, step S146 makes a determination for preparation for a recovery procedure with a certain time margin and at a proper timing of issuing a notification or an alarm. Depending on whether the notification or the alarm has been recognized by the driver, step S148 makes a determination of a measure in a case where the driver's measure is delayed, such as whether to start the processing equivalent to the normal recovery procedure.

The processing of steps S144 to S148 described above is for implementation of such control.

Note that the reference of the grace time in step S146 may be applied as a reference value parameterized for general passenger cars, heavy and dangerous article loaded vehicles, large ridesharing vehicles, and the like, such as a safety coefficient according to the characteristics of the vehicle, a RRR target value obtained for the road section, and the like.

Information presented to the driver by the system via an information display unit 120 or the like is taken into the driver's working memory as information for risk determination, and taken out from the working memory in accordance with the degree of recognition of importance of handover to prompt the driver to make action determination.

<3-2-3-2. Evaluation of Driver's Recovery Action>

Here, the evaluation on the recovery action of the driver according to the embodiment will be described more specifically. Point deduction targets (1) to (3), that is, the targets of deducting the driver's evaluation value when the processing shifts to step S160 for starting the MRM described above will be described with reference to Table 2.

TABLE 2

Addition/deduction points at occurrence of MRM

| Occurrence of MRM | Degree | Single occurrence | Repeated occurrence in same traveling path |
|---|---|---|---|
| Point deduction target (1) | Imminent | −1 point | −2 point |
| Point deduction target (2) | Slight extra time | −4 point | −4 point |
| Point deduction target (3) | Supposed to have plenty of extra time | −5 point | −5 point |

In the example of Table 2, in the point deduction target (1), point deduction is [−1] for a single occurrence, and points are deducted [−2] for repeated occurrence in the same traveling path. In the point deduction target (2), point deduction is [−4] for a single occurrence, and points are deducted [−4] for repeated occurrence in the same traveling path. In the point deduction target (3), point deduction is [−5] for a single occurrence, and points are deducted [−5] for repeated occurrence in the same traveling path.

The point deduction target (1) is a deduction point when the processing proceeds from step S131 to step S160, indicating deduction points in an imminent situation in terms of the degree of deduction. This case is related to a response to an event that has occurred immediately before the own vehicle without prior notice on the road on which the own vehicle travels, and is not related to the driver's direct responsibility. However, in a case where the start of MRM is predicted by the situation determination at the time of using the automated driving, point deduction (third degree of deduction) is adopted so as not to repeat the use of the automated driving dependent on the system. In addition, in the point deduction target (1), for example, it is possible to use a mechanism in which, as deduction with a temporary conditional flag, the deduction can be canceled unless repeated application is performed for a certain period.

The point deduction target (2) is a deduction point when the processing proceeds from step S134 to step S160, indicating deduction points in a situation with a slight extra time in terms of the degree of deduction. This is a case where, even when the system decelerates the traveling speed of the vehicle and extends the arrival time to the point where handover is essential, the recovery measure to the manual-controlled driving is insufficient due to a cause attributed to the driver such as negligence, and the MRM is started. In this case, since the driver is responsible for starting the MRM, point deduction (deduction of a second degree) is heavier than the case of point deduction target (1).

The point deduction target (3) is a deduction point when the processing proceeds from step S150 to step S160, indicating deduction points in a situation originally having sufficient extra time in terms of the degree of deduction. This case corresponds to the use supposed to have a plenty of extra time, in which the handover should have been done with early recovery. As a system, MRM is executed by a method using software and having less impact on the surroundings. However, point deduction is heavier than the case of point deduction target (2) described above in order to encourage the driver to perform behavioral change to prevent a negligent handover action and to take a prompt action (deduction of a first degree).

Next, an example of evaluation for the driver at the time of normal handover request from the system to the driver (also referred to as Request to Intervene and Transition Demand) will be described with reference to Table 3. The evaluation illustrated in Table 3 is performed in step S124 in FIG. 7B, for example, but is not limited thereto. The evaluation according to Table 3 can be performed at another handover timing or at even at a different timing from these.

TABLE 3

Addition/deduction points for recovery quality at issuance of request to intervene

| Addition/deduction points for recovery quality at issuance of request to intervene | Single occurrence | Repeated occurrence in same traveling path | Remarks |
|---|---|---|---|
| Break/rest at early stage, select detour path and abandon handover at handover point in advance | +0.2 | +0.2 | |
| Early request for leading vehicle, remote control, remote operation assistance | +0.2 | +0.2 | |
| Detection of recognition of recovery request prior notification | +0.1 | +0.1 | |
| Handover started by recovery notice sound or driver's voluntary situation confirmation (autonomous generation of sense of recovery) | +0.2 | +0.2 | |
| Recovery start in response to recovery notification | 0 | 0 | |
| Recovery start in response to recovery alarm (regarded as neglection of situation) | −0.2 | ×2 | Prevention of neglecting situation or delaying high-priority processing |
| No detection of recognition of recovery request prior notification (regarded as leaving notification not captured in memory unhandled) | −0.5 | −0.5 | |
| Recovery start in response to forced request for recovery (regarded as lack of sense of risk) | −1.0 | ×2 | |
| Handover barely achieved by system performing prior deceleration and generating time grace (on highway) | −2 | ×1.5 | |
| Failure in handover and system execution of MRM (on highway) | −4 | ×1.5 | Suppression of driver's intentional violation |
| Deceleration in advance (on low-speed non-highway road) to generate time grace and achievement of handover | −0.5 | −0.5 | |
| Failure in handover, and system executes MRM (on low-impact road) | −0.5 | −0.5 | |
| No confirmation of ODD application status (NDRA start without confirmation) | −2 | ×2 | |
| Use of NDRA outside ODD, determined as violation | −3 | ×2 | |

In Table 3, the first to fourth lines are examples in which points are added to the evaluation of the driver, the fifth line is an example in which points are not added or deducted to the evaluation of the driver, and the sixth and subsequent lines are examples in which points are deducted from the evaluation of the driver.

According to Table 3, as an example of the case of adding points, point addition [+0.2] are applied regardless of whether it is a single occurrence or a repeated occurrence within the traveling path in a case where the driver selects break or rest at an early stage, or selects a detour path and abandons handover at the handover point in advance, in a case where the driver requests assistance by the leading vehicle, remote control, or remote operation at an early stage, and in a case where handover is started by a recovery notice sound or driver's voluntary situation confirmation (autonomous generation of sense of recovery). In addition, in a case where there is the recognition detection of the recovery request prior notification by the driver, point addition [+0.1] is applied regardless of whether it is a single occurrence or a repeated occurrence within the traveling path.

When the driver starts the recovery operation in response to the recovery notification, the recovery operation is determined as a normal recovery operation, and neither point addition nor point deduction is performed.

On the other hand, as an example of a case where point deduction is performed, in a case where the driver starts recovery in response to the recovery alarm, the case is determined that the driver has neglected the situation. In this case, point deduction [−0.2] is applied for single occurrence and point deduction ×2 (double deduction) is applied for repeated occurrence in the same traveling path. This deduction is intended to prevent the driver from neglecting the situation or delaying the high-priority processing. In a case where the driver's recognition of the recovery request prior notification has not been detected (leaving the notification not captured in the memory unhandled), point addition [−0.5] is added as malicious handling regardless of whether it is a single occurrence or a repeated occurrence within the traveling path. In a case where the driver starts recovery in response to the forced request for recovery, point deduction [−1.0] is applied in the case of a single occurrence and point deduction x2 (double point deduction) is applied in the case of repeated occurrence within the same traveling path, determined as the lack of sense of risk.

In addition, in a case where handover is barely achieved by the system performing prior deceleration and generating a time grace on a highway, point deduction [−2.0] is applied for a single occurrence, while point deduction x1.5 is applied for repeated occurrence within the same traveling path. Similarly, in a case of driver's handover handling failure, that is, where the driver has failed in handover and the system executed MRM on a highway, point deduction [−4.0] is applied for a single occurrence, while point deduction x1.5 is applied for repeated occurrence within the same traveling path. This deduction is intended to suppress the driver's intentional violation.

Furthermore, in a case where the system has decelerated in advance on a low-speed non-highway road to generate a time grace and achieved handover, or in a case of driver's handover handling failure, that is, where the driver has failed in handover, and the system executes MRM on a low-impact road (such as a road with extremely small traffic volume), point deduction [−0.5] is applied regardless of whether it is a single occurrence or repeated occurrence within the same traveling path.

Still further, regarding the use of NDRA, in a case where the driver starts NDRA without confirming the ODD application status, point deduction [−2.0] is applied for a single occurrence, while point deduction x2 (double point deduction) for repeated occurrence within the same traveling path. In a case where the driver uses NDRA outside ODD, this is determined as a violation, and point deduction [−3.0] is applied for single occurrence, while point deduction x2 for repeated occurrence within the same traveling path.

The system (automated driving control unit 10112) accumulates the addition/deduction points illustrated in Table 3 for an identical driver and uses the accumulated values as evaluation values of the driver. The system performs accumulation of the acceleration/deceleration record of the driver, for example, for all the traveling path set and executed by the driver in the system or the traveling path executed within a predetermined period. In this manner, by imposing a commission-based penalty according to the history of the driver, this evaluation result is reflected in control for preventing malicious use, such as repeating the recovery operation in a careless manner while ignoring the prompt NDRA interruption request that is not dealt with even though the handover request has been issued from the system.

When the evaluation value of the driver is low (for example, the evaluation value is a negative value), the system can impose a penalty to the use of the automated driving by the driver.

As an example of the penalty for the driver, there is use restriction of automated driving. Examples of the use restriction of the automated driving include processing of delaying the estimated time of arrival at the destination, forced stopover to the service area, a traveling lock for a certain period of time, restriction on the upper limit speed of traveling, use restriction of the automated driving mode (for the same day, same week or month), use section restriction of the automated driving mode, and the like. These use restrictions have an effect of giving an intuitive sense of suffering a loss (risk) to the driver and encouraging early recovery to manual-controlled driving or appropriate measures.

As another example of the penalty for the driver, there is use restriction of a secondary task (NDRA) conducted by the driver during use of the automated driving. With this use restriction, it is possible to give an intuitive sense of suffering a loss (risk) to the driver, and to obtain an effect of encouraging early recovery to manual-controlled driving and appropriate measures.

One assumable example of the use restriction of the secondary task is use restriction on a terminal device used by the driver for the secondary task. One assumable case of the use restriction on the terminal device is filling over a screen displayed on the terminal device and erosive operation using an arbitrary image onto the screen. With these operations, for example, the driver can be made to recognize the risk by the stepwise advance notice appealing to the intuition of the driver. Furthermore, it is conceivable to interchange the screen being used by the terminal device and a handover information window (interchange between the slave screen and the master screen). This makes it possible to encourage the driver to pay attention to handover of driving, for example.

Furthermore, there are other conceivable methods, such as forcibly freezing the screen of the terminal device, or retroactively invalidating the operation performed by the driver using the terminal device. Due to the forced interruption of the operation, it is possible to give the driver a sense of waste for the loss of the previous work by forcing the NDRA, leading to further encouragement for the driver to pay attention to the handover of driving.

The control of terminal device can be implemented by, for example, functions of application software installed in the terminal device for utilization of the system according to the embodiment (e.g., bird's eye view presentation of traveling path, prior notification of end of ODD section to driver).

Note that the values of addition/deduction described using Tables 2 and 3 are examples, and are not limited to the above examples. Furthermore, each example of addition/deduction of points is also an example, and is not limited to the above-described example.

<3-2-3-3. Bird's-Eye View Display of Traveling Path Applicable to Embodiment>

Next, a bird's-eye view display of the traveling path applicable to the embodiment will be described more specifically.

Figure 8:
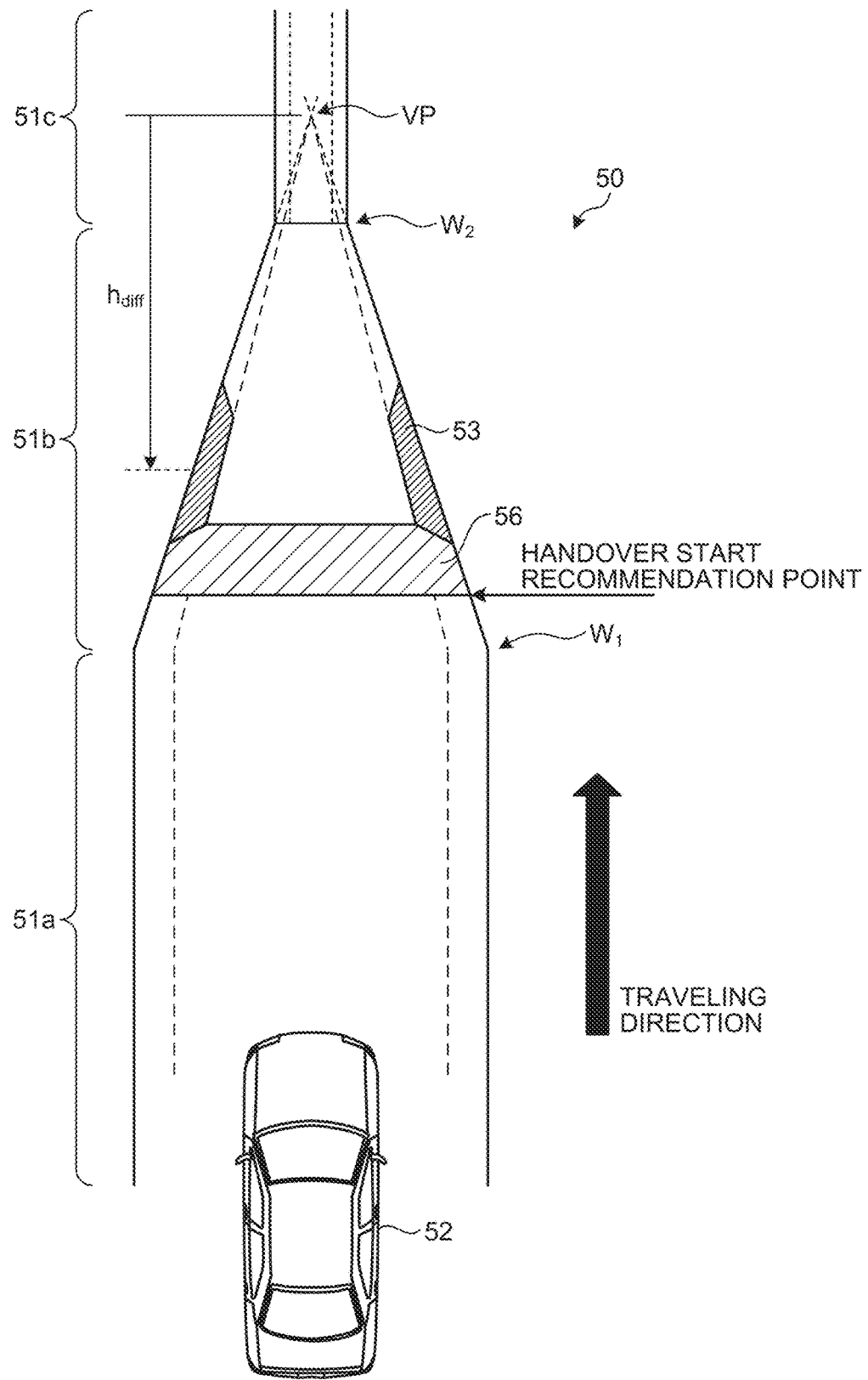
FIG. 8 is a schematic diagram schematically illustrating an example of a bird's-eye view display of a traveling path applicable to the embodiment.

FIG. 8 is a schematic diagram schematically illustrating an example of a bird's-eye view display of the traveling path applicable to the embodiment. In FIG. 8, a bird's-eye view display 50 includes a short distance display portion Sla, an intermediate distance display portion 51b, and a long distance display portion 51c. FIG. 8 illustrates a traveling direction of the own vehicle from the lower end side toward the upper end side of the figure. In FIG. 8, the lower end portion is the current position of the own vehicle, but the position of the vehicle is not limited to this example. Furthermore, the icon 52 indicating the own vehicle is for facilitating the image of the traveling path, and display thereof can be omitted.

In FIG. 8, the short distance display portion 51a displays a section from the current position of the own vehicle to a predetermined first distance. The first distance is, for example, a distance of about 15 minutes in travel time from the own vehicle. In the example of FIG. 8, in the short distance display portion 51a, the position in the vertical direction on the screen and the actual distance can be in a linear relationship.

The intermediate distance display portion 51b has a shape that narrows the width according to the vertical position on the screen so as to converge at an infinite point VP from the upper end that is the width $W_1$ of the short distance display portion 51a. In the intermediate distance display portion 51b, the position in the vertical direction on the screen and the actual distance have a non-linear relationship, and for example, the change in the actual distance with respect to the position on the screen can be increased as it goes upward on the screen.

Here, in FIG. 8, when the position in the longitudinal direction is set as an arrival time along the time in the traveling direction, the reciprocal of a distance $h_{diff}$ from the infinite point VP of the display can be displayed in proportion to the traveling time. In this manner, by displaying the intermediate distance display portion 51b with perspective, the display of the arrival time can be efficiently presented on a narrow screen. By accurately displaying the degree of impact of each handover point or the like through the display form of the bird's-eye view display 50, the driver can intuitively grasp the time at each arrival point.

On the other hand, the long distance display portion 51c extends from the position of a width $W_2$ in front of the infinite point VP while maintaining the width $W_2$. The long distance display portion 51c can have a linear relationship between the position in the vertical direction on the screen and the actual distance, similarly to the short distance display portion 51a described above.

In addition, all the sections illustrated in FIG. 8 are supposed to be the sections in which the automated driving at the driving automation level 4 is possible. Here, it is assumed that there is a section in which it is preferable for the driver to perform recovery to manual-controlled driving for reasons such as the presence of a narrower road width or a railroad crossing. Such a section is considered to have a high request recovery ratio (RRR) for the driver. Therefore, driver's failure to appropriately perform recovery to the manual-controlled driving would cause social adverse effect such as an impact on the following vehicle in this section.

Therefore, information indicating a section having high RRR is displayed in the bird's-eye view display 50. For example, a caution display 53 that narrows the road width is displayed for such a section. The caution display 53 can call attention to the driver. In addition, it is possible to provide a handover start recommendation point in front of the driver by a predetermined distance of the section and to highlight the section 56 recommended for handover.

In the embodiment, a section display indicating a recommended driving mode for each section is added to the bird's-eye view display 50 illustrated in FIG. 8 so as to facilitate driver's recovery from the automated driving to the manual-controlled driving. The bird's-eye view display 50 to which the section display is added will be described with reference to FIGS. 9A to 9C.

Figure 9A:
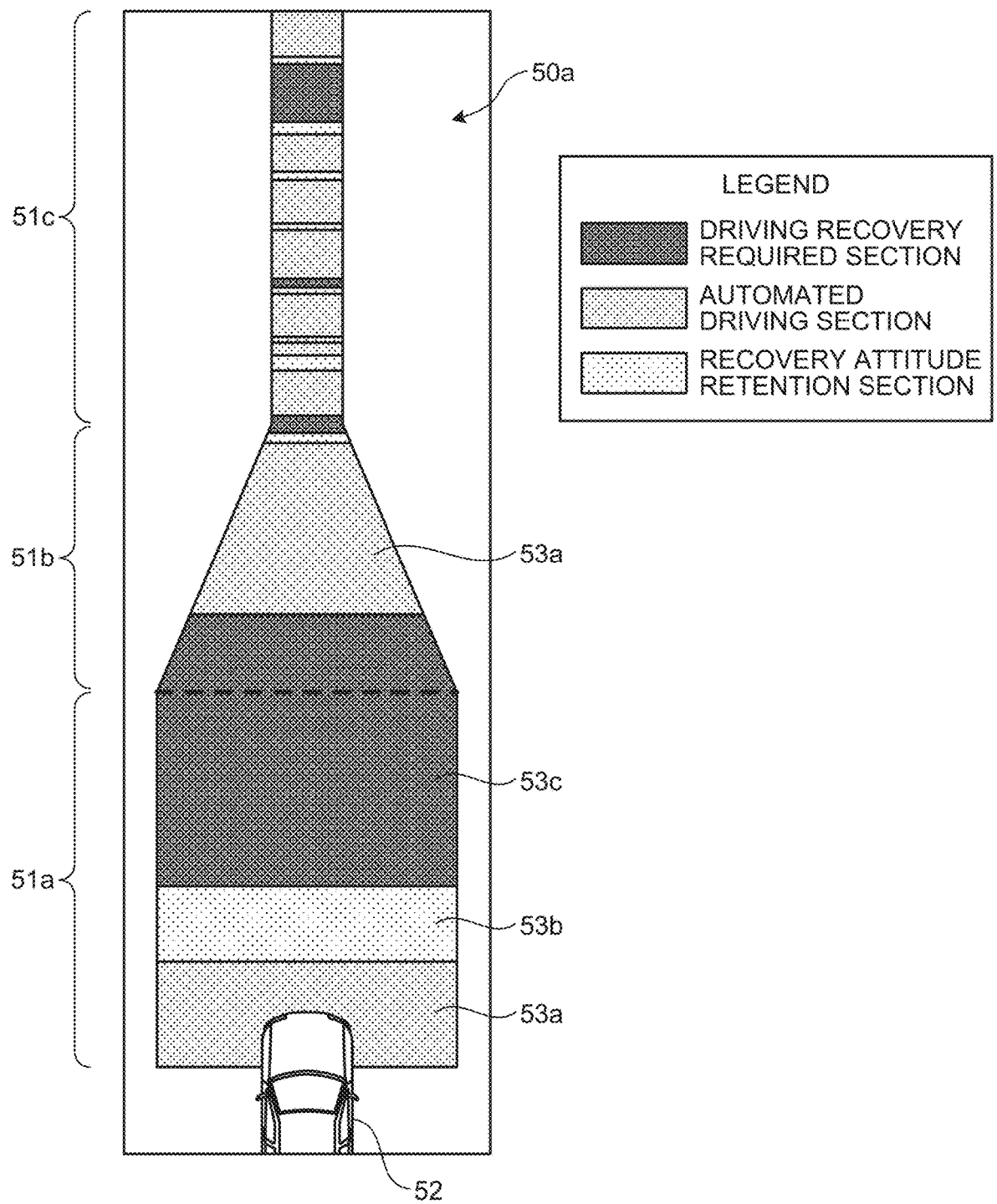
FIG. 9A is a schematic diagram illustrating an example of a bird's-eye view display in which each section is color-coded according to the embodiment.

FIG. 9A is a schematic diagram illustrating an example of a bird's-eye view display 50a in which each section is color-coded according to the embodiment. In the bird's-eye view display 50a of FIG. 9A, color-coded display is adopted to distinguish an automated driving enabled section 53a, a recovery attitude retention section 53b, and a driving recovery required section 53c.

The automated driving enabled section 53a indicates a section in which automated driving at the driving automation level 4 is enabled, and is displayed in green as a color associated with safety and security, for example. The recovery attitude retention section 53b is a section immediately before recovery from the automated driving to the manual-controlled driving, and indicates a section in which the driver is desired to maintain the attitude of recovery to the manual-controlled driving. The recovery attitude retention section 53b is displayed in yellow as a color invoking driver's attention, for example. The driving recovery required section 53c indicates a section in which manual-controlled driving by the driver is required, and is displayed in red indicating caution, for example.

Note that the color coding using green, yellow, and red described above is an example, and is not limited to this color combination. In addition, as long as each section can be clearly distinguished, a single color may be used without color coding.

In this manner, by changing the display method according to the section and the distance from the own vehicle, the driver can easily grasp the timing to perform recovery from the automated driving to the manual-controlled driving.

Figure 9B:
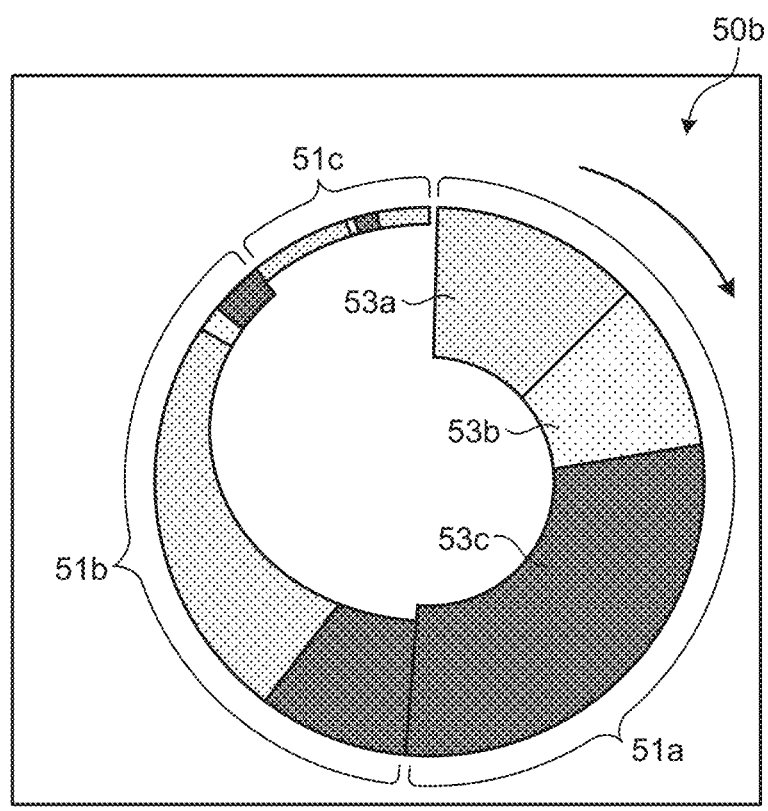
FIG. 9B is a schematic diagram illustrating an example of a bird's-eye view display configured in an annular shape according to the embodiment.

FIG. 9B is a schematic diagram illustrating an example of a bird's-eye view display 50b configured in an annular shape according to the embodiment. In the example of FIG. 9B, the top portion in the annular display is set as the position of the own vehicle, and the distance from the own vehicle increases clockwise (right-handed rotation) from the position as a starting point. In addition, the sense of distance is emphasized by narrowing the display width as the distance from the own vehicle increases.

The bird's-eye view display 50b formed in an annular shape as described above is suitable for display in a narrow area such as a display screen of a wearable device such as a wristwatch.

Figure 9C:
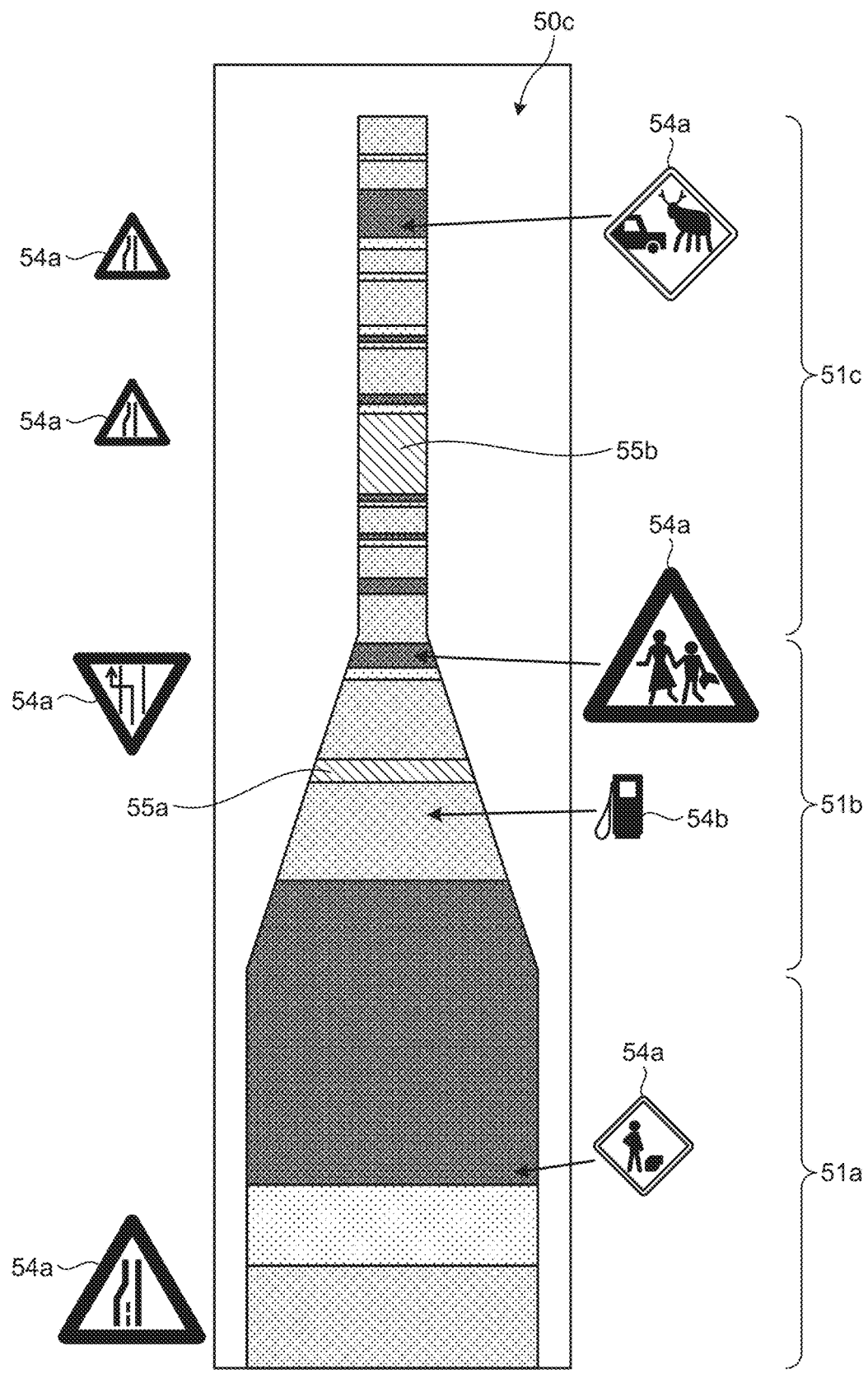
FIG. 9C is a schematic diagram illustrating an example of a bird's-eye view display including road information according to the embodiment.

FIG. 9C is a schematic diagram illustrating an example of a bird's-eye view display 50c including road information according to the embodiment. The bird's-eye view display 50c illustrated in FIG. 9C is an example in which road information such as an icon 54a corresponding to a traffic sign or an icon 54b indicating a facility is added to the bird's-eye view display 50a illustrated in FIG. 9A. The icon 54a indicates a place and item to be noted by the driver in the automated driving vehicle, and in this example, is displayed to mimic a traffic sign actually installed on the road. The icon 54b indicates a facility required for traveling of the vehicle, which is displayed corresponding to a point such as a gas station, a parking area, or a service area, for example.

Furthermore, FIG. 9C also displays sections where the time for passage greatly fluctuates, such as a congestion section, illustrated as section displays 55a and 55b.

In this manner, by using the bird's-eye view display 50c to which the road information is added, the risk information at each approach time is captured in the driver's visual field as the progresses of above-described memory of consciousness, and at a point where importance is high, that is, a point where the risk is high, the sense of risk stimulates the work memory of the driver at the time of action determination. Therefore, the driver can predict the timing of recovery from the automated driving to the manual-controlled driving at an earlier stage, and can more smoothly perform recovery to the manual-controlled driving as compared with the case of uniformly presenting only the monotonous course display.

The bird's-eye view display 50c and the bird's-eye view display 50a illustrated in FIG. 9A can be displayed, for example, on a screen of a terminal device used when the driver uses the automated driving system according to the embodiment. For example, an application program related to the information processing program according to the embodiment, which is installed in the terminal device, operates on the CPU 10010, thereby controlling the display of the bird's-eye view display 50*a* or the bird's-eye view display 50*c*. At this time, it is conceivable that the bird's-eye view display 50*a* or the bird's-eye view display 50*c* is displayed, for example, at the right end or the left end of the screen in a compressed state in the width direction. Alternatively, the bird's-eye view display 50*a* or the bird's-eye view display 50*c* may be displayed over two sides sharing a vertex of the screen, or may be displayed over three sides of the screen or around the screen.

<3-2-4. HCD Control Configuration Example According to Embodiment>

Figure 10:
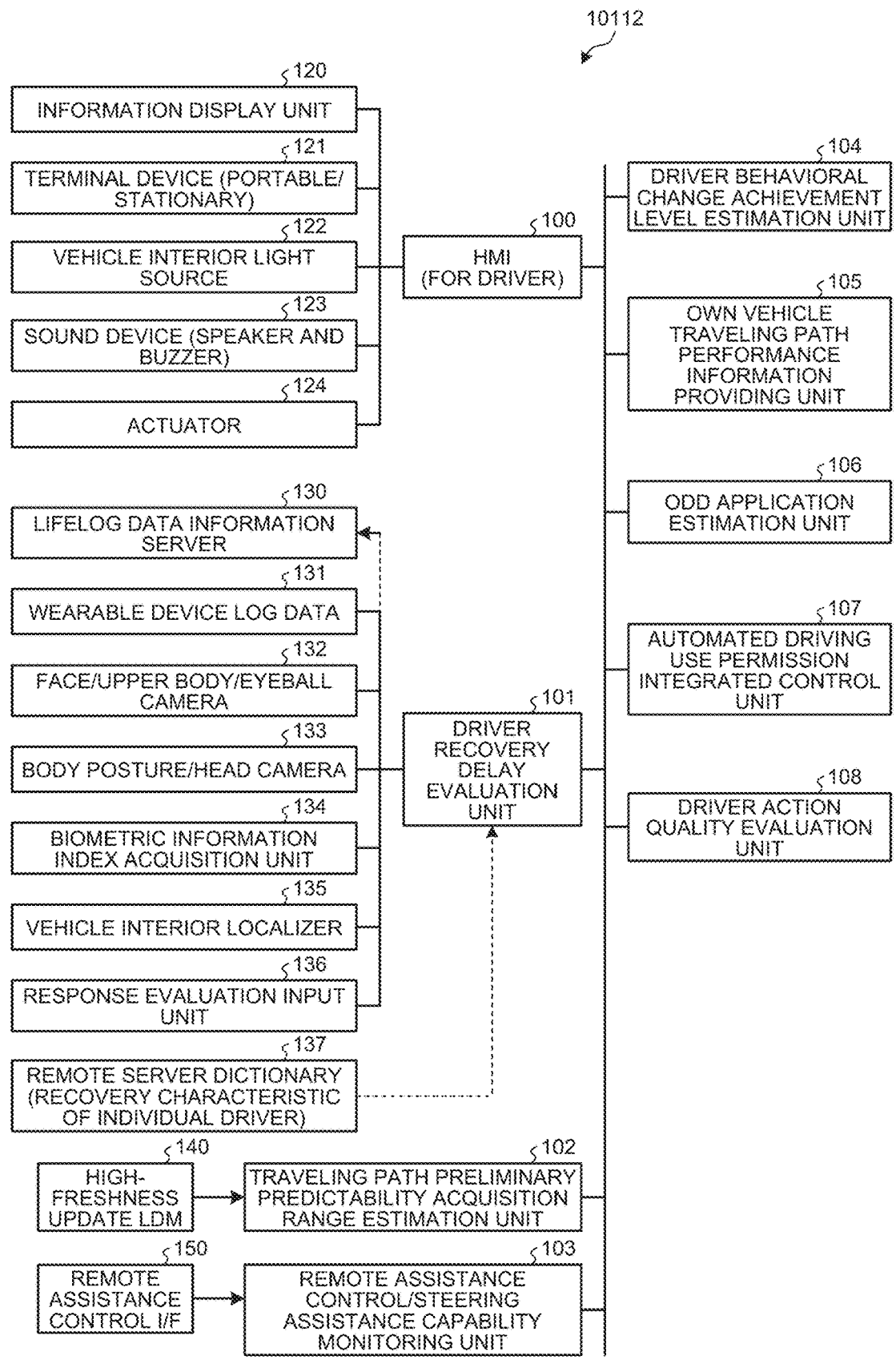
FIG. 10 is a functional block diagram of an example for illustrating a function of control by an HCD in the automated driving control unit according to the embodiment.

Next, an HCD control configuration example according to the embodiment will be described more specifically. FIG. 10 is a functional block diagram of an example for illustrating a function of control by an HCD in the automated driving control unit 10112 according to the embodiment. Note that FIG. 10 is illustrated focusing on functions for implementation of control by the HCD among the functions of the automated driving control unit 10112, and other functions are omitted as appropriate.

In FIG. 10, the automated driving control unit 10112 includes an HMI 100, a driver recovery delay evaluation unit 101, a traveling path preliminary predictability acquisition range estimation unit 102, a remote assistance control/ steering assistance capability monitoring unit 103, a driver behavioral change achievement level estimation unit 104, an own vehicle traveling path performance information providing unit 105, an ODD application estimation unit 106, an automated driving use permission integrated control unit 107, and a driver action quality evaluation unit 108. When the information processing program according to the embodiment operates on the CPU 10010, each of these units is configured and implemented as a module, for example, on the RAM 10012 which is a main storage device.

The HMI 100 is implemented as an interface for a driver, and is connected to, for example, an information display unit 120, a terminal device 121, a vehicle interior light source 122, a sound device 123, and an actuator 124.

The information display unit 120 performs predetermined display in accordance with a command from the HMI 100. The terminal device 121 may be a terminal device carried in the vehicle by the driver, or may be a terminal device pre-installed in the vehicle. The HMI 100 can bidirectionally communicate with the terminal device 121. The terminal device 121 can receive a user's operation and supplies a control signal corresponding to the received user's operation to the HMI 100. In addition, the terminal device 121 displays a predetermined screen on a display device included in the terminal device 121 in accordance with a command from the HMI 100. The vehicle interior light source 122 is a light source installed inside the vehicle, and control such as power on/off control and light amount control is performed by the HMI 100.

The sound device 123 includes a speaker, a buzzer, and a drive circuit that drives the speaker and the buzzer. The sound device 123 emits a sound according to the control of the HMI 100. Furthermore, the sound device 123 can include a microphone. The sound device 123 converts an analog sound signal based on the sound collected by the microphone into a digital sound signal and supplies the digital sound signal to the HMI 100.

The actuator 124 drives a predetermined portion inside the vehicle under the control of the HMI 100. For example, the actuator 124 applies vibration such as haptic vibration to the steering. Furthermore, another actuator 124 can control reclining of the seat on which the driver sits in accordance with a command from the HMI 100.

The HMI 100 controls operations and the like of the information display unit 120, the terminal device 121, the vehicle interior light source 122, the sound device 123, and the actuator 124 based on information from a traveling path preliminary predictability acquisition range estimation unit 102, a remote assistance control/steering assistance capability monitoring unit 103, and an ODD application estimation unit 106 to be described below. With this configuration, the following visual and audible notification can be made to the driver.

Preliminary Notification by Guidance Sound

At this time, as the guidance sound, it is preferable to use a sound that can be easily noticed by a person but does not give excessive stimulation, such as an in-flight chime sound in a passenger airplane (for example, a gentle chime sound at the time of urging seat belt fastening). The notification by the guidance sound can be applied to the prior notification of a recovery operation from automated driving to manual-controlled driving, for example. For example, it is conceivable to use the notification by the guidance sound when the system presents agreement on the "deal" to the driver.

Notification for Requesting Recovery to Manual-Controlled Driving

At the time of the request, the HMI 100 can perform an auditory notification by a sound emitted by the sound device 123 or a visual notification by display of the information display unit 120. In addition, at the time of the request, the HMI 100 may drive the actuator 124 to give haptic vibration to the steering wheel to make a tactile notification. Furthermore, the HMI 100 can instruct the driver to perform a pointing vocalization call to the front of the road.

Warning and Alarm

The HMI 100 can give an audible, visual, or tactile warning or alarm to the driver. For example, the HMI 100 can control the sound device 123 to emit a warning sound to give an audible warning. In this case, it is conceivable that the warning sound is a sound having a larger stimulus compared with the above-described guidance sound. The HMI 100 can also control the information display unit 120 and the vehicle interior light source 122 to visually give a warning by blinking red light, warning light emission inside the vehicle, and the like. Furthermore, the HMI 100 can control the actuator 124 to strongly vibrate the seat on which the driver sits to provide a tactile warning.

Penalty

The HMI 100 can perform control to impose a penalty operation on the driver. For example, the HMI 100 can perform control that is considered to cause discomfort to the driver, such as visual restriction, operational restriction, applying slight pain or cold air to the driver, and forward movement of the driver's seat. In addition, the HMI 100 can perform pseudo control such as occurrence of lateral swing of the vehicle, acceleration/deceleration giving discomfort, and pseudo lane deviation, and can give a penalty to the driver so as to directly encourage early recovery or have an effect later on, rather than on the spot. Furthermore, the HMI 100 can give a penalty according to the intellectual information of the driver, such as presentation of financial penalty information, presentation of forcible entry to a service area or the like as a penalty and a restraint time at that time, notification of automated driving use prohibition as penalty, and warning presentation regarding the next or repeated use restriction.

The driver recovery delay evaluation unit 101 evaluates a delay in recovery by the driver from the automated driving to the manual-controlled driving, and is connected to, for example, a lifelog data information server 130, wearable device log data 131, a face/upper body/eyeball camera 132, a biometric information index acquisition unit 134, a vehicle interior localizer 135, and a response evaluation input unit 136. In addition, the driver recovery delay evaluation unit 101 acquires, from a remote server dictionary 137, information indicating a recovery characteristic of an individual driver to manual-controlled driving.

The wearable device log data 131 is log data acquired from a wearable device in a case where the driver wears the wearable device. The wearable device log data 131 includes, for example, the driver's action history and biometric information.

The face/upper body/eyeball camera 132 is a camera provided in the vehicle interior so as to image the upper body including the head of the driver. The face/upper body/eyeball camera 132 is provided in the vehicle interior so as to be able to image the expression of the driver, the fine movement of the eyeball, and the behavior of the upper body. The face/upper body/eyeball camera 132 is not limited thereto, and may include a plurality of cameras for imaging the face, the eyeball, and the upper body, separately. A body posture/head camera 133 is a camera that is provided in the vehicle interior and captures the body posture including the head of the driver. By analyzing the captured images obtained by the body posture/head camera 133 in time series, it is possible to track the body posture of the driver and the position and orientation of the head.

Note that, in the embodiment, the camera is described such that the face/upper body/eyeball camera 132 and the body posture/head camera 133 are separated for convenience from the degree of freedom of installation, but this is not limited to this example, and a device in which these cameras are integrated may be used.

The biometric information index acquisition unit 134 acquires driver's biometric information based on outputs of various sensors provided in the vehicle, for example. Examples of the biometric information to be acquired include respiration, pulse, exhalation, body temperature distribution, and electrooculography. The present invention is not limited to this, and the biometric information index acquisition unit 134 can acquire part of driver's biometric information from a wearable device worn by the driver.

The vehicle interior localizer 135 is a localizer installed in the vehicle interior. The response evaluation input unit 136 receives a response from the driver to a request, a warning, or the like presented to the driver by the HMI 100.

Individual pieces of information acquired by the wearable device log data 131, the face/upper body/eyeball camera 132, the biometric information index acquisition unit 134, the vehicle interior localizer 135, and the response evaluation input unit 136 are accumulated in the lifelog data information server 130 as a lifelog of the driver.

Figure 11:
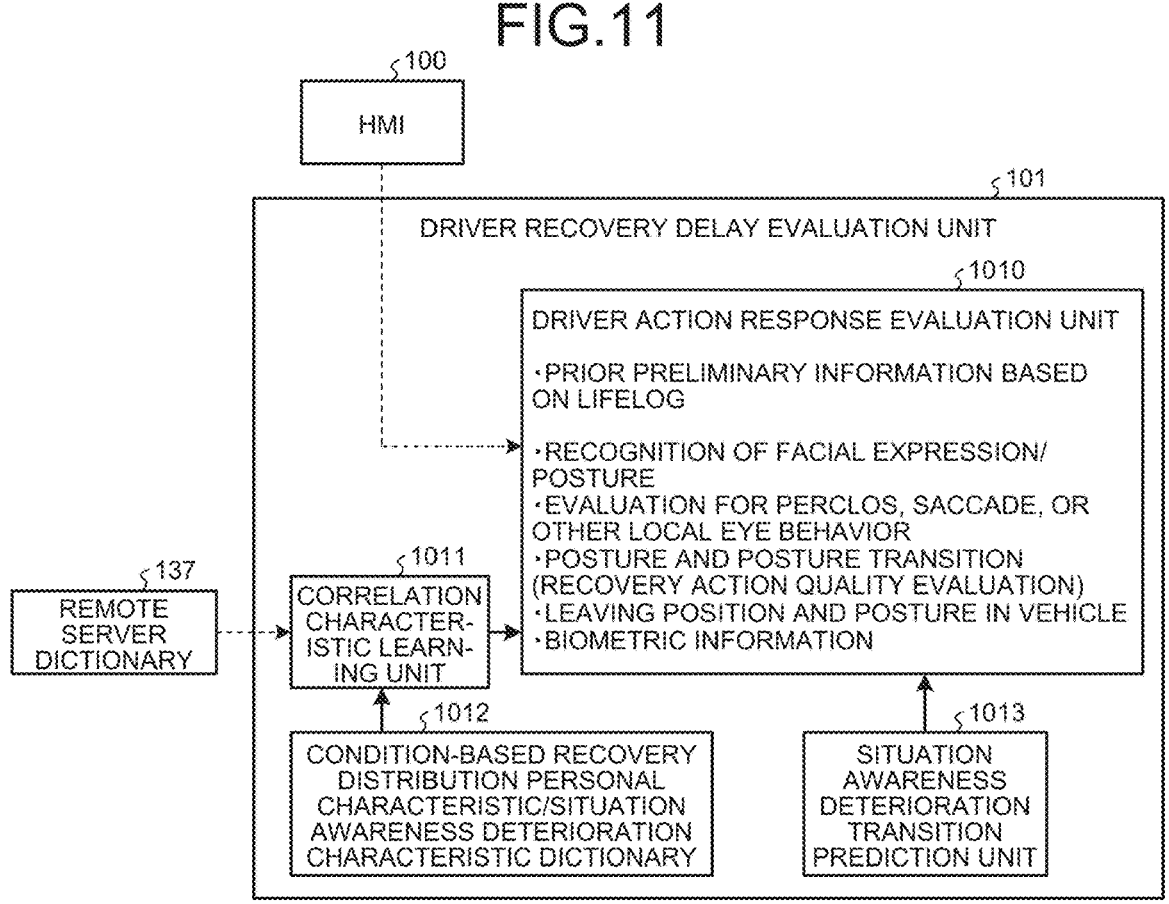
FIG. 11 is a functional block diagram of an example for illustrating functions of a driver recovery delay evaluation unit according to the embodiment.

FIG. 11 is a functional block diagram illustrating an example of the function of the driver recovery delay evaluation unit 101 according to the embodiment. In FIG. 11, the driver recovery delay evaluation unit 101 includes a driver action response evaluation unit 1010, a correlation characteristic learning unit 1011, a condition-based recovery distribution personal characteristic/situation awareness deterioration characteristic dictionary 1012, and a situation awareness deterioration transition prediction unit 1013.

The condition-based recovery distribution personal characteristic/situation awareness deterioration characteristic dictionary 1012 is a dictionary related to individual driver's an observable evaluation value and a characteristic of deterioration in situation awareness. The correlation characteristic learning unit 1011 learns a correlation characteristic between the observation evaluation value of the individual driver and the recovery delay time distribution based on the information indicating the individual driver's characteristic regarding recovery to manual-controlled driving acquired from the remote server dictionary 137 and on the evaluation value and the situation awareness deterioration characteristic acquired from the condition-based recovery distribution personal characteristic/situation awareness deterioration characteristic dictionary 1012.

In the embodiment, the remote server dictionary 137 is disposed in a remote server outside the vehicle, but the location is not limited to this example. That is, the reason for installing the remote server dictionary 137 in an external server is application using an exemplary use in which the characteristics of the driver are not necessarily associated with the unique vehicle due to the spread of business vehicles and share cars. Accordingly, the remote server dictionary 137 may be installed in the vehicle to be used.

The driver action response evaluation unit 1010 acquires individual pieces of information regarding the driver from the HMI 100. For example, the driver action response evaluation unit 1010 acquires prior preliminary information based on the lifelog from the HMI 100. In addition, the driver action response evaluation unit 1010 acquires, for example, the following information regarding the driver from the HMI 100 based on images of the face and the body acquired by various sensors (cameras).

Recognition information of facial expressions and body postures.

Information related to eyes This example involves acquisition of an evaluation of the local behavior of the eye, such as the Percent of the time eyelids are closed (PERCLOS) or saccade (rapid eye movement).

Posture and transition of posture. In this example, the quality of the recovery action is evaluated based on the posture and the transition of posture.

Unseated position and posture in the cabin.

Biometric information

The driver action response evaluation unit 1010 evaluates the action response of the driver based on each piece of information acquired from the HMI 100 and the correlation characteristic acquired from the correlation characteristic learning unit 1011. The evaluation result is passed to the situation awareness deterioration transition prediction unit 1013. Based on the evaluation result, the situation awareness deterioration transition prediction unit 1013 predicts a transition related to deterioration in situation awareness in the driver.

When the lifelog data information server 130 is available, a part of the lifelog data acquired from the lifelog data information server 130 can be input to the driver action response evaluation unit 1010. By using the lifelog data of the driver, the driver action response evaluation unit 1010 can enhance the estimation accuracy of the wakefulness level or the like based on preliminary driver state information such as insufficient sleep time, the accumulation of overwork, the apnea syndrome, and the alcohol residue of drinking, and can improve the determination accuracy of the situation awareness capability of the driver, thereby enabling safer control against sudden onset of drowsiness such as microsleep.

In this manner, the driver recovery delay evaluation unit 101 has a function as a monitoring unit that monitors the state of the driver based on the information acquired from the lifelog data information server 130, the wearable device log data 131, the face/upper body/eyeball camera 132, the biometric information index acquisition unit 134, the vehicle interior localizer 135, and the response evaluation input unit 136.

Returning to the description of FIG. 10, the traveling path preliminary predictability acquisition range estimation unit 102 acquires a high-freshness update LDM 140, and estimates the acquisition range of the preliminary predictability for the traveling path based on the acquired high-freshness update LDM 140. That is, based on the high-freshness update LDM 140, the traveling path preliminary predictability acquisition range estimation unit 102 acquires a range in which an event can be predicted in advance on the traveling path.

Figure 12:
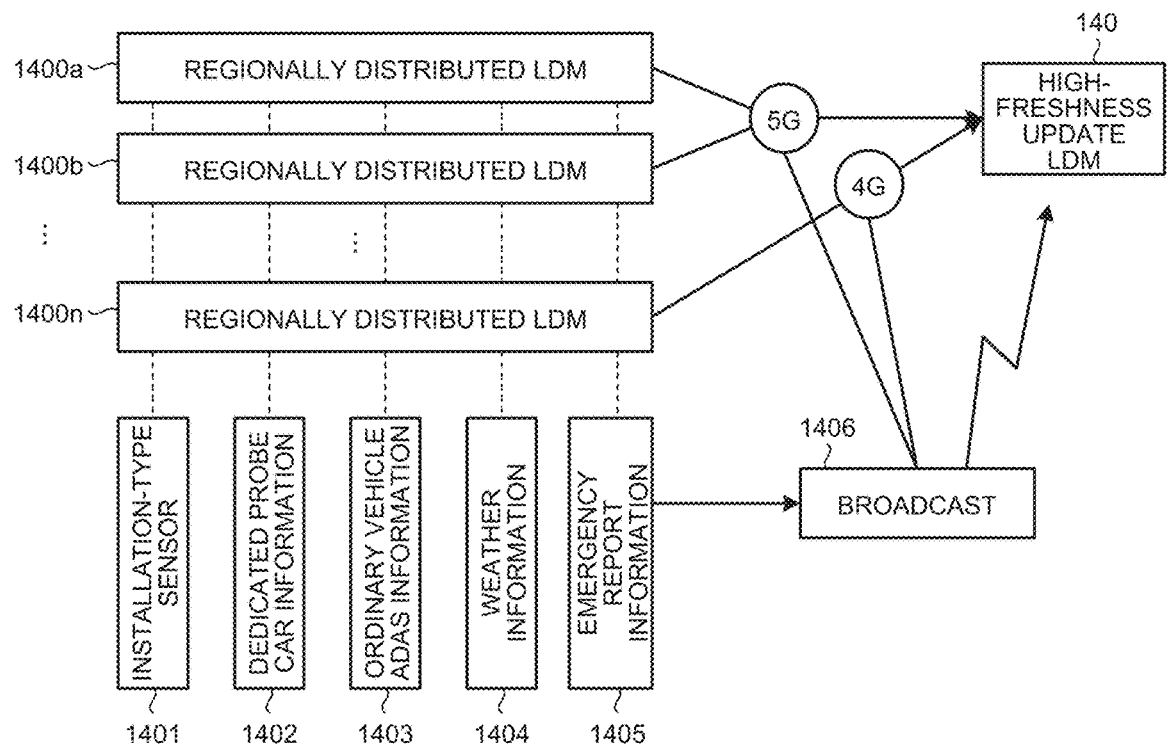
FIG. 12 is a schematic diagram for illustrating a high-precision update LDM applicable to the embodiment.

FIG. 12 is a schematic diagram illustrating the high-freshness update LDM 140 applicable to the embodiment. In each region, regionally distributed LDMs 1400a, 1400b, . . . , and 1400n are arranged. These regionally distributed LDMs 1400a, 1400b, . . . , and 1400n are updated as needed based on an installation-type sensor 1401, the dedicated probe car information 1402, the ordinary vehicle ADAS information 1403, the weather information 1404, the emergency report information 1405 (such as falling of a dangerous article), and the like corresponding to each region.

The regionally distributed LDMs 1400a to 1400n are transmitted via the fifth generation communication (5G), fourth generation communication (4G), or still another communication method. The transmitted respective regionally distributed LDMs 1400a to 1400n are received by, for example, the automated driving control unit 10112 and aggregated to constitute the high-freshness update LDM 140. Furthermore, the emergency report information 1405 is delivered by the broadcast 1406 and received by the automated driving control unit 10112 directly or included in the 5G or 4G communication described above. The automated driving control unit 10112 updates the high-freshness update LDM 140 based on received emergency report information 1405.

Returning to the description of FIG. 10, the traveling path preliminary predictability acquisition range estimation unit 102 estimates a range in which the event can be predicted in advance by the acquired high-freshness update LDM 140 on the traveling path based on the following information and situation.

Here, a large amount of investment in environmental infrastructure and dedicated probe cars is possible in central parts of urban transportation. On the other hand, in an area or a use time zone where an investment effect is small, there is also a situation having a dependence on sporadic data collected mainly in the shadow mode from the ADAS information 1403 of the general vehicle. Therefore, the preliminary predictability for the traveling path which can be provided by the high-freshness update LDM 140 is live information which actively changes with time according to the deployment of the regionally distributed LDM described below, an allowable communication band of the communication network, and the like.

Prior information before starting the traveling path with respect to a section provided with the high-freshness update LDM 140.

Risk information indicating a decrease in update frequency of the high-freshness update LDM 140. An update frequency of the high-freshness update LDM 140 varies with a lapse of time, attributed to a passage/existence density of a probing vehicle (for example, a dedicated probe car).

Information loss due to shortage of a regional radio communication band or the like.

An insufficient passage of a probing vehicle that compensates for information against a decrease in predictability due to bad weather.

Predictability decreases due to a temporary information shortage occurring in acquired information from a leading vehicle/vehicle group that substitutes and complements a traveling path section with a shortage of information with no updated LDM supplied due to infrastructure development or the like.

The remote assistance control/steering assistance capability monitoring unit 103 monitors availability of remote assistance control and capability of handling steering assistance based on information acquired from a remote assistance control I/F 150. The monitoring by the remote assistance control/steering assistance capability monitoring unit 103 is assumed to be used as an option such as local traffic, platoon travel support, or limited connection support.

Figure 13:
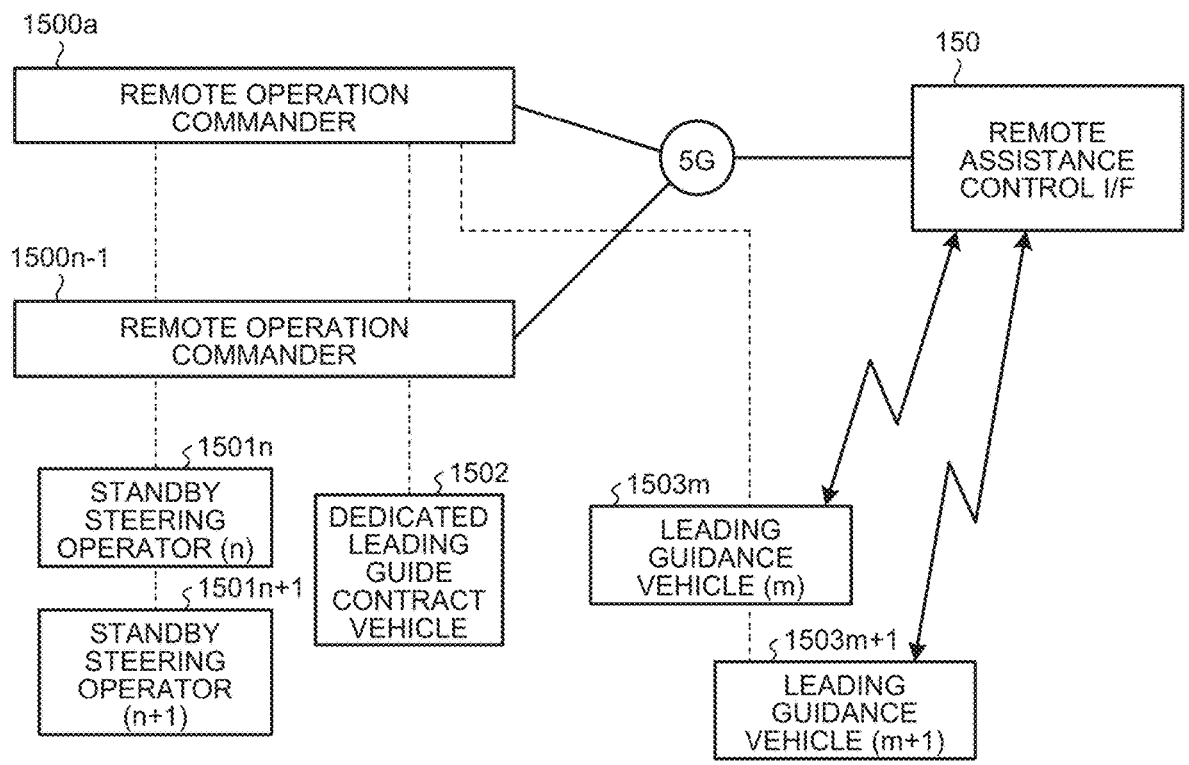
FIG. 13 is a schematic diagram for illustrating acquisition of information by the remote assistance control I/F applicable to the embodiment.

FIG. 13 is a schematic diagram for describing acquisition of information by the remote assistance control I/F 150 applicable to the embodiment. Remote operation commander 1500 a, . . . , 1500 n–1 individually collect information from a standby steering operator 1501 and a standby steering operator 1501n+1 and a dedicated leading guide contract vehicle 1502. In this example, the remote operation commander 1500a also collects information from leading guide vehicles 1503m and 1503m+1. Each of the remote operation commanders 1500a, . . . , 1500n–1 transmits the collected information to the remote assistance control I/F 150 using 5G communication, for example. The communication scheme here is not limited to 5G, and may be 4G. In the example of the drawing, the leading guide vehicles 1503m and 1503m+1 directly transmit the collected information to the remote assistance control I/F 150.

Returning to FIG. 10, the remote assistance control/steering assistance capability monitoring unit 103 performs the following processing based on the information acquired from the remote assistance control I/F 150.

Control support using a remote control support service such as a case where it is difficult for a driver to perform recovery from automated driving to manual-controlled driving. This includes control on behalf of the driver by the system, such as early evacuation action and operator assignment control.

Maneuvering control by a remote operator of vehicle steering control. This is a control command in a case where an external remote control deal is concluded and operator assignment is possible.

Monitoring of execution of remote assistance and monitoring of fallback (fail-safe traveling) at occurrence of trouble.

Figure 14:
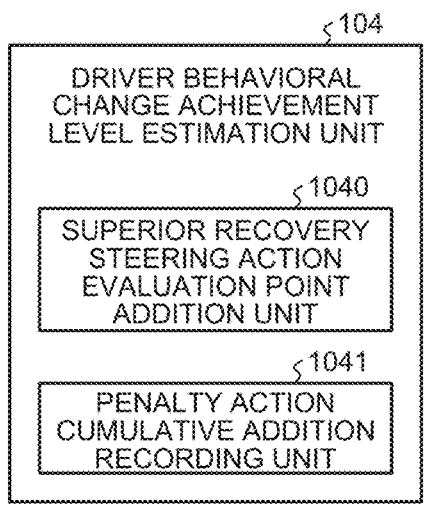
FIG. 14 is a functional block diagram of an example for illustrating functions of a driver behavioral change achievement level estimation unit according to the embodiment.

The driver behavioral change achievement level estimation unit 104 estimates an achievement level of a change regarding the behavioral change of the driver with respect to the system limit. FIG. 14 is a functional block diagram of an example illustrating functions of the driver behavioral change achievement level estimation unit 104 according to the embodiment. The driver behavioral change achievement level estimation unit 104 includes a superior recovery steering action evaluation point addition unit 1040 and a penalty action cumulative addition recording unit 1041.

The superior recovery steering action evaluation point addition unit 1040 adds an evaluation value to a superior driving operation at the time of recovery to manual-controlled driving. The penalty action cumulative addition recording unit 1041 deducts points from the evaluation value in accordance with the violating action toward the system's recovery request to the manual-controlled driving or the failure to respond to the recovery request. Furthermore, the penalty action cumulative addition recording unit 1041 cumulatively adds the evaluation value to the action for which the penalty occurs. The driver behavioral change achievement level estimation unit 104 can acquire the evaluation value from the driver recovery delay evaluation unit 101, for example.

Returning to the description of FIG. 10, the own vehicle traveling path performance information providing unit 105 provides an LDM region cloud (for example, the regionally distributed LDMs 1400*a* to 1400*n*) with performance information regarding the own vehicle traveling (passing) path. Specifically, the own vehicle traveling path performance information providing unit 105 provides the following information and the like.

- Variation/difference with respect to map information acquired in advance, report of abnormality information, risk information to the following vehicle even after entering the section.
- At detection of abnormality/hazardous risk (falling objects, accidents, disasters, and the like) during traveling, emergency information is transmitted from the own vehicle by automated or manual notification.
- Notification of characteristic event (event notification by driver/vehicle user), suspicious risk information.
- Providing information by manual report from a driver, not by automated report. In this case, the temporarily recorded road environment information from a time point several minutes before the report is notified.
- Upload probing request from server. For example, upon receiving a falling object risk emergency report with unknown details from the preceding vehicle, the detail check is performed. For this purpose, a detailed scan request is issued to an LDM cloud server that manages the section, and information obtained by the detailed scan using an environment recognition enhancement scan equivalent to the environment scan during normal traveling or with a higher refresh rate is uploaded.

As an option, in a case where it is difficult to provide the LDM, the own vehicle traveling path performance information providing unit 105 can further provide information to a following vehicle, a standby vehicle, and the like based on the information possessed by the own vehicle.

For example, in a case where the amount of traffic passing through the section is small and it is difficult to provide the constantly updated LDM in the acquired upload information, or in a case where the preparation of the LDM-complete cloud of the infrastructure is insufficient, it is difficult to expect the automated traveling at driving automation level 4 based on the high-freshness update LDM 140 by the infrastructure.

In such a case, the driving is switched from the automated driving to the manual-controlled driving, and pairing is performed for a vehicle to be assisted (for example, a following vehicle or a standby vehicle) that requires assistance. Then, the environment acquisition data when the own vehicle is traveling at the driving automation level of the driving automation level 2 or lower is provided to the vehicle to be assisted as data necessary for traveling at the driving automation level 4. Furthermore, the LDM is provided by pairing with the assisted vehicle specific vehicle, and information when the following vehicle follows the own vehicle in the driving automation level 4 is provided.

For example, the own vehicle traveling path performance information providing unit 105 can provide this information in cooperation with the remote assistance control/steering assistance capability monitoring unit 103 described above. For example, when the pairing partner is a leading support vehicle, information can be provided as road guidance information to a following vehicle of the pairing partner. The operation in which the leading vehicle, the remote assistance, and the like are combined with the high-freshness update LDM 140 is further found to be useful particularly at the time of using in-line transportation including unmanned traveling vehicles, and the operation may be applied to the use in which the driver does not get on the actual vehicle.

The ODD application estimation unit 106 determines whether the vehicle is in a section (ODD section) in which the vehicle can travel at each driving automation level. The ODD application estimation unit 106 makes this determination based on the following information.

- Evaluation information regarding driver history such as superior credibility evaluation, violation of recovery, deduction, and penalty of the driver.
- Evaluation information regarding driver's comprehension and proficiency related to the need to perform recovery based on HCD.
- Information indicating an acquisition state of the high-freshness update LDM 140.
- Information of request recovery ratio (RRR) based on LDM such as high-freshness update LDM 140 and information indicating a point selectable by an evacuation option.
- Information indicating the limit of automated driving application based on the diagnosis result obtained by vehicle-loaded devices.
- Information indicating vehicle dynamics (loaded passenger, cargo, and cargo collapse risk characteristics).

In addition, the ODD application estimation unit 106 estimates an ODD section to which non-monitoring automated driving at driving automation level 4 can be applied and an ODD section to which automated driving corresponding to driving automation level 3 can be used according to other update statuses such as the LDM such as the high-freshness update LDM 140. Furthermore, the ODD application estimation unit 106 reexamines and updates the applicable ODD section according to risk information newly acquired during the travel traveling path, attachment of device contamination, a change in state of the driver, and the like. At this time, the ODD application estimation unit 106 notifies the driver of the information update through the HMI 100, and evaluates the driver's comprehension level for the situation change based on the response by the driver to the notification.

The automated driving use permission integrated control unit 107 integrally controls the use permission of the automated driving. For example, the automated driving use permission integrated control unit 107 integrally controls the automated driving permission status for each travel section. Furthermore, the automated driving use permission integrated control unit 107 controls the execution of MRM. Furthermore, the automated driving use permission integrated control unit 107 performs control for giving a punishment or a penalty to the driver, such as forced interruption of use, for the act of violation during the use of automated driving. Examples of the violation include delay of the response of the driver to the request for recovery to the manual-controlled driving from the system, and repeated and continuous use of the automated driving at the driving automation level 3.

The driver action quality evaluation unit 108 evaluates the quality of the action (action quality) of the driver during automated driving or the like.

The driver action quality evaluation unit 108 evaluates the quality of the driver's action based on the stability of the steering of the driver, for example. The driver action quality evaluation unit 108 evaluates each driving-related item such as steering operation, accelerator and brake operation, and indicator operation by the driver. In addition, the driver action quality evaluation unit 108 evaluates a designation operation or action such as a pointing vocalization call by the driver in response to the handover request from the system to the manual-controlled driving. Furthermore, the posture recovery evaluation may be performed when the driver returns from an NDRA task, done with relaxed posture, to the steering posture for driving.

One type of information that is difficult to be directly observed by the system in implementation of the control of HCD is assessment of situation awareness that is information related to brain activation of the driver. Therefore, in the HCD according to the embodiment, attention is paid to the steering action in a state of lowered situation awareness. For example, in a steering action in a state where situation awareness is insufficient, that is, in a state where situation awareness is lowered, intelligent feedback becomes insufficient, increasing steering due to excessive reflection. That is, focusing on the fact that the state of lowered situation awareness often causes excessive steering with improper feedback, which should be done smoothly in normal occasions, the steering during automated driving is compared with steering by manual-controlled driving in normal times, and the result will be used as an evaluation index for driver's situation awareness.

3-3. Driving Automation Level 4 Applicable to Embodiment

Here, the driving automation level 4 applicable to the embodiment will be described.

<3-3-1. Basic Structure>

Figure 15:
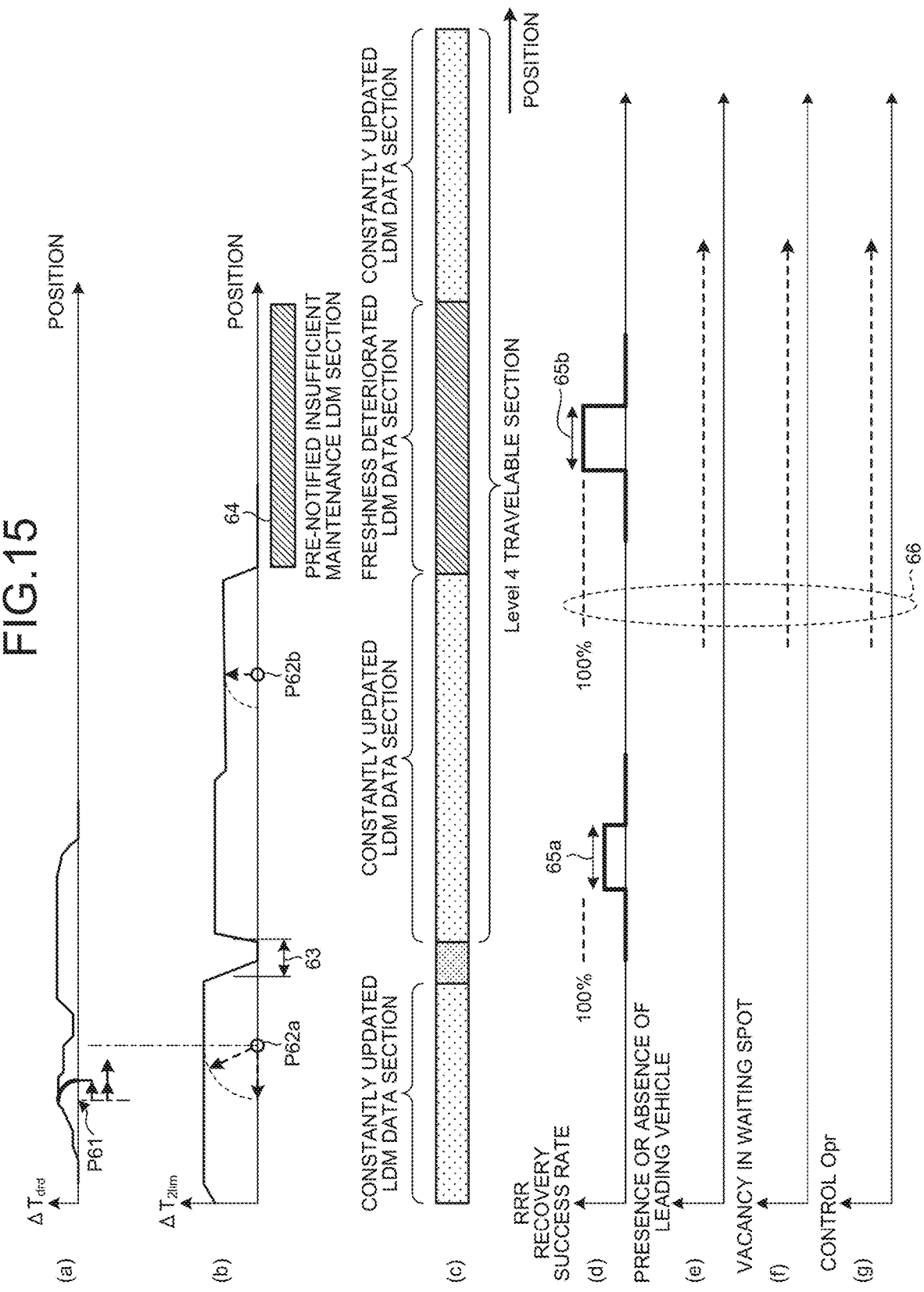
FIG. 15 is a schematic diagram for illustrating a basic structure of driving automation level 4 applicable to the embodiment.

First, a basic structure of the driving automation level 4 will be described. FIG. 15 is a schematic diagram for illustrating a basic structure of driving automation level 4 applicable to the embodiment.

In FIG. 15, in each of charts (a) to (g), the horizontal axis indicates individual positions. Chart (a) illustrates an example of a relationship between a recovery time $\Delta T_{drd}$ and a position (or elapsed time in arrival calculated from the vehicle speed). Chart (b) illustrates an example of a relationship between a grace time $\Delta T_{2lim}$ and the position. The recovery time $\Delta T_{drd}$ and the grace time $\Delta T_{2lim}$ will be described below.

Chart (c) illustrates an example of a constantly updated (high-freshness update) LDM data section. In this example, the travelable section in automated driving at the driving automation level 4 (described as Level 4 in the drawing) includes an LDM data section in which the freshness is deteriorated with no update, for example. As indicated by section 64 in chart (b), the freshness deteriorated LDM data section is a section which is an insufficient maintenance LDM section as notified in advance, and is supposed to be a section in which the manual-controlled driving is temporarily indispensable. Note that section 63 in chart (b) is a section incapable of maintaining the provision of the high-freshness update LDM 140 due to a decrease in the number of passing vehicles, the communication band shortage due to excessive use of surrounding public communication, and the like. This section is also supposed to need manual-controlled driving.

Chart (d) illustrates an example of RRR and a recovery success rate. Each of charts (e), (f), and (g) illustrates an example of the presence or absence of a leading vehicle, an example of the vacant state of a waiting spot, and an example of the vacant state of the control operator, respectively.

Although illustration is omitted, there might be cases, for example, where there is no support from the information indicated by charts (e), (f), and (g) in section 65b, and a handover event unmanageable by the driver occurs when entering section 65b. In this case, when the vehicle stops in section 65b by the MRM function, there is a high possibility of causing a serious violation status such as occurrence of a risk of rear-end collision with the following vehicle due to sudden stop of the own vehicle due to road blockage including section 65b, or at a tunnel exit with poor visibility, or the like (details will be described below).

The system communicates with an LDM on a cloud network via a local infrastructure communication network to request new information, and then constantly updated states of the LDM in the scheduled travel section is provided from the cloud network. Alternatively, the leading vehicle provides high-freshness individual LDM information acquired on a case-by-case basis by methods such as vehicle to vehicle (V2V) communication.

Based on these pieces of provided information, the system determines, a grace time $\Delta T_{2lim}$ (Time to reach limit of MRM=immediately preceding distant predictability range) indicating a grace period during which safe driving of the own vehicle is presumed to be possible and a recovery time $\Delta T_{drd}$ (Time delay to resume driving=Notification to driving) required for the driver to perform recovery from manual-controlled driving, which is detected passively or actively by the system. This determination is made in accordance with the maintenance status confirmed to be used in the latest self-diagnosis situation of the own vehicle.

As illustrated in chart (a) of FIG. 15, when the current position of the own vehicle is position P61, for example, the recovery time $\Delta T_{drd}$ indicates that the recovery to the manual-controlled driving is performed at a position advanced from position P61 by a distance corresponding to the recovery time $\Delta T_{drd}$ at position P61. On the other hand, as illustrated in chart (b), when position P62a is a point where recovery to the manual-controlled driving is essential, the grace time $\Delta T_{2lim}$ indicates a grace margin of recovery to the manual-controlled driving at a position back from the position P62a by a distance corresponding to the grace time $\Delta T_{2lim}$ at position P62a.

The recovery time $\Delta T_{drd}$ and the grace time $\Delta T_{2lim}$ vary according to the road environment during traveling and the state of the driver, for example, as illustrated in positions P62a and P62b in chart (b).

The system compares the grace time $\Delta T_{2lim}$ with the recovery time $\Delta T_{drd}$, and determines whether the grace time $\Delta T_{2lim}$ and the recovery time $\Delta T_{d}$rd satisfy the relationship of the following Formula (1).

$$\Delta T_{2lim} >> \Delta T_{drd} \qquad (1)$$

When the grace time $\Delta T_{2lim}$ and the recovery time $\Delta T_{drd}$ satisfy the relationship of Formula (1), even if the driver uses the vehicle in the automated driving at the driving automation level 4 while the vehicle is traveling, the driver has a low probability of encountering a situation that requires immediate measures. This leads to the limited risk and thus, even when the driver cannot make a recovery to manual-controlled driving in time, fallback occurs unless the MRM rapidly increases other traffic risk.

Here, based on information obtained from the LDM or the like, the system determines a risk of causing road traffic obstruction by own vehicle's execution of an emergency stop or the like using the MRM in the travel section. According to the determination result, in a case where there is such a possibility, the system performs, before entering the section, operations such as search for a detour route that allows evacuation, determination of whether pairing with a leading guidance vehicle is possible, and determination of the margin of the remote driving assistance controller, the execution operator, and the necessary communication line. According to the determination result, the system provides the risk selection information to the user of the detour or the avoidance selection by the providable limit point of the automated driving according to the presence or absence of the provision of the avoidance measure associated with the execution of the MRM. The system sets whether to use operation of prompting the user to make the determination or the whether the system prioritizes the evacuation selection in advance, as optional setting switchable item, and performs the processing according to the determination to complete.

That is, the availability of the automated driving at the driving automation level 4 for the vehicle traveling in the section is determined regarding any of the selection of the detour route, the continuation limit point at which the paired leading guidance vehicle or remote operator performs remote steering, and the limit point of control at which the system can travel without affecting the following vehicle, that is, without causing a large social influence. By presenting these pieces of information using the information display unit 120 as information for prompting the driver to make an action determination for managing the risk, the information is taken into the working memory of the driver. Therefore, the driver can achieve situation awareness at an early stage when approaching a point where measures are necessary.

When the driver has neglected to perform the recovery operation requested by the system at these limit points, and violated the deal, the driver will be subjected to intuitive penalty with higher commonality instead of having secondary induced accidents, in accordance with the violation. That is, the driver will be subjected to a penalty which directly acts as a demerit, rather than a stochastic possibility that the driver is unaware of, such as speed restriction at the time of continuous traveling, forced pit stop to a parking lot, or bad odor. This penalty makes it possible for the system to prompt the driver to change action to actions such as suppressing the illegal use of automated driving or not actively performing the violation during the use of automated driving.

Here, as described with reference to chart (b), the grace time $\Delta T_{2lim}$ is information that changes with the travel of the own vehicle, and there may be a case where a sufficiently long prediction cannot be obtained as originally scheduled. The data of the high-freshness update LDM 140 supplied from the infrastructure may change with time even when the data of all the traveling path sections has been received at the start of the traveling path. Therefore, acquiring the high-freshness update LDM 140 each occasion is likely to cause compression of a communication band or the like.

Therefore, the information preliminarily acquired by the system of the own vehicle includes confirmed information of a section not permitting the automated driving at the driving automation level 4 and predicted information of the grace time $\Delta T_{2lim}$ in each section scheduled as a service. Here, the grace time $\Delta T_{2lim}$ is actually acquired before approaching each section as more accurate information updated immediately before. Such information may be acquired by directly requesting the area management server, may be acquired by V2V communication from the leading guidance vehicle, or may be acquired from broadcast information.

The RRR and the recovery success rate of chart (d) will be described. A section in which the numerical value of Request Recovery Ratio (RRR) is 100% is a section in which execution of stop or sudden and large amount of deceleration of a vehicle in the section would lead to, with an extremely high possibility, the necessity of rapid deceleration of the following vehicle. In this section, prior completion of handover is requested in order to ensure safety.

Examples of the section needing high RRR setting include a partial section being a special limited section, such as a one-way bridge, with a traffic volume at least having no possibility of temporary stop or complete blockage of passage in both directions, a special road having no vehicle refuge such as a metropolitan expressway, a section requiring general vehicles to take time to grasp the situation, such as an exit of a tunnel, a roundabout, and an intersection. Conversely, in a section where the traffic volume is extremely small and the vehicle stop on the road is extremely unlikely to cause obstruction of vision or obstruction of traveling of the following vehicle, the RRR can be set to 0%.

In the example of the drawing, the RRR is set to a value lower than 100% in section 65a, whereas the RRR is set to 100% in section 65b. This indicates that section 65b is a section in which there is an extremely high possibility that the stop or sudden deceleration of the vehicle greatly affects the travel of the following vehicle. On the other hand, section 65a in which the RRR is set to a value lower than 100% indicates that the influence of the stop or sudden stop of the vehicle on the following vehicle is smaller compared to section 65b.

The presence or absence of a leading vehicle in chart (e) indicates the presence or absence of mutual volunteer support using a dedicated standby vehicle or a general vehicle that guides and supports automated driving travel in a section where passage is difficult only by the own vehicle equipment and the LDM. The vacancy of the waiting spot in chart (f) indicates, for example, the presence or absence of a waiting spot where the leading vehicle or the own vehicle waits until the leading vehicle arrives when the leading vehicle is determined to be present in chart (e) when having assistance from the leading vehicle in the hard to pass section. The vacancy of the control operator in chart (g) indicates availability (capability) of the controller and availability of supply of the substantial maneuver operator. This affects the recovery request rate to the driver in the scheduled section in a case where the traveling path is scheduled to use the mechanism of receiving a remote assistance.

These complex controls can be determined to have no merit regarding the use by a general healthy person. On the other hand, the control is useful for providing a service network to wide social areas in a situation having difficulty to find a driver necessary for transportation due to the shortage of manpower when the function is used as a public service such as the use for groups (elderly people, children, etc.) having limited manual-controlled driving capability, which is an advantage of automated driving.

When it is to reliably perform pairing capable of following the leading vehicle or pairing regarding remote driving assistance steering at a cruising speed, the vehicle can travel at driving automation level 4. On the other hand, in a case where the driver handles the case by themselves, operation such as completion of handover to manual-controlled driving or performing prior vehicle stop using MRM will be required before approaching the coming section where the RRR is 100% (indicated as section 66 in the drawing).

<3-3-2. ODD at Driving Automation Level 4>

Figure 16:
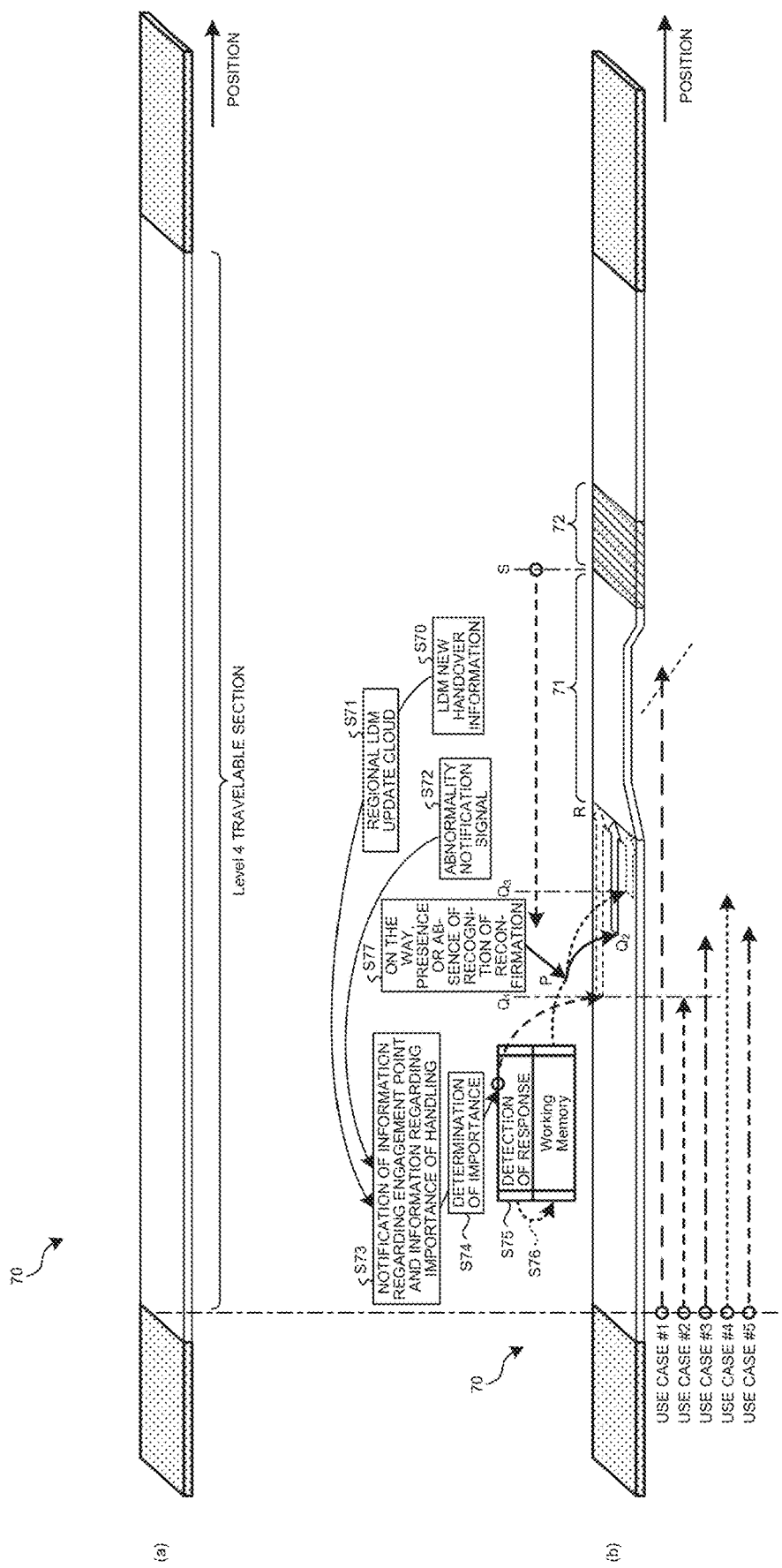
FIG. 16 is a schematic diagram for illustrating ODD at driving automation level 4 according to the embodiment.

Next, ODD at the driving automation level 4 according to the embodiment will be described. FIG. 16 is a schematic diagram for illustrating ODD at driving automation level 4 according to the embodiment.

FIG. 16 illustrates a direction in which the own vehicle travels from left to right in the drawing. The upper diagram illustrates an example of a section provided as static information that allows traveling with automated driving at driving automation level 4 (Level 4) on a road 70. The lower diagram in FIG. 16 schematically illustrates an example of a case where section 71 in which the lane width is limited due to road construction, for example, the automated driving at the driving automation level 4 is difficult, in the section that allows the traveling of the vehicle. In FIG. 16, a section 71 is a range from point R to point S, and the driver needs to drive with manual-controlled driving in this section 71. It is possible to shift from manual-controlled driving to automated driving in section 72 having a predetermined length from point S being an end of the section 71.

Here, ideal use of the driving automation level 4 will be described. When the equipment of the vehicle has performance of a certain level or more, the automated driving at the driving automation level 4 can be always used in the physical road section under the condition confirmed before the start of the traveling path. On the other hand, there is a possibility to have a situation in which the automated driving at the driving automation level 4 is not permitted at the start of travel after determination of the traveling path or during the travel after the start. Therefore, performing continuous state monitoring in preparation for abnormal situations would lead to reduction of significance of the presence and usage of the automated driving from the viewpoint of the user.

Therefore, it is conceivable to introduce a control that allows the minimized use of the emergency measure referred to as MRM by keeping its use under a condition where the social negative influence is a certain level or less.

It is also conceivable to avoid MRM activation. In this case, information provision for enabling the driver to voluntarily take a preliminary measure and grasp necessary information before activation of MRM is performed accurately and intuitively, that is, so as to act on the working memory with an appropriate priority. Here, assumable examples of information to be provided to the driver include vehicle dynamics characteristics displacement, self-diagnosis and situation presentation of an on-board device, information presentation regarding predictability of a preceding road (including a temporary decrease in sensing performance), and advance provision of information regarding propriety of evacuation/retreat (temporary acceptable amount due to capacity fluctuation).

Furthermore, there is a need to have a mechanism of developing the sense of usage priority so that even when the driver is engaged in NDRA, the driver can take a predictable priority measure and voluntary measures as coping behavior in its use form.

Next, more practical use of the driving automation level 4 will be described. In order for the own vehicle to autonomously determine the ODD as the driving automation level 4 on the spot and to perform automated travel without a driver in a section where the vehicle can travel at the driving automation level 4, the following conditions need to be satisfied.

First, it is necessary for the system to be able to preliminarily acquire the high-freshness update LDM 140 along the traveling course of the assumed traveling path. The acquired high-freshness update LDM 140 includes information indicating a recovery success rate (or request recovery ratio: RRR) for each road section along the traveling course. The system calculates an estimated delay time at which the driver can perform recovery to the manual-controlled driving by the handover limit point assumed by the driver, as a delay time from the notification for achieving the RRR to the recovery.

Furthermore, the system presents an avoidance option in a case where the driver has not performed the recovery before the time in consideration of the delay time. In actual traveling, after having acquired information indicating that the driver is expected to perform recovery to manual-controlled driving from some update information along the traveling course, it is necessary to prompt the driver to take a physical recovery action without negligence in accordance with the information.

Here, whether the driver takes an expected recovery action in response to a notification from the system corresponds to a region determined by the person's behavioral psychological mode that the system cannot directly sense.

However, it is not always the case that a person takes a voluntary coping behavior simultaneously in all areas. That is, it is difficult to expect a person to take this type of voluntary measure unless the person has developed ethical mind based on the social behavioral norm.

Here, first, it is assumed that a human performs a handling action based on the notification on the premise of development of sense of voluntary handling. In consideration of a benefit of performing the secondary task, a benefit of movement which is a main purpose, a disadvantage of failure to perform recovery when having received the driving recovery request, a disadvantage of neglecting to acquire prior information necessary for the recovery, and the like are projected in their future as a result of the selection action, and the selection determination of the coping behavior is performed within a range in which the result can be intuitively depicted.

Furthermore, as a result, when a measure is actually taken, important information in determining the preselected coping behavior is preferentially and temporarily stored in the work storage, that is, the working memory that declines over time.

As human behavioral psychology, the delay time from the notification of the necessity of recovery to the manual-controlled driving to the completion of the actual recovery depends greatly on conditions such as: how the prior information is provided; the status of driver's accurate recognition of the importance of the notified item; elapsed time declined importance in the memory from the notification of the necessity of the new handover to the notification of implementation, the presence or absence of the occurrence of matters on which the driver has been focused other than driving; and the driver's personal ability difference in the memory retention of the important matters to the working memory.

Here, a lower diagram of FIG. 16 will be described. For example, in a case where handover information is newly generated by the high-freshness update LDM 140 (step S70), the handover information is acquired by the system via a regional LDM cloud network as illustrated in step S71. The system may also receive an abnormality notification signal from a leading vehicle or the like (step S72). In step S73, the system notifies the driver of information on an engagement point (locational point) involved in handover and the importance of handling handover based on the acquired handover information or abnormality notification signal (presentation of a provisional deal).

The driver determines the importance in response to this notification (step S74), and agrees and responds to the provisional deal. The system detects the driver's response (step S75). Accordingly, the provisional deal is exchanged. In addition, the driver stores information regarding the handover in the working memory in accordance with the agreement response to the provisional deal (step S76).

For example, in a case where the driver does not execute the handover operation even after a predetermined time has elapsed from the first notification, the system notifies the driver of reconfirmation, and determines whether the driver recognizes the notification (step S77). Depending on the presence or absence of the recognition, the handling procedure branches as indicated by point P, for example.

Here, the timing of recovery to the manual-controlled driving by the driver varies depending on the conditions such as driver's recognition of the importance of handover. For example, when the response of the driver to the provisional deal is not detected in step S75, the system requests the driver to perform recovery to manual-controlled driving at the point (position) $Q_1$.

The system notifies the driver for reconfirmation (step S77), and according to whether the driver recognizes the notification, issues a recovery request at point $Q_2$ closer to section 71 after the point $Q_1$, or at point $Q_3$ in more proximity to section 71 further from point $Q_1$.

When a person performs thinking activity (brain activity) that requires a judgment with awareness, the brain unconsciously captures intellectual information that is a basis of the thought and is temporarily into the working memory in order of importance. The information captured in the working memory gradually fades away from the working memory as the importance of the information decreases.

During that period, it is assumed that the handover request to switching from the automated driving to the manual-controlled driving is issued from the system while the driver is immersed in NDRA, for example. When the driver has no sense of urgency in the handling or little sense of near-future risk that would act on intuition about a demerit from driver's overlooking of the notification and failure to execute handover, the driver's sense of necessity regarding the handling, that is, the retention of the working memory gradually fades away. In addition, information such as surroundings monitoring information and preconditions (vehicle dynamics characteristics) during traveling of the vehicle, which are required at the time of handover, fade away in the working memory. For example, when the surroundings monitoring information is determined to be important, acquisition information necessary for the determination is retained in the working memory.

For example, there is an assumable case where, while the own vehicle is traveling along a route allowed to travel by automated driving at driving automation level 4, there occurs, over time, an event fluctuation that the own vehicle approaches a section requiring manual-controlled driving ahead of the road section, which is known from the high-freshness update LDM 140 or the like and preceding information of a route ahead obtained by V2V communication from the leading vehicle. Furthermore, in the presence of a narrow road section that is difficult to be used as evacuation space in front of that, it is required to successfully achieve the handover still before that in consideration of the maintenance of social order. The delay from the notification to the successful handover depends largely on each driver's awareness level and the level of retention of prior information necessary for the determination in the memory.

When the driver recognizes the necessity, captures the prior information with a sense of tension, recognizes the information by the initial notification and makes a response (that is, the system detects the perception in the form of a response), and the importance of the information remains in the working memory as being important for the memory of the driver, it is possible to shorten the time from the notification to the recovery, and only needs the notification slightly before the limit point.

On the other hand, when the driver does not correctly recognize the notification and the system cannot detect the driver's recognition of the notification, the system determines that the driver has not sufficiently retained the necessity of handover in the working memory, and issues a recovery request at an earlier timing (point Q: in the lower part of FIG. 16).

However, unlike the mechanical mechanism of the system, the working memory is a conceptual representation of the functions of the brain that controls human thought and judgment. Therefore, there is a difference in the upper limit in the storage of each person, and there are even people immediately forget the priority even in important information due to health condition, aging, and the like.

It is assumed that the time from the point where the driver receives such information associated with the change sufficiently before the corresponding point R (for example, point $Q_1$) and to the point where the driver arrives at the corresponding point R in response to the notification would be sufficiently long time such as several tens of minutes. In ergonomically viewing this situation, when controlled by the HCD, a person basically stores information in the working memory based on the importance of the information. At this time, when the information is not obtained as a sensation indicating direct near future importance, the priority of the information would be lowered compared with information such as NDRA having high importance at that time point.

In this case, the system indicates to the driver the urgency of the handover request and a penalty against the negligence of the handover request, and detects a response by the driver. By making a response based on understanding that is not a reflective response, the driver can inject information in a more reliable form by the working memory of the driver. As a means for examining the response after understanding, it is possible to apply the observation state evaluation of intentional gestures of the wakeful cognitive state of the driver by the pointing vocalization call illustrated in JP 2019-021229 A and WO 19/017215 A. Since there is cognitive feedback in the gesture of the pointing vocalization call, it is possible to take charge of a very large number of roles of confirmation recognition. The application is not limited to this, and a simpler cognitive response means may be used in which the driver answers a question presented from the system.

Here, it can be presumed that the driver who has received an early recovery notification has an insufficient response to the prior notification and has reduced sense of importance for the necessity of recovery. From the driver's learning history regarding the delay for the time from the previous notification to the recovery, the necessary time is calculated based on a certain level of a recovery success rate to the manual-controlled driving at the necessary handover completion limit point. While the time from the recovery request notification to the completion of the recovery can be prolonged in this case, the quality of the recovery action, that is, a quick recovery from the notification, is managed and indexed. Therefore, a low quality recovery action is subjected to point deduction processing and penalty, and thus, an early recovery action is expected in driver's mind.

The driver's accurate action determination in response to the prior notification or notification can be performed only when the advance information leading to the determination, presented by the information display unit 120 or the like, is appropriately implemented properly according to the risk and is taken into the determination storage.

Here, use cases #1 to #5 in the lower part of FIG. 16 will be described.

Use Case #1

Use case #1 is an exemplary case where the travel plan is made assuming that the permitted route of the driving automation level 4 updated by the transient static LDM is to be defined as an executable route of the automated driving at the driving automation level 4 without performing the active monitoring control by the continuous reception of the latest data such as the high-freshness update LDM 140. In this case, depending on the state of the driver, the recovery to the manual-controlled driving cannot be completed in the driver's handover allowable limit period for the new situation which needs driver's intervention and which has not been acquired from the transient static LDM and for which update information has not been obtained. This is going to use an emergency measure by the MRM, and in some cases, would be hindrance of passage to the following vehicle or induction of a risk of a rear-end accident.

This use case #1 can occur in various situations, for example, a case of expiration of contract in a case where information update is performed on a reception right basis, that is, contract basis such as the form of subscription, a case of reception failure in the restriction of the usage condition in the high importance charging, and a case regarding the presence/absence of cancel of a remote assistance concierge service.

Use Case #2

Use case #2 is an exemplary case where travel environment information of a road along the traveling course is appropriately received in advance from the high-freshness update LDM 140 or the like to notify the driver, and the information is accurately recognized by the driver, with no detection of a response from the driver. In this case, it is not difficult to determine whether the importance and the occurrence timing of the necessary intervention are stored in the working memory of the driver, and there is a risk that the handover will not be completed safely within time. Therefore, the driver is notified early (point Q: in FIG. 16). This squeezes the time during which the driver can be involved in work other than driving (such as NDRA). Among all cases, in a case where the handover operation is not quickly performed from the recovery notification and the recovery quality is low, the penalty evaluation will result in point deduction, causing demerits in future use.

Use Case #3

Unlike use case #2 described above, use case #3 is an exemplary case where the driver correctly performs recognition at the stage of notification. Here, in use case #3, automated driving at the driving automation level 4 is continued for a long time from the early reception of the notification of the new event to the actual arrival at the corresponding point (point $Q_2$). In this case, at the time point of receiving the notification, it is difficult to determine whether the importance and the occurrence timing of the handover are stored in the working memory of the driver. In a situation where a certain period of time has elapsed since the first notification in step S73, there is a possibility that the memory is faded. In this case, the system issues a reconfirmation notification (step S77) to the driver and checks the response of the driver. This makes it possible to find that the residual memory of the driver is more faded than in use case #4 to be described below, and the system performs early notification.

At this time, the driver has made a cognitive response to the situation change once in step S74. Therefore, there is slight remaining memory, and the time required for situation awareness can be shorter than that in the above-described use case #2, and thus, the notification is made at an intermediate time between the above-described use case #2 and use case 43 to be described below.

Use Case #4

Use case #4 is an exemplary case where the driver understands the importance upon receiving the notification, there is a driver's response in the confirmation notification to the driver (step S77), and driver's memory is retained as working memory. In this case, even when there is a long time before arriving at the point, by appropriately checking the situation accompanying the approach to the point (for example, a pointing vocalization call to the front or a notification screen) before arriving at the point, the driver can refresh its memory as working memory, with risk awareness heighted with a shorted distance to the point. This makes it possible for the system to perform action detection for the state and reconfirmation in the driver, and makes it possible for the driver to accurately and properly perform handover recovery based on the unfading remaining information in the working memory even immediately before the notified handover point (point $Q_3$). This leads to a high-quality recovery action with the evaluation with added points for superiority.

Use Case #5

Use case #5 is similar to use case #4 described above up to recognition when receiving the next information necessary for handover during automated driving use for the working memory. On the other hand, in use case #5, by holding new information in the working memory and the transition of time due to a state referred to as mind wandering, the driver has a higher level of consciousness deviation into other thoughts, away from the loop of driving operation. In this case, the timing of the reconfirmation for recovery at the necessary timing is greatly different for each person depending on the state at that time.

In use case #5, the system utilizes observability evaluation indexes such as the health condition of each driver including the autonomic nervous disorder from the driver's awareness state, and performs feedback to the driver in a mode to continuously and intuitively activate the merit and the penalty. The system repeatedly presents the driver with information such as appropriate preceding risks, information about options for avoiding the risks, or near-future drawable information on the degree of risk influence when the risk is not avoided. This promotes psychological reinforcement learning by the driver as a habit of performing early recovery to the manual-controlled driving and performing progress observation necessary for the recovery, making it possible to more reliably form a mind of grasping the situation before reaching the handover point, as working memory.

Note that use case #5 conceptually illustrates an example of variably notifying a range in which the system allows the involvement in the NDRA as the ODD according to the superiority and inferiority of the driver based on the evaluation of the behavioral characteristics unconsciously obtained by the driver in self-learning, from the presentation of the information to the driver, the health condition of the driver at times, and the repeated use action of the system, and schematically illustrates that the range can greatly change depending on the behavioral change of the driver.

As described above, based on the travelable section at the driving automation level 4 as the same physical environment, uses cases will differ depending on the accessibility of the information, the risk information included in the information, the weighting and avoidance selection for the importance, the timing information, and the handling (response) status with respect to the information.

In the automated driving based on the HCD, the driver repeatedly experiences a long-term cycle including: addition of risk information to be the basis of the criterion of the action determination of the person, to the timely update information provided by the system; imposition of penalty depending on the response at the time of use; and having a benefit for the superior response. By introducing the HCD according to the embodiment of the present disclosure, it is possible to achieve presentation of risk intuitively drawable toward the use of the state to be caused by driver's excessive dependence of automated driving while enjoying the benefits of the automated driving. This configuration allows the driver to be involved in recovery from the active automated driving to the manual-controlled driving to enable appropriate use of the advantage of comfortable NDRA, while constantly provided with risk information from the system. This makes it possible for the driver to utilize the merit in the use of the automated driving while confirming the information during the automated driving with a sense of security. Such an HMI, which prompts the driver to take a proactive action and generated by the balance between the benefit of the driver's use of the NDRA and the penalty, rather than the forced confirmation request to the driver, is to be the control by the HCD.

<3-3-3. Application Example of Driving Automation Level 4 According to Embodiment>

Figure 17A:
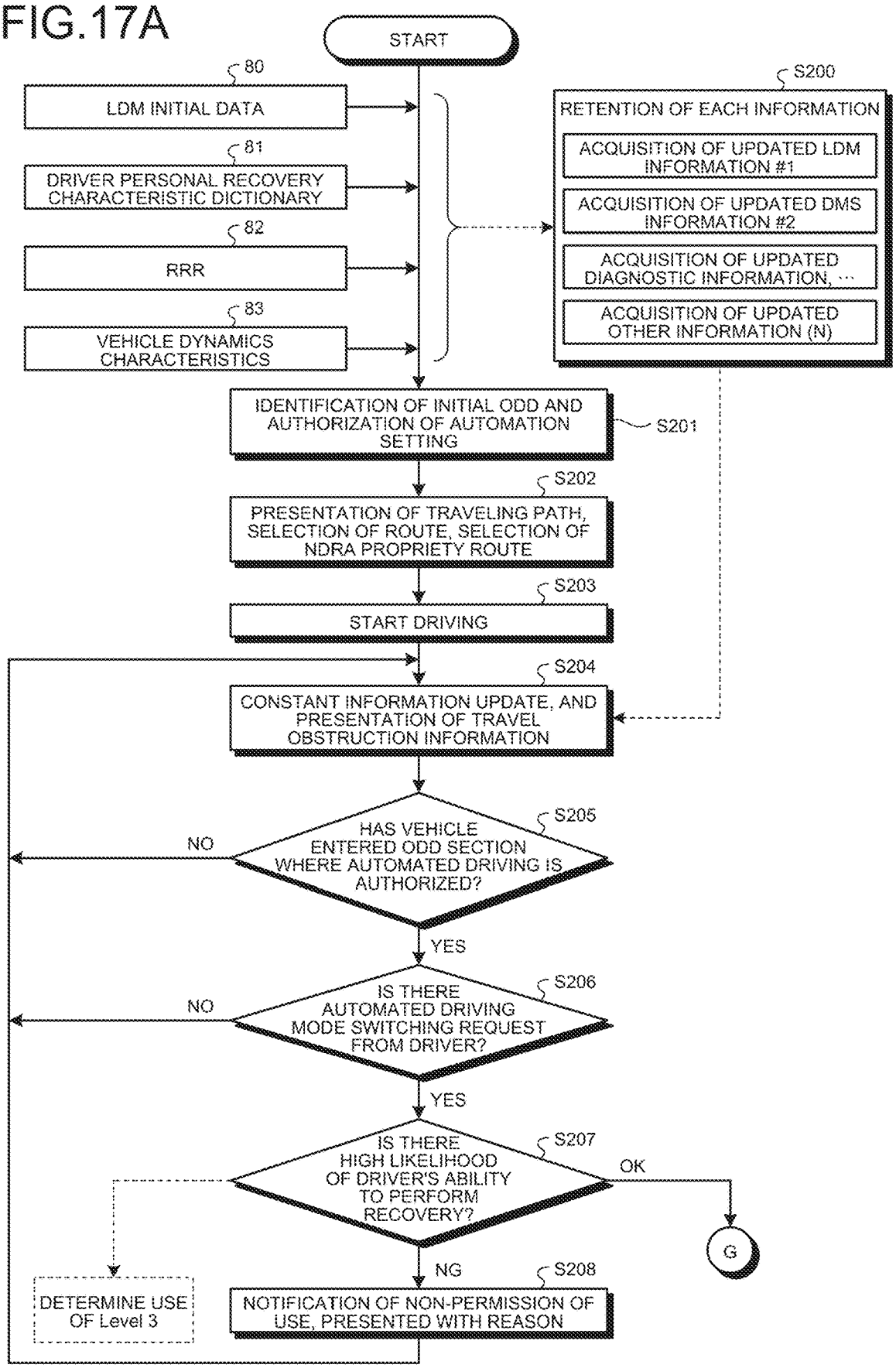
FIG. 17A is a flowchart of an example for illustrating an application example of driving automation level 4 according to the embodiment.
Figure 17B:
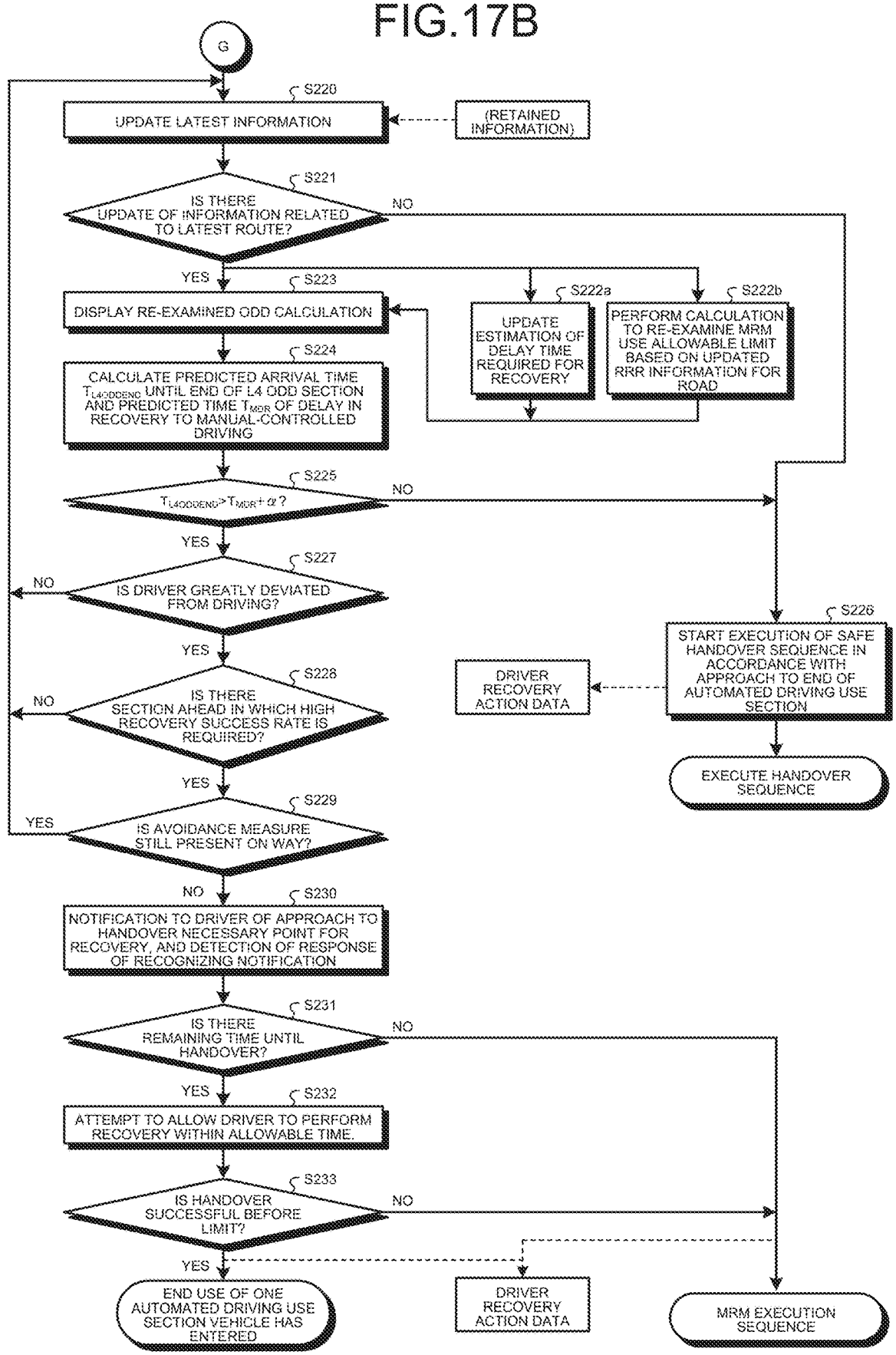
FIG. 17B is a flowchart of an example for illustrating an application example of driving automation level 4 according to the embodiment.

Next, an application example of the driving automation level 4 according to the embodiment will be described. FIGS. 17A and 17B are flowcharts illustrating an example of the application example of the driving automation level 4 according to the embodiment. In FIGS. 17A and 17B, the reference sign "G" indicates that the processing shifts to the corresponding reference sign in FIGS. 17A and 17B.

In FIG. 17A, in step S200, the automated driving control unit 10112 acquires and retains various pieces of information such as LDM initial data 80, a driver personal recovery characteristic dictionary 81, RRR 82, and a vehicle dynamics characteristics 83. Furthermore, the automated driving control unit 10112 also performs acquisition of updated LDM information (#1, #2, . . . ), acquisition of updated diagnostic information, acquisition of other updated information (N), and the like.

In next step S201, the automated driving control unit 10112 identifies initial ODD and authorizes setting for automated driving based on the information acquired in step S200. In the next step S202, the automated driving control unit 10112 presents the traveling path to the driver and requests the driver to select a route and the like. Furthermore, the automated driving control unit 10112 requests the driver to select a route specifying NDRA propriety. In the next step S203, the driver starts driving the own vehicle.

In the next step S204, the automated driving control unit 10112 acquires each piece of information described in step S200, and updates the constant information accompanying the travel after the start of the traveling path. In addition, the automated driving control unit 10112 performs visual display including the arrival time such as travel obstruction information at each driving automation level (refer to FIGS. 8, 9A to 9C).

In next step S205, the automated driving control unit 10112 determines whether the vehicle has entered the ODD section where the automated driving at driving automation level 4 is authorized. When having determined that the own vehicle has not entered the ODD section (step S205, "No"), the automated driving control unit 10112 returns to the processing of step S204. In contrast, when having determined that the own vehicle has entered the ODD section in step S205 (step S205, "Yes"), the automated driving control unit 10112 proceeds to the processing of step S206.

Note that, in the flowcharts illustrated in FIGS. 17A and 17B, the same processing is repeated from step S204 (not illustrated) when the vehicle exits the section where the automated driving travel can be performed once and enters the section where it is determined whether a new ODD can be used.

In step S206, the automated driving control unit 10112 determines whether there is a request for switching of the automated driving mode, from the driver. When it is determined that there is no switching request (step S206, "No"), the automated driving control unit 10112 returns to the processing of step S204. In contrast, when having determined that there is a switching request (step S206, "Yes"), the automated driving control unit 10112 proceeds to the processing of step S207.

In step S207, the automated driving control unit 10112 determines the likelihood of the driver's ability to perform recovery to manual-controlled driving. Here, for example, based on the driver personal recovery characteristic dictionary 81, when the driver is a superior automated driving user who actively performs recovery operation, the automated driving control unit 10112 allows the driver to use the advantages (NDRA or the like) obtained by the automated driving. On the other hand, when the driver is likely to have drug dependence or sleep disorder, the automated driving control unit 10112 prohibits or restricts the use of the automated driving function even when the driver has few deduction points or penalties. With the determination processing in step S207, many drivers perform self-learning to avoid prohibited use in order to obtain the benefit of NDRA during automated driving.

The environment allowable to be used for the travel route is not necessarily an environment in which the use of the automated driving at the driving automation level 4 can always be provided even when the use of the automated driving is allowed. As described above, under the condition ensuring the condition that the driver has the recovery ability, there is also a condition for allowing the use of the automated driving or the advanced assistance up to the driving automation level 3. In this case, it can be said that the determination processing in step S207 is the use determination of automated driving at the driving automation level 3 (Level 3) of the driver. The application and the like of the driving automation level 3 according to the embodiment will be described below.

When having determined that the driver is estimated to have a capability to perform recovery to manual-controlled driving (step S207, "OK"), the automated driving control unit 10112 proceeds to the processing of the flowchart in FIG. 17B according to the reference sign "G" in the drawing. In contrast, when having determined that the driver is not estimated to have the recovery capability (step S207, "NG"), the automated driving control unit 10112 proceeds to the processing of step S208.

Note that, in a case where the automated driving is used in combination with remote driving assistance in its use form, leading guidance vehicle assistance, or the like in the use mode of the automated driving, it is not essential to determine the ability of the driver to perform recovery to manual-controlled driving. In this case, another determination processing is to be performed, which is not included in the processing described in the examples of the present embodiment.

In step S208, the automated driving control unit 10112 presents a notification of non-permission of the use of the automated driving to the driver with a reason. Examples of conceivable reasons presented to the driver in this case include fatigue and drowsiness of the driver, a penalty history of the driver in which the cumulative addition value of the violation due to excessive dependence is a predetermined value or more. When having been presented from the system with a reason for non-permission notification, the driver who desires to benefit from automated driving is expected to undergo action improvement learning by using improvement learning, a superior boost permission request (described below) with a limited number of times, or the like.

After the processing in step S208, the processing returns to step S204. Here, there is a case where the vehicle travels on a road section suitable for a condition for use of the automated driving function while continuing traveling, or a case where the initial condition is replaced with a condition that permits the use by the improvement in the driver's awareness to handling. Therefore, the system loops the processing of steps S204 to S208 and continuously monitors the state of the driver or the like.

The description proceeds to the flowchart of FIG. 17B. Following the reference sign "G", that is, when the driver selects the travel in the automated driving at the driving automation level 4, the automated driving control unit 10112 performs, in step S220, update of the latest information after the start of the traveling path. After entering the ODD section where the automated driving at the driving automation level 4 is permitted, the vehicle can continue to travel using the automated driving at the driving automation level 4 as long as the condition is not changed. In the flowchart of FIG. 17B, step S220 illustrates loop processing of updating the latest information in a state monitored in the steady state, that is, in association with traveling.

When some situation change along the route is detected in step S220 or when the vehicle approaches the end point of ODD, the automated driving control unit 10112 proceeds to the processing of step S221.

In step S221, the automated driving control unit 10112 determines whether information related to the latest route essential for continuous automated driving travel has been updated. When having determined that the information has not been updated (step S221, "No"), the automated driving control unit 10112 proceeds to the processing of step S226.

In step S226, the automated driving control unit 10112 starts execution of a safe handover sequence as scheduled in accordance with approach to the end of the automated driving section (NDRA use section). Thereafter, the handover sequence is executed.

Here, the automated driving control unit 10112 adds an evaluation value to a superior driver, for example, a driver who dutifully responds to the recovery request by the system, constantly cares about the recovery request, and confirms the status change in the middle of the traveling path. Furthermore, the automated driving control unit 10112 permits the superior driver to select the next switching to the automated driving mode without going through a complicated check and approval procedure such as multiple authentication. The superior driver can also preferentially receive the use guidance of the automated driving of the driving automation level 4. In this manner, there are various benefits for the superior driver.

What is essential in implementing such an HCD for the driver to take the best confirmation action is a process in which the driver captures the "memory" necessary for these confirmation determinations as well as for determinations provoking appropriate actions from the system, and the "quality" of the information provided by the system to the HMI. For example, the information corresponds to information indicating when and what, as well as what to do as a countermeasure to cause what type of influence, illustrated in FIG. 9C, that is, information working on the working memory.

Note that the recovery action of the driver in the safe handover sequence in step S226 is acquired and stored as recovery action data with evaluated quality of action. This recovery action data has an impact on the evaluation point for the driver.

In contrast, when having determined that the information has been updated in step S221 (step S221, "Yes"), the automated driving control unit 10112 proceeds to the processing of steps S222a, S222b, and S223.

The divergence when it is determined in step S221 that the information has been updated (step S221, "Yes") assumes procedures in the allowable ODD conditions at the time of entering the ODD section, taken for the time of occurrence of unexpected events such as sudden bad turn in the weather during traveling, a trouble of the vehicle, or a load collapse. In a case where occurrence of such an unexpected event is found, it is necessary to take a measure corresponding to the grace time required to handle the event. The flowchart in FIG. 17B illustrates an example of a series of processing related to this measure applicable to the embodiment. The quality of the coping behavior for the event taken by the driver at the time of abnormality is also acquired by the driver by driver's appropriate risk determination action, and is an important factor that causes appropriate behavioral change for the driver.

In step S222a, the automated driving control unit 10112 monitors the state of the driver including the response determination to the notification recognition, obtains an estimated value of the delay time required for recovery to the manual-controlled driving based on the monitoring result, and updates the existing estimated value. In step S222b, the automated driving control unit 10112 updates RRR information for the road, and performs calculation to re-examine the MRM use allowable limit based on the update.

In step S223, the automated driving control unit 10112 displays the re-examined ODD calculation result based on the information determined to have been updated in step S221, the information updated and acquired in steps S222a and S222b, the self-diagnosis information, and the like. Furthermore, the automated driving control unit 10112 confirms the response of the driver to the display.

In next step S224, the automated driving control unit 10112 calculates predicted arrival time $T_{L4ODDEND}$ until the end of the ODD section relating to driving automation level 4 and predicted time $T_{MDR}$ of the delay in recovery to manual-controlled driving. In the next step S225, the automated driving control unit 10112 determines whether the calculated predicted arrival time $T_{L4ODDEND}$ and the predicted time $T_{MDR}$ satisfy the relationship of $[T_{L4ODDEND} > T_{MDR} + \alpha]$. Note that the value $\alpha$ is a margin time to the handover start necessary point.

When having determined in step S225 that the relationship of $[T_{L4ODDEND} > T_{MDR} + \alpha]$ is not satisfied (step S225, "No"), the automated driving control unit 10112 proceeds to the processing of step S226.

In contrast, when having determined in step S225 that the relationship of $[T_{L4ODDEND} > T_{MDR} + \alpha]$ is satisfied (step S225, "Yes"), the automated driving control unit 10112 proceeds to the processing of next step S227.

In step S227, the automated driving control unit 10112 determines whether the driver is greatly deviated from driving based on the monitoring result of the state of the driver. When having determined that the driver is not greatly deviated from driving (step S227, "No"), the automated driving control unit 10112 returns to the processing of step S220. In this case, the driver does not greatly deviate from driving, and a response to the notification from the system can be expected.

On the other hand, when having determined that the driver is greatly deviated from driving in step S227 (step S227, "Yes"), the automated driving control unit 10112 proceeds to the processing of step S228.

In step S228, the automated driving control unit 10112 determines whether there is a section requiring a high recovery success rate. When having determined that the section does not exist (step S228, "No"), the automated driving control unit 10112 returns to the processing of step S220. In this case, for example, the operation means continuation, for the period of the margin a, of a situation in which even an evet such as a sudden stop of the own vehicle by MRM or the like will have an extremely small impact on surrounding vehicles or the like.

In contrast, when having determined that the section exists (step S228, "Yes"), the automated driving control unit 10112 proceeds to the processing of step S229.

In step S229, the automated driving control unit 10112 determines whether the avoidance measure is still present on the way to the handover start point, such as an intermediate refuge area or a waiting area. When having determined that there is an avoidance measure (step S229, "Yes"), the automated driving control unit 10112 returns to the processing of step S220.

In contrast, when having determined that there is no avoidance measure (step S229, "No"), the automated driving control unit 10112 proceeds to the processing of step S230. In this case, when the own vehicle continues traveling, there is a high possibility of losing evacuation means and activation of the MRM, having a risk of causing a traffic obstruction or a rear-end collision to the following vehicle.

In step S230, the automated driving control unit 10112 notifies the driver of the approach to the handover necessary point for recovery from the automated driving to the manual-controlled driving, and detects the driver's response accepting the notification. In the next step S231, the automated driving control unit 10112 determines whether there is a remaining time until handover. When having determined that there is no remaining time (step S231, "No"), the automated driving control unit 10112 proceeds to the processing of an MRM execution sequence.

In contrast, when having determined that there is the remaining time (step S231, "Yes"), the automated driving control unit 10112 proceeds to the processing of step S232 and attempts to allow the driver to perform recovery to the manual-controlled driving within an allowable time. In this case, a success rate of the RRR or more cannot be expected. In the next step S233, the automated driving control unit 10112 determines whether the handover attempted in step S232 has been successful before the limit. When having determined that the handover has been successful (step S233, "Yes"), the automated driving control unit 10112 determines completion of the use of one automated driving use section the vehicle has entered. In contrast, when having determined that the handover has failed (step S233, "No"), the automated driving control unit 10112 proceeds to the processing of the MRM execution sequence.

Incidentally, the recovery action of the driver at the transition of the MRM execution sequence from step S231 or step S233 and the transition from step S233 to the end of use of one section is acquired and stored as recovery action data. This recovery action data has an impact on the evaluation point for the driver.

Note that, in the above description, the individual determination processes in FIG. 17B, for example, the determination processes in steps S225 to S229, are sequentially performed in time series, but this is not limited to this example. For example, the processes in steps S225 to S229 may be executed in parallel in time series to determine whether the driver can perform recovery, and the process may be directly shifted to the MRM execution sequence when at least one of the determinations in steps S225 to S229 is a determination result indicating that recovery will be hard to achieve. This means jump to the sequence.

<3-4. Application Example of HCD for Driving Automation Level 3>

Next, an application example of the HCD for the driving automation level 3 according to the embodiment will be described.

driving automation level 3 is defined as a mode in which the driver can always respond to an abnormality. Therefore, in order for the vehicle to safely travel at the driving automation level 3 without disturbing social order, the driver needs to pay attention to the situation of the driving road environment in advance and prepare posture and attitude capable of recovery to manual-controlled driving so that the driver can always quickly perform recovery to manual-controlled driving while using the vehicle at the driving automation level 3. In other words, in a state where the driver is not expected to in these situations, it is no longer appropriate to use the vehicle at the driving automation level 3. That is, in this case, considering the state of the driver, it is difficult to say that traveling is possible at the driving automation level 3.

That is, at least the ODD at the driving automation level 3 handled in the definition of the driving automation level 3 according to the embodiment is an operation design domain usable when these conditions are satisfied. In the ODD at driving automation level 3 in this case, the range up to a point where the driver is expected to be able to manage the situation while continuing the travel in the current state of the driver is a limit of the operation design domain corresponding to driving automation level 3.

In other words, in the ODD that enables use of driving automation level 3, the driver's deviation from the long-term driving steering work, which is a state not involved in the driving, leads to driver's distraction in attention and deterioration in information collection ability to collect continuous information on the surrounding environment necessary for the driving. This makes it difficult to take a coping behavior against an emergency handover from automated driving to manual-controlled driving.

When the driver is responsible for driving, they continue to collect information necessary to perceive, recognize and judge the situation. This is because the action determination is required to have near-future predictability associated with the selected action and operation, and in order to ensure the predictability in a more reliable state, the driver continues to collect a lot of information in continuous manual-controlled driving. The information collected here includes, for example, not only the behavior of the preceding vehicle but also a lot of information that cannot be instantaneously obtained after notification of a request for recovery to manual-controlled driving, such as loaded cargo of the own vehicle, road conditions further ahead of the preceding vehicle, presence or absence of road congestion, and section reminding by a road sign.

Starting from the stage where the surrounding monitoring attention is interrupted using the automated driving function of the driving automation level 3, information that is fundamentally necessary for these determinations and is unconsciously acquired in the case of manual-controlled driving gradually fades away or is not updated in the working memory.

Therefore, in the embodiment, the ODD is determined by limiting the travel at the driving automation level 3 according to how long the thought characteristics and the state unique to the driver continuously grasp the surrounding environment in a level close to the attention state of the manual-controlled driving and the own vehicle status. The ODD design of the vehicle is determined in consideration of the driver's current state and future prediction estimation in addition to the environment recognition performance of the vehicle, the acquisition of advance information of the travel route, and the self-diagnosis result of the own vehicle.

From the viewpoint of HCD, it is difficult for the driver to continuously grasp the peripheral information so that the driver can immediately take over the driving steering without being involved in the actual driving steering (manual-controlled driving). In automated driving, it is considered that a thought is assigned to matters other than driving for long hours during traveling. Therefore, there is an increased risk that the working memory gradually release recollections such as estimated surrounding environment information and own vehicle characteristic (including change) information, which are necessary for short-term handover to manual-controlled driving and are essential for safe steering, and even awareness of the driver during steering operation.

Therefore, the ODD defining the driving automation level 3 based on the HCD according to the embodiment is set different from the existing ODD defined as a design from the performance limit of the system, the road maintenance situation, the advance information regarding the road, and the like. That is, based on the wakefulness of the driver, the history of continuous recognition of the surrounding situation, and the like, the ODD determines a section in which the driver's handling can be expected when the driver receives a request of handover from the automated driving to the manual-controlled driving. In this section, a range set in design in consideration of the performance limit of the system, the road maintenance situation, the advance information regarding the road, and the like is to be determined as a travelable area for the driving automation level 3 permitted in view of the driver's current situation recognition and handling ability.

Here, the extension of the section of the driving automation level 3 will be described. There is an assumable case where the driver is permitted, according to their own state, to use the driving automation level 3 in a short period in which the driver can be expected to perform recovery in the state, performs extension application to the system after recognizing the situation, and intermittently uses the driving automation level 3.

Figure 18A:
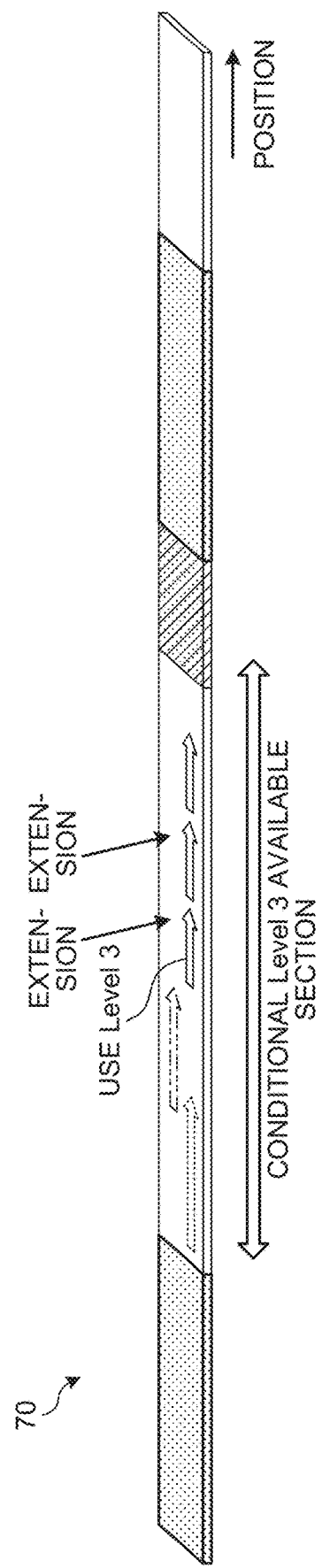
FIG. 18A is a diagram schematically illustrating a state in which a driver traveling on a road 7 in their own vehicle extends a section of driving automation level 3.

FIG. 18A is a diagram schematically illustrating a state in which a driver who is traveling on a road 70 by the own vehicle extends a section of driving automation level 3. This example illustrates a state in which the driver repeatedly executes the automated driving at the driving automation level 3 for a short period by an extension application in the section that permits conditional use of automated driving at the driving automation level 3 (Level 3). That is, the driver performs the automated driving at the driving automation level 3 for a short period, applies for an extension at the time point when the period ends, and further performs the automated driving at the driving automation level 3 for a short period. In the example of the figure, the driver repeats this action.

Here, since the system permits extension only by a button operation on a simple extension request by the driver, for example, the driver does not take into the working memory the attention necessary for actual continuous safety confirmation and the prerequisite information necessary for grasping the situation ahead of the vehicle necessary for handover. This leads to an increasing possibility that the system permits extension while the prediction information is fading in the driver's working memory.

For example, the system detects a confirmation behavior such as a pointing vocalization call to the front of the road by the driver together with an extension request by a button operation or the like. This makes it possible to exchange a "second deal" between the system and the driver with respect to the recognition of the situation and the resulting responsibility, leading to achievement of causing the driver to store the sense of responsibility, that is, the recollection of the necessity of recovery again into the working memory.

When the use of the automated driving at the driving automation level 3 is permitted, there occurs a concern as to whether the driver is in an appropriate recovery state, attitude, and wakefulness during the use, and whether the driver has performed the continuous attention obligation ahead of the vehicle. Here, in terms of ergonomics, there is no penalty or the like for the driver's negligence of their fundamental duties, and thus, these duties or the like would not necessarily be fulfilled in the case of a careless driver only because of the possibility of receiving a risk.

The occurrence of use of automated driving involving these violations has already been socially known, and overlooking this state left with no countermeasures should not be permitted. That is, when these state transitions are recorded and a feedback loop is formed as a matter that cannot be overlooked as a legal penalty, the driver intuitively receives "virtual pain" recorded and stored in the driver's consciousness as a violation state that is more intuitively subject to the penalty, separately from the interval of performing attention obligation to avoid the risk of the accident itself.

The reason why the number of cases of speeding is small on the road with speeding surveillance or traffic enforcement is that the driver's experience of a traffic enforcement is considered as a near-future risk projected in the driver's mind as action determination. Even with the same penalty introduced, the violation with surveillance being "having more commonality and more realistic" would increase the sense of prevention, leading to achievement of the same effect from the viewpoint of the action psychology.

It is also possible to silently record the violation state in the action of the driver, that is, record the violation state in a shadow mode without arousing the driver's consciousness. However, also in this case, it is desirable to intentionally perform a sensory recording such as visual, auditory, tactile, and olfactory from an ergonomic viewpoint. That is, by repeatedly receiving the sensory violation state, the situation recognition in the driver's brain is developed so that the information at the time of approaching the violation state in the driver's working memory achieves a state having a higher priority action determination for avoiding a risk. Depending on whether or not the risk is visualized as sensation to the driver, the risk will have a different effect on the driver's behavioral psychology.

Perceptual feedback having an impact on these determinations works as an HMI indicating a risk in the immediate future based on the HCD, and its psychological effect is reflected as an influence on the intuitive driver's action for the future, which cannot be obtained only by introduction of penalty reinforcement by legal implementation or the like. With a plurality of means for feedback of the HMI, for example, even when it is difficult to linguistically transmit information, risk information can work on the brain, such as a case of direct effect on the visual cortex, which can be evolved to a mechanism to lower a probability of overlooking a risk and avoid the risk through various stimuli. For near future risks, all drivers have brain and body mechanisms that avoid the risk without overlooking the risk, regardless of individual differences.

Figure 18B:
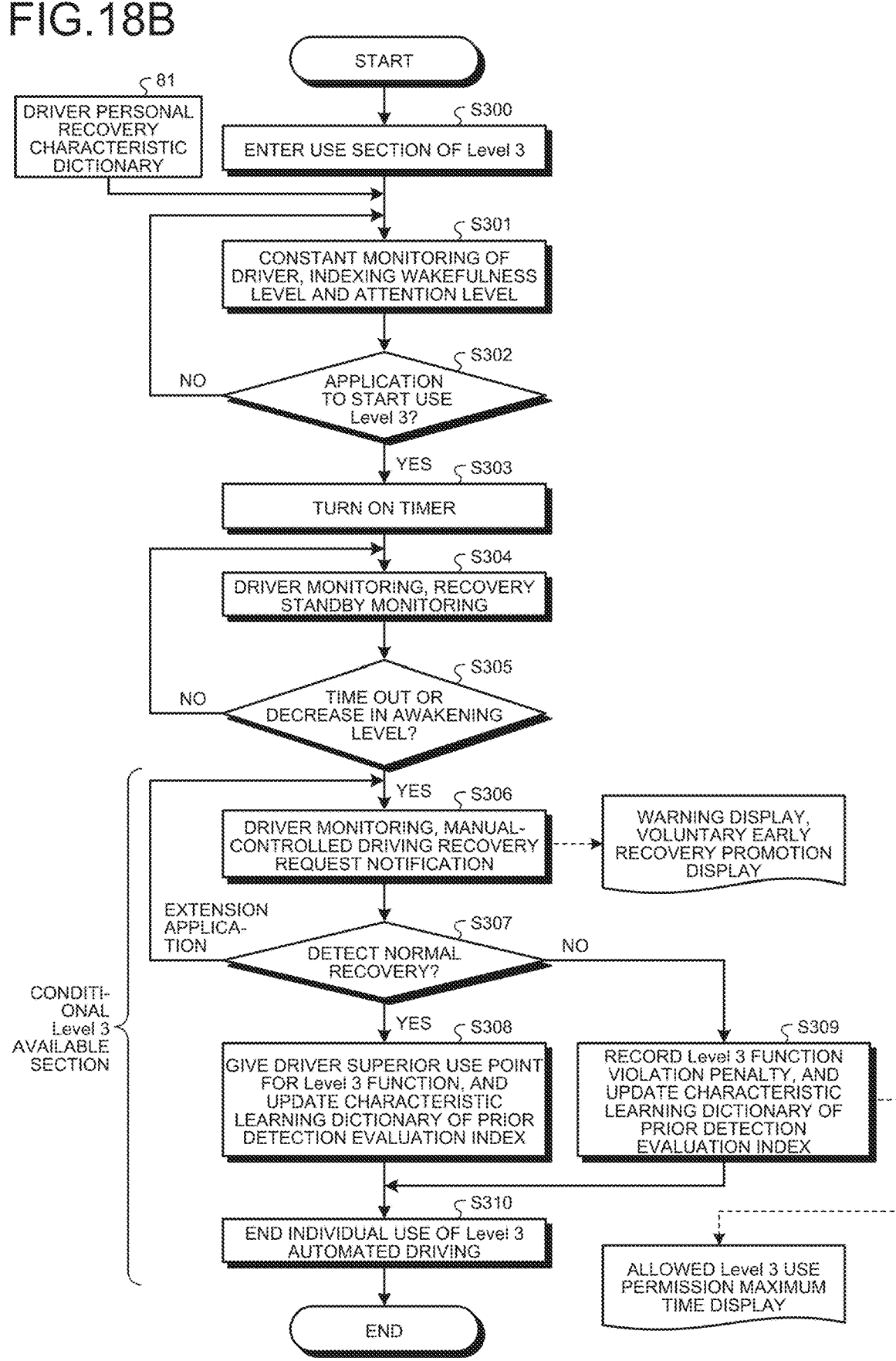
FIG. 18B is a flowchart illustrating an example of processing in a conditional driving automation level 3 available section according to the embodiment.

FIG. 18B is a flowchart illustrating an example of processing in the conditional driving automation level 3 available section illustrated in FIG. 18A according to the embodiment. When the own vehicle enters the use section of the automated driving according to the driving automation level 3 (Level 3) in step S300, the automated driving control unit 10112 refers to the driver personal recovery characteristic dictionary 81 that has been trained to learn recovery characteristics of the driver of the own vehicle based on the past information, and starts constant monitoring of the driver in step S301 to index the wakefulness level and the attention level of the driver.

Note that the driver personal recovery characteristic dictionary 81 can include, for example, a body model and a head model of the driver to be described below, and can include information indicating an operation including a required time of each part of the body, the head, the eyes, and the like when the driver performs recovery from automated driving to manual-controlled driving.

The indexing in step S301, predicts, for example, the maximum time of the use of the automated driving at the driving automation level 3, which is allowable from the arousal state, the fatigue accumulation state, and the psychologically loaded degree of the driver, which are detected based on the past recoverable attention duration time of the driver, and sets this maximum time as an index of the wakefulness level and the attention level of the driver.

In next step S302, the automated driving control unit 10112 determines whether the driver has applied to start using automated driving at the driving automation level 3. When having determined that the application has not been made (step S302, "No"), the automated driving control unit 10112 returns to the processing of step S301. In contrast, when having determined that the use start has been applied by the driver (step S302, "Yes"), the automated driving control unit 10112 proceeds to the processing of step S303.

In step S303, the automated driving control unit 10112 turns on a timer and starts measuring the time. In the next step S304, the automated driving control unit 10112 monitors the driver, detects the driver's wakefulness and attention reduction state accompanying the continuous use of the automated driving at the driving automation level 3, and also monitors the standby state of the driver recovery to the manual-controlled driving.

In the next step S305, the automated driving control unit 10112 determines whether the time from the point where the measurement is started in step S303 exceeds a predetermined time, the use of the driving automation level 3 has timed out, or the wakefulness of the driver has decreased. When having determined that the use of the driving automation level 3 has not timed out and the wakefulness of the driver has not decreased (step S305, "No"), the automated driving control unit 10112 returns to the processing of step S304.

In contrast, when having determined that the use of the driving automation level 3 has timed out or the wakefulness of the driver has decreased (step S305, "Yes"), the automated driving control unit 10112 proceeds to the processing of step S306.

Processing from step S306 to step S310 described below corresponds to the processing in conditional driving automation level 3 available section illustrated in FIG. 18A.

In step S306, the automated driving control unit 10112 monitors the driver, and detects a notification of a request for recovery to manual-controlled driving by the driver and a behavior of the driver. Here, even in a period in which the driver is estimated to be able to maintain the wakefulness, when the decrease in awakening level is detected, the automated driving control unit 10112 presents a display for warning, or a display for encouraging the driver to perform voluntary early recovery to the manual-controlled driving.

In next step S307, the automated driving control unit 10112 determines whether driver's normal recovery to manual-controlled driving has been detected.

When having determined that the normal recovery is detected (step S307, "Yes"), the automated driving control unit 10112 proceeds to the processing of step S308. In step S308, the automated driving control unit 10112 determines that the driver has performed a superior use of the function at the driving automation level 3, and gives the driver a superior function use point. In addition, the automated driving control unit 10112 updates the characteristic learning dictionary (for example, the driver personal recovery characteristic dictionary 81) of the prior detection evaluation index.

When having determined that the normal recovery is not detected in step S307 (step S307, "No"), the automated driving control unit 10112 proceeds to the processing of step S309. In step S309, the automated driving control unit 10112 records a penalty to the driver based on the determination that the driver has made violation regarding the function of driving automation level 3. In addition, the automated driving control unit 10112 updates the characteristic learning dictionary (for example, the driver personal recovery characteristic dictionary 81) of the prior detection evaluation index.

Furthermore, at the transition of the processing from step S307 to step S309, the automated driving control unit 10112 displays the maximum time for permitting the use of the automated driving of the driving automation level 3, which is allowed based on the wakefulness, the fatigue accumulation state, the psychologically loaded degree, and the like of the driver, predicted from the past recoverable attention duration time of the driver, and presents the maximum time to the driver.

After completion of the processing in step S308 or step S309, the use of the automated driving at the driving automation level 3 (Level 3) for each time is ended (step S310).

On the other hand, when the extension application of extending the use time of the automated driving at the driving automation level 3 has been detected from the driver in step S307 (step S307: "Extension application"), the automated driving control unit 10112 extends the use time by a predetermined time and returns to the processing of step S306. The extension application is performed, for example, by the driver operating a predetermined operator provided in the input unit 10101. At this time, the automated driving control unit 10112 detects that the front confirmation such as pointing vocalization call has been performed by the driver in response to the operation, and then individually approves the extension application for the use section.

<3-5. ODD Decision Element>

Figure 19A:
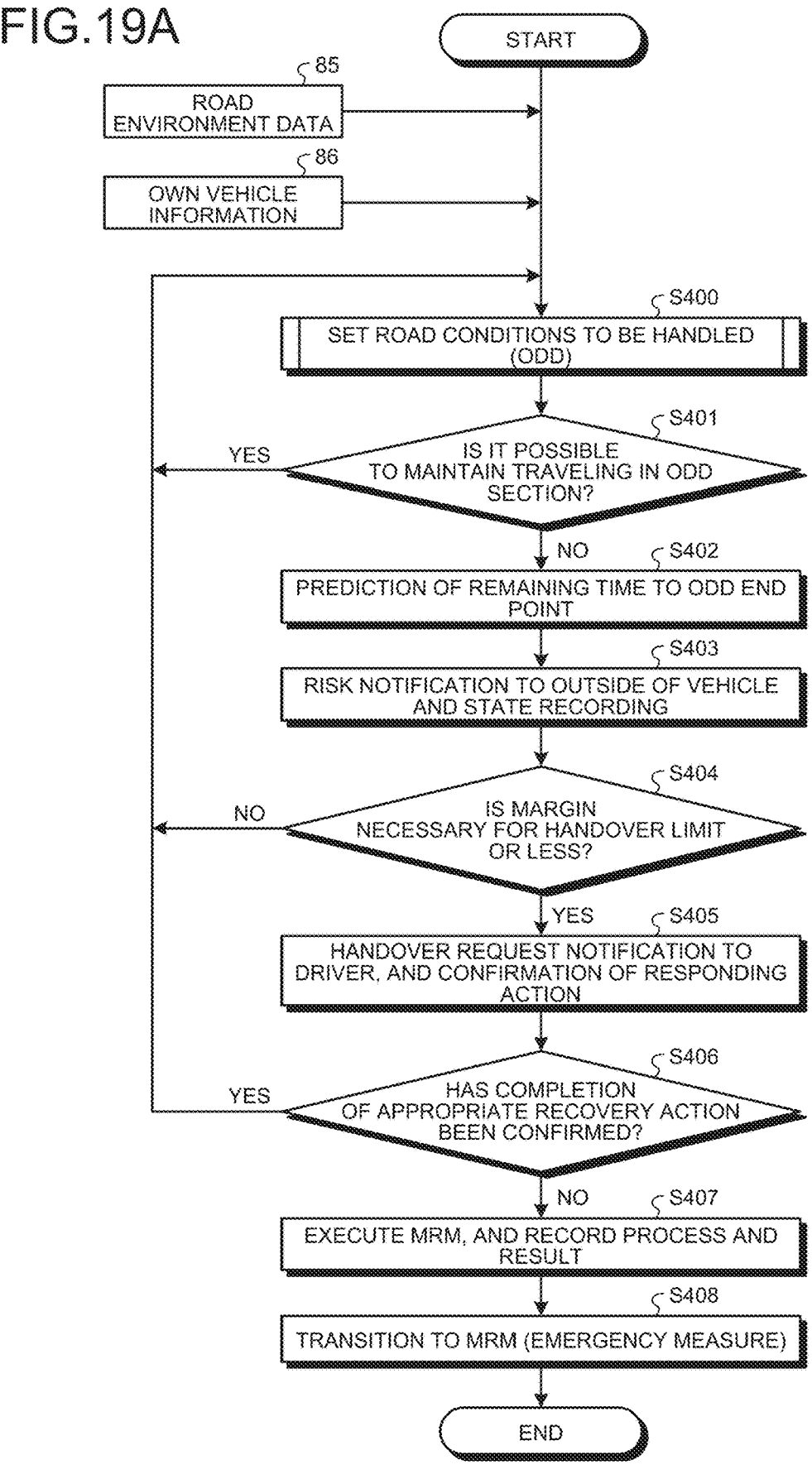
FIG. 19A is a flowchart of an example in which a flow of processing of automated driving applicable to the embodiment is illustrated focusing on ODD.

An ODD decision element applicable to the embodiment will be described below with reference to the flowcharts in FIGS. 19A and 19B. Here, as an example, when the driving automation level 3 is actually used on a specific road on which the use of the automated driving at the driving automation level 3 is assumed as the environmental infrastructure, the use determination of the ODD of the use permission and the decision element of the control will be described based on use conditions. FIG. 19A is a flowchart of an example in which a flow of processing of automated driving applicable to the embodiment is illustrated focusing on ODD.

When the driver sets the traveling path including the destination of travel and the vehicle starts to travel, the automated driving control unit 10112 determines, in step S400, the automated driving availability condition at the driving automation level 3 on the target road by determination processing to be described below, and sets the available section (ODD) of the automated driving at the driving automation level 3. That is, along the travel of the vehicle, the automated driving control unit 10112 acquires road environment data 85 indicating the environment of the road included in the traveling path such as the LDM, own vehicle information 86 related to the vehicle driven by the driver, and a status indicating whether the driver can perform recovery. Among them, at least the status indicating whether the driver can perform recovery is constantly acquired while the driver uses the automated driving at the driving automation level 3. In step S400, the ODD setting is performed in consideration of the current state based on the self-diagnosis result for the perception, recognition, determination, and control with the performance of the on-board device of the vehicle.

In next step S401, based on the latest self-diagnosis result of the vehicle, the automated driving control unit 10112 determines whether the vehicle can keep traveling in the ODD section, that is, whether the condition that the continuous use of the automated driving at driving automation level 3 is recognized is continuously maintained as ODD. When having determined that the vehicle can keep traveling in the ODD section (step S401, "Yes"), the automated driving control unit 10112 returns to the processing of step S400.

Here, as long as the condition for continuous use of the automated driving at the driving automation level 3 is satisfied, the automated driving permitted by the driving automation level 3 can be continuously used. On the other hand, the use actually allowed for the driving automation level 3 is limited to within a specific time range. Accordingly, when a decrease in driver's consciousness or the like is observed in the determination of step S401, the system cancels the use permission determination of the automated driving of the driving automation level 3 for the driver.

On the other hand, when having determines in step S401 that the vehicle cannot keep traveling in the ODD section when the vehicle keeps traveling on the course (step S401, "No"), the automated driving control unit 10112 proceeds to the processing of step S402.

As a more specific example, when the vehicle directly travels in the course in case where the direct travel of the vehicle would cause a result such as: travel out of the ODD section in which automated driving is applicable; or non-permission of the use of automated driving at driving automation level 3 due to a weather change or a decrease in the driver's wakefulness, that is, in a case where there is a situation change that would cause deviation from the ODD defining the applicability of the use of automated driving at driving automation level 3, the automated driving control unit 10112 determines that the vehicle cannot keep traveling in the ODD section when the vehicle directly travels in the course (step S401, "No"), and proceeds to the processing of step S402.

In step S402, the automated driving control unit 10112 predicts a remaining time until the vehicle reaches the ODD end point based on update information such as the most recently acquired LDM. The automated driving control unit 10112 can notify the driver of the predicted remaining time until the arrival time at the handover completion point.

In the next step S403, the automated driving control unit 10112 explicitly presents to the driver that the corresponding vehicle is outside the ODD, that is, the driver is requested to perform recovery from the automated driving state to the manual-controlled driving state. At the same time, when handover to manual-controlled driving is not normally and smoothly performed, the automated driving control unit 10112 transmits information notifying the outside of the vehicle of a possibility of occurrence of a risk factor that causes sudden deceleration or sudden excessive steering in the driver in the surrounding traveling vehicle.

Furthermore, the automated driving control unit 10112 records the state. This record has a function to encourage the driver to prevent excessive dependence on the automated driving system. The repeated violation and the improper use deviating from ODD conducted by the driver on the automated driving will be regulated depending on the local approval system. Even with no direct experience of an accident due to excessive dependence on the automated driving, the user (driver) of the automated driving receives a direct effect of penalty traced back based on the recorded information as a psychological risk, which will be a factor of a direct change in action toward improvement in the driver.

Whether or not the driver actually performs the recovery action to the manual-controlled driving is not included in the flowchart of FIG. 19A since it is not a sequence directly carried out by the system. The driver who dislikes to fall into the violation state and hopes to avoid receiving financial penalty or the like voluntarily completes the use of the automated driving in the middle of the processing of the flowchart. Accordingly, when the handover request notification is actually made to the driver in step S405 to be described below, the driver performs processing of ending the use of the automated driving to end the series of processing of the flowchart in FIG. 19A (not illustrated).

The processing proceeds to step S404. In step S404, the automated driving control unit 10112 determines before the end of the ODD section whether the margin (for example, time) necessary for handover of the manual-controlled driving is the limit or less. In a case where the automated driving control unit 10112 determines that there is margin for handover and handling of the handover at the present time is unnecessary (step S404, "No"), the processing returns to step S400.

On the other hand, when the automated driving control unit 10112 determines that the margin is the limit or less (step S404, "Yes"), the processing proceeds to step S405. In this case, the vehicle has already entered the section in which the handover to the manual-controlled driving is to be started.

In step S405, the automated driving control unit 10112 presents a notification requesting handover to the manual-controlled driving to the driver, and confirms a responding action of the driver to the notification. In addition, the automated driving control unit 10112 presents a warning related to use outside ODD, where automated driving is permitted, inside and outside the vehicle, and records a progress state.

In next step S406, the automated driving control unit 10112 determines whether completion of an appropriate recovery action to manual-controlled driving by the driver has been confirmed. When having determined that the completion of the recovery action is confirmed (step S406, "Yes"), the automated driving control unit 10112 returns to the processing of step S400.

In contrast, when having determined that the completion of the recovery action is not confirmed (step S406, "No"), the automated driving control unit 10112 proceeds to the processing of step S407. In this case, the recovery action of the driver violates the allowable ODD. In step S407, the automated driving control unit 10112 executes the MRM and records the progress and result of the execution of the MRM. Then, in step S408, as an emergency measure, the control of the vehicle is shifted to the MRM.

In the case of a driver who normally uses automated driving at the driving automation level 3, the driver continuously pays attention ahead of the vehicle for enabling quick recovery in response to the recovery request of the system and maintains the situation awareness necessary for the quick recovery in ordinary cases. Therefore, the driver is expected to quickly perform recovery to manual-controlled driving so as not to be subject to a violation, a penalty, or the like as an action of a person.

Here, advancement of the automated driving assistance system weakens elements acting on the sense of risk of the psychological action other than direct penalties, causing reduction of the sense of risk. As a result, regardless of driving is the automated driving at the driving automation level 3, some careless drivers and the like has a possibility to cause a use case in which the driver fails to perform recovery to the manual-controlled driving regardless of the violation state and the situation proceeds to a state not guaranteed to be handled by the automated driving function. Even in such a use case, it is desirable that the stepwise execution of the MRM is performed in a period that can ensure safety, rather than execution of sudden braking by the MRM. The procedures from step S404 to step 408 described above to the MRM correspond to fallback processing to be conducted when the recovery of the driver to the manual-controlled driving cannot be confirmed from the system.

Figure 19B:
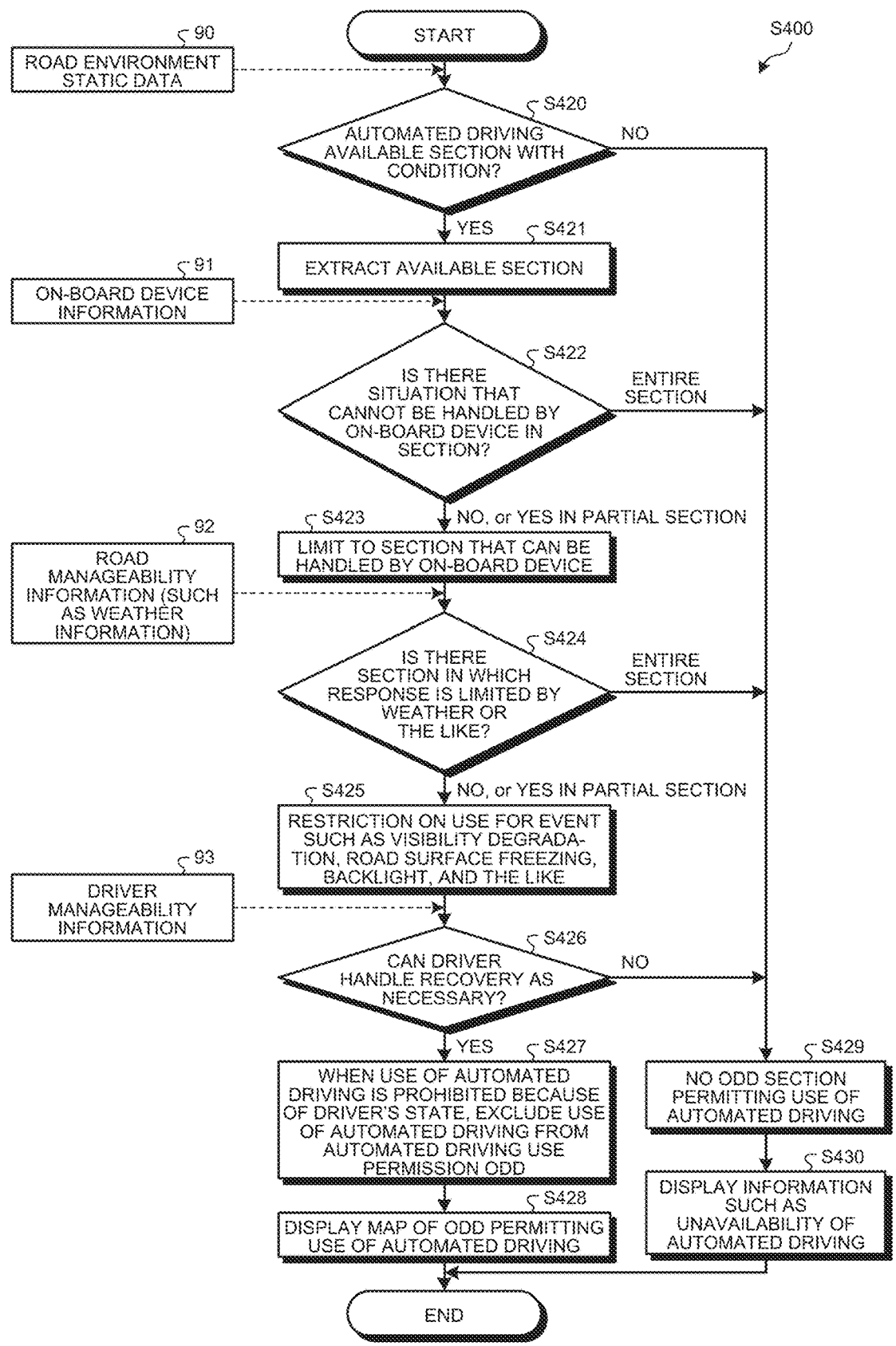
FIG. 19B is a flowchart illustrating an example of ODD setting processing applicable to the embodiment in more detail.

FIG. 19B is a flowchart of an example further specifically illustrating the ODD setting processing example applicable to the embodiment according to step S400 in the flowchart of FIG. 19A described above.

The automated driving control unit 10112 acquires road environment static data 90 such as LDM, and acquires, when possible, the high-freshness update LDM 140. In step S420, the automated driving control unit 10112 determines whether each section included in the road environment static data 90 can be a section where automated driving is available when conditions are satisfied, for example. When having determined that each section does not include a section in which automated driving is available even if conditions are satisfied (step S420, "No"), the automated driving control unit 10112 proceeds to the processing of step S429.

In step S429, the automated driving control unit 10112 determines that there is no section in which the automated driving is available, and in the next step S430, displays that the automated driving is unavailable to the driver. Items to be displayed is not limited thereto, and the automated driving control unit 10112 may display a symbol of the limited support function, a required prediction time to a section where the automated driving can be used, and the like.

After the processing of step S430, the series of processing according to the flowchart of FIG. 19B is completed, and the processing proceeds to step S401 of FIG. 19A.

When having determined in step S420 that there is a section in which the automated driving is available (step S420, "Yes"), the automated driving control unit 10112 proceeds to the processing of step S421. In step S421, for example, from each section included in the road environment static data 90, a section in which automated driving becomes available when conditions are satisfied is extracted as ODD.

The processing proceeds to step S422, and at that time, the automated driving control unit 10112 acquires on-board device information 91 which is information about a device mounted on the vehicle. The on-board device information 91 includes information indicating a handling limit by self-diagnosis that can be detected by the on-board device of the vehicle.

In step S422, based on on-board device information 91, the automated driving control unit 10112 determines whether there is a section that cannot be handled by the on-board device of the vehicle in the section extracted in step S421. When having determined that all the sections extracted in step S421 are sections that cannot be handled by the on-board device of the vehicle (step S422, "All sections"), the automated driving control unit 10112 proceeds to the processing of step S429.

When having determined in step S422 that there is no section that can be handled by the on-board device of the vehicle in the section extracted in step S421 or that there is a section in a part of the section (step S422, "No or Yes in partial section"), the automated driving control unit 10112 proceeds to the processing of step S423. In step S423, the automated driving control unit 10112 limits the ODD to the section extracted in step S421 to the section that can be handled by the on-board device.

The processing proceeds to step S424, and at that time, the automated driving control unit 10112 acquires road manageability information 92 indicating handling capability of the road regarding automated driving based on weather information or the like.

In step S424, based on the road manageability information 92, the automated driving control unit 10112 determines whether there is a section in which handling by the on-board device is restricted due to weather or the like in the section restricted in step S423. When having determined that all the sections restricted in step S423 are sections in which measures by the on-board device are restricted due to weather or the like (step S424, "All sections"), the automated driving control unit 10112 proceeds to the processing of step S429.

When it is determined in step S424 that there is no section in which handling by the on-board device is limited due to weather or the like in the section limited in step S423, or that the section exists in a part of the section (step S424, "No, or Yes in partial section"), the automated driving control unit 10112 proceeds to the processing of step S425. In step S425, the automated driving control unit 10112 adds, to ODD, restrictions on use for an event in which handling by the on-board device are restricted by the weather, for example, visibility degradation, road surface freezing, and backlight.

The processing proceeds to step S426, and at that time, the automated driving control unit 10112 acquires driver manageability information 93 indicating whether the driver can handle recovery from the automated driving to the manual-controlled driving. The driver manageability information 93 is, for example, information based on the state of the driver such as the fatigue level.

In step S426, the automated driving control unit 10112 determines whether the driver can handle recovery to the manual-controlled driving as necessary based on the driver manageability information 93. When having determined that handling is not possible (step S426, "No"), the automated driving control unit 10112 proceeds to the processing of step S429.

When having determined in step S426 that it is possible to handle recovery to manual-controlled driving (step S426, "Yes"), the automated driving control unit 10112 proceeds to the processing of step S427. In step S427, when the use of the automated driving is prohibited because of a driver's state, the automated driving control unit 10112 excludes the use of the automated driving from the automated driving use permission ODD. Examples of the driver's state that causes prohibition of the use of the automated driving include reduction in the wakefulness or the health state, and the drinking.

At this time, because of reduced wakefulness in particular, the driver is likely to have a psychological desire to continue traveling with the assistance of the automated driving. In this case, when the driver with reduced wakefulness due to drinking or drug use is permitted to use certain automated driving of the system in particular, the driver would repeatedly use the system excessively depending on the support function, leading to the reduction of the sense of risk.

This decrease in the sense of risk induces excessive dependence on the automated driving function although the automated driving function is not almighty. This causes the driver to fail in the recovery to manual-controlled driving against the occurrence of an unexpected situation. This result in an automatic shift to the above-described MRM, which may adversely affect the social traffic network and thus is undesirable. That is, this promotes the use having a possibility of disturbing the social order in terms of ergonomics, leading to the need to have such an operation as a preventive measure.

Furthermore, regarding the processing of forcing the shift to step S429 in the determination of step S426 (step S426, "No"), there is a need for the driver to develop a mind that the automated driving function cannot be used depending on the result of handling. Therefore, a determination notification may be further explicitly presented to the driver.

On the other hand, in a situation where the automated driving vehicle is used as an assistance of the movement of the physically handicapped driver or the automated driving vehicle is used in combination with remote assistance, it is conceivable to use a mode in which the driver's recovery to manually-controlled driving is not to be the top priority, such as the case of follow-up traveling assistance by the preceding guidance vehicle or the steering assistance using remote monitoring, instead of easily activating the MRM. Therefore, it is allowable to introduce a control other than those illustrated in FIGS. 19A and 19B.

In next step S428, the automated driving control unit 10112 displays a map of ODD permitting the use of the automated driving, which has been comprehensively determined based on each determination result described above.

After the processing of step S428, a series of processing according to the flowchart of FIG. 19B is completed, and the processing proceeds to step S401 of FIG. 19A.

FIG. 20 is a schematic diagram for more specifically describing a setting example of an ODD section applicable to the embodiment.

In FIG. 20, chart (a) illustrates an example of an automated driving permissible section in an infrastructure, and a predetermined section of a specific expressway is assumed as an example. Chart (b) illustrates an example of an average vehicle speed based on a traffic flow of a vehicle group in the section illustrated in chart (a). In this example, the average vehicle speed in the section from point $U_0$ to point $U_1$ is 90 [km/h]. For example, due to the influence of congestion or the like, the average vehicle speed is decelerated to 60 [km/h] from point $U_1$, and the average vehicle speed increases to 60 [km/h] or more at point $U_2$ due to the relaxation of congestion.

In addition, chart (c) illustrates an example of a section within the performance limit in which the on-board device mounted on the target vehicle can handle in a steady state during the day by determination based on information acquired in advance. Furthermore, chart (d) illustrates an example of a case of going out of an ODD application section.

Here is an example of an assumed case where the use condition of the automated driving function is permitted only at the time of traffic congestion at 60 [km/h] or less defined by law or the like. In this case, the section on the map in which the use of the automated driving function is permitted can be, for example, a certain section of the expressway as illustrated in chart (a). However, the section in which the use of the automated driving is actually permitted is limited to a section (points $U_1$ to $U_2$ in the example of FIG. 20) in which the average vehicle speed of the vehicle group is decreased to 60 [km/h] or less due to occurrence of traffic congestion within the certain section together with the timing.

Furthermore, there may be a section in which safe traveling cannot be expected in automated driving because of conditions such as on-board devices of the vehicle and allowable load weight. Examples of this section include: a section in which use of automated driving is restricted by heavy cargo in a section with a sharp curve; and a section having a possibility of occurrence of false detection of a road boundary due to a deterioration in visibility due to bad weather, flooding of a road, or the like although the automated driving function can be enabled by the system in normal weather.

In the example of FIG. 20, as illustrated in chart (d), the average vehicle speed in the section from point $U_0$ to point $U_1$ in the traffic flow is 90 [km/h], and thus, ODD is not applicable (outside ODD). The average vehicle speed is 60 [km/h] in the section from point $U_1$ to point $U_2$, and thus, ODD is applicable (ODD applicable). Here, visibility at point $U_{11}$, is poor due to weather such as local downpour or snow cover, and thus is defined as an outside ODD section to which ODD is not applicable although it is a section within a handling limit of the on-board device. Therefore, the driver needs to perform recovery from automated driving to manual-controlled driving in a period indicated by hatching starting from point $U_{11}$. For example, when the poor visibility starting from point $U_{11}$ is improved at point $U_{12}$, ODD is then applied, making it possible to perform shift from the manual-controlled driving to the automated driving.

The section to which the ODD is to be applied next is a section still within the section from point $U_1$ to point $U_2$. However, since this ODD is started from point $U_{12}$ which is a start point of the handling limit of the on-board device, the driver needs to perform recovery from the automated driving to the manual-controlled driving in a period indicated by hatching starting from point $U_{13}$. In the example of FIG. 20, it is determined that driving is not permitted due to fatigue of the driver or the like at a point $U_{13}$ at which the vehicle arrives after traveling for a predetermined time from point $U_{12}$. Accordingly, in subsequent sections, ODD is not applied even though it is within the handling limit of the on-board device. On and after this point $U_{13}$, the MRM activation is conceivable.

In this manner, even in a section where the use of the automated driving is permitted by the infrastructure, the ODD condition might change due to various causes such as the travel of the vehicle group, the weather, and the condition of the driver, leading to occurrence of a change in the ODD application range accordingly. Therefore, as described with reference to the flowcharts of FIGS. 19A and 19B, the actual ODD is determined by appropriately setting conditions along with the travel of the vehicle.

Note that the term "ODD" described in the present specification is not necessarily used as a section determined as a design in the industry at the present time. That is, "ODD" in the present specification is used based on the concept of "available section in which automated driving at each driving automation level is allowed as system according to various conditions in respective social circumferences". A similar effect can be obtained even with extended application of this definition in accordance with the application of automated driving of a vehicle implemented in aiming at safe and comfortable use in the society.

In FIGS. 19A, 19B, and 20 described above, the operation of ODD at driving automation level 3 has been described. However, the application of ODD is not limited to this driving automation level 3 or the driving automation level 4. For example, with enhancement in the assistance level, it is considered that a problem equivalent to that described in the driving automation level 3 would occur even at the driving automation level 2. In addition, even with the same vehicle, it is conceivable to going back and forth among different automated driving modes depending on the state of social infrastructure development.

Therefore, what is important is achievement, in system control, the use of automated driving with the driver's action determination mind of maintaining a certain degree of involvement in the request from the system regardless of the driving mode among all the driving automation levels to which the vehicle has transitioned. Therefore, the control sequence for each automated driving mode described in the present embodiment is an exemplary use case, and is not limited thereto.

<3-6. DMS According to Embodiment>

Next, a driver monitoring system (DMS) according to the embodiment will be described.

<3-6-1. Outline of DMS According to Embodiment>

When the automation mode of the vehicle is the driving automation level 3 or the driving automation level 4, the system needs to constantly monitor the capability of the driver.

When the system can no longer continue the scheduled task such as going along a travel route or continuing to travel on a planned traveling path and suddenly switches driving from automated driving to manual-controlled driving, the driver cannot always be ready for the transition to manual-controlled driving. In this case, the driver might panic and have difficulty in achieving situational awareness, causing the system to execute MRM for safety. MRM serves as a fallback function when the transition fails. However, many instances of improper use of MRMs in a social environment can result in unnecessary rear collisions, traffic congestion, and other undesirable and unexpected effects. Therefore, constant monitoring of the driver as described above is required.

When the system requests the driver to perform recovery to manual-controlled driving, the system must be able to make an appropriate determination on the driver's specific abilities in order to maximize the probability that the recovery will occur without difficulty and minimize the probability that the driver will not be able to perform recovery to manual-controlled driving.

On the other hand, in a case where it is difficult for the system to appropriately issue a notification or warning to the driver at an appropriate timing or assist the driver to achieve smooth recovery to manual-controlled driving without difficulty, there is a possibility of reduction in the sense of obligation in the driver to act following the system.

Issuing an early notification to the driver to request for the recovery to the manual-controlled driving can be interpreted that there is enough time before the timing to perform recovery, and it is not necessary to immediately start the recovery procedure. On the other hand, delayed notification to the driver can be interpreted as an increased risk to cause a failure in performing the recovery, and this further leads to a result that the driver imposes responsibility on the system because the cause of the failure of the transition is the delayed notification from the system.

From the viewpoint of behavioral psychology, humans are inherently self-centered or self-indulgent. Therefore, without the notification or alert issued from the system at an appropriate timing, the driver would no high sense of risk for the notification from the system when using the automated driving. Therefore, in actual handover to the manual-controlled driving, there is a risk that the importance of starting the handover is not recognized by the driver until the handover limit is reached, and then the limit point of the handover is reached with the lowered situation awareness including the surrounding situation confirmation and the like required before the start of the manual-controlled driving.

That is, when the driver prioritizes recovery to the requested manual-controlled driving, it is possible that the system performs MRM when the driver is frequently unable to complete the perform recovery to manual-controlled driving in time before the system starts MRM. Whether the driver accepts this possibility is determined based on the driver's choice and intention.

However, such a fallback process is not a solution to the problem from the viewpoint of social activity since it is likely to induce a new problem in social activity. For example, in a case where a vehicle is on a road under construction in one lane such as a road point on which a car accident is being dealt with, execution of vehicle control by MRM would cause a risk of completely blocking the traffic. Since no one has the right to interfere with social activities or drive others into critical situations, social benefits outweigh individual preferences and/or satisfaction.

As a solution for avoiding such a negative aspect of the automation in the automated driving system, there is a method of encouraging the driver to have a higher degree of sense of involvement depending on the situation.

However, how to increase the degree of sense of involvement in the driver and how the system correctly recognizes the state transition necessary to start handover to manual-controlled driving is a challenge. When the system requests the driver to perform recovery to manual-controlled driving, it is necessary for the driver to appropriately and spontaneously perform recovery to the manual-controlled driving without delay. To achieve this, it is effective that the system provides the driver with control corresponding to benefit for an appropriate recovery action by the driver, while imposing a penalty on the driver to prompt the change in the action of the driver in a case where the driver did not take early or quick recovery action, or in a case where the driver has taken an action of violation.

However, it is difficult to observe the psychological state in the brain of the driver who is driving the vehicle with a practical device. For example, use of a head-mounted optical topography observation device such as a headgear that observes cerebral blood flow, a brain blood flow table device such as functional Near-Infrared Spectroscopy (fNIR), and a large-scale medical device such as functional Magnetic Resonance Imaging (fMRI) enables direct visualizing the driver's local thinking activity in the brain in a laboratory or the like. However, there is no known art capable of observing the brain state without restraining the driver in the vehicle. Therefore, direct measurement of driver's thinking activity of is not practical.

On the other hand, by observing the movement responsive to the thinking activity and analyzing and evaluating the behavior, it is possible to estimate the activity situation in the brain to a certain extent from the observed physical behavior of the driver. By appropriately analyzing the measurement result, a lot of clues that can be regarded as responses of thinking activities can be obtained, leading to acquisition of a probability that the driver appropriately follows the instruction within a predetermined time frame. By quantifying the activity of the driver as described above, it is possible to estimate the driver's response to various instructions such as a prior notification, a recovery request, an alarm, and a confirmation request from the system, enabling implementation of a method of giving an appropriate reward and penalty to the driver, leading to encouragement of voluntary participation of the driver.

That is, because of the benefit for the execution of the appropriate recovery handling according to the request from the system, the driver is expected to suppress excessive use of automated driving while enjoying the comfort of the automated driving. This makes it possible to eliminate the harm that is concerned when the automated driving function is widely introduced in society.

The embodiment of the present disclosure proposes a driver monitoring system (DMS) as a technology for quantifying "Quality of Action" together with a plurality of assumed examples of enabling acquisition of a driver-related parameter group, which is a group of parameters related to the driver. Hereinafter, the "quality of action" will be referred to as "QoA" in some cases.

<3-6-2. More Specific Description of DMS According to Embodiment>

Next, a DMS according to the embodiment will be described more specifically.

The DMS according to the embodiment has the following two targets to be calculated and monitored.

(1) Estimated Time Required for Driver to Return to Appropriate Driving Posture

The DMS according to the embodiment calculates an estimated required time allocation required for the driver to return from the current attitude to an appropriate and safe driving posture. Monitoring targets therefor include, but are not limited to, deviations derived from movements in head, hand, eye, and posture in conscious or unconscious non-driving actions of the driver. In addition, the DMS according to the embodiment estimates real-time deviation of the driver from the driving posture determined to be appropriate by the driver.

(2) Preparation Level at which Driver can Perform Handover of Driving Tasks Fully from Automated Driving to Manual-Controlled Driving The DMS according to the embodiment monitors a certain level of consciousness of mind and physical state necessary for the recovery to manual-controlled driving before the vehicle reaches the boundary of the permitted ODD, regardless of whether it is the boundary of the road section of the driving automation level 3 or the boundary of the road section where the automated driving by the driving automation level 4 is possible (which is dynamically applicable).

When the system is capable of continuing automated driving without driver's intervention, the driver can greatly benefit from automated driving in a particular road section. On the other hand, such a road section is limited to a certain section of a road where traffic information is dynamically monitored and update information can be provided in advance to vehicles approaching the road section. In such a section, when there is an immediate intervention request requesting the driver to perform recovery to manual-controlled driving as a fallback, the driver is not required to perform completely responsive action. In a road section in such a special situation, a driver of a specific vehicle having ability can enjoy automated driving at driving automation level 4.

However, the above-described road section defined for each driving automation level by ODD is not stationary but continues to change with time. There are an extremely large number of factors for the change in conditions for determining ODD for automated driving at driving automation level 3 and ODD for automated driving at driving automation level 4 of the vehicle.

For example, there may be a case where, at the time point where the driver starts from the departure point, the specific road section is the ODD in which the automated driving at the driving automation level 4 is possible, but an event such as a large amount of snow in the road section occurring with the lapse of time makes it difficult for the vehicle system to manage such a situation. In such a case, the system may change the driving automation level permitted for the road section from driving automation level 4 to driving automation level 3 or even lower driving automation level.

In such a case, the system needs to be able to predict the readiness of the driver and predict the time required for the driver to perform recovery to the driving attitude so that the response of the driver to the recovery request for recovery from the automated driving to the manual control is to be made in time before the vehicle reaches the boundary of the road section permitting the automated driving of the changed and updated driving automation level 4.

It is also expected that the sensitivity or threshold of the driver attention index required to issue a warning to the driver will also need to be adjusted depending on the environmental conditions (including risk factors or personalized controls).

Meanwhile, when the driver can perform recovery to the manual-controlled driving, automated driving at the driving automation level 3 can be used in some sections of the road, and these sections can be set as specific ODD sections to which automated driving at the driving automation level 3 is applicable. Furthermore, in some sections of other roads in which the system can predict the planned route driving operation task of continuing the planned traveling without intervention of the driver, automated driving at driving automation level 4 is possible. The system can extend this interval to a predictable range, and a specific ODD to which automated driving at the driving automation level 4 is applicable is newly set to this section.

In any driving automation level of automated driving, the road section specifying ODD is dynamically specified. The road section always changes over time because it is extremely difficult to control the external environment of the vehicle or the entire performance of the system function of the vehicle system itself.

While MRM is considered to be a safe fallback in current automated driving systems, it is not suitable and in fact not practical as a fallback when used in certain situations (for example, construction, specific weather conditions, unexpected or unpredicted behavior of nearby vehicles, etc.). Without minimizing the use of large-scale MRM, various events that greatly reduce social activities occur, such as traffic congestion, rear collision, and obstruction of vehicles on roads, having an increased social impact depending on the traffic situation. From such a social point of view, it is highly required in automated driving that the driver finds a measure using MRM at least not excessively as much as possible.

Therefore, it is extremely important to constantly monitor the driver. That is, the driver needs to be able to perform recovery to manual-controlled driving at a prior timing with respect to an appropriate time that can be estimated and determined from the extreme time point that triggers the use of the MRM.

The time required for recovery to manual-controlled driving varies depending on the initial state of the driver at the time point of notification of the recovery request by the system. Alternatively, if the system senses that the level of attention sought by the driver is not sufficient, it must decide to stop immediately, regardless of the driving automation level.

From this viewpoint, the system that controls the automated driving estimates a sign indicating a decrease in the ability of the driver to perform recovery to the manual-controlled driving by collecting action of the driver and using the action characteristics peculiar to the driver obtained by the learning of the actions so that the driver can perform recovery to the manual-controlled driving in response to the recovery request of the manual-controlled driving, and then estimates the time required for recovery to the manual-controlled driving based on the detected situation. When the budget balance between the estimated time and the time until the MRM is activated is established, the system can determine whether to notify, request intervention, or issue a warning depending on the situation.

To maximize safety levels at driving automation level 3 and driving automation level 4, the system needs to ensure that the driver maintains a certain level of preparation/attention so that the driver can continue safe and calm driving tasks as appropriate when safe driving is required, without depending on MRM. In addition, when the driver is notified of the request to perform recovery to the manual-controlled driving, the analysis of the driver's action for obtaining situation awareness for action determination necessary for near future prediction until the handover is started with calmness about the request to perform recovery is also a determination factor for the system to notify the request to perform recovery.

The intention behind this hypothesis is that the driver can always be supported by the function of fallback, and if not possible, the MRM feature can completely stop the vehicle in an emergency when it is difficult for the driver to timely resume manual-controlled driving before reaching the ODD boundary. Therefore, the system must be able to accurately detect the level of attention and the level of preparedness of the driver when making an intervention request to the driver.

In this manner, the ODD defining the automated driving of a particular driving automation level needs to take into account the driver's estimated ability to respond to the intervening request and the credibility score history of the recovery collected based on the driver's past use of automated driving.

In addition to existing ODD factors such as road condition to destination, vehicle performance, load dynamics, etc., the system may allow the driver to take advantage of automated driving at driving automation level 4 of the system once the system is able to predict that the vehicle is currently traveling on a road section that has sufficient minimum required information to continue traveling without driver intervention for the time being. Alternatively, in a case where the performance of the driving automation level is deteriorated due to an insect strike on the front view camera, and it is necessary to shift to the automated driving at the driving automation level 3 until the automated cleaning is completely finished, or in a case where the automated cleaning requires a long time, it may be difficult for the driver to wait while maintaining attention. In this case, it is necessary to set again to completely return to the manual-controlled driving.

In the problem of how the driver should interact with the automated driving system in response to the changing ODD, it is important that the automated driving system continues to properly track the driver's performance from various perspectives. This is to confirm that the driver is still able to resume manual-controlled driving. In addition, the system can predict a delay that can occur until the driver completes the transition without any trouble at a success rate being the target value or more without switching to the MRM mode from the time point when the driver is notified of the request for recovery from the automated driving to the manual-controlled driving.

To enable this method, the system needs to always monitor (a) the driver's mental readiness and (b) estimated time required for the driver to return to the driving position.

These are all specific to the driver. In the case of the driver who uses the automated driving for the first time, the system uniformly gives the use permission to the driver in accordance with, for example, the action over a certain period of time of the driver taking a long time from the time obtained from the action evaluation of the newly used driver statistically evaluated. That is, the system first learns the behavior characteristic of the specific driver by an offline method based on recovery observation evaluation data regarding the driver. The system uses the dictionary generated from the repetition, obtains the recognized recovery characteristic of the driver by real-time analysis for the behavior observation of the driver, and estimates the wakefulness of the driver each time.

The need for the driver to hold attentiveness and readiness depends on whether predictive information is available from the infrastructure or whether the embedded system is self-navigable and able to predict road safety. By using the above-described time required for the recovery by the system for the recovery notification, the warning process and the fallback process are determined in a timely manner, and some time margin required until the system starts the MRM is always ensured.

More importantly, the system is to be also adapted to the online method by constantly monitoring the driver's behavior and parameterizing and storing the data. The prior notification action monitoring that monitors the driver's action in response to prior notification to the driver can capture trends and characteristics that correlate to different levels of quality of action (QoA) required for the process of recovery to manual-controlled driving.

The reason why the operation related to the individual-specific action characteristic of the driver is performed in the online method using the latest learning dictionary without depending on the off-line outside the vehicle is that the action characteristic of a human is likely to fluctuate depending on the fatigue or physical condition at that time, and execution of action analysis uniformly depending on the dictionary generated by off-line learning would result in a failure in correcting offset such as the physical condition fluctuation.

Methods and techniques available for accurately modeling and estimating the ability of a driver regarding handover of driving and manual control have not been identified at present time. However, by modeling and predicting the driver's recovery process and feasible recovery level, a plurality of different approaches can be used to reliably provide the driver's readiness, awareness status, and responsiveness that are essential for the driver to smoothly transition from automated driving to manual-controlled driving.

When the repeated use of the automated driving is continued, it is possible to acquire the evaluation value for the action quality according to the action of the driver, leading to clarification of the handover request notification that occurs thereafter and the execution by the driver with respect to the handover request notification. This results in acquisition of the high/low qualities of the action are obtained as a set, leading to repetition of rapid self-learning in a learning device.

The ability to predict the readiness of the driver helps to achieve high-quality transition between different driving automation levels. This enables the driver to be away from the driving task for a long time, and the driver to have a further distance from the driving position. This eliminates necessity of simply monitoring of the driver's facial features and eye states, which is an existing method for detecting the wakefulness level and the fatigue level. By monitoring the operation of the driver by posture tracking, the system can determine whether the driver can resume manual-controlled driving and accumulate many parameters for accurately estimating the time required to return to the driving position and posture suitable for safe driving.

<3-6-3. Quantification of Quality of Action (QoA) According to Embodiment>

In order to quantify "Quality of Activity" as an index, the present disclosure proposes the following items.

(Item #1)
By directly sensing the following points by the DMS according to the embodiment, the driver's readiness is constantly monitored.

For the physical characteristics of the driver, the following are monitored:
(1) Three-dimensional (3D) human body (joint position and posture) and head posture (position and orientation)
(2) Motion of 3D human body and head within time period T
(3) Monitoring eye conditions and facial gestures
(4) Line-of-sight direction for driving task The behavior of the driver is monitored as follows.
(1) Response to system warnings and interventions
(2) Driver behavior in driving task (manual-controlled driving mode) and non-driving task (automated driving mode)

Based on the extracted characteristics of the driver and the behavior of the driver, the wakefulness level and attentiveness of the driver, and any pathological change are monitored.

(Item #2)
By the DMS according to the embodiment, in consideration of input information regarding the current position of the driver, the movement (action) of the driver, and the situation outside the vehicle (ODD and weather situation), the driver is monitored to estimate the time required for the driver to return to the driving position.

From the viewpoint of the driver, there is a need to give some reward to the driver for the action of following the notification for requesting the resumption of the manual-controlled driving smoothly and quickly with high accuracy. Similarly to many actions of daily activity, it is very important to visualize validity for the recovery process. Accordingly, the visual and auditory feedback to the driver and/or the feedback by the tactile information has an effect in learning and motivates the driver to improve the recovery performance.

This feedback loop is greatly related to the development of human natural movement when using the automated driving function. The multi-level penalty imposed by the delay of the message feedback, as well as the evaluation of the high-performance satisfactory driver for the response to the high-accuracy driving transition, on the other side, cause the driver to learn little by little so as to increase the driver's awareness about the advantage of promptly requesting the prior notification or the notification, not because of penalty or deprivation of an opportunity to use automated driving due to the driver's low recovery performance.

(Item #3)
The data collected by the sensing system of the DMS according to embodiments is parameterized and transformed into operational values corresponding to different types of operations/movements in the vehicle as a QoA index (quantification of recovery quality performance).

An intermediate analysis of the movement corresponding to the correction of the body movement recovery to the driving position gives a high score in consideration of the speed in correcting the movement in addition to the evaluation of the initial state.

Assumable examples of the QoA index described above include the following.
(1) A recovery index, which can be evaluated by an orientation vector of feet/legs movement.

For example, when the initial position of the driver's foot is away from the pedal while engaged in driving at driving automation level 4, it is necessary to estimate the time required for the driver to return the foot to the natural position used for normal driving of the driver. When evaluating the speed, not only the physical speed but also how quickly and accurately the driver can return the foot to the appropriate position is also evaluated. At this time, since the behavioral habit differs depending on the driver, the detected recovery procedure flow is provided to the learning function so as to be combined with the delay time in a case where handover is successful.
  (2) A posture-recovery index to evaluate a body recovery from a non-driving position on a backrest.
  (3) The three-dimensional position of hands relative to the steering is tracked to estimate the degree of separation of the hands from the steering. At this time, it is possible to estimate whether both hands or one hand are free or busy.

The advantage of converting the raw data obtained as described above into an index characterizing the recovery performance depending on the recovery phase of manual-controlled driving is that the system is capable of immediately performing a visual feedback, to the driver, of the fact that the system is accurately tracking the recovery performance and that the driver's movements are classified according to the actual performance. Note that this actual performance will have a direct impact on the permission level at which the system subsequently switches back to the driving automation level.

In the driving engagement behavior, excessive dependence on automated driving and low quality of recovery are prohibited or suppressed. Such a "visual feedback" directly works on the memory of the human brain, and is prioritized in the driver's working memory according to a difference in critical level determined by an index of an inappropriate recovery operation or a timely appropriate recovery operation.

The novel features according to the embodiment of the present disclosure are as follows.
  (1) The dynamic action of the driver in the recovery procedure is quantified by a quantification method and a parameterization method, and the result of the recovery event is directly correlated with a driver recovery performance each time a request to intervene (RTI) event occurs.
  (2) In addition, additional timely feedback of the detected and quantified quality of action is provided to the driver by a visual method that directly works on the visual cortex of the brain. With this operation, when the system has detected that the recovery process is inappropriate, the system prompts the driver to give top priority to the recovery task at any time. This can be achieved because of a visual indication that a penalty is imposed when the delay cannot be recovered within an appropriate time.
  (3) One advantage, obtained as a secondary effect of the repeated feedback for each event, is that the driver who has performed self-learning using the procedure intuitively will positively take the recovery action. At this time, with a high possibility that the feedback provides erroneous information, self-learning would not be normally performed. Therefore, there is a need to accurately and appropriately provide the feedback according to the performance of each driver. This adaptation processing is implemented by the following personalization processing and learning functions embedded in the system.
  (4) The self-learning method is not a method of learning by forcing a necessary operation, but is a method of unconsciously performing the learning by repeating use by using the analysis type described herein as an example, in accordance with a reward for a driver's attempt to quickly and satisfactorily perform the recovery processing, a penalty or the like imposed on a driver's inappropriate recovery processing, and the like.

(Item #4)

Driver identification and personalization—driver monitoring system is adapted to a specific person (specific driver). This is a necessary process because the monitored features and parameters vary more greatly from person to person.

The state of the driver greatly varies depending on the ethnicity, age, personal habit, body structure, gender, and the like of the driver. Therefore, for example, eye condition monitoring needs to be varied according to a person. Similarly, depending on the physique and the position of the camera, the monitoring system must be customizable to the characteristics of the driver.

In some case of customization processing, it is only necessary for the driver to perform, as personalization, adjustment and setting the way the driver feels comfortable, such as setting of the height of the position of the driver's seat and adjustment of the orientation of the rear view mirror. In contrast, the customization processing according to the embodiment is processing in which the system observes the action of the driver through repetitive use, calculates the recovery time distribution by learning based observation result data, and determines the prior notification and the notification timing necessary for achieving the target RRR. That is, the customization processing according to the embodiment is processing performed by the system through use observation for the driver, and is not the processing of performing settings according to the preference of the driver.

At this time, it is useful that some setting values are adjusted to add an offset in order to ensure safety in a commercial vehicle such as a large ridesharing vehicle, and the handover request notification is issued earlier than the system schedule notification.

Furthermore, for a driver or the like having memory impairment, it is also allowable to further add an auxiliary notification function such as prior notification or re-notification regarding notification such as a recovery request.

The system needs to have an ability to achieve adjustment (adaptation) by training the new driver.
  (1) The process of learning a part of a pipeline includes a process of acquiring reference data when driver information is captured in the system for the first time.
  (2) A general (average) model is determined based on a plurality of drivers and their behaviors. At this time, the model may include a plurality of base models.
  (3) Based on the sensed data from each sensor and the driver's context, a database of drivers is built, transformed and tailored for new drivers.
  (4) Adaptation and adjustment in real time conducted to allow the system to be adapted to new case scenarios and changes in the driver. Examples of adaptation include adjustment of a sensing system, adjustment to a new case scenario, or the like.

(Item #5)

A defined driver model including n-dimensional data groups correlated to case scenarios and a specific ODD is introduced. The driver model includes a head and face model with 3D data adapted to more accurately extract head and face features. Furthermore, the high-level driver model definition is parameterized into a group of descriptors of the driver regarding the body shape, the body structure, the behavior, and the like.

Driver identification by a face authentication method using depth information and luminance information of a 3D sensing technology is performed. Using the depth information and the luminance information, a 3D model of the driver's head and face is generated, and the model can be adapted to the driver in accordance with the input of the depth information and the luminance information. As a result, a 3D mesh model of the driver can be obtained with a limited number of control points. This makes it possible to perform high-accuracy detection of the state of the face gesture and the eye due to the rigid body transformation (head position) and the non-rigid body deformation.

Head position and orientation alignment for whole body skeleton tracking plays an important assisting role in driver motion monitoring, which is used to evaluate driver behavior against expected behavior in known ODD.

A situation in which it is necessary to dynamically change the expected ODD according to the weather, a malfunction of the on-board device, other situations to be notified to the driver, and the reaction of the driver to the notification, is useful in improving the estimation processing of the system of estimating the "situation awareness" level of the driver. Here, the "situation awareness" of the driver includes, for example, recognition that there is a vehicle in a dynamically changed new state, indicating that manual-controlled driving needs to be resumed in a state different from a state agreed upon and approved by the driver before starting the automated driving mode. In addition, for example, by the driver pointing to a notification menu or a destination on the information panel, the system can detect that the driver has received the notification.

<3-6-4. Configuration Applicable to DMS According to Embodiment>

Figure 21:
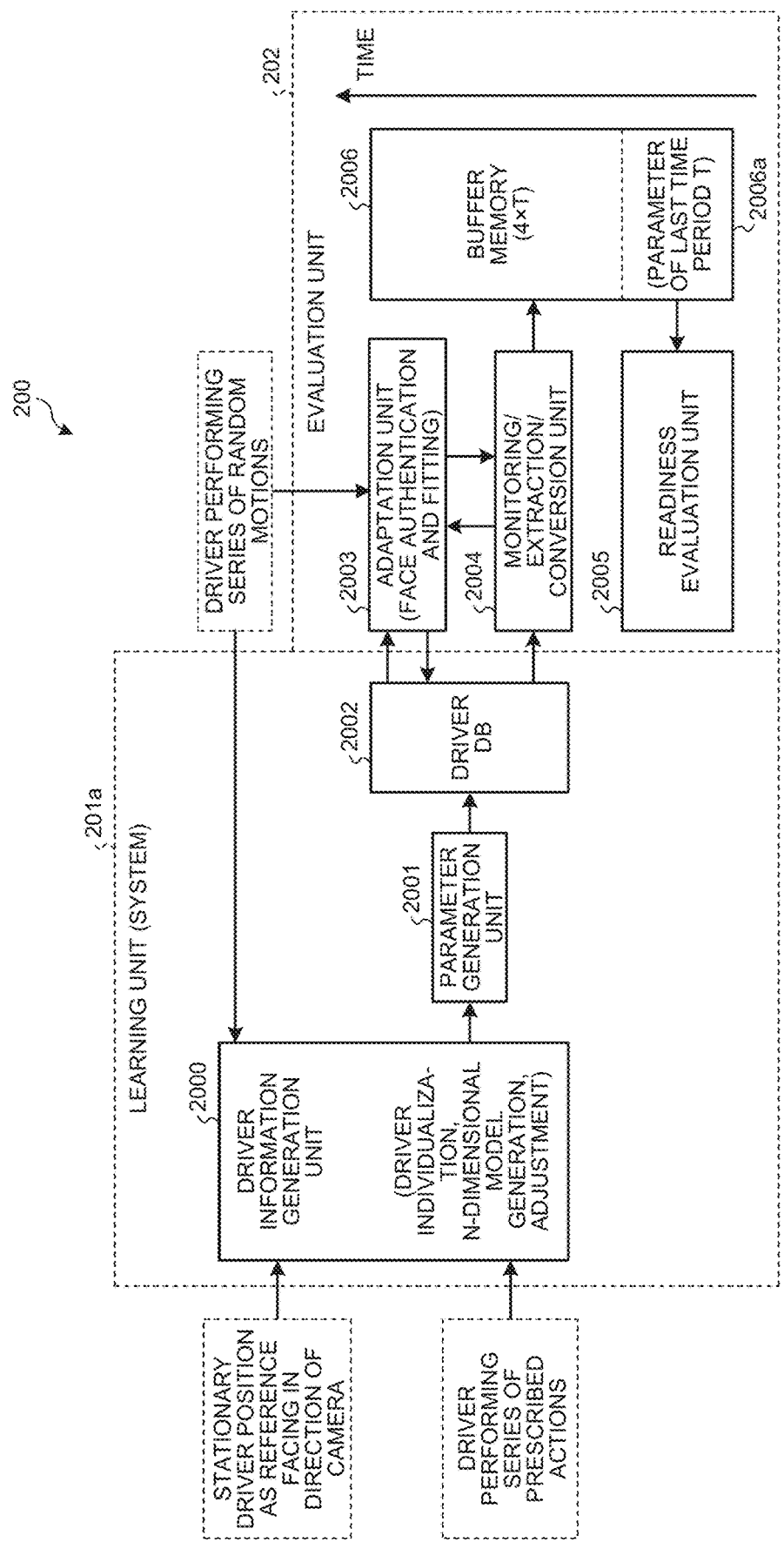
FIG. 21 is a functional block diagram of an example for illustrating functions of a driver action evaluation unit applicable to the DMS according to the embodiment.

Next, a configuration applicable to the DMS according to the embodiment will be described. FIG. 21 is a functional block diagram of an example for illustrating functions of a driver action evaluation unit 200 applicable to the DMS according to the embodiment. The driver action evaluation unit 200 illustrated in FIG. 21 is included in an automated driving system of the vehicle such as the automated driving control unit 10112.

In FIG. 21, the driver action evaluation unit 200 includes a learning unit 201a and an evaluation unit 202. For example, the learning unit 201a learns and parameterizes characteristics and actions of a specific driver, and stores parameterized driver information in a database. The evaluation unit 202 acquires a corresponding parameter with reference to a database based on information obtained by monitoring the driver in the vehicle by various sensors, and obtains the quality of the action of the driver based on the acquired parameter.

First, the learning unit 201a will be described. In FIG. 21, the learning unit 201a includes a driver information generation unit 2000, a parameter generation unit 2001, and driver database (DB) 2002.

The driver information generation unit 2000 receives input of static information and dynamic information related to the driver. The static information input to the driver information generation unit 2000 is, for example, a captured image (referred to as a reference image) acquired by capturing an image of the head, face, and body of the driver at a fixed reference position facing the direction of the in-vehicle camera with the in-vehicle camera. On the other hand, the dynamic information input to the driver information generation unit 2000 is a captured image (referred to as a motion image) acquired by capturing an image of the driver who performs a prescribed series of motions with the in-vehicle camera.

In the embodiment, since a ToF camera and a stereo camera are provided as the in-vehicle camera, the reference image and the motion image can be acquired as information having depth information.

The driver information generation unit 2000 extracts a feature of the head or the face from each of the input reference image and the motion image, individualizes the driver based on the extracted feature, and generates individualized driver information. In addition, the driver information generation unit 2000 generates an N-dimensional model of the driver based on the reference image and the motion image. The driver information generation unit 2000 further adjusts each piece of generated information to reduce the dimension of the information.

The parameter generation unit 2001 generates a parameter based on each piece of information generated by the driver information generation unit 2000, and parameterizes the driver. The parameter of the driver generated by the parameter generation unit is stored in the driver DB 2002.

Next, the evaluation unit 202 will be described. In FIG. 21, the evaluation unit 202 includes an adaptation unit 2003, a monitoring/extraction/conversion unit 2004, a readiness evaluation unit 2005, and buffer memory 2006.

The adaptation unit 2003 receives an input of a captured image obtained by capturing an image of a driver who performs a series of random motions by an in-vehicle camera. The driver who performs this series of random motions is, for example, a driver who is driving the vehicle. This captured image is also delivered to the driver information generation unit 2000. The driver information generation unit 2000 further performs driver individualization and N-dimensional model generation using the captured image. The parameter generation unit 2001 parameterizes the N-dimensional model generated using the captured image, and adds the generated parameter to the driver DB 2002.

The adaptation unit 2003 performs face authentication with reference to the driver DB 2002 based on 3D information generated from the input captured image to identify the driver. In addition, the adaptation unit 2003 passes the fitted 3D model to the monitoring/extraction/conversion unit 2004 based on the 3D information by the adaptation unit 2003.

The monitoring/extraction/conversion unit 2004 refers to the driver DB 2002 based on the 3D model delivered from the adaptation unit 2003, and extracts a parameter from the 3D data. The monitoring/extraction/conversion unit 2004 converts the extracted parameter into a format used by the readiness evaluation unit 2005 and stores the converted parameter in the buffer memory 2006.

In FIG. 21, the arrow on the right side of the buffer memory 2006 indicates the transition of time inside the buffer memory 2006, specifically indicating that the lower end side in the drawing corresponds to a newer (stored latest) parameter. The processing in the evaluation unit 202 is updated every predetermined time period T, for example, and the parameter stored in the buffer memory 2006 is sequentially moved to an earlier time region (upper side in the drawing) for each unit of time period T. In this example, the buffer memory 2006 has a capacity corresponding to four units of the time period T. When the capacity is filled by a new parameter being input, for example, the parameter stored earliest is discarded.

A region 2006a schematically illustrates the last parameter, that is, the parameter latest stored at time period T. The readiness evaluation unit 2005 evaluates the preparation state of the driver based on the parameters stored in the region 2006 a. This readiness is the driver's state of readiness for a recovery operation from automated driving to manual-controlled driving, for example, when the driving mode of the vehicle is switched from the automated driving mode to the manual-controlled driving mode. As described above, the evaluation value indicating this evaluation is added or deducted for each driver, and serves as an index of a reward or a penalty for the driver.

Although the learning unit 201a illustrated in FIG. 21 is formed in the system, that is, in the automated driving control unit 10112, this is not limited to this example. That is, the function of the learning unit 201a may be implemented outside the system, that is, offline.

Figure 22:
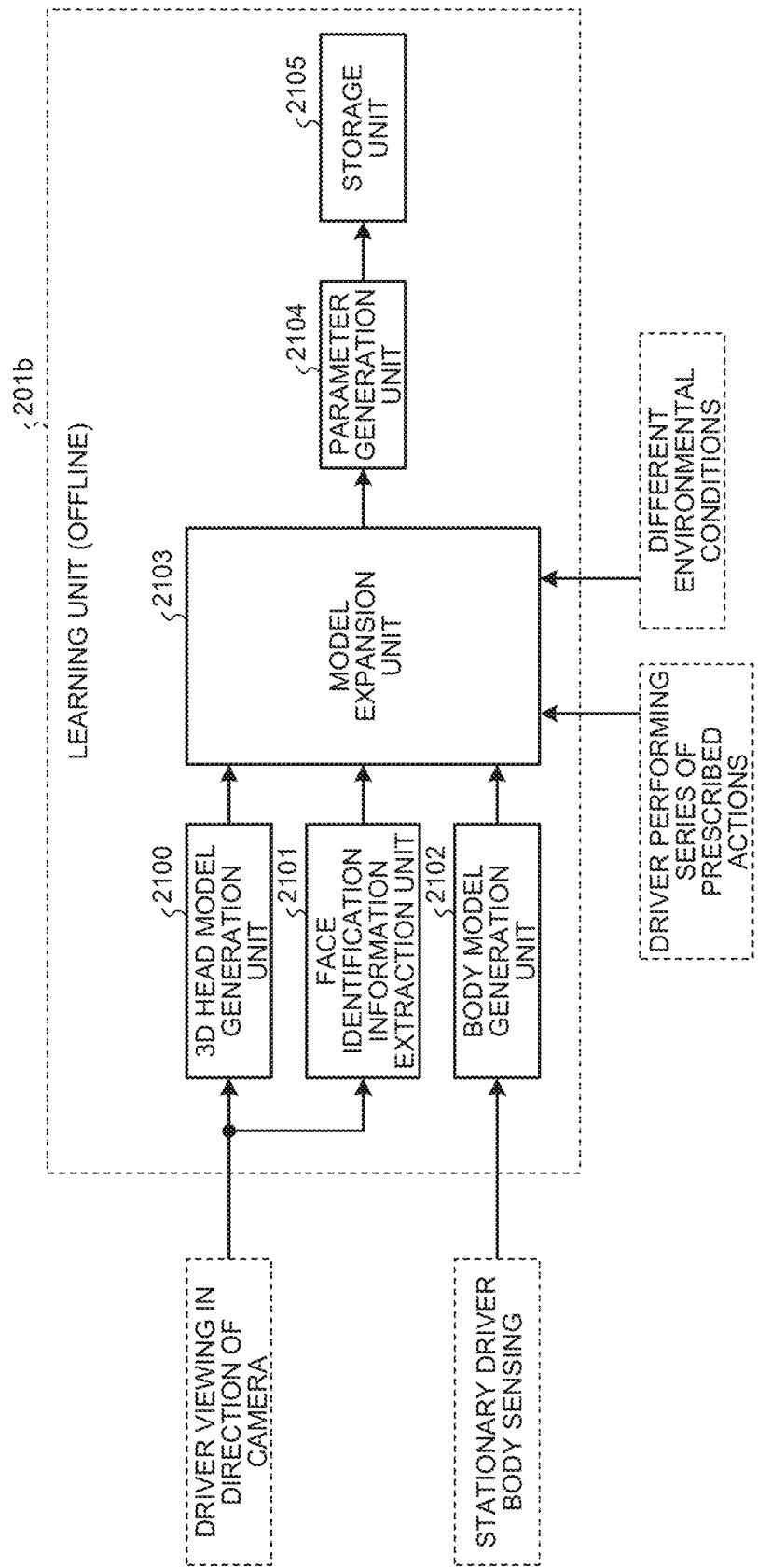
FIG. 22 is a functional block diagram of an example for illustrating functions of a learning unit configured offline applicable to the embodiment.

FIG. 22 is a functional block diagram of an example for illustrating functions of a learning unit configured offline applicable to the embodiment. In FIG. 22, a learning unit 201b includes a 3D head model generation unit 2100, a face identification information extraction unit 2101, a body model generation unit 2102, a model expansion unit 2103, a parameter generation unit 2104, and a storage unit 2105.

Each of the 3D head model generation unit 2100 and the face identification information extraction unit 2101 receives an input of captured image obtained by capturing, with an in-vehicle camera, an image of the driver looking in the direction of the in-vehicle camera. The 3D head model generation unit 2100 generates a 3D model of the head of the driver based on the input captured image. The generated 3D model is passed to the model expansion unit 2103. In addition, the face identification information extraction unit 2101 extracts face identification information for identifying the face of the driver from the input captured image. For example, the face identification information extraction unit 2101 extracts a feature from the input captured image to specify the face, and acquires face identification information based on the feature related to the specified face. The acquired face identification information is passed to the model expansion unit 2103.

Stationary body sensing information of the driver is input to the body model generation unit 2102. Here, as the body sensing information, for example, it is possible to apply a captured image obtained by capturing a driver with a stationary posture by a camera in a certain direction. The body model generation unit 2102 generates a body model of the driver (for example, a body model based on 3D information) based on the input body sensing information. The generated body model is passed to the model expansion unit 2103.

The model expansion unit 2103 further receives an input of captured image obtained by capturing an image of a driver who performs a prescribed series of operations with the in-vehicle camera and information indicating different environmental conditions. The model expansion unit 2103 expands the head model and the body model of the driver into an N-dimensional model based on each input information. Furthermore, the model expansion unit 2103 individualizes and customizes the expanded N-dimensional model, and passes the model to the parameter generation unit 2104.

The parameter generation unit 2104 parameterizes the N-dimensional model passed from the model expansion unit 2103 and stores the generated parameter in the storage unit 2105. The parameters stored in the storage unit 2105 can be used as initial data of the driver DB 2002 illustrated in FIG. 21, for example.

Generation of a 3D head model applicable to the learning units 201a and 201b described above will be schematically described. FIG. 23A is a schematic diagram for schematically illustrating generation of a 3D head model applicable to the embodiment.

As illustrated in chart (a) of FIG. 23A, by using information of a plurality of different types of drivers and with reference to a driver head model DB 2200 being a database of head models of a specific driver and a general head model 2201, a 3D head model generation process 220 generates a head mesh model 2202 of the driver. The head mesh model 2202 generated in the 3D head model generation process 220 includes 3D+1D information. The 3D information is three-dimensional information in a three-dimensional space, while the 1D information is time-dimensional information. That is, the head mesh model 2202 is obtained by adding time information to a head model based on 3D information.

Chart (b) in FIG. 23A is a schematic diagram more specifically illustrating the head mesh model 2202. A model 2210 illustrates an example in which the 3D mesh is applied to a face image, while a model 2211 illustrates an example in which the face image is removed from the model 2210 to leave the 3D mesh alone. As illustrated in the model 2211, the 3D head model generation process 220 determines 3D control points (illustrated with stars) 2212a, 2212b, 2212c . . . to generate a 3D deformable head model adaptable to different people and their facial expressions and characteristics.

Generation of a body model applicable to the learning units 201a and 201b described above will be schematically described. FIG. 23B is a schematic diagram for schematically illustrating generation of a body model applicable to the embodiment.

As illustrated in chart (a) of FIG. 23B, in A 3D body model generation processing 230, the body model 2302 of the driver is generated by using information of a plurality of different types of drivers and by referring to the driver body model DB 2300 which is a database of body models of a specific driver and the general body model 2301. The body model 2302 generated in the 3D body model generation processing 230 has 3D+1D information similarly to the head mesh model 2202 described above. That is, the body model 2302 is obtained by adding time information to the body model.

Chart (b) in FIG. 23B is a schematic diagram more specifically illustrating the body model. A model 2310 represents an example of determining 3D control points 2311a, 2311b, 2311c, . . . at the body's primary joints, at the body's critical locations (head, chest center, waist) using a skeletal model (skeleton). Using these 3D control points 2311a, 2311b, 2311c, . . . , a 3D deformable head model that is adaptable to different people and their physical gestures and features are generated.

A model 2320 in chart (b) of FIG. 23B schematically represents a state in which a driver is seated on the driver's seat of the vehicle. In this case, for example, by examining the angle of the upper body centered on a waist position 2312 based on the positional relationship between a steering wheel 2321 and the model 2320, it is possible to determine whether the driver is in a state of being able to perform recovery to manual-controlled driving. The example of FIG. 23B indicates that the angle is angle α and the driver's seat is at a reclining position (non-driving position), making it possible to determine that it is difficult to perform an immediate recovery. On the other hand, when the angle is the angle β, it can be determined that the reclining position of the driver's seat is canceled and the driver's seat is back to the driving position, making it possible to determine that the driver can perform immediate recovery to the driving position. Note that this determination method is an example for description, and is not limited thereto.

Figure 24:
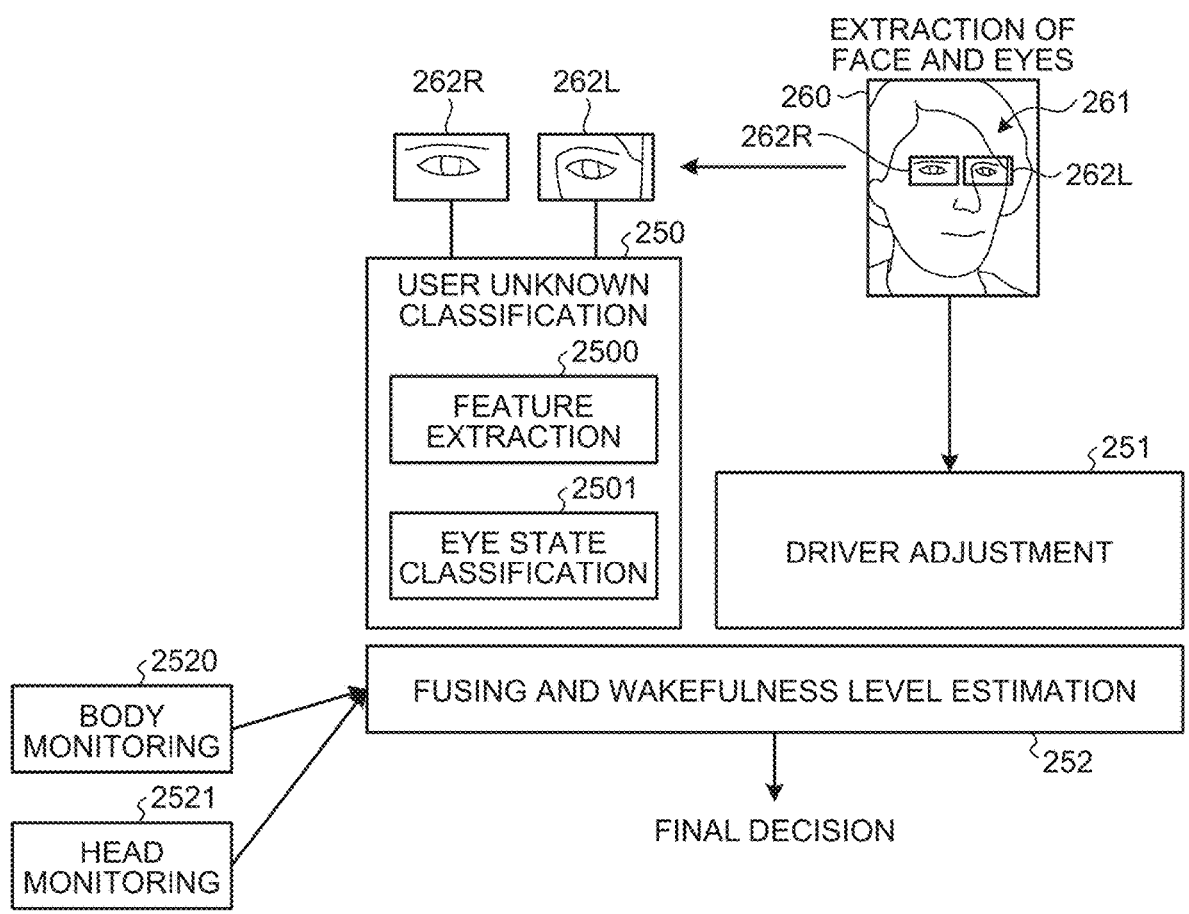
FIG. 24 is a schematic diagram for illustrating a method for determining wakefulness of a driver, which is applicable to the embodiment.

Next, an example of a method for determining the wakefulness of the driver will be described. FIG. 24 is a schematic diagram for illustrating a method for determining wakefulness of a driver, which is applicable to the embodiment. First, a face 261 of the driver is extracted from a captured image 260 captured by an in-vehicle camera, and then a right eye 262R and a left eye 262L are further extracted from the face 261 extracted. In addition, the captured image 260 is adjusted by a driver adjustment process 251 in a predetermined manner.

For the right eye 262R and the left eye 262L extracted from the face 261, features are extracted by feature extraction processing 2500 of user unknown classification processing 250, and the eye state is classified by eye state classification processing 2501. As the feature extraction processing 2500, it is possible to apply various methods such as a combination of histograms of oriented gradients (HoG) and principal component analysis, detection of Eyes Aspect Ratio (EAR), and measurement of a corneal reflection point. Similarly, regarding the eye state classification processing 2501, it is also possible to apply various classification methods such as a support vector machine (SVM), a K-Means method, and classification using a neural network.

By fusing and wakefulness level estimation processing 252, the wakefulness level of the driver is estimated by fusing the features extracted by the feature extraction processing 2500, the eye state classified by the eye state classification processing 2501, and the captured image adjusted by the driver adjustment process 251 together with the body information acquired by a body monitoring 2520 and the head information acquired by a head monitoring 2521.

<3-6-5. Specific Example of Evaluation of Action Quality According to Embodiment>

Next, the evaluation of the action quality according to the embodiment will be described using a specific example.

Figure 25:
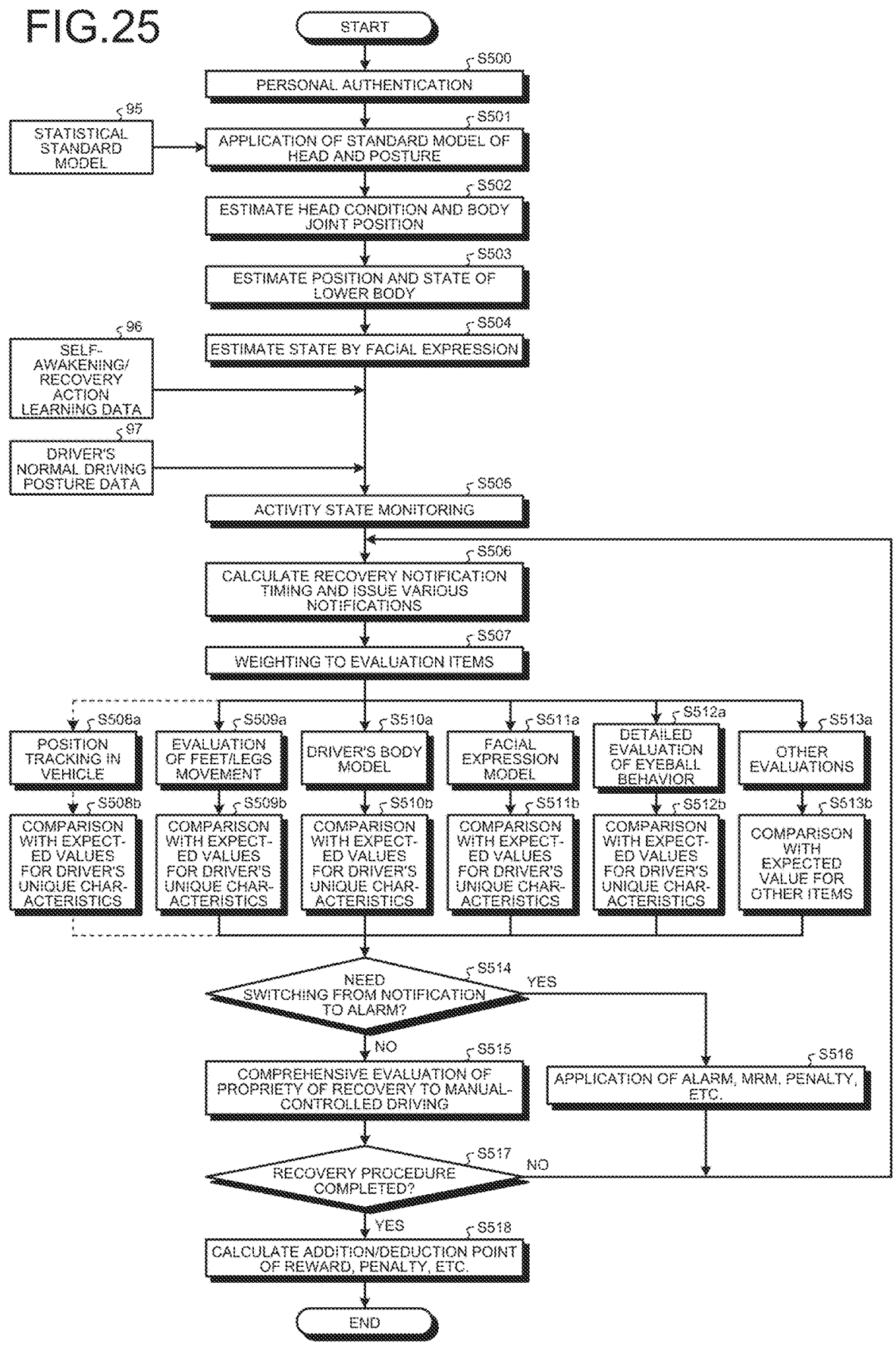
FIG. 25 is a flowchart illustrating an example of processing of evaluating the quality of action according to the embodiment.

FIG. 25 is a flowchart illustrating an example of processing of evaluating the quality of action according to the embodiment. When the driver sits on the driver's seat, the automated driving control unit 10112 performs personal authentication of the driver in step S500. The personal authentication can be performed, for example, based on a face image of the driver captured by the in-vehicle camera. The authentication method is not limited thereto, and may be performed based on biometric information that can be acquired from a finger or the like.

In the next step S501, the automated driving control unit 10112 acquires, for example, a statistical standard model 95 related to the head and body (posture) of the human body preliminarily stored in the storage unit 10111, and applies the acquired statistical standard model 95 as a standard model of the head and posture of the driver.

In next step S502, the automated driving control unit 10112 estimates the driver's state of the head and the joint positions of the body using the skeleton. In the next step S503, the automated driving control unit 10112 estimates the driver's position and state of the lower body using the skeleton. In the next step S504, the automated driving control unit 10112 estimates the state of the driver by the facial expression using the captured image obtained by capturing the face of the driver with the in-vehicle camera. More specifically, the automated driving control unit 10112 estimates visual fixation, fatigue, emotions, and the like based on the driver's facial expression.

Next, the automated driving control unit 10112 acquires driver's self-awakening/recovery action learning data 96 of the driver and driver's normal driving posture data 97 of the driver, and starts monitoring the activity state of the driver in step S505. The automated driving control unit 10112 monitors the activity state of the driver such as NDRA by the monitoring. The self-awakening/recovery action learning data 96 of the driver and the driver's normal driving posture data 97 can be acquired from the driver personal recovery characteristic dictionary 81, for example.

Note that the processing of steps S500 to S504 described above is processing in the case of a driver not having the self-awakening/recovery action learning data 96. In the case of a driver already having the self-awakening/recovery action learning data 96, information such as a body model included in the driver personal recovery characteristic dictionary 81 can be used instead of the statistical standard model 95.

In the next step S506, the automated driving control unit 10112 calculates a recovery notification timing for notifying the driver of the recovery from automated driving to manual-controlled driving. The automated driving control unit 10112 can calculate the recovery notification timing based on the LDM or the information acquired by the activity state monitoring on the driver started in step S505, for example. The automated driving control unit 10112 then performs various notifications such as a recovery request to the driver according to the calculated timing. This notification is performed in the processing of the flowchart in FIG. 17B, and is specifically performed in step S230, for example.

In the next step S507, the automated driving control unit 10112 performs weighting to each evaluation item. That is, based on the driver's response to various notifications made in step S506, the automated driving control unit 10112 performs weighting on a critical evaluation item based on a relevance with the monitoring result regarding the critical evaluation item, according to the activity state of the driver such as NDRA.

A set of steps S508a and S508b, a set of steps S509a and S509b, . . . , and a set of steps S513a and S513b individually indicate specific examples of weighting on the evaluation item. Among these, the set of steps S508a and S508b has the highest importance, the importance decreases toward the right in the drawing, and the set of steps S513a and S513b has the lowest importance.

In step S508a, the automated driving control unit 10112 tracks the position of the driver in the vehicle. For example, in step S508a, the position at which the driver is positioned after leaving the driver's seat is tracked. In step S508b, the automated driving control unit 10112 compares the tracking result acquired in step S508a with an expected value for tracking by the driver, and obtains an evaluation value normalized by the expected value.

For example, the expected value may be a parameter value when the driver is in a perfect state. That is, the expected value is a characteristic unique to the driver in a target item. By comparing the parameter value of the driver acquired by the monitoring with the expected value, an evaluation value normalized by the unique characteristic of the driver can be obtained.

In step S509a, the automated driving control unit 10112 evaluates the movement of the feet/legs of the driver. This makes it possible to grasp the operation state of the accelerator pedal or the brake pedal by the driver, for example. In step S509*b*, the automated driving control unit 10112 compares the evaluation value obtained in step S509*a* with an expected value for the movement of the feet/legs of the driver, and obtains an evaluation value normalized by the expected value as the unique characteristic of the driver.

In step S510*a*, the automated driving control unit 10112 evaluates the posture and the attitude of the driver based on the body model of the driver. This makes it possible to grasp information such as whether the driver is reclining the driver's seat and whether the driver faces the steering wheel, for example. In step S510*b*, the automated driving control unit 10112 compares the evaluation value obtained in step S510*a* with an expected value as a characteristic unique to the driver with respect to the posture and the attitude of the driver, and obtains an evaluation value normalized by the expected value.

Furthermore, in step S510*a*, based specifically on the arm and the finger out of the body model of the driver, the automated driving control unit 10112 evaluates a response action (action of the finger indicating "understood") of the driver toward various notifications such as the recovery request made in step S506. In step S510*b*, the automated driving control unit 10112 compares the evaluation value obtained in step S510*a* with the expected value as the driver's unique characteristics for the arm and the finger of the driver, and obtains an evaluation value normalized by the expected value.

In step S511*a*, the automated driving control unit 10112 evaluates the expression of the driver based on a facial expression model of the driver. A head model of the driver can be applied as the facial expression model. This makes it possible to estimate the driver's emotion (calm, drowsy, irritated, angry, etc.) at that time. In step S510*b*, the automated driving control unit 10112 compares the evaluation value obtained in step S510*a* with an expected value as a unique characteristic of the driver for the face expression of the driver, and obtains an evaluation value normalized by the expected value.

In step S512*a*, the automated driving control unit 10112 evaluates the behavior of the eyeball of the driver in detail. For example, as described with reference to FIG. 24, the automated driving control unit 10112 performs the eye state classification processing 2501 on the right eye 262R and the left eye 262L extracted from the driver's face 261, leading to acquisition of the behavior of the eyeball such as PERCLOS or saccade. This makes it possible to estimate whether the driver concentrates on the front side in the traveling direction or is in the mind wandering state. In step S512*b*, the automated driving control unit 10112 compares the evaluation value obtained in step S512*a* with an expected value as a unique characteristic of the driver with respect to the eyeball behavior of the driver, and obtains an evaluation value normalized by the expected value.

In step S513*a*, the automated driving control unit 10112 evaluates other items. In step S513*b*, the automated driving control unit 10112 compares the evaluation value obtained in step S513*a* with the expected value for the other items, and obtains an evaluation value normalized by the expected value.

After each processing of the set of steps S508*a* and S508*b* to the set of steps S513*a* and 513*b*, the automated driving control unit 10112 determines in step S514 whether it is necessary to switch the notification to the driver performed in step S506 to an alarm. That is, in a case where it is determined that the quality of the recovery operation of the driver has deteriorated due to a reason such as a delay in operation based on the normalized evaluation values obtained in each of the set of steps S508*a* and S508*b* to the set of steps S513*a* and 513*b*, notification is switched, in escalation, to an alarm.

When having determined that switching is necessary in step S514 (step S514, "Yes"), the automated driving control unit 10112 proceeds to the processing of step S516. In step S516, the automated driving control unit 10112 issues an alarm for prompting the driver to perform recovery to manual-controlled driving. Furthermore, the automated driving control unit 10112 deducts points from the evaluation value of the driver and applies a penalty to the driver. The automated driving control unit 10112 can start the MRM depending on the situation.

After the processing of step S516, the automated driving control unit 10112 returns to the processing of step S506.

In contrast, when having determined that switching is unnecessary in step S514 (step S514, "No"), the automated driving control unit 10112 proceeds to the processing of step S515. In step S515, based on the normalized evaluation value in each of the set of steps S508*a* and S508*b* to the set of steps S513*a* and 513*b*, the automated driving control unit 10112 performs comprehensive evaluation on propriety of recovery to manual-controlled driving.

The automated driving control unit 10112 calculates a comprehensive evaluation value tn according to the following Formula (2). In Formula (2), "Ev" represents an evaluation value for each evaluation item normalized by an expected value as a driver's unique characteristic. In addition, "W" represents a weight for each evaluation item. As illustrated in Formula (2), weighting corresponding to the evaluation item is performed on the evaluation value for each evaluation item, and the weighted evaluation values are added up for all the evaluation items to calculate the comprehensive evaluation value tn.

$$tn = \Sigma(Ev \times W) \quad (2)$$

Here, the comprehensive evaluation based on the evaluation values calculated by the set of steps S508*a* and S508*b* to the set of steps S513*a* and 513*b* will be described using a specific example. Here, the normalized evaluation value is represented by percentage %. That is, when an evaluation value to be weighted is X and a weight in percentage is W (%), a weighted evaluation value X' is calculated by the following Formula (3).

$$X' = X \times (W/100) \quad (3)$$

In a case where it is detected, in the position tracking in step S508*a*, that the driver's motion such as leaving the driver's seat and moving to the loading platform, moving to a nap space, and teleworking from the place other than the seat, the evaluation value is set as an 100% critical evaluation target, for example.

In the position tracking in step S508*a*, there is a case where although the driver's motion of leaving the seat is not detected, the execution of the secondary task having an inappropriate posture for driving is detected, such as when the driver uses the driving system sitting on the driver's seat while rotating the direction of the driver's seat. In this case, focusing on the evaluation of the movement of the feet/legs in step S509*a*, and placing importance on the evaluation of the recovery action performed with the foot of the driver stepping on the pedal such as the accelerator pedal and the brake pedal, and for example, weighting of 80% is performed. Furthermore, the recovery action based on the lower body of the body model is evaluated by weighting 20%, for example.

Here, in a case where the driver who takes their foot off the pedal, and returns to the driving posture from the posture crossing their legs with the driving seat rotated, it is necessary to correct the seat surface of the driver's seat in the lower body posture while putting back the crossed legs and sequentially laterally moving the foot. In the evaluation, the recovery movement speed is calculated from the observation information applied to the skeleton model of the foot, and there may be a case where it takes time for the movement of the posture and attitude normally expected to the driver, or the expected movement is not performed.

In such a case, since the transition characteristic of the action has individual differences, an evaluation value normalized with the evaluation value in the normally successful recovery action of the driver is used with reference to a learning dictionary generated by repeated use based on absolute observation values.

In addition, even in a case where the driver who has left the seat receives a recovery request and takes a normal seating posture, there is a possibility that the wakefulness cannot be sufficiently recovered. In view of this, from the recovery notification to the driver, the evaluation in steps S508a and S508b and steps S509a and S509b is weighted, and the recovery action of the driver is observed. In addition, immediately before transferring the driving steering to the driver after seating, the weight for steps S508a and S508b is set to 0%, and instead, the weight for the sum of the evaluation in steps S511a and S511b and the evaluation in steps S512a and S512b is set to 100%. In this manner, each evaluation value is weighted to obtain the comprehensive evaluation value tn.

Returning to the description of FIG. 25. In next step S517, the automated driving control unit 10112 determines whether a recovery procedure to manual-controlled driving by the driver has been completed. When having determined that the processing is not completed (step S517, "No"), the automated driving control unit 10112 returns to the processing of step S506. In this case, when the recovery procedure by the driver proceeds in order with no delay, the monitoring critical point transitions from left to right in the drawing, that is, from the set of steps S508a and S508b to the right process one by one so as to sequentially change the critical points, as the loop processing in steps S506 to S517 proceeds.

In contrast, when having determined that the recovery procedure is completed in step S517 (step S517, "Yes"), the automated driving control unit 10112 proceeds to the processing of step S518. In step S518, the automated driving control unit 10112 calculates an addition/deduction point such as a reward or a penalty for the driver based on the comprehensive evaluation value tn calculated in step S515.

(Specific Example of Weighting)

Next, the weighting in the set of steps S508a and S508b to the set of steps S513a to S513b in the flowchart of FIG. 25 described above will be described more specifically with reference to Tables 4A to 6B. Tables 4A and 4B illustrates an example of QoA evaluation based on a driver specific head model. In Tables 4A to 6B, the "Index-relevance (determination coefficient/relevance coefficient)" is a "weight" for the evaluation value in the corresponding item. This coefficient is a coefficient indicating relevance of the item to the QoA, and is also a determination coefficient used for QoA determination of the item.

TABLE 4A

QoA evaluation (1)

| Item | Attribute | Features | Index-relevance | Readiness/attentiveness |
|---|---|---|---|---|
| Item | Extracted variables | Extracted features, information | Determination coefficient/relevance coefficient | Target acquisition information (e.g., wakefulness level, recovery propriety determination, recovery quality evaluation value) |
| Driver personalized 3D head model Driver-specific head model | Identification and head shape adaptation of the general 3D head model Authentication Application of standard model to classification analysis | Person ID (is there a person?), Eye, mouth, and overall facial features Personal authentication Extraction of facial features such as eyes, nose, mouth, and other parts | 10% | Personal authentication |
| Driver personalized 3D head model | Head position/orientation, gaze Head position, orientation line-of-sight direction | Front facing (Front field of view), looking front left and right, looking out of the driving field of view Driver's attention direction analysis, front gaze, road sign confirmation, distracted driving, line-of-sight movement to side mirror portable terminal use, terminal browsing, navigation screen operation, . . . | 25% | Implementation of attention obligation Determination of confirmation execution ratio Factor of inattentiveness to front, distracted driving Operation confirmation of front confirmation parallax call evaluation confirmation of system notification instruction confirmation operation |

TABLE 4B

| | | QoA evaluation (1) | | |
|---|---|---|---|---|
| Driver personalized 3D head model | Facial expression Polygon model of facial expression | Eye state, blinking State of eyes: eyes are open, eyelid is droopy than usual, decrease in eye opening quickness (drowsiness index), blinking, PERCLOS, estimation of fatigue and drowsiness by eye movement Fatigue, drowsiness, emotions, sickness Estimation of fatigue by yawning or other expression analysis, emotion estimation, estimation of diseases such as seizures (mouth opening, painful expression), calm and collected mind, aggressive driving mind, and state in which situation has not been grasped due to half-asleep state, . . . | 25% | Emotion evaluation: Aggressive driving mind, calm driving mind, and immersion degree evaluation (sports watching, movie viewing, game, etc.) for NDRA by portable terminal device Presence or absence of front check and notification check during NDRA is evaluated by evaluation in conjunction with movement of line of sight; leading to evaluation of attention withdrawal situation with respect to driving steering (e.g., during use of driving automation level 3, when unconfirmed state continues for several minutes, driver is determined to have performed violation of attention obligation) drowsiness and fatigue expression |

Regarding the head model, when the extracted variables indicate authentication and application of the standard model to classification analysis, the target acquisition information is personal authentication, and the extracted features and information are personal authentication information and facial feature information such as eyes, nose, mouth, and the like. The weight is set to 10%.

Similarly, regarding the head model, in a case where the extracted variables are the head position, orientation, and the line-of-sight direction, the target acquisition information is information such as driver's implementation of attention obligation, determination of a confirmation execution ratio, a factor of inattentiveness to the front, distracted driving, operation confirmation of a front confirmation parallax call, and evaluation confirmation of a confirmation operation for a system notification instruction. Examples of the extracted feature and information include driver's attention direction analysis, front gaze, road sign confirmation, distracted driving, line-of-sight movement to side mirror, portable terminal use, and terminal browsing, navigation screen operation. The weight is set to 25%.

Furthermore, regarding the head model, in a case where the extracted variable is a polygon model of the facial expression, the target acquisition information is emotion evaluation. Examples of the emotion evaluation include an aggressive driving mind, a calm driving mind, and an immersion degree evaluation (sports watching, movie viewing, game, etc.) for NDRA by the portable terminal device.

It is possible to estimate how much attention is directed to the browsing content from the state in which the line of sight is directed to the content image at the time of NDRA by the line of sight. Furthermore, it is possible to estimate the emotional involvement status from the facial expression and the body gesture. The larger the emotional involvement, the more the driver's working memory is occupied by the information regarding the browsing content, the higher the risk of causing a decrease in situation awareness required at recovery to manual-controlled driving. Therefore, this evaluation on the expression is one of the major clues of the determination index when the driver performs normal recovery from automated driving to manual-controlled driving, and is important.

In addition, the presence or absence of the front check and the notification check during NDRA is evaluated by the evaluation in conjunction with the movement of the line of sight, leading to evaluation of attention withdrawal situation with respect to the driving steering (during use of driving automation level 3, when the unconfirmed state continues for several minutes, for example, the driver is determined to have performed violation of attention obligation), and further, the drowsiness and fatigue expression.

The extracted features and information are the state of the eyes and the state of other face parts. As the state of the eyes, examples of the extracted features and information include the state in which the eye is open, a state in which the eyelid is droopy than usual, a decrease in eye opening quickness (drowsiness index), blinking, PERCLOS, fatigue and drowsiness estimation due to eye movement, and. As the state of the face parts other than the eyes, the extracted features and information include estimation of fatigue by yawning or other expression analysis, emotion estimation, estimation of diseases such as seizures (mouth opening, painful expression, etc.), a calm and collected mind, an aggressive driving mind, and a state in which the situation has not been grasped due to half-asleep state.

The weight is set to 25% regardless of whether the extracted features and information are the state of the eye or the state of other face parts.

Tables 5A and 5B illustrates an example of QoA evaluation based on a driver's body model.

TABLE 5A

QoA evaluation (2)

| Item | Attribute | Features | Index-relevance | Readiness/attentiveness |
|---|---|---|---|---|
| Item | Extracted variables | Extracted features, information | Determination coefficient/ relevance coefficient | Target acquisition information (e.g., wakefulness level, recovery propriety determination, recovery quality evaluation value) |
| Overall driver body model tracking Driver body model | Upper driver body skeleton, body parts detection and their relative poses Upper body evaluation (coordinates of skeleton model including fingers, hands, arms, feet, etc. of upper body) of driver in driver's seat | Right hand, left hand, upper body part, Hands on wheel, driver eating, smoking, reading, searching something Whether hands are ready on steering, eating and drinking while talking, smoking, searching for object, operation of mobile terminal, . . . | 15% | Indexing of action evaluation leading to violation of driving steering/attention obligation Eating and drinking, degree of hands occupation, reading, unacceptable action during driving (navigator operation, emailing, searching for cigarette, wallet, camera, etc.) |

TABLE 5B

QoA evaluation (2)

| Overall driver body model tracking | 3D + 1 Time - driver poses and activity (time sequential body movement) Transition analysis along time axis performed on body model for NDRA immersion degree evaluation of action confirmation motion evaluation for behavior including pointing vocalization call is enabled | Recognition of special poses and driver behaviour - phone usage, turning to the back, Driving Position, out of driving position, Turned seat position Driving steering enabled posture, recovery delay prediction when driver is in posture other than driving posture | 20% | Behaviour evaluation. Action at steady time, recovery transition action evaluation after recovery request, and notification content confirmation operation after notification Body movement quality while returning back to driving posture. (Action quality evaluation that evaluates whether driver has made quick recovery to driver's seat and quick recovery to driving posture without negligence after recovery notification, based on analysis of posture and motion of limbs) Reference baseline delay time according to driver personal characteristic to perform respective time to recovery estimation based on personal movement activity level. Delay and quick recovery quality evaluation based on steady stable recovery by learning Note: even in case of quick action, it is determined whether or not action is panicking action. Action determined as panicking action is classified as low quality recovery action (in case where there is delay in start of recovery and driver attempts to make up for delay in hurry, risk of impairing safety would increase. Accordingly, avoiding such panicking recovery is set as target) |

With respect to the body model, in a case where the extracted variable is the upper body posture evaluation (coordinates of skeleton model including fingers, hands, arms, feet, of upper body) of the driver in the driver's seat, the target acquisition information is, for example, indexing of action evaluation leading to violation of the driving steering/attention obligation, eating and drinking, reading, an unacceptable action during driving (navigator operation, emailing, searching for cigarette, wallet, camera, etc.), and a degree of hands occupation. Examples of the extracted features and information include whether a hand is ready on the steering, eating and drinking while talking, smoking, searching for an object, an operation of a mobile terminal, . . . , and so on. The weight is set to 15%.

Similarly, by further performing transition analysis along the time axis on the body model, the NDRA immersion degree evaluation of the action is extracted as a variable, and the confirmation motion evaluation for behavior including a pointing vocalization call such as road front confirmation is also extracted as a variable.

Examples of the target acquisition information include an action at steady time, a recovery transition action evaluation after the recovery request, and a notification content confirmation operation after the notification. Examples of the recovery transition action evaluation include an action quality evaluation that evaluates whether the driver has made a quickly recovery to the driver's seat and quick recovery to the driving posture without negligence after the recovery notification, based on a motion analysis of the limbs.

As a matter of course, the recovery request notification may be designed to be issued at a necessary time in consideration of the adverse effect of being issued earlier than necessary, and the action evaluation of the driver may be incorporated as preparation for recovery from the prior notification sound to be notified to the driver. In particular, once involved in the NDRA for a long time, there is a possibility, immediately after receiving the recovery request, that the situation in front of the road changes in the scenery, the situation of the surrounding vehicles, and even the weather together with progress of the traveling path. Before the actual recovery notification by the notification sound, it is also an effective early recovery procedure that the driver starts to take in information necessary for situation awareness stepwise by directing their line of sight forward and confirming the road situation or confirming the update display information, and thus, evaluation thereof may be used as extension as a reward target.

The target acquisition information further includes delay and quick recovery quality evaluation based on steady stable recovery by learning. Incidentally, even in the case of a quick action, it is determined whether or not the action is a panicking action. In a case where the action is determined to be a panicking action, the action is classified as a low quality recovery action. That is, in a case where there is a delay in start of recovery and the driver attempts to make up for the delay in a hurry, the risk of impairing the safety would increase. Accordingly, avoiding such a panicking recovery is set as a target.

Examples of the extracted feature and information are a driving steering posture (whether driving steering is possible), and a recovery delay prediction when the driver is in a posture other than the driving posture. The weight is set to 20%.

Tables 6A and 6B illustrates an example of the QoA evaluation based on the evaluation of the movement of the driver's feet/legs and an example of the QoA evaluation based on the detailed evaluation of the eyeball behavior.

TABLE 6A

| | | QoA evaluation (3) | | |
|---|---|---|---|---|
| Item | Attribute | Features | Index-relevance | Readiness/attentiveness |
| Item | Extracted variables | Extracted features, information | Determination coefficient/relevance coefficient | Target acquistion information (e.g., wakefulness level, recovery propriety determination, recovery quality evaluation value) |
| Monitoring driver's foot/legs Evaluation of movement of driver's feet/legs | Leg detection, pose, orientation, motion tracking Evaluation of movement based on skeleton model of feet/legs | Legs on the gas pedal, break, activity, Occurrence of posture change that takes time to perform recovery of driving posture, such as moving away from driving steering action, crossing legs, and rotating driver's seat | 15% | Readiness to start pressing brake pedal, axel pedal, Expected delay time to recover for present state Predition of whether it is possible to immediately operate brake pedal or accelerator pedal, and time required for recovery in case where it is not possible (Time required for recovery is estimated by learning as delay time required from initial state) |

TABLE 6BB

QoA evaluation (3)

| | | | | |
|---|---|---|---|---|
| Eyeball behavior detailed evaluation | Evaluations of onset of saccade, microsaccade, and visual fixation (based on evaluation of coordinates and polar coordinates of eyeball behavior) | Presence or absence of visual information search, action of referring to visual information storage, and notification information confirmation | Index of wakefulness level depending on presence/absence of onset of behavior of information confirmation search set to 0% in case of no detection of eyeball behavior, 80% in case of continuous confirmation on straight line, and 100% in case of high-frequency confirmation by response to task | |
| Eyeball behavior detailed evaluation | Evaluations of onset of saccade, microsaccade, and visual fixation (based on evaluation of coordinates and polar coordinates of eyeball behavior | Visual information search for content of notification information (evaluation of onset of eyeball behavior of message confirmation of notification content, or macrosaccade behavior in vicinity of visual fixation) | 0%: in case of no reaction made to handover point change notification or update notification 100%: in case of presence of prompt notification content and visual confirmation of factor after notification | Whether wakefulness level is at level capable of searching by visual information, and whether attentiveness level is high |

Regarding the movement of the driver's feet/legs, the extracted variable is the evaluation of the movement based on the skeleton model of the feet/legs, and the target acquisition information is the prediction of whether it is possible to immediately operate the brake pedal or the accelerator pedal and the time required for recovery in a case where it is not possible. The time required for the recovery is estimated by learning as the delay time required from the initial state. The extracted features and information are, for example, occurrence of posture change that takes time to perform recovery of the driving posture, such as moving away from the driving steering action, crossing the legs, and rotating the driver's seat. The weight is set to 15%.

Regarding the driver's eyeball behavior, extracted variables are evaluations of onset of saccade, microsaccade, and visual fixation. These are extracted based on the evaluation of the coordinates and polar coordinates of the eyeball behavior. Examples of the target acquisition information include whether the wakefulness level is at a level capable of searching by visual information, and whether the attentiveness level is high. Examples of the extracted features and information include the presence or absence of visual information search, the presence or absence of an action of referring to visual information storage, and the presence or absence of notification information confirmation. The weight becomes an index of the wakefulness level depending on the presence/absence of onset of the behavior of the information confirmation search, and is set to 0% in the case of no detection of eyeball behavior, 80% in the case of continuous confirmation on a straight line, and 100% in the case of high-frequency confirmation by response to the task.

In addition, regarding the eye movement of the driver, even when the extracted variable and the target acquisition information are similar to those described above, in a case where the extracted feature and information are different from those described above, that is, are visual information search for the content of the notification information, for example, evaluation of onset of eyeball behavior of message confirmation of the notification content, or macrosaccade behavior in the vicinity of visual fixation, and the like, the weight would be also different from those described above. In this case, the weight is set to 0% in a case of no reaction made to the handover point change notification or the update notification, and is set to 100% in a case of presence of prompt notification content and visual confirmation of a factor after the notification.

(3-6-6. Summary of DMS According to Embodiment)

There are known techniques of directly evaluating driver's conditions. On the other hand, there is no known method of quantification of the "quality of the recovery operation" that makes it difficult for the system to determine whether the driver is actually ready to perform recovery or to evaluate the operation performance for later determination of a reward depending on whether the driver is willing to follow the request to intervene (RTI) instruction issued by the system. When there is no reward feedback scheme according to the severity of the RTI instruction, it is difficult to make the driver responsible for giving priority to a serious situation.

In this case, the driver's working memory would remain at a monotonous attention level at which attention cannot be increased even in a situation where a recovery is highly required. This leads to execution of MRM on a road with heavy traffic, increasing a risk of a rear collision or a risk of causing a traffic congestion on a specific road.

In view of this, as described above, the driver monitoring system (DMS) according to the embodiment performs monitoring of the driver using the following methods.

(1) Use of a direct sensing technique that directly monitors the driver to monitor the driver's readiness for driving tasks.
(2) Estimation and monitoring of the responsive action of the driver from the viewpoint of the time required to return from the non-driving task of the automated driving mode to the driving task (manual-controlled driving) and the appropriateness of the driver's position.
(3) Estimation of an index of driver distraction by monitoring the driver's non-driving actions.
(4) Execution of monitoring personalized to the driver, in which a responsive action and the readiness of the driver are monitored based on a driving position determined to be appropriate by the driver.

(5) Parameterization of characteristics of the driver in relation to the driver's position and behavior and execution of recording for statistical analysis over time. This can be used for adaptation to the system in time and reference to driver behavior.

(6) Use of the detected driver's readiness and responsive actions for designing an optimal driver system that is best responsive to warning and intervention at driving automation levels 3 and 4.

(7) Acquisition of a 3D model of the driver's head or face, upper body, legs, arms, and hands, and adaption of the acquired model to the specific state of a person and a driver (for example, a state such as emotion, fatigue, illness, or distraction).

(8) Tracking of the movement of the entire body skeleton of the driver in order to estimate the behavior of the driver with high accuracy.

(9) Estimation of current and near-future driver posture and behavior based on common driver behavior, personalized general behavior, and a series of recent actions in certain situations (such as ODD and environmental conditions).

(10) Construction of an HMI that performs feedback to the driver about the quality of the detected and analyzed action related to the recovery.

(11) Construction of a feedback HMI constituted at least by visual information and further including an acoustic or haptic HMI.

(12) Provision of first-level feedback information that is timely with a delay less than a few seconds to 10 seconds from the detection.

(13) Indexing the quality of action (QoA) that is presented to the driver by visual feedback along with the credibility of the driver's past recovery quality.

(14) Recording and storing data in a non-volatile data storage capable of retrieval with a predetermined method, and executing analysis of data, in order to avoid data falsification.

As a technique for implementation of these terms, a 3D information acquisition technique for acquiring luminance (or RGB) information and depth information is required. An example for implementing such a 3D information acquisition technology is application of a Direct-Time of Flight (D-ToF) camera. The 3D information acquisition and processing makes it possible to identify and recognize the state (for example, wakefulness, distraction, and pathological change) of a particular driver with high accuracy and to dynamically characterize the posture, entire or part of body of the driver.

Furthermore, it is possible to generate a 3D head/face model of the driver from the depth information and the luminance information and adapt the driver to the 3D model in accordance with the input of the depth information and the luminance information.

As a result, a 3D mesh model of the driver is obtained with limited control points. This makes it possible to execute rigid body transformation (head position) and face gesture and eye state monitoring by non-rigid body deformation with high accuracy.

In addition to customization of the driver's personal system, it is necessary for perform acquisition of the 3D position of the driver's body part. This mainly includes the body skeleton and the position and orientation of the head. That is, the position and orientation of the head plays an important role in efficiently extracting facial features and facial gestures necessary for monitoring eye conditions. On the other hand, body skeleton tracking plays an important role in monitoring the driver's hand situation and posture, and in motion monitoring, which is used to evaluate the driver's behavior relative to the behavior assumed in known ODD.

In addition, positioning of arms, legs and hands can be performed with high accuracy in the 3D domain using 3D information acquisition techniques. This makes it possible not only to predict the future behavior of the driver with higher accuracy, but also to greatly simplify the acquisition of the body posture and the motion related to the driver behavior.

The above-described driver-by-driver customizable DMS needs to train each driver to learn the features extracted from luminance information and depth information of the 3D sensing technology. The following terms can be assumed as an example of the contents to be learned by the driver.

Sitting in the normal driver position and facing the windshield.

Sitting in the normal driver position and facing the camera.

Driving in accordance with regulations depending on varying conditions outside and inside the vehicle.

Monitoring behavior with a specifically defined HMI interaction.

In addition, the number of sensors installed in the vehicle may be minimized as long as the system is efficient. Accordingly, the camera position and the sufficiently wide field of view camera technology are very important in designing a driver monitoring system.

The position of the camera is desirably a position capable of imaging the entire body of the driver. Furthermore, it is more preferable to arrange the camera so as to minimize occlusion in imaging the body of the driver who is the subject. The field of view of the camera preferably has a size capable of simultaneous monitoring of different body parts and surroundings (for example, a passenger).

Furthermore, it is preferable to be able to apply a monitoring camera technology capable of simultaneously acquiring 3D information necessary for accurate 3D model positioning as well as a 2D image or texture content. That is, in order to detect the behavior of the driver with high accuracy, it is necessary to be able to acquire 3D information important for reliably monitoring all body parts of the driver and 2D images and texture content important for extracting features of the face.

Furthermore, it is preferable to have high conformity to the noise variable because the behavior of the driver can be easily detected with high accuracy. For example, it is conceivable to improve robustness against varying illumination conditions by the use in combination with a multiple exposure method. Furthermore, arranging the camera so as to minimize occlusion as described above is also effective from the viewpoint of adaptability to the noise variable. Furthermore, it is also effective to learn different types of drivers (age, ethnicity, etc.) and behaviors of these drivers.

In the DMS according to the embodiment of the present disclosure, by quantifying the "quality of action" of the recovery action when the driver perform recovery from automated driving to manual-controlled driving, the system can evaluate and predict the action of the driver when the system requests the driver to resume manual-controlled driving after automated driving, in automated driving at driving automation level 3 and driving automation level 4.

In the DMS according to the embodiment, according to the results obtained from the series of evaluation processing, the system can appropriately determine personalized reward and penalty evaluation values for the driver's action. With this configuration, by applying the DMS according to the embodiment, it is possible to directly influence the prioritization of the operation in the driver's consciousness so that the driver interrupts or stops continuing the NDRA and performs recovery to the manual-controlled driving at an early stage according to the intervention request from the system, rather than being forced from the system.

The present specification has described exemplary cases focusing on an application referred to as driving automation level 3 or driving automation level 4 as an application of automated driving. On the other hand, it is not assumed that a general vehicle is used while being specialized for a specific driving automation level. The level 3 of the automated driving or level 4 of the automated driving is set as a condition enabling more advanced automated driving with functionally requiring less intervention of the driver.

Therefore, when the driver actually uses the vehicle having the performance, there may be any combination in the use of automated driving, such as use of driving automation level 1 or driving automation level 2 assumed to have limited function of driving assistance, depending on the environment and other conditions. These use categories are merely defined terms that have been used in the process of discussing the design viewpoint and use system of the vehicle and the system. Accordingly, from the driver's usage viewpoint, the usage boundary between the levels will not be always limited to the explicit use as defined, in the future.

Furthermore, even in the case of the driving automation level 2 as a system, with more advanced driving assistance provided, when the risk continues to be extremely small in the stable road travel section, the driver tends to have a sense of use of "conditional automated driving" at the driving automation level 3 being the level having no big difference as compared with the sense of use of the higher driving automation level 2 even in the ODD state provided as the automated driving assistance being the "automated driving function under a specific condition" of the driving automation level 2. In addition, in order to achieve preventive and safety against occurrence due to a decrease in attention occurring at the time of use of the driving automation level 2, it would be necessary to perform monitoring of a decrease in the wakefulness of the driver also at the driving automation level 2.

Accordingly, it is obvious that, in addition to the examples in the present embodiment, the functions described in the present embodiment can be extended and used under the driver monitoring at the time of use in the levels in the driving automation level 0 to the driving automation level 2, and thus, the automated driving functions at the driving automation level 3 or less are not separately described as examples. That is, the scope of application of the embodiment is not limited to the classification described as defined in the levels of automated driving of the SAE.

<Supplementary Notes>

The above-described embodiment provides a measure for the reduction in attention, which occurs as reduction of attentiveness that has been once directed to safe steering action determination required for existing manual-controlled driving. Specifically, this reduction is caused by excessive dependence on the automated driving function occurring as a change in action determination psychology attributed to the psychological sense of security that can occur by introducing automated driving and the advanced driving assistance functions, at the use of these functions by the driver.

As a countermeasure, the action evaluation method is provided based on action observation of the driver during the use of the vehicle by the driver, and the quality of the driver's action is directly or indirectly reflected to the driver as a feedback from the system by using the indexed numerical value according to the condition allowed by the traveling condition. More specifically, as the influence of the driver's own action, the feedback is performed onto the driver in one or more of the forms of visual, auditory, tactile, and olfactory forms, regarding how the action result will be reflected in subsequent situations. The present disclosure relates to a technology of using this feedback to prompt a behavioral change for achieving prevention or reduction of driver's excessive dependence on the automated driving system described above, which is to be achieved through repeated use of the system in which an influence of a driver's own action is given as a direct or indirect reward or a penalty to the driver through a mechanism working physically, psychologically, or systematically, by the feedback.

There may be a case where the driver uses automated driving function with excessive dependence on the function beyond the system's automated driving function serving limit zone, and it is not probable to enable the driver to take a responsive action to achieve recovery to manual-controlled driving. The present disclosure relates to a technology in which, even in such a case, the system can provide necessary information in order to prevent an emergency stop of a vehicle in a road section due to a mechanism such as MRM, for example, as risk minimization processing according to the necessity of a road environment to be the key of social activity, and in order to cause a driver to have a behavioral intension for achieving an appropriate early recovery action in response to a request for recovery to manual-controlled driving. Specifically, the provision of the information should be capable of performing hierarchical risk determination according to the degree of importance by causing the behavioral intension to act properly, performed in a form of involving an intuitive sense of immediate closeness along with situation change, that is, over time.

Furthermore, with the evaluation provided by system according to the present disclosure, specifically, the action quality evaluation applied to quality, that is, superiority and inferiority, of the responsive action of the driver according to the information presentation that enables accurate risk determination, that is, the required action quality evaluation at the time of recovery from manual-controlled driving, it is possible to perform action learning as rewards and benefits to be given to the driver as a result of quick and accurate recovery action, and as even disadvantages. An automated driving system according to the present disclosure includes the following series of technologies that provide a control method in accordance with human behavioral intention and an ergonomic viewpoint, while extracting advantages of an automated driving function required by society.

Technology of driver's action quality evaluation

Indexing technology for driver's behavior evaluation result

HMI that performs risk determination to be provided to driver and prediction of progress transition of determination HMI that chronologically provides non-monotonic risk information by hierarchical risk classification information provision to driver HMI storage projection into working memory applied to the driver, for visualizing future risk (display addition/ deduction point or feedback of penalty or restriction in future) at time of action determination Intuitive and time-series provision, to the driver, of use permission condition for user of automated driving such as ODD The automated driving system according to the present disclosure presents the driver with options through time-series risk variation, risk importance, and HMI through the individual technologies and the like, thereby providing a function that enables the driver to perform a behavioral change and self-learning to maximize the benefits while maintaining the sensory risk balance at the time of using automated driving.

By using the technology according to the present disclosure in the driver's natural sense of use, the influence exerted by the driver's own action during use of automated driving is depicted and visualized as near future events. As a result, with the automated driving system according to the present disclosure, it is possible to project, to the driver by an appropriate HMI, a social negative influence difficult to be sensed directly, such as a traffic congestion and a rear-end accident as a result thereof which can be caused by driver's excessive dependence on MRM during automated driving use. With this functionality, the automated driving system according to the present disclosure can provide control which is suitable in use for the purpose that would not hinder social activities and which has incorporated human behavioral psychology, and in addition, can exhibit other effects and implementation methods obvious to those skilled in the art from the description of the present embodiment.

The effects described in the present specification are merely examples, and thus, there may be other effects, not limited to the exemplified effects.

Note that the present technique can also have the following configurations.

(1) An information processing device comprising:
an automated driving control unit that makes a notification to a driver of a vehicle regarding a condition enabling automated driving of the vehicle based on an operation design domain that is set for the vehicle.

(2) The information processing device according to the above (1),
wherein the automated driving control unit acquires an approval response to the notification, made by the driver.

(3) The information processing device according to the above (1) or (2),
wherein the automated driving control unit makes the notification before the driver sits on a driver's seat of the vehicle and starts driving of the vehicle.

(4) The information processing device according to any one of the above (1) to (3),
wherein the automated driving control unit makes the notification in a manual-controlled driving section before the vehicle enters a section satisfying the condition.

(5) The information processing device according to any one of the above (1) to (4),
wherein the automated driving control unit makes the notification according to an importance of handover from the automated driving to manual-controlled driving.

(6) The information processing device according to any one of the above (1) to (5), further comprising a monitoring unit that performs driver monitoring, that is, an operation of monitoring a state of the driver,
wherein the automated driving control unit performs an evaluation of a recovery status from an automated driving state of the driver to a state in which the driver's manual-controlled driving is possible, based on a state of the driver acquired by monitoring of the driver.

(7) The information processing device according to the above (6),
wherein, when the evaluation for the recovery status is a predetermined level or less, the automated driving control unit imposes a penalty on the driver.

(8) The information processing device according to the above (7),
wherein the automated driving control unit imposes a restriction on a non-driving action of the driver during the automated driving, as the penalty.

(9) The information processing device according to the above (7) or (8),
wherein the automated driving control unit gives an unpleasant stimulus to a body of the driver during the automated driving, as the penalty.

(10) The information processing device according to any one of the above (7) to (9),
wherein the automated driving control unit imposes a restriction on the use of the automated driving by the driver, as the penalty.

(11) The information processing device according to the above (6),
wherein the automated driving control unit changes the condition according to the evaluation.

(12) The information processing device according to any one of the above (1) to (11),
wherein, when an unexpected event occurs while the vehicle is traveling, the automated driving control unit determines which one of automated driving or manual-controlled driving is to be used for execution of evacuation travel for the event in accordance with urgency of the unexpected event, and based on a result of the determination and a behavior of the driver according to the result of the determination, the automated driving control unit performs deduction of the evaluation of the driver by a degree selected from any one of a first degree, a second degree lower than the first degree, and a third degree lower than the second degree.

(13) The information processing device according to the above (12),
wherein, when the evacuation travel is determined to be started by manual-controlled driving and there is a predetermined margin or more until the start of the manual-controlled driving for the evacuation travel, the automated driving control unit notifies the driver of the occurrence of the unexpected event, and when the response of the driver to the notification cannot be acquired and the margin of the evacuation travel until the start of the manual-controlled driving is a predetermined level or less, the automated driving control unit starts the evacuation travel by using automated driving and performs deduction of the evaluation of the driver by the first degree.

(14) The information processing device according to the above (12) or (13),
wherein, when having determined that the evacuation travel is to be started by manual-controlled driving and having determined that a grace time given before start of the evacuation travel cannot be extended, the automated driving control unit starts the evacuation travel by using automated driving and performs deduction of the evaluation of the driver by the second degree.

(15) The information processing device according to any one of the above (12) to (14), wherein, when having determined that the evacuation travel is to be started by using automated driving, the automated driving control unit performs deduction of the evaluation of the driver by the third degree.

(16) An information processing device comprising:
an automated driving control unit that controls automated driving of a vehicle based on an operation design domain set for the vehicle; and
a monitoring unit that performs driver monitoring for monitoring a driver of the vehicle,
wherein the automated driving control unit performs
an evaluation of a recovery status from an automated driving state of the driver to a state in which manual-controlled driving is possible, based on a state of the driver acquired by the driver monitoring, and changes a condition enabling automated driving of the vehicle based on the operation design domain, according to the evaluation.

(17) An information processing method comprising steps to be executed by a processor, the steps including
an automated driving control step of making a notification to a driver of a vehicle regarding a condition enabling automated driving of the vehicle based on an operation design domain that is set for the vehicle.

(18) An information processing program for causing a computer to execute
an automated driving control step of making a notification to a driver of a vehicle regarding a condition enabling automated driving of the vehicle based on an operation design domain that is set for the vehicle.

(19) An information processing method comprising steps to be executed by a processor, the steps including:
an automated driving control step of controlling automated driving of a vehicle based on an operation design domain set for the vehicle; and
a monitoring step of monitoring a driver of the vehicle,
wherein the automated driving control step performs
an evaluation of a recovery status from an automated driving state of the driver to a state in which manual-controlled driving is possible, based on a state of the driver monitored by the monitoring step, and changes a condition enabling the automated driving of the vehicle based on the operation design domain, according to the evaluation.

(20) An information processing program causing a computer to execute steps comprising:
an automated driving control step of controlling automated driving of a vehicle based on an operation design domain set for the vehicle; and
a monitoring step of monitoring a driver of the vehicle,
wherein the automated driving control step performs
an evaluation of a recovery status from an automated driving state of the driver to a state in which manual-controlled driving is possible, based on a state of the driver monitored by the monitoring step, and changes a condition enabling the automated driving of the vehicle based on the operation design domain, according to the evaluation.

REFERENCE SIGNS LIST 50, 50a, 50b, 50c Bird's-Eye View Display
51a Short Distance Display Unit
51b Intermediate Distance Display Unit
51c Long Distance Display Unit
53a Automated Driving Enabled Section
53b Recovery Attitude Retention Section
53c Operation Recovery Required Section
80 LDM Initial Data
81 Driver Personal Recovery Characteristic Dictionary
82 RRR
83 Vehicle Dynamics Characteristics
85 Road Environment Data
86 Own Vehicle Information
90 Road Environment Static Data
91 On-Board Device Information
92 Road Manageability Information
93 Driver Manageability Information
95 statistical standard model
96 Self-Awakening/Recovery Action Learning Data
97 Driver's Normal Driving Posture Data
100 HMI
101 Driver Recovery Delay Evaluation Unit
102 Traveling Path Preliminary Predictability Acquisition Range Estimation Unit
103 Remote Assistance Control/Steering Assistance Capability Monitoring Unit
104 Driver Behavioral Change Achievement Level Estimation Unit
105 Own Vehicle Traveling Path Performance Information Providing Unit
106 Odd Application Estimation Unit
107 Automated Driving Use Permission Integrated Control Unit
108 Driver Action Quality Evaluation Unit
132 Face/Upper Body/Eyeball Camera
133 Body Posture/Head Camera
140 High-Freshness Update LDM
200 Driver Action Evaluation Unit
201a, 201b Learning Unit
202 Evaluation Unit
220 3D Head Model Generation Process
230 3D Body Model Generation Process
250 User Disabled Classification Processing
1010 Driver Action Response Evaluation Unit
1040 Superior Recovery Steering Action Evaluation Point Addition Unit
1041 Penalty Action Cumulative Addition Recording Unit
2000 Driver Information Generation Unit
2001, 2104 Parameter Generation Unit
2002 Driver DB
2003 Adaptation Unit
2004 Monitoring/Extraction/Conversion Unit
2005 Readiness Evaluation Unit
2006 Buffer Memory
2100 3D Head Model Generation Unit
2101 Face Identification Information Extraction Unit
2102 Body Model Generation Unit
2103 Model Expansion Unit
2105 Storage Unit
2202 Head Mesh Model
2302 Body Model
10101 Input Unit
10112 Automated Driving Control Unit

The invention claimed is:
1. An information processing device comprising:
a memory storing program code, and at least one processor configured to execute the program code to perform operations comprising:
making a notification to a driver of a vehicle regarding a condition enabling automated driving of the vehicle based on an operation design domain that is set for the vehicle;

when an unexpected event occurs while the vehicle is traveling, making a determination whether automated driving or manual-controlled driving is to be used for execution of evacuation travel for the event in accordance with an urgency of the unexpected event;

based on a result of the determination and a behavior of the driver, performing a deduction of an evaluation of the driver by a degree selected from any one of a first degree, a second degree lower than the first degree, and a third degree lower than the second degree;

when the evacuation travel is determined to be started by manual-controlled driving and there is a predetermined margin or more until a start of the manual-controlled driving for the evacuation travel, notifying the driver of an occurrence of the unexpected event; and when a response of the driver to the notification cannot be acquired and a margin of the evacuation travel until the start of the manual-controlled driving is a predetermined level or less, starting the evacuation travel by using automated driving and performing deduction of the evaluation of the driver by the first degree.

2. The information processing device according to claim 1, wherein the operations further comprise:
acquiring an approval response to the notification, made by the driver.

3. The information processing device according to claim 1, wherein the operations further comprise:
making the notification before the driver sits on a driver's seat of the vehicle and starts driving of the vehicle.

4. The information processing device according to claim 1, wherein the operations further comprise:
making the notification in a manual-controlled driving section before the vehicle enters a section satisfying the condition.

5. The information processing device according to claim 1, wherein the operations further comprise:
making the notification according to an importance of handover from the automated driving to manual-controlled driving.

6. The information processing device according to claim 1, wherein the operations further comprising:
monitoring a state of the driver; and
performing an evaluation of a recovery status from an automated driving state of the driver to a state in which the manual-controlled driving by the driver is possible, based on the state of the driver.

7. The information processing device according to claim 6, wherein the operations further comprise:
when the evaluation for the recovery status is a predetermined level or less, imposing a penalty on the driver.

8. The information processing device according to claim 7, wherein the operations further comprise:
imposing a restriction on a non-driving action of the driver during the automated driving as the penalty.

9. The information processing device according to claim 7, wherein the operations further comprise:
giving a predetermined stimulus to a body of the driver during the automated driving, as the penalty.

10. The information processing device according to claim 7, wherein the operations further comprise:
imposing a restriction on use of the automated driving by the driver as the penalty.

11. The information processing device according to claim 6, wherein the operations further comprise:
changing the condition according to the evaluation.

12. An information processing device comprising:
a memory storing program code, and
at least one processor configured to execute the program code to perform operations comprising:
making a notification to a driver of a vehicle regarding a condition enabling automated driving of the vehicle based on an operation design domain that is set for the vehicle;
when an unexpected event occurs while the vehicle is traveling, making a determination whether automated driving or manual-controlled driving is to be used for execution of evacuation travel for the event in accordance with an urgency of the unexpected event;
based on a result of the determination and a behavior of the driver, performing a deduction of an evaluation of the driver by a degree selected from any one of a first degree, a second degree lower than the first degree, and a third degree lower than the second degree; and
when having determined that the evacuation travel is to be started by manual-controlled driving and having determined that a grace time given before start of the evacuation travel cannot be extended, starting the evacuation travel by using automated driving and performing deduction of the evaluation of the driver by the second degree.

13. The information processing device according to claim 12, wherein the operations further comprise:
when having determined that the evacuation travel is to be started by using automated driving, performing deduction of the evaluation of the driver by the third degree.

14. An information processing method comprising:
making a notification to a driver of a vehicle regarding a condition enabling automated driving of the vehicle based on an operation design domain that is set for the vehicle;
when an unexpected event occurs while the vehicle is traveling, making a determination whether automated driving or manual-controlled driving is to be used for execution of evacuation travel for the event in accordance with an urgency of the unexpected event;
based on a result of the determination and a behavior of the driver, performing a deduction of an evaluation of the driver by a degree selected from any one of a first degree, a second degree lower than the first degree, and a third degree lower than the second degree;
when the evacuation travel is determined to be started by manual-controlled driving and there is a predetermined margin or more until a start of the manual-controlled driving for the evacuation travel, notifying the driver of an occurrence of the unexpected event; and
when a response of the driver to the notification cannot be acquired and a margin of the evacuation travel until the start of the manual-controlled driving is a predetermined level or less, starting the evacuation travel by using automated driving and performing deduction of the evaluation of the driver by the first degree.

15. An information processing method comprising:
making a notification to a driver of a vehicle regarding a condition enabling automated driving of the vehicle based on an operation design domain that is set for the vehicle;
when an unexpected event occurs while the vehicle is traveling, making a determination whether automated driving or manual-controlled driving is to be used for execution of evacuation travel for the event in accordance with an urgency of the unexpected event;

based on a result of the determination and a behavior of the driver, performing a deduction of an evaluation of the driver by a degree selected from any one of a first degree, a second degree lower than the first degree, and a third degree lower than the second degree; and when having determined that the evacuation travel is to be started by manual-controlled driving and having determined that a grace time given before start of the evacuation travel cannot be extended, starting the evacuation travel by using automated driving and performing deduction of the evaluation of the driver by the second degree.

16. A non-transitory computer readable medium storing program code, the program code being executable by at least one processor to perform operations comprising:

making a notification to a driver of a vehicle regarding a condition enabling automated driving of the vehicle based on an operation design domain that is set for the vehicle;

when an unexpected event occurs while the vehicle is traveling, making a determination whether automated driving or manual-controlled driving is to be used for execution of evacuation travel for the event in accordance with an urgency of the unexpected event;

based on a result of the determination and a behavior of the driver, performing a deduction of an evaluation of the driver by a degree selected from any one of a first degree, a second degree lower than the first degree, and a third degree lower than the second degree;

when the evacuation travel is determined to be started by manual-controlled driving and there is a predetermined margin or more until a start of the manual-controlled driving for the evacuation travel, notifying the driver of an occurrence of the unexpected event; and when a response of the driver to the notification cannot be acquired and a margin of the evacuation travel until the start of the manual-controlled driving is a predetermined level or less, starting the evacuation travel by using automated driving and performing deduction of the evaluation of the driver by the first degree.

17. A non-transitory computer readable medium storing program code, the program code being executable by at least one processor to perform operations comprising:

making a notification to a driver of a vehicle regarding a condition enabling automated driving of the vehicle based on an operation design domain that is set for the vehicle;

when an unexpected event occurs while the vehicle is traveling, making a determination whether automated driving or manual-controlled driving is to be used for execution of evacuation travel for the event in accordance with an urgency of the unexpected event;

based on a result of the determination and a behavior of the driver, performing a deduction of an evaluation of the driver by a degree selected from any one of a first degree, a second degree lower than the first degree, and a third degree lower than the second degree; and when having determined that the evacuation travel is to be started by manual-controlled driving and having determined that a grace time given before start of the evacuation travel cannot be extended, starting the evacuation travel by using automated driving and performing deduction of the evaluation of the driver by the second degree.

* * * * *